United States Patent
Netherton et al.

(10) Patent No.: US 12,552,775 B2
(45) Date of Patent: Feb. 17, 2026

(54) COMPOUNDS AND USES THEREOF

(71) Applicant: Foghorn Therapeutics Inc., Indianapolis, IN (US)

(72) Inventors: Matthew Netherton, Cambridge, MA (US); Francois Brucelle, Belmont, MA (US); Jing Deng, Cambridge, MA (US); Johannes H. Voigt, Cambridge, MA (US)

(73) Assignee: Foghorn Therapeutics Inc., Cambridge, MA (US)

( * ) Notice: Subject to any disclaimer, the term of this patent is extended or adjusted under 35 U.S.C. 154(b) by 447 days.

(21) Appl. No.: 18/253,526

(22) PCT Filed: Nov. 22, 2021

(86) PCT No.: PCT/US2021/060352
§ 371 (c)(1),
(2) Date: May 18, 2023

(87) PCT Pub. No.: WO2022/109396
PCT Pub. Date: May 27, 2022

(65) Prior Publication Data
US 2024/0101534 A1  Mar. 28, 2024

Related U.S. Application Data

(60) Provisional application No. 63/116,268, filed on Nov. 20, 2020.

(51) Int. Cl.
| | | |
|---|---|---|
| *C07D 401/14* | (2006.01) | |
| *A61P 35/00* | (2006.01) | |
| *C07D 417/14* | (2006.01) | |
| *C07D 471/10* | (2006.01) | |
| *C07D 487/10* | (2006.01) | |

(52) U.S. Cl.
CPC ............ *C07D 401/14* (2013.01); *A61P 35/00* (2018.01); *C07D 417/14* (2013.01); *C07D 471/10* (2013.01); *C07D 487/10* (2013.01)

(58) Field of Classification Search
CPC ................ A61K 31/47; A61K 31/4402; A61K 31/4406; A61K 31/4409; A61K 45/06; A61K 31/472; A61K 31/435; A61P 33/02; A61P 33/14; C07D 213/38; C07D 215/12; Y02A 50/30
See application file for complete search history.

(56) References Cited

U.S. PATENT DOCUMENTS

2020/0255416 A1  8/2020  Chory et al.

FOREIGN PATENT DOCUMENTS

| WO | 2020/078933 A1 | 4/2020 |
| WO | 2020/160198 A1 | 8/2020 |
| WO | 2021/207291 A1 | 10/2021 |

OTHER PUBLICATIONS

Farnaby, et al., "BAF complex vulnerabilities in cancer demonstrated via structure-based PROTAC design" Nature Chemical Biology, Jun. 10, 2019 vol 15, p. 672-680; p. 673, Fig. 1b.

PCT International Search Report and the Written Opinion of the International Searching Authority pertaining to International Application No. PCT/US2021/060352; Date of Mailing: Feb. 11, 2022; 7 pages.

*Primary Examiner* — Jeffrey S Lundgren
*Assistant Examiner* — Paul Randall Gauger
(74) *Attorney, Agent, or Firm* — Nielsen IP Law LLC

(57) ABSTRACT

The present disclosure features compounds and methods useful for the treatment of BAF complex-related disorders.

29 Claims, No Drawings

COMPOUNDS AND USES THEREOF

BACKGROUND

The invention relates to compounds useful for modulating BRG1- or BRM-associated factors (BAF) complexes. In particular, the invention relates to compounds useful for treatment of disorders associated with BAF complex function.

Chromatin regulation is essential for gene expression, and ATP-dependent chromatin remodeling is a mechanism by which such gene expression occurs. The human Switch/Sucrose Non-Fermentable (SWI/SNF) chromatin remodeling complex, also known as BAF complex, has two SWI2-like ATPases known as BRG1 (Brahma-related gene-1) and BRM (Brahma). The transcription activator BRG1, also known as ATP-dependent chromatin remodeler SMARCA4, is encoded by the SMARCA4 gene on chromosome 19. BRG1 is overexpressed in some cancer tumors and is needed for cancer cell proliferation. BRM, also known as probable global transcription activator SNF2L2 and/or ATP-dependent chromatin remodeler SMARCA2, is encoded by the SMARCA2 gene on chromosome 9 and has been shown to be essential for tumor cell growth in cells characterized by loss of BRG1 function mutations. Deactivation of BRG and/or BRM results in downstream effects in cells, including cell cycle arrest and tumor suppression.

SUMMARY

The present invention features compounds useful for modulating a BAF complex. In some embodiments, the compounds are useful for the treatment of disorders associated with an alteration in a BAF complex, e.g., a disorder associated with an alteration in one or both of the BRG1 and BRM proteins. The compounds of the invention, alone or in combination with other pharmaceutically active agents, can be used for treating such disorders.

In an aspect, the invention provides a compound having the structure of Formula I:

Formula I

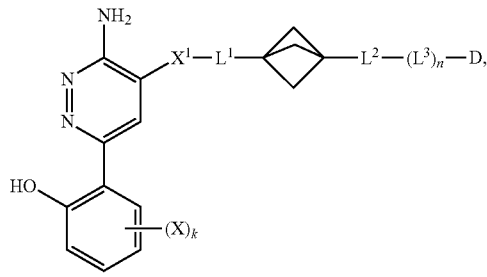

wherein
X is halo (e.g., F, Cl, Br, or I);
$X^1$ is absent, O, or $NR^1$;
k is 0, 1, 2, or 3;
n is 0, 1, or 2;
$R^1$ is H or optionally substituted $C_1$-$C_6$ alkyl;
$L^1$ is optionally substituted $C_1$-$C_6$ alkylene, optionally substituted $C_2$-$C_6$ alkenylene, or optionally substituted $C_2$-$C_6$ alkynylene;
$L^2$ is absent, optionally substituted $C_1$-$C_6$ alkylene, optionally substituted $C_1$-$C_{20}$ heteroalkylene, or optionally substituted $C_2$-$C_9$ heterocyclylene;
each $L^3$ is, independently, optionally substituted $C_1$-$C_{20}$ heteroalkylene, optionally substituted $C_3$-$C_{10}$ carbocyclylene, optionally substituted $C_3$-$C_{10}$ carbocyclylene-$C_1$-$C_6$ alkylene, optionally substituted $C_2$-$C_9$ heterocyclylene, optionally substituted $C_2$-$C_9$ heterocyclylene-$C_1$-$C_6$ alkylene, optionally substituted $C_6$-$C_{10}$ arylene, optionally substituted $C_6$-$C_{10}$ arylene-$C_1$-$C_6$ alkylene, optionally substituted $C_2$-$C_6$ alkynylene, O, or $NR^1$; and
D is a degradation moiety,
or a pharmaceutically acceptable salt thereof.

In some embodiments, k is 0. In some embodiments, k is 1.

In some embodiments, $X^1$ is absent. In some embodiments, $X^1$ is O or $NR^1$.

In some embodiments, $R^1$ is optionally substituted $C_1$-$C_6$ alkyl. In some embodiments, $R^1$ is methyl. In some embodiments, $R^1$ is H.

In some embodiments, $L^1$ is optionally substituted $C_1$-$C_6$ alkylene.

In some embodiments, $L^1$ is

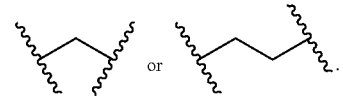

In some embodiments, $L^2$ is absent.
In some embodiments, $L^2$ is present. In some embodiments, $L^2$ is optionally substituted $C_1$-$C_6$ alkylene.

In some embodiments, $L^2$ is

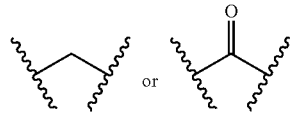

In some embodiments, $L^2$ is optionally substituted $C_1$-$C_{20}$ heteroalkylene.

In some embodiments, $L^2$ is

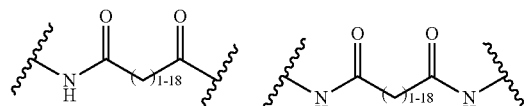

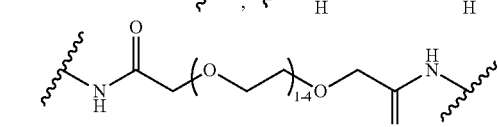

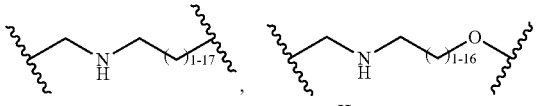

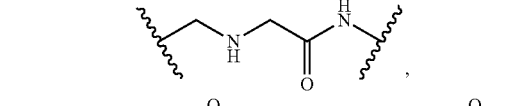

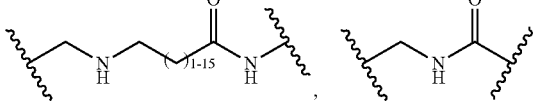

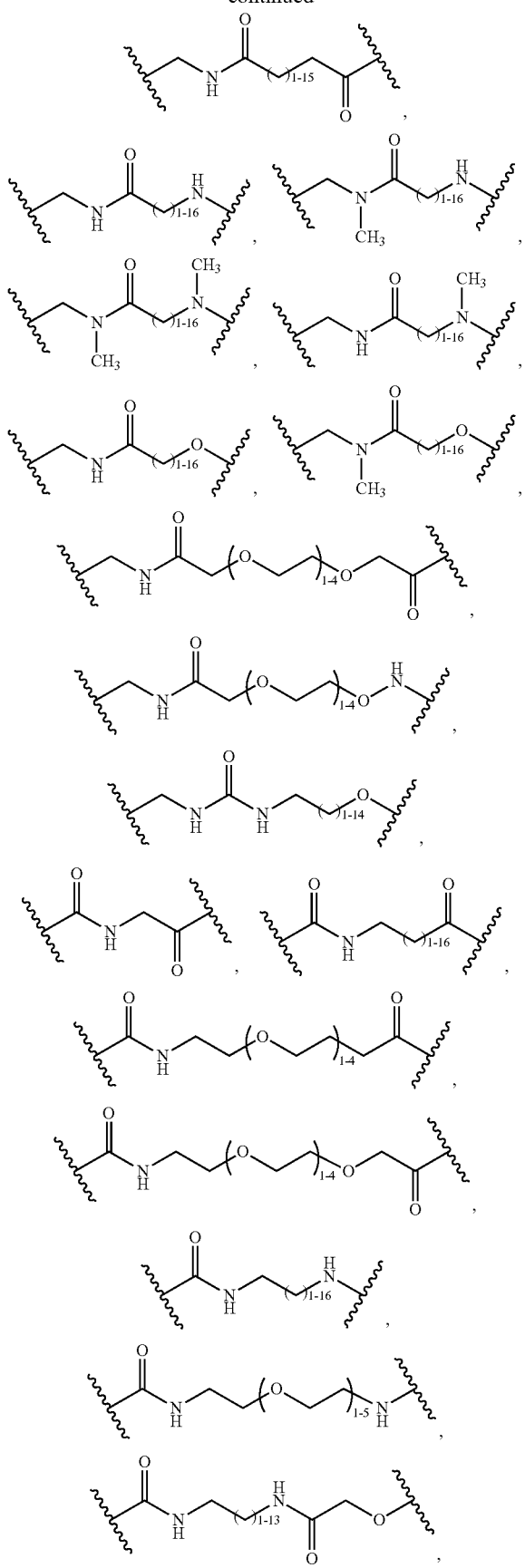

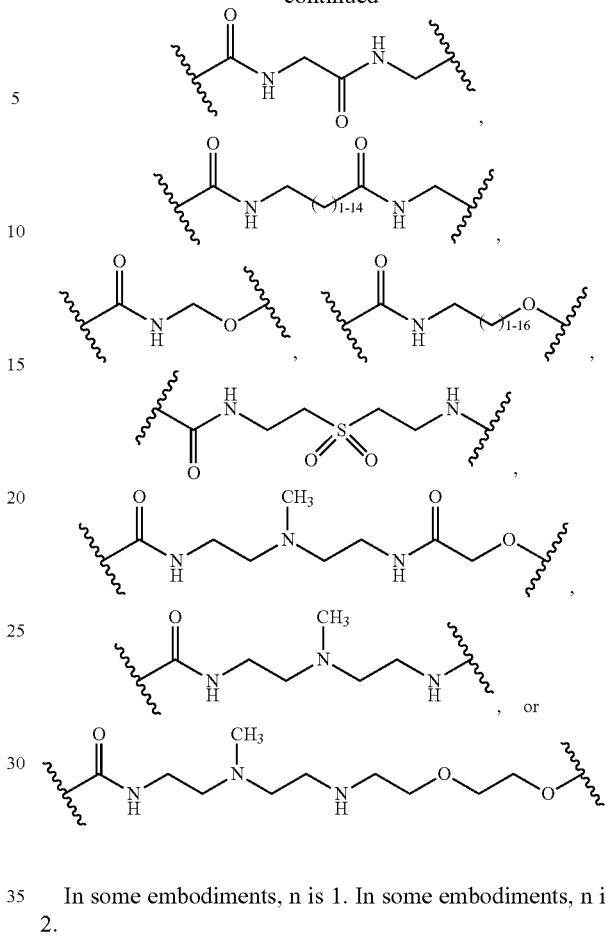

In some embodiments, n is 1. In some embodiments, n is 2.

In some embodiments, at least one $L^3$ is optionally substituted $C_3$-$C_{10}$ carbocyclylene-$C_1$-$C_6$ alkylene, optionally substituted $C_2$-$C_9$ heterocyclylene, optionally substituted $C_2$-$C_9$ heterocyclylene-$C_1$-$C_6$ alkylene, optionally substituted $C_1$-$C_{20}$ heteroalkylene, O, or $NR^1$. In some embodiments, at least one $L^3$ is optionally substituted $C_1$-$C_{20}$ heteroalkylene, In some embodiments, at least one $L^3$ is

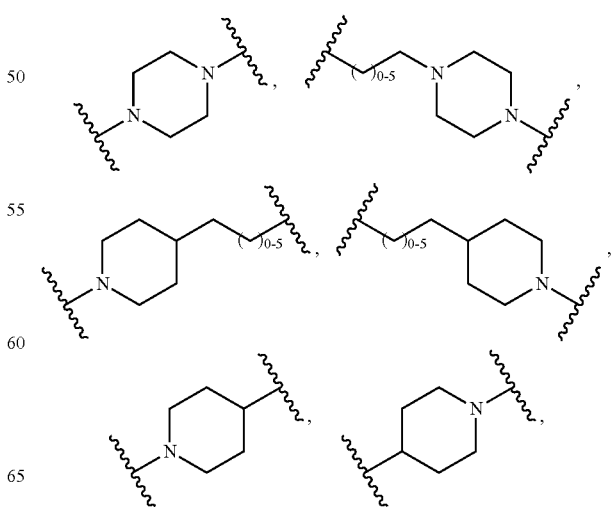

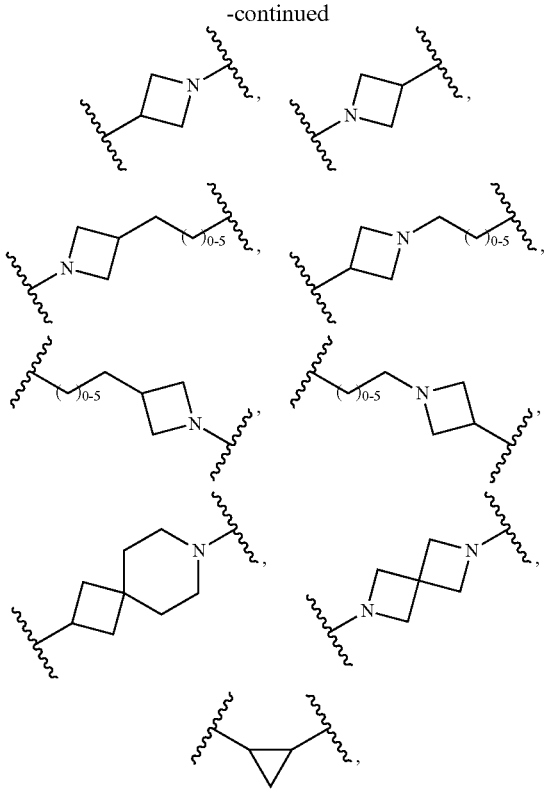

phenylene, O, or $NR^1$.

In some embodiments, n is 0.

In some embodiments, the degradation moiety is a ubiquitin ligase binding moiety. In some embodiments, the ubiquitin ligase binding moiety comprises a Cereblon ligand, an IAP (Inhibitors of Apoptosis) ligand, a mouse double minute 2 homolog (MDM2), or a von Hippel-Lindau ligand.

In some embodiments, the degradation moiety has the structure of Formula A:

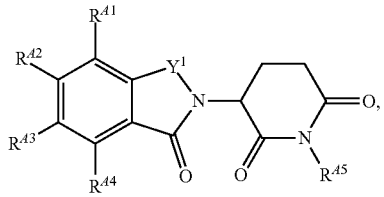

Formula A wherein
$Y^1$ is

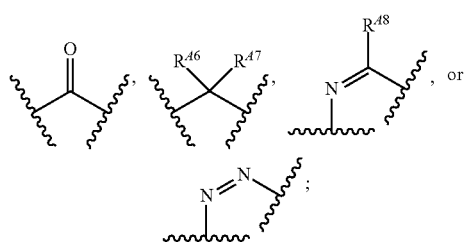

$R^{45}$ is H, optionally substituted $C_1$-$C_6$ alkyl, or optionally substituted $C_1$-$C_6$ heteroalkyl;

$R^{46}$ is H or optionally substituted $C_1$-$C_6$ alkyl; and $R^{47}$ is H or optionally substituted $C_1$-$C_6$ alkyl; or $R^{46}$ and $R^{47}$, together with the carbon atom to which each is bound, combine to form optionally substituted $C_3$-$C_6$ carbocyclyl or optionally substituted $C_2$-$C_5$ heterocyclyl; or $R^{46}$ and $R^{47}$, together with the carbon atom to which each is bound, combine to form optionally substituted $C_3$-$C_6$ carbocyclyl or optionally substituted $C_2$-$C_5$ heterocyclyl;

$R^{48}$ is H, optionally substituted $C_1$-$C_6$ alkyl, or optionally substituted $C_1$-$C_6$ heteroalkyl;

each of $R^{41}$, $R^{42}$, $R^{43}$, and $R^{44}$ is, independently, H, $A^2$, halogen, optionally substituted $C_1$-$C_6$alkyl, optionally substituted $C_1$-$C_6$ heteroalkyl, optionally substituted $C_3$-$C_{10}$ carbocyclyl, optionally substituted $C_2$-$C_9$ heterocyclyl, optionally substituted $C_6$-$C_{10}$ aryl, optionally substituted $C_2$-$C_9$ heteroaryl, optionally substituted $C_2$-$C_6$ alkenyl, optionally substituted $C_2$-$C_6$ heteroalkenyl, optionally substituted —O—$C_3$-$C_6$ carbocyclyl, hydroxyl, thiol, or optionally substituted amino; or $R^{41}$ and $R^{42}$, $R^{42}$ and $R^{43}$, and/or $R^{43}$ and $R^{44}$ together with the carbon atoms to which each is attached, combine to form

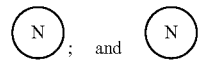

is optionally substituted $C_6$-$C_{10}$ aryl, optionally substituted $C_3$-$C_{10}$ carbocyclyl, optionally substituted $C_2$-$C_6$ heteroaryl, or $C_2$-$C_9$ heterocyclyl, any of which is optionally substituted with $A^2$, where one of $R^{41}$, $R^{42}$, $R^{43}$, and $R^{44}$ is $A^2$, or

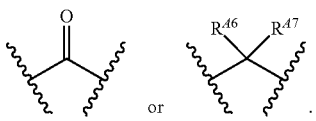

is substituted with $A^2$; and $A^2$ is a bond between the degradation moiety and the linker.

In some embodiments, $R^{45}$ is H or methyl. In some embodiments, $R^{45}$ is H.

In some embodiments, each of $R^{41}$, $R^{42}$, $R^{43}$, and $R^{44}$ is, independently, H or $A^2$. In some embodiments, $R^{41}$ is $A^2$ and each of $R^{42}$, $R^{43}$, and $R^{44}$ is H. In some embodiments, $R^{42}$ is $A^2$ and each of $R^{41}$, $R^{43}$, and $R^{44}$ is H. In some embodiments, $R^{43}$ is $A^2$ and each of $R^{41}$, $R^{42}$ and $R^{44}$ is H. In some embodiments, $R^{44}$ is $A^2$ and each of $R^{41}$, $R^{42}$, and $R^{43}$ is H.

In some embodiments, $Y^1$ is

In some embodiments, $R^{46}$ is H.

In some embodiments, $R^{47}$ is H.

In some embodiments, $Y^1$ is

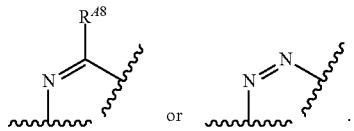

In some embodiments, $R^{A8}$ is H or optionally substituted $C_1$-$C_6$ alkyl. In some embodiments, $R^{A8}$ is H or methyl. In some embodiments, $R^{A8}$ is methyl.

In some embodiments, the degradation moiety has the structure of Formula A2:

Formula A2

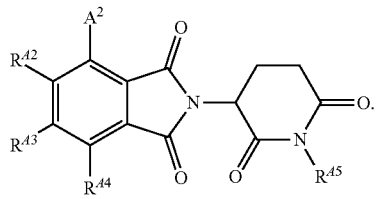

In some embodiments, the degradation moiety has the structure of Formula A4:

Formula A4

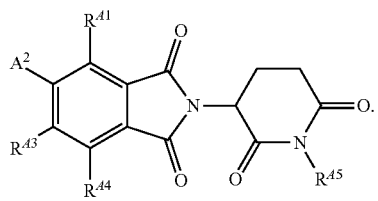

In some embodiments, the degradation moiety has the structure of Formula A5:

Formula A5

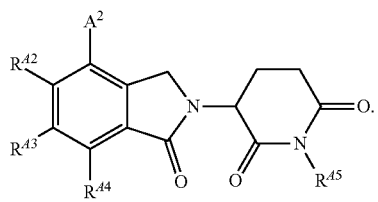

In some embodiments, the degradation moiety has the structure of Formula A6:

Formula A6

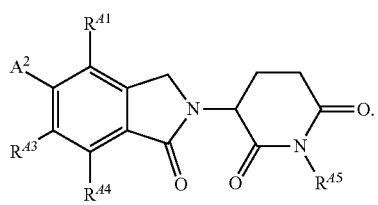

In some embodiments, the degradation moiety has the structure of Formula A8:

Formula A8

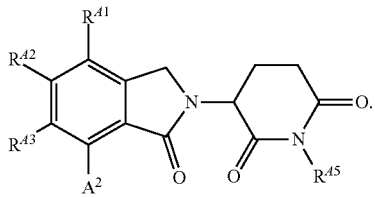

In some embodiments, the degradation moiety has the structure of Formula A10:

Formula A10

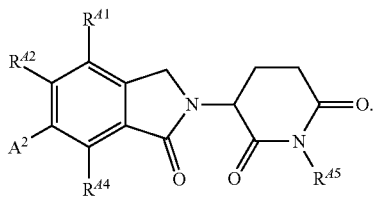

In some embodiments, the degradation moiety has the following structure:

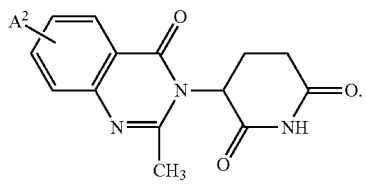

In some embodiments, the degradation moiety has the following structure:

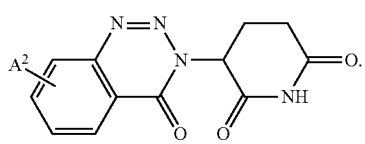

In some embodiments, moiety has the structure of Formula C:

Formula C

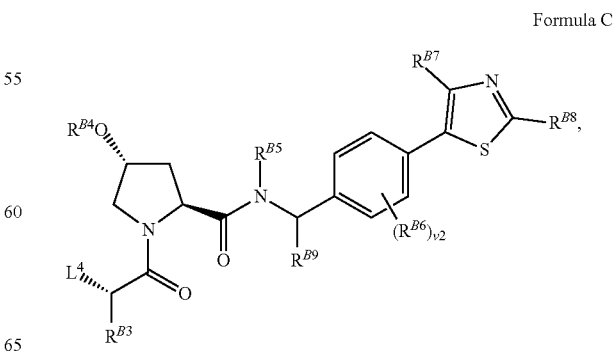

Wherein

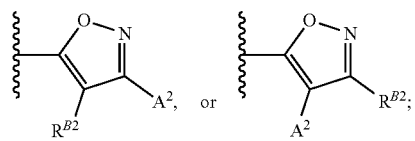

L$^4$ is —N(R$^{B1}$)(R$^{B2}$), R$^{B2}$ or A$^2$

R$^{B1}$ is H, A$^2$, optionally substituted C$_1$-C$_6$ alkyl, or optionally substituted C$_1$-C$_6$ heteroalkyl;

R$^{B2}$ is H, optionally substituted C$_1$-C$_6$ alkyl, or optionally substituted C$_1$-C$_6$ heteroalkyl;

R$^{B3}$ is A$^2$, optionally substituted C$_1$-C$_6$ alkyl, optionally substituted C$_1$-C$_6$ heteroalkyl, optionally substituted C$_3$-C$_{10}$ carbocyclyl, optionally substituted C$_6$-C$_{10}$ aryl, optionally substituted C$_1$-C$_6$ alkyl C$_3$-C$_{10}$ carbocyclyl, or optionally substituted C$_1$-C$_6$ alkyl C$_6$-C$_{10}$ aryl;

R$^{B4}$ is H, optionally substituted C$_1$-C$_6$ alkyl, optionally substituted C$_3$-C$_{10}$ carbocyclyl, optionally substituted C$_6$-C$_{10}$ aryl, optionally substituted C$_1$-C$_6$ alkyl C$_3$-C$_{10}$ carbocyclyl, or optionally substituted C$_1$-C$_6$ alkyl C$_5$-C$_{10}$ aryl;

R$^{B5}$ is H, optionally substituted C$_1$-C$_6$ alkyl, or optionally substituted C$_1$-C$_6$ heteroalkyl;

v2 is 0, 1, 2, 3, or 4;

each R$^{B6}$ is, independently, A$^2$, halogen, optionally substituted C$_1$-C$_6$ alkyl, optionally substituted C$_1$-C$_6$ heteroalkyl, optionally substituted C$_3$-C$_{10}$ carbocyclyl, optionally substituted C$_2$-C$_9$ heterocyclyl, optionally substituted C$_6$-C$_{10}$ aryl, optionally substituted C$_2$-C$_9$ heteroaryl, optionally substituted C$_2$-C$_6$alkenyl, optionally substituted C$_2$-C$_6$ heteroalkenyl, hydroxy, thiol, or optionally substituted amino;

each of R$^{B7}$ and R$^{B8}$ is, independently, H, halogen, optionally substituted C$_1$-C$_6$ alkyl, or optionally substituted C$_6$-C$_{10}$ aryl;

R$^{B9}$ is H or optionally substituted C$_1$-C$_6$ alkyl; and

A$^2$ is a bond between the degradation moiety and the linker;

where one and only one of R$^{B1}$, R$^{B3}$, and R$^{B6}$ is A$^2$.

In some embodiments, the degradation moiety has the structure of Formula C1:

Formula C1

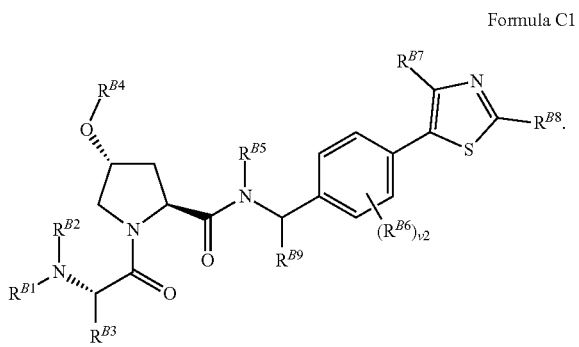

In some embodiments, the degradation moiety has the structure of Formula C2:

Formula C2

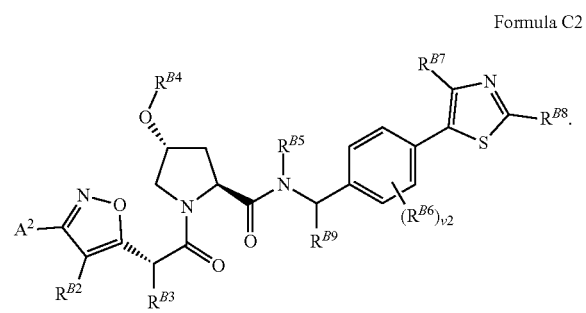

In some embodiments, R$^{B9}$ is optionally substituted C$_1$-C$_6$ alkyl. In some embodiments, R$^{B9}$ is methyl. In some embodiments, R$^{B9}$ is bonded to (S)-stereogenic center. In some embodiments, R$^{B9}$ is hydrogen.

In some embodiments, the degradation moiety has the following structure:

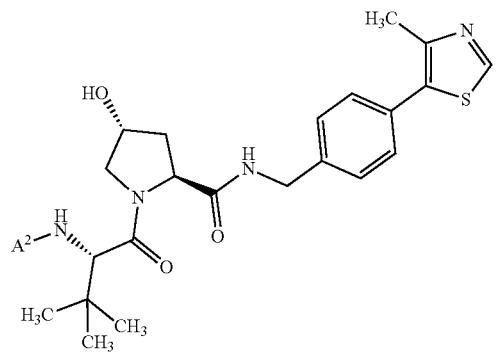

In some embodiments, the degradation moiety has the following structure:

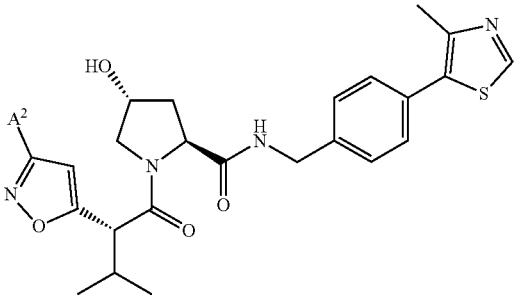

In some embodiments, the degradation moiety has the following structure:

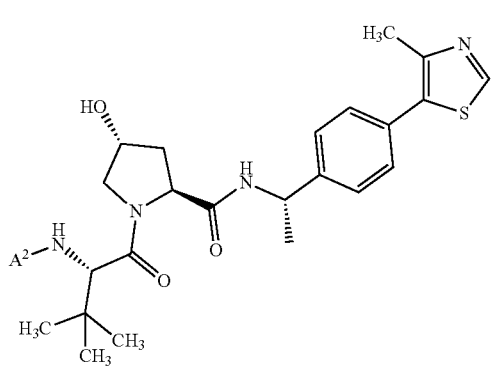

In some embodiments, the degradation moiety has the following structure:

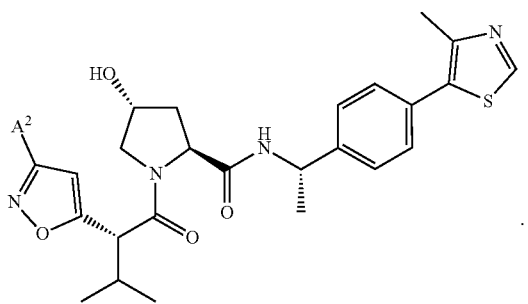

In some embodiments, the degradation moiety is

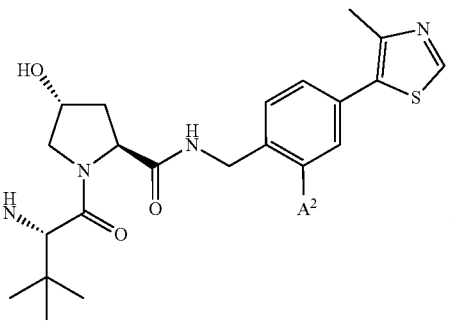

In some embodiments, the degradation moiety comprises the structure of

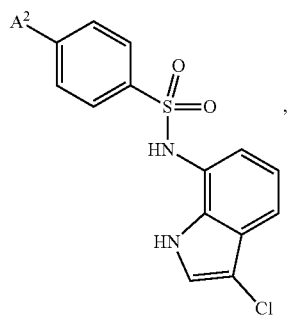

wherein $A^2$ is a bond between the degradation moiety and the linker.

In some embodiments, k is 0.

In some embodiments, the compound is a compound selected from the group consisting of compounds 1-105 in Table 1 and pharmaceutically acceptable salts thereof.

TABLE 1

Compounds of the Invention

| Compound No. | Compound Structure |
|---|---|
| 1 | |
| 2 | |
| 3 | |

TABLE 1-continued

Compounds of the Invention

| Compound No. | Compound Structure |
| --- | --- |
| 4 | |
| 5 | |
| 6 | |

TABLE 1-continued

Compounds of the Invention

| Compound No. | Compound Structure |
|---|---|
| 7 | |
| 8 | |
| 9 | |

TABLE 1-continued

Compounds of the Invention

| Compound No. | Compound Structure |
|---|---|
| 10 | |
| 11 | |
| 12 | |

TABLE 1-continued

Compounds of the Invention

| Compound No. | Compound Structure |
|---|---|
| 13 | |
| 14 | |
| 15 | |
| 16 | |

TABLE 1-continued
Compounds of the Invention
| Compound No. | Compound Structure |
|---|---|
| 17 | 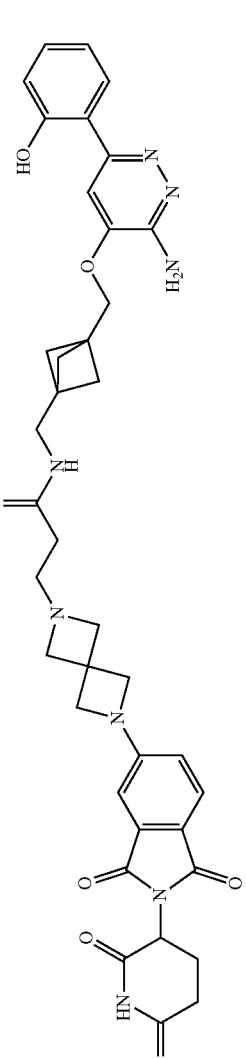 |
| 18 | 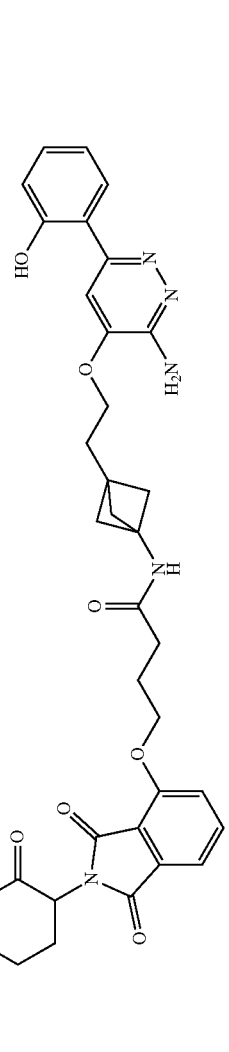 |
| 19 | 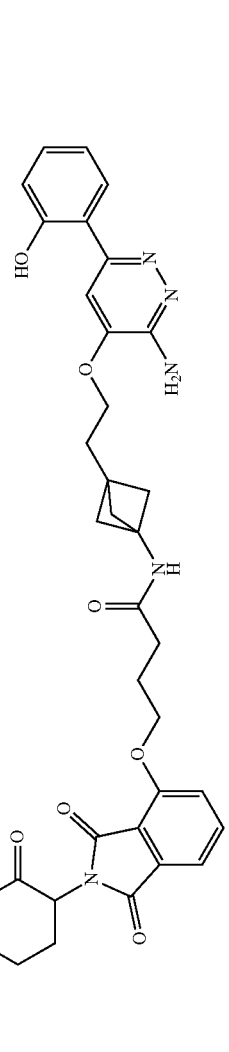 |

TABLE 1-continued

Compounds of the Invention

| Compound No. | Compound Structure |
|---|---|
| 20 | |
| 21 | |
| 22 | |

TABLE 1-continued

Compounds of the Invention

| Compound No. | Compound Structure |
|---|---|
| 23 | |
| 24 | |
| 25 | |

TABLE 1-continued

Compounds of the Invention

| Compound No. | Compound Structure |
|---|---|
| 26 | |
| 27 | |
| 28 | |

TABLE 1-continued

Compounds of the Invention

| Compound No. | Compound Structure |
|---|---|
| 29 | |
| 30 | |
| 31 | |

TABLE 1-continued

Compounds of the Invention

| Compound No. | Compound Structure |
| --- | --- |
| 32 | |
| 33 | |
| 34 | |
| 35 | |

TABLE 1-continued
Compounds of the Invention
| Compound No. | Compound Structure |
|---|---|
| 36 | 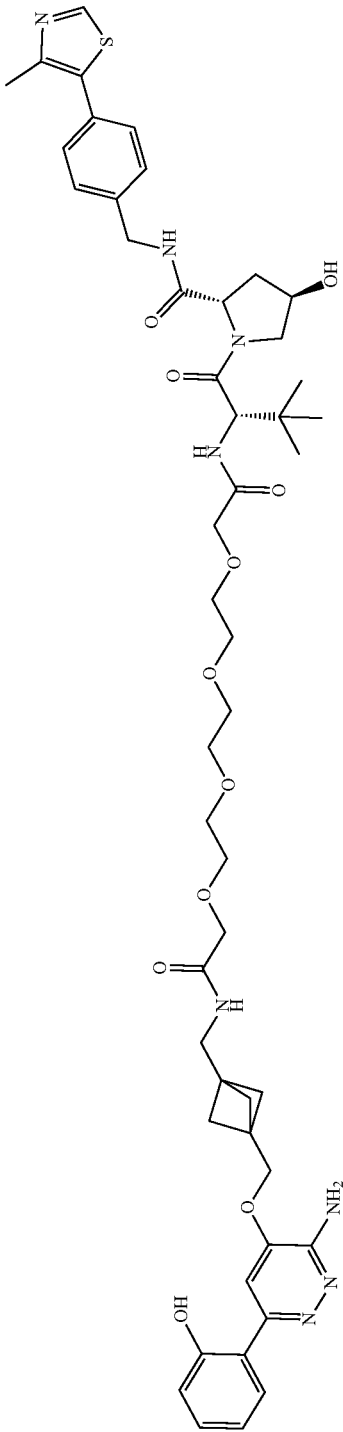 |
| 37 | 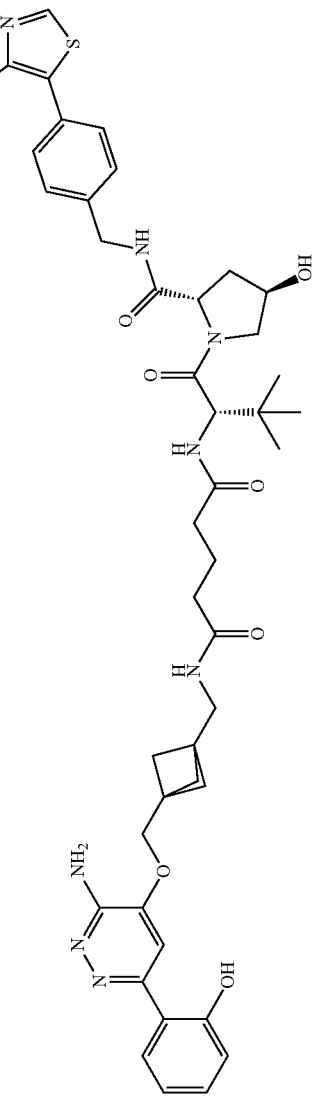 |
| 38 | 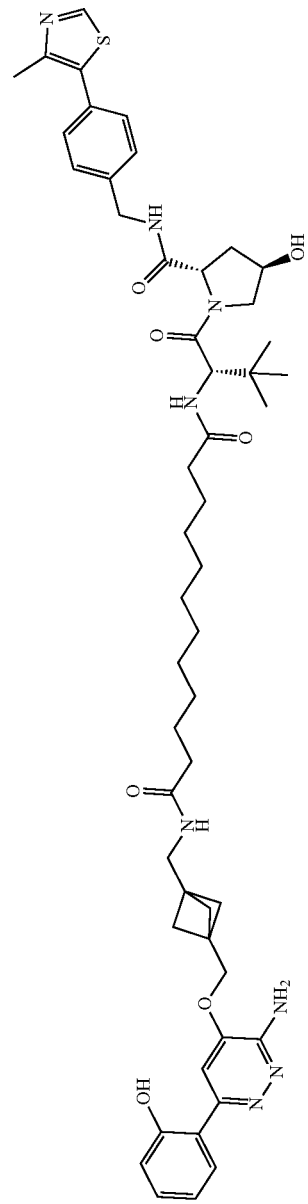 |

TABLE 1-continued
Compounds of the Invention
| Compound No. | Compound Structure |
| --- | --- |
| 39 | 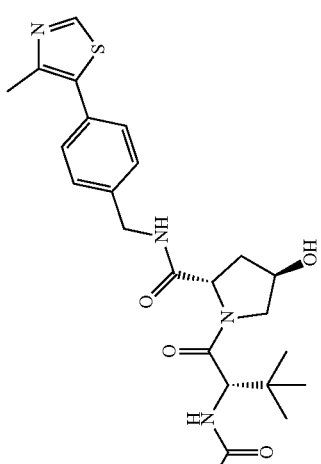 |
| 40 | 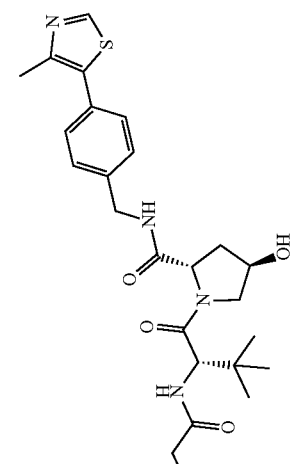 |
| 41 | 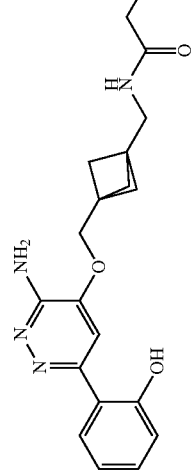 |

TABLE 1-continued

Compounds of the Invention

| Compound No. | Compound Structure |
|---|---|
| 42 | |
| 43 | |

TABLE 1-continued

Compounds of the Invention

| Compound No. | Compound Structure |
| --- | --- |
| 44 | |
| 45 | |
| 46 | |

TABLE 1-continued

Compounds of the Invention

| Compound No. | Compound Structure |
|---|---|
| 47 | |
| 48 | |
| 49 | |

TABLE 1-continued

Compounds of the Invention

| Compound No. | Compound Structure |
|---|---|
| 50 | |
| 51 | |
| 52 | |
| 53 | |

TABLE 1-continued

Compounds of the Invention

| Compound No. | Compound Structure |
|---|---|
| 54 | |
| 55 | |
| 56 | |
| 57 | |

TABLE 1-continued

Compounds of the Invention

| Compound No. | Compound Structure |
| --- | --- |
| 58 | |
| 59 | |
| 60 | |

TABLE 1-continued

Compounds of the Invention

| Compound No. | Compound Structure |
|---|---|
| 61 | |
| 62 | |
| 63 | |
| 64 | |

TABLE 1-continued

Compounds of the Invention

| Compound No. | Compound Structure |
| --- | --- |
| 65 | |
| 66 | |
| 67 | |

TABLE 1-continued

Compounds of the Invention

| Compound No. | Compound Structure |
|---|---|
| 68 | |
| 69 | |
| 70 | |

TABLE 1-continued

Compounds of the Invention

| Compound No. | Compound Structure |
| --- | --- |
| 71 | |
| 72 | |
| 73 | |

TABLE 1-continued

Compounds of the Invention

| Compound No. | Compound Structure |
|---|---|
| 74 | |
| 75 | |
| 76 | |

TABLE 1-continued

Compounds of the Invention

| Compound No. | Compound Structure |
| --- | --- |
| 77 | |
| 78 | |
| 79 | |

TABLE 1-continued

Compounds of the Invention

| Compound No. | Compound Structure |
| --- | --- |
| 80 | |
| 81 | |
| 82 | |
| 83 | |

TABLE 1-continued

Compounds of the Invention

| Compound No. | Compound Structure |
|---|---|
| 84 | |
| 85 | |
| 86 | |

TABLE 1-continued

Compounds of the Invention

| Compound No. | Compound Structure |
| --- | --- |
| 87 | |
| 88 | |
| 89 | |

TABLE 1-continued

Compounds of the Invention

| Compound No. | Compound Structure |
|---|---|
| 90 | |
| 91 | |
| 92 | |

TABLE 1-continued

Compounds of the Invention

| Compound No. | Compound Structure |
|---|---|
| 93 | |
| 94 | |
| 95 | |
| 96 | |

TABLE 1-continued

Compounds of the Invention

| Compound No. | Compound Structure |
|---|---|
| 97 | |
| 98 | |
| 99 | |
| 100 | |

TABLE 1-continued

Compounds of the Invention

| Compound No. | Compound Structure |
|---|---|
| 101 | |
| 102 | |
| 103 | |

TABLE 1-continued
Compounds of the Invention
| Compound No. | Compound Structure |
|---|---|
| 104 | 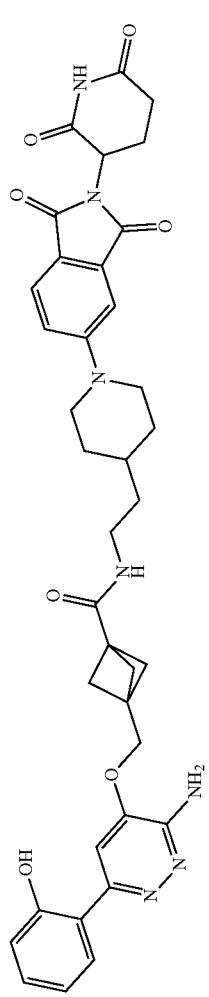 |
| 105 | 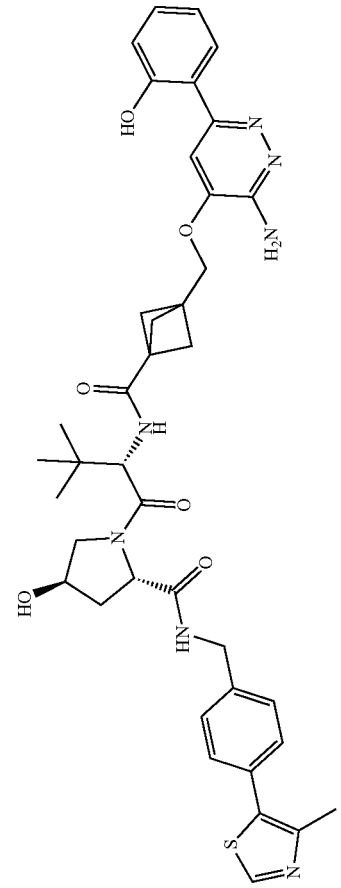 |

In some embodiments, the compound has a ratio of BRG1 $IC_{50}$ to BRM $IC_{50}$ of at least 5. In some embodiments, the compound has a ratio of BRG1 $IC_{50}$ to BRM $IC_{50}$ of at least 7. In some embodiments, the compound has a ratio of BRG1 $IC_{50}$ to BRM $IC_{50}$ of at least 10. In some embodiments, the compound has a ratio of BRG1 $IC_{50}$ to BRM $IC_{50}$ of at least 15. In some embodiments, the compound has a ratio of BRG1 $IC_{50}$ to BRM $IC_{50}$ of at least 20. In some embodiments, the compound has a ratio of BRG1 $IC_{50}$ to BRM $IC_{50}$ of at least 25. In some embodiments, the compound has a ratio of BRG1 $IC_{50}$ to BRM $IC_{50}$ of at least 30.

In an aspect, the invention features a pharmaceutical composition comprising any of the foregoing compounds and a pharmaceutically acceptable excipient.

In another aspect, the invention features a method of decreasing the activity of a BAF complex in a cell, the method involving contacting the cell with an effective amount of any of the foregoing compounds or a pharmaceutical composition thereof.

In some embodiments, the cell is a cancer cell.

In another aspect, the invention features a method of treating a BAF complex-related disorder in a subject in need thereof, the method involving administering to the subject an effective amount of any of the foregoing compounds (e.g., a BRM/BRG1 dual inhibitor compound or a BRM-selective compound) or a pharmaceutical composition thereof.

In some embodiments, the BAF complex-related disorder is cancer.

In a further aspect, the invention features a method of inhibiting BRM, the method involving contacting a cell with an effective amount of any of the foregoing compounds (e.g., a BRM/BRG1 dual inhibitor compound or a BRM-selective compound) or a pharmaceutical composition thereof.

In some embodiments, the cell is a cancer cell.

In another aspect, the invention features a method of inhibiting BRG1, the method involving contacting the cell with an effective amount of any of the foregoing compounds or a pharmaceutical composition thereof.

In some embodiments, the cell is a cancer cell.

In a further aspect, the invention features a method of inhibiting BRM and BRG1, the method involving contacting the cell with an effective amount of any of the foregoing compounds or a pharmaceutical composition thereof.

In some embodiments, the cell is a cancer cell.

In another aspect, the invention features a method of treating a disorder related to a BRG1 loss of function mutation in a subject in need thereof, the method involving administering to the subject an effective amount of any of the foregoing compounds (e.g., a BRM/BRG1 dual inhibitor compound or a BRM-selective compound) or a pharmaceutical composition thereof.

In some embodiments, the disorder related to a BRG1 loss of function mutation is cancer. In other embodiments, the subject is determined to have a BRG1 loss of function disorder, for example, is determined to have a BRG1 loss of function cancer (for example, the cancer has been determined to include cancer cells with loss of BRG1 function).

In another aspect, the invention features a method of inducing apoptosis in a cell, the method involving contacting the cell with an effective amount of any of the foregoing compounds (e.g., a BRM/BRG1 dual inhibitor compound or a BRM-selective compound) or a pharmaceutical composition thereof.

In some embodiments, the cell is a cancer cell.

In a further aspect, the invention features a method of treating cancer in a subject in need thereof, the method including administering to the subject an effective amount of any of the foregoing compounds (e.g., a BRM/BRG1 dual inhibitor compound or a BRM-selective compound) or a pharmaceutical composition thereof.

In some embodiments of any of the foregoing methods, the cancer is non-small cell lung cancer, colorectal cancer, bladder cancer, cancer of unknown primary, glioma, breast cancer, melanoma, non-melanoma skin cancer, endometrial cancer, esophagogastric cancer, pancreatic cancer, hepatobiliary cancer, soft tissue sarcoma, ovarian cancer, head and neck cancer, renal cell carcinoma, bone cancer, non-Hodgkin lymphoma, small-cell lung cancer, prostate cancer, embryonal tumor, germ cell tumor, cervical cancer, thyroid cancer, salivary gland cancer, gastrointestinal neuroendocrine tumor, uterine sarcoma, gastrointestinal stromal tumor, CNS cancer, thymic tumor, Adrenocortical carcinoma, appendiceal cancer, small bowel cancer, or penile cancer.

In some embodiments of any of the foregoing methods, the cancer is non-small cell lung cancer, colorectal cancer, bladder cancer, cancer of unknown primary, glioma, breast cancer, melanoma, non-melanoma skin cancer, endometrial cancer, or penile cancer.

In some embodiments of any of the foregoing methods, the cancer is a drug resistant cancer or has failed to respond to a prior therapy (e.g., vemurafenib, dacarbazine, a CTLA4 inhibitor, a PD1 inhibitor, interferon therapy, a BRAF inhibitor, a MEK inhibitor, radiotherapy, temozolomide, irinotecan, a CAR-T therapy, Herceptin®, Perjeta®, tamoxifen, Xeloda®, docetaxol, platinum agents such as carboplatin, taxanes such as paclitaxel and docetaxel, ALK inhibitors, MET inhibitors, Alimta®, Abraxane®, Adriamycin®, gemcitabine, Avastin®, Halaven®, neratinib, a PARP inhibitor, ARN810, an mTOR inhibitor, topotecan, Gemzar®, a VEGFR2 inhibitor, a folate receptor antagonist, demcizumab, fosbretabulin, or a PDL1 inhibitor).

In some embodiments of any of the foregoing methods, the cancer has or has been determined to have BRG1 mutations. In some embodiments of any of the foregoing methods, the BRG1 mutations are homozygous. In some embodiments of any of the foregoing methods, the cancer does not have, or has been determined not to have, an epidermal growth factor receptor (EGFR) mutation. In some embodiments of any of the foregoing methods, the cancer does not have, or has been determined not to have, an anaplastic lymphoma kinase (ALK) driver mutation. In some embodiments of any of the foregoing methods, the cancer has, or has been determined to have, a KRAS mutation. In some embodiments of any of the foregoing methods, the BRG1 mutation is in the ATPase catalytic domain of the protein. In some embodiments of any of the foregoing methods, the BRG1 mutation is a deletion at the C-terminus of BRG1.

In another aspect, the disclosure provides a method treating a disorder related to BAF (e.g., cancer or viral infections) in a subject in need thereof. This method includes contacting a cell with an effective amount of any of the foregoing compounds (e.g., a BRM/BRG1 dual inhibitor compound or a BRM-selective compound), or pharmaceutically acceptable salts thereof, or any of the foregoing pharmaceutical compositions. In some embodiments, the disorder is a viral infection is an infection with a virus of the Retroviridae family such as the lentiviruses (e.g., Human immunodeficiency virus (HIV) and deltaretroviruses (e.g., human T cell leukemia virus I (HTLV-1), human T cell leukemia virus II (HTLV-II)), Hepadnaviridae family (e.g., hepatitis B virus (HBV)), Flaviviridae family (e.g., hepatitis C virus (HCV)), Adenoviridae family (e.g., Human Adenovirus), Herpesviridae family (e.g., Human cytomegalovirus (HCMV), Epstein-Barr virus, herpes simplex virus 1 (HSV-1), herpes simplex virus 2 (HSV-2), human herpesvirus 6 (HHV-6), Herpesvitus K*, CMV, varicella-zoster virus), Papillomaviridae family (e.g., Human Papillomavirus (HPV, HPV E1)), Parvoviridae family (e.g., Parvovirus B19), Polyomaviridae family (e.g., JC virus and BK virus), Paramyxoviridae family (e.g., Measles virus), Togaviridae family (e.g., Rubella virus). In some embodiments, the disorder is Coffin Siris, Neurofibromatosis (e.g., NF-1, NF-2, or Schwannomatosis), or Multiple Meningioma.

In another aspect, the disclosure provides a method for treating a viral infection in a subject in need thereof. This method includes administering to the subject an effective amount of any of the foregoing compounds (e.g., a BRM/BRG1 dual inhibitor compound or a BRM-selective compound), or pharmaceutically acceptable salts thereof, or any of the foregoing pharmaceutical compositions. In some embodiments, the viral infection is an infection with a virus of the Retroviridae family such as the lentiviruses (e.g., Human immunodeficiency virus (HIV) and deltaretroviruses (e.g., human T cell leukemia virus I (HTLV-1), human T cell leukemia virus II (HTLV-II)), Hepadnaviridae family (e.g., hepatitis B virus (HBV)), Flaviviridae family (e.g., hepatitis C virus (HCV)), Adenoviridae family (e.g., Human Adenovirus), Herpesviridae family (e.g., Human cytomegalovirus (HCMV), Epstein-Barr virus, herpes simplex virus 1 (HSV-1), herpes simplex virus 2 (HSV-2), human herpesvirus 6 (HHV-6), Herpesvitus K*, CMV, varicella-zoster virus), Papillomaviridae family (e.g., Human Papillomavirus (HPV, HPV E1)), Parvoviridae family (e.g., Parvovirus B19), Polyomaviridae family (e.g., JC virus and BK virus), Paramyxoviridae family (e.g., Measles virus), or Togaviridae family (e.g., Rubella virus).

In some embodiments of any of the foregoing aspects, the compound is a BRM-selective compound. In some embodiments, the BRM-selective compound inhibits the level and/or activity of BRM at least 10-fold greater than the compound inhibits the level and/or activity of BRG1 and/or the compound binds to BRM at least 10-fold greater than the compound binds to BRG1. For example, in some embodiments, a BRM-selective compound has an $IC_{50}$ or $IP_{50}$ that is at least 10-fold lower than the $IC_{50}$ or $IP_{50}$ against BRG1. In some embodiments of any of the foregoing aspects, the compound is a BRM/BRG1 dual inhibitor compound. In some embodiments, the BRM/BRG1 dual inhibitor compound has similar activity against both BRM and BRG1 (e.g., the activity of the compound against BRM and BRG1 with within 10-fold (e.g., less than 5-fold, less than 2-fold). In some embodiments, the activity of the BRM/BRG1 dual inhibitor compound is greater against BRM. In some embodiments, the activity of the BRM/BRG1 dual inhibitor compound is greater against BRG1. For example, in some embodiments, a BRM/BRG1 dual inhibitor compound has an $IC_{50}$ or $IP_{50}$ against BRM that is within 10-fold of the $IC_{50}$ or $IP_{50}$ against BRG1.

In another aspect, the invention features a method of treating melanoma, prostate cancer, breast cancer, bone cancer, renal cell carcinoma, or a hematologic cancer in a subject in need thereof, the method including administering to the subject an effective amount of any of the foregoing compounds or pharmaceutical compositions thereof.

In another aspect, the invention features a method of reducing tumor growth of melanoma, prostate cancer, breast cancer, bone cancer, renal cell carcinoma, or a hematologic cancer in a subject in need thereof, the method including administering to the subject an effective amount of any of the foregoing compounds or pharmaceutical compositions thereof.

In another aspect, the invention features a method of suppressing metastatic progression of melanoma, prostate cancer, breast cancer, bone cancer, renal cell carcinoma, or a hematologic cancer in a subject, the method including administering an effective amount of any of the foregoing compounds or pharmaceutical compositions thereof.

In another aspect, the invention features a method of suppressing metastatic colonization of melanoma, prostate cancer, breast cancer, bone cancer, renal cell carcinoma, or a hematologic cancer in a subject, the method including administering an effective amount of any of the foregoing compounds or pharmaceutical compositions thereof.

In another aspect, the invention features a method of reducing the level and/or activity of BRG1 and/or BRM in a melanoma, prostate cancer, breast cancer, bone cancer, renal cell carcinoma, or hematologic cancer cell, the method including contacting the cell with an effective amount of any of the foregoing compounds or pharmaceutical compositions thereof.

In some embodiments of any of the above aspects, the melanoma, prostate cancer, breast cancer, bone cancer, renal cell carcinoma, or hematologic cell is in a subject.

In some embodiments of any of the above aspects, the effective amount of the compound reduces the level and/or activity of BRG1 by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference. In some embodiments, the effective amount of the compound that reduces the level and/or activity of BRG1 by at least 50% (e.g., 55%, 60%, 65%, 70%, 75%, 80%, 85%, 90%, or 95%) as compared to a reference. In some embodiments, the effective amount of the compound that reduces the level and/or activity of BRG1 by at least 90% (e.g., 91%, 92%, 93%, 94%, 95%, 96%, 97%, 98%, or 99%).

In some embodiments, the effective amount of the compound reduces the level and/or activity of BRG1 by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference for at least 12 hours (e.g., 14 hours, 16 hours, 18 hours, 20 hours, 22 hours, 24 hours, 30 hours, 36 hours, 48 hours, 72 hours, or more). In some embodiments, the effective amount of the compound that reduces the level and/or activity of BRG1 by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference for at least 4 days (e.g., 5 days, 6 days, 7 days, 14 days, 28 days, or more).

In some embodiments of any of the above aspects, the effective amount of the compound reduces the level and/or activity of BRM by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference. In some embodiments, the effective amount of the compound that reduces the level and/or activity of BRM by at least 50% (e.g., 55%, 60%, 65%, 70%, 75%, 80%, 85%, 90%, or 95%) as compared to a reference. In some embodiments, the effective amount of the compound that reduces the level and/or activity of BRM by at least 90% (e.g., 91%, 92%, 93%, 94%, 95%, 96%, 97%, 98%, or 99%).

In some embodiments, the effective amount of the compound reduces the level and/or activity of BRM by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference for at least 12 hours (e.g., 14 hours, 16 hours, 18 hours, 20 hours, 22 hours, 24 hours, 30 hours, 36 hours, 48 hours, 72 hours, or more). In some embodiments, the effective amount of the compound that reduces the level and/or activity of BRM by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference for at least 4 days (e.g., 5 days, 6 days, 7 days, 14 days, 28 days, or more).

In some embodiments, the subject has cancer. In some embodiments, the cancer expresses BRG1 and/or BRM protein and/or the cell or subject has been identified as expressing BRG1 and/or BRM. In some embodiments, the cancer expresses BRG1 protein and/or the cell or subject has been identified as expressing BRG1. In some embodiments, the cancer expresses BRM protein and/or the cell or subject has been identified as expressing BRM. In some embodiments, the cancer is melanoma (e.g., uveal melanoma, mucosal melanoma, or cutaneous melanoma). In some embodiments, the cancer is prostate cancer. In some embodiments, the cancer is a hematologic cancer, e.g., multiple myeloma, large cell lymphoma, acute T-cell leukemia, acute myeloid leukemia, myelodysplastic syndrome, immunoglobulin A lambda myeloma, diffuse mixed histiocytic and lymphocytic lymphoma, B-cell lymphoma, acute lymphoblastic leukemia (e.g., T-cell acute lymphoblastic leukemia or B-cell acute lymphoblastic leukemia), diffuse large cell lymphoma, or non-Hodgkin's lymphoma. In some embodiments, the cancer is breast cancer (e.g., an ER positive breast cancer, an ER negative breast cancer, triple positive breast cancer, or triple negative breast cancer). In some embodiments, the cancer is a bone cancer (e.g., Ewing's sarcoma). In some embodiments, the cancer is a renal cell carcinoma (e.g., a Microphthalmia Transcription Factor (MITF) family translocation renal cell carcinoma (tRCC)). In some embodiments, the cancer is metastatic (e.g., the cancer has spread to the liver). The metastatic cancer can include cells exhibiting migration and/or invasion of migrating cells and/or include cells exhibiting endothelial recruitment and/or angiogenesis. In other embodiments, the migrating cancer is a cell migration cancer. In still other embodiments, the cell migration cancer is a non-metastatic cell migration cancer. The metastatic cancer can be a cancer spread via seeding the surface of the peritoneal, pleural, pericardial, or subarachnoid spaces. Alternatively, the metastatic cancer can be a cancer spread via the lymphatic system, or a cancer spread hematogenously. In some embodiments, the effective amount of an agent that reduces the level and/or activity of BRG1 and/or BRM is an amount effective to inhibit metastatic colonization of the cancer to the liver.

In some embodiments the cancer harbors a mutation in GNAQ. In some embodiments the cancer harbors a mutation in GNA11. In some embodiments the cancer harbors a mutation in PLCB4. In some embodiments the cancer harbors a mutation in CYSLTR2. In some embodiments the cancer harbors a mutation in BAP1. In some embodiments the cancer harbors a mutation in SF3B1. In some embodiments the cancer harbors a mutation in EIF1AX. In some embodiments the cancer harbors a TFE3 translocation. In some embodiments the cancer harbors a TFEB translocation. In some embodiments the cancer harbors a MITF translocation. In some embodiments the cancer harbors an EZH2 mutation. In some embodiments the cancer harbors a SUZ12 mutation. In some embodiments the cancer harbors an EED mutation.

In some embodiments, the method further includes administering to the subject or contacting the cell with an anticancer therapy, e.g., a chemotherapeutic or cytotoxic agent, immunotherapy, surgery, radiotherapy, thermotherapy, or photocoagulation. In some embodiments, the anticancer therapy is a chemotherapeutic or cytotoxic agent, e.g., an antimetabolite, antimitotic, antitumor antibiotic, asparagine-specific enzyme, bisphosphonates, antineoplastic, alkylating agent, DNA-Repair enzyme inhibitor, histone deacetylase inhibitor, corticosteroid, demethylating agent, immunomodulatory, janus-associated kinase inhibitor, phosphoinositide 3-kinase inhibitor, proteasome inhibitor, or tyrosine kinase inhibitor.

In some embodiments, the compound of the invention is used in combination with another anti-cancer therapy used for the treatment of uveal melanoma such as surgery, a MEK inhibitor, and/or a PKC inhibitor. For example, in some embodiments, the method further comprises performing surgery prior to, subsequent to, or at the same time as administration of the compound of the invention. In some embodiments, the method further comprises administration of a MEK inhibitor and/or a PKC inhibitor prior to, subsequent to, or at the same time as administration of the compound of the invention.

In some embodiments, the anticancer therapy and the compound of the invention are administered within 28 days of each other and each in an amount that together are effective to treat the subject.

In some embodiments, the subject or cancer has and/or has been identified as having a BRG1 loss of function mutation.

In some embodiments, the cancer is resistant to one or more chemotherapeutic or cytotoxic agents (e.g., the cancer has been determined to be resistant to chemotherapeutic or cytotoxic agents such as by genetic markers, or is likely to be resistant, to chemotherapeutic or cytotoxic agents such as a cancer that has failed to respond to a chemotherapeutic or cytotoxic agent). In some embodiments, the cancer has failed to respond to one or more chemotherapeutic or cytotoxic agents. In some embodiments, the cancer is resistant or has failed to respond to dacarbazine, temozolomide, cisplatin, treosulfan, fotemustine, IMCgp100, a CTLA-4 inhibitor (e.g., ipilimumab), a PD-1 inhibitor (e.g., Nivolumab or pembrolizumab), a PD-L1 inhibitor (e.g., atezolizumab, avelumab, or durvalumab), a mitogen-activated protein kinase (MEK) inhibitor (e.g., selumetinib, binimetinib, or tametinib), and/or a protein kinase C (PKC) inhibitor (e.g., sotrastaurin or IDE196).

In some embodiments, the cancer is resistant to or failed to respond to a previously administered therapeutic used for the treatment of uveal melanoma such as a MEK inhibitor or PKC inhibitor. For example, in some embodiments, the cancer is resistant to or failed to respond to a mitogen-activated protein kinase (MEK) inhibitor (e.g., selumetinib, binimetinib, or tametinib), and/or a protein kinase C (PKC) inhibitor (e.g., sotrastaurin or IDE196).

Chemical Terms

The terminology employed herein is for the purpose of describing particular embodiments and is not intended to be limiting.

For any of the following chemical definitions, a number following an atomic symbol indicates that total number of atoms of that element that are present in a particular chemical moiety. As will be understood, other atoms, such as H atoms, or substituent groups, as described herein, may be present, as necessary, to satisfy the valences of the atoms. For example, an unsubstituted $C_2$ alkyl group has the formula —$CH_2CH_3$. When used with the groups defined herein, a reference to the number of carbon atoms includes the divalent carbon in acetal and ketal groups but does not include the carbonyl carbon in acyl, ester, carbonate, or carbamate groups. A reference to the number of oxygen, nitrogen, or sulfur atoms in a heteroaryl group only includes those atoms that form a part of a heterocyclic ring.

The term "acyl," as used herein, represents a H or an alkyl group that is attached to a parent molecular group through a carbonyl group, as defined herein, and is exemplified by formyl (i.e., a carboxaldehyde group), acetyl, trifluoroacetyl, propionyl, and butanoyl. Exemplary unsubstituted acyl groups include from 1 to 6, from 1 to 11, or from 1 to 21 carbons.

The term "alkyl," as used herein, refers to a branched or straight-chain monovalent saturated aliphatic hydrocarbon radical of 1 to 20 carbon atoms (e.g., 1 to 16 carbon atoms, 1 to 10 carbon atoms, 1 to 6 carbon atoms, or 1 to 3 carbon atoms).

An alkylene is a divalent alkyl group. The term "alkenyl," as used herein, alone or in combination with other groups, refers to a straight chain or branched hydrocarbon residue having a carbon-carbon double bond and having 2 to 20 carbon atoms (e.g., 2 to 16 carbon atoms, 2 to 10 carbon atoms, 2 to 6 carbon atoms, or 2 carbon atoms).

The term "alkynyl," as used herein, alone or in combination with other groups, refers to a straight chain or branched hydrocarbon residue having a carbon-carbon triple bond and having 2 to 20 carbon atoms (e.g., 2 to 16 carbon atoms, 2 to 10 carbon atoms, 2 to 6 carbon atoms, or 2 carbon atoms).

The term "amino," as used herein, represents —$N(R^{N1})_2$, wherein each $R^{N1}$ is, independently, H, OH, $NO_2$, $N(R^{N2})_2$, $SO_2OR^{N2}$, $SO_2R^{N2}$, $SOR^{N2}$, an N-protecting group, alkyl, alkoxy, aryl, arylalkyl, cycloalkyl, acyl (e.g., acetyl, trifluoroacetyl, or others described herein), wherein each of these recited $R^{N1}$ groups can be optionally substituted; or two $R^{N1}$ combine to form an alkylene or heteroalkylene, and wherein each $R^{N2}$ is, independently, H, alkyl, or aryl. The amino groups of the invention can be an unsubstituted amino (i.e., —$NH_2$) or a substituted amino (i.e., —$N(R^{N1})_2$).

The term "aryl," as used herein, refers to an aromatic mono- or polycarbocyclic radical of 6 to 12 carbon atoms having at least one aromatic ring. Examples of such groups include, but are not limited to, phenyl, naphthyl, 1,2,3,4-tetrahydronaphthyl, 1,2-dihydronaphthyl, indanyl, and 1H-indenyl.

The term "arylalkyl," as used herein, represents an alkyl group substituted with an aryl group. Exemplary unsubstituted arylalkyl groups are from 7 to 30 carbons (e.g., from 7 to 16 or from 7 to 20 carbons, such as $C_1$-$C_6$ alkyl $C_6$-$C_{10}$ aryl, $C_1$-$C_{10}$ alkyl $C_6$-$C_{10}$ aryl, or $C_1$-$C_{20}$ alkyl $C_{56}$-$C_{10}$ aryl), such as, benzyl and phenethyl. In some embodiments, the alkyl and the aryl each can be further substituted with 1, 2, 3, or 4 substituent groups as defined herein for the respective groups.

The term "azido," as used herein, represents a —$N_3$ group.

The term "bridged polycycloalkyl," as used herein, refers to a bridged polycyclic group of 5 to 20 carbons, containing from 1 to 3 bridges.

The term "cyano," as used herein, represents a —CN group.

The term "carbocyclyl," as used herein, refers to a non-aromatic $C_3$-$C_{12}$ monocyclic, bicyclic, or tricyclic structure in which the rings are formed by carbon atoms. Carbocyclyl structures include cycloalkyl groups and unsaturated carbocyclyl radicals.

The term "cycloalkyl," as used herein, refers to a saturated, non-aromatic, and monovalent mono- or polycarbocyclic radical of 3 to 10, preferably 3 to 6 carbon atoms. This term is further exemplified by radicals such as cyclopropyl, cyclobutyl, cyclopentyl, cyclohexyl, cycloheptyl, norbornyl, and adamantyl.

The term "halo," as used herein, means a fluorine (fluoro), chlorine (chloro), bromine (bromo), or iodine (iodo) radical.

The term "heteroalkyl," as used herein, refers to an alkyl group, as defined herein, in which one or more of the constituent carbon atoms have been replaced by nitrogen, oxygen, or sulfur. In some embodiments, the heteroalkyl group can be further substituted with 1, 2, 3, or 4 substituent groups as described herein for alkyl groups. Examples of heteroalkyl groups are an "alkoxy" which, as used herein, refers alkyl-O— (e.g., methoxy and ethoxy). A heteroalkylene is a divalent heteroalkyl group. The term "heteroalkenyl," as used herein, refers to an alkenyl group, as defined herein, in which one or more of the constituent carbon atoms have been replaced by nitrogen, oxygen, or sulfur. In some embodiments, the heteroalkenyl group can be further substituted with 1, 2, 3, or 4 substituent groups as described herein for alkenyl groups. Examples of heteroalkenyl groups are an "alkenoxy" which, as used herein, refers alkenyl-O—. A heteroalkenylene is a divalent heteroalkenyl group. The term "heteroalkynyl," as used herein, refers to an alkynyl group, as defined herein, in which one or more of the constituent carbon atoms have been replaced by nitrogen, oxygen, or sulfur. In some embodiments, the heteroalkynyl group can be further substituted with 1, 2, 3, or 4 substituent groups as described herein for alkynyl groups. Examples of heteroalkynyl groups are an "alkynoxy" which, as used herein, refers alkynyl-O—. A heteroalkynylene is a divalent heteroalkynyl group.

The term "heteroaryl," as used herein, refers to an aromatic mono- or polycyclic radical of 5 to 12 atoms having at least one aromatic ring containing 1, 2, or 3 ring atoms selected from nitrogen, oxygen, and sulfur with the remaining ring atoms being carbon. One or two ring carbon atoms of the heteroaryl group may be replaced with a carbonyl group. Examples of heteroaryl groups are pyridyl, pyrazoyl, benzooxazolyl, benzoimidazolyl, benzothiazolyl, imidazolyl, oxaxolyl, and thiazolyl.

The term "heteroarylalkyl," as used herein, represents an alkyl group substituted with a heteroaryl group. Exemplary unsubstituted heteroarylalkyl groups are from 7 to 30 carbons (e.g., from 7 to 16 or from 7 to 20 carbons, such as $C_1$-$C_6$ alkyl $C_2$-$C_9$ heteroaryl, $C_1$-$C_{10}$ alkyl $C_2$-$C_6$ heteroaryl, or $C_1$-$C_{20}$ alkyl $C_2$-$C_9$ heteroaryl). In some embodiments, the alkyl and the heteroaryl each can be further substituted with 1, 2, 3, or 4 substituent groups as defined herein for the respective groups.

The term "heterocyclyl," as used herein, refers a mono- or polycyclic (e.g., bicyclic or tricyclic) radical having 3 to 12 atoms having at least one non-aromatic ring containing 1, 2, 3, or 4 ring atoms selected from N, O or S, and no aromatic ring containing any N, O, or S atoms. Examples of heterocyclyl groups include, but are not limited to, morpholinyl, thiomorpholinyl, furyl, piperazinyl, piperidinyl, pyranyl, pyrrolidinyl, tetrahydropyranyl, tetrahydrofuranyl, and 1,3-dioxanyl.

The term "heterocyclylalkyl," as used herein, represents an alkyl group substituted with a heterocyclyl group. Exemplary unsubstituted heterocyclylalkyl groups are from 7 to 30 carbons (e.g., from 7 to 16 or from 7 to 20 carbons, such as $C_1$-$C_6$ alkyl $C_2$-$C_9$ heterocyclyl, $C_1$-$C_{10}$ alkyl $C_2$-$C_9$ heterocyclyl, or $C_1$-$C_{20}$ alkyl $C_2$-$C_9$ heterocyclyl). In some embodiments, the alkyl and the heterocyclyl each can be further substituted with 1, 2, 3, or 4 substituent groups as defined herein for the respective groups.

The term "hydroxyalkyl," as used herein, represents alkyl group substituted with an —OH group.

The term "hydroxyl," as used herein, represents an —OH group.

The term "N-protecting group," as used herein, represents those groups intended to protect an amino group against undesirable reactions during synthetic procedures. Commonly used N-protecting groups are disclosed in Greene, "Protective Groups in Organic Synthesis," 3rd Edition (John Wiley & Sons, New York, 1999). N-protecting groups include, but are not limited to, acyl, aryloyl, or carbamyl groups such as formyl, acetyl, propionyl, pivaloyl, t-butylacetyl, 2-chloroacetyl, 2-bromoacetyl, trifluoroacetyl, trichloroacetyl, phthalyl, o-nitrophenoxyacetyl, α-chlorobutyryl, benzoyl, 4-chlorobenzoyl, 4-bromobenzoyl, 4-nitrobenzoyl, and chiral auxiliaries such as protected or unprotected D, L, or D, L-amino acids such as alanine, leucine, and phenylalanine; sulfonyl-containing groups such as benzenesulfonyl, and p-toluenesulfonyl; carbamate forming groups such as benzyloxycarbonyl, p-chlorobenzyloxycarbonyl, p-methoxybenzyloxycarbonyl, p-nitrobenzyloxycarbonyl, 2-nitrobenzyloxycarbonyl, p-bromobenzyloxycarbonyl, 3,4-dimethoxybenzyloxycarbonyl, 3,5-dimethoxybenzyloxycarbonyl, 2,4-20 dimethoxybenzyloxycarbonyl, 4-methoxybenzyloxycarbonyl, 2-nitro-4,5-dimethoxybenzyloxycarbonyl, 3,4,5-trimethoxybenzyloxycarbonyl, 1-(p-biphenylyl)-1-methylethoxycarbonyl, α,α-dimethyl-3,5-dimethoxybenzyloxycarbonyl, benzhydryloxy carbonyl, t-butyloxycarbonyl, diisopropylmethoxycarbonyl, isopropyloxycarbonyl, ethoxycarbonyl, methoxycarbonyl, allyloxycarbonyl, 2,2,2,-trichloroethoxycarbonyl, phenoxycarbonyl, 4-nitrophenoxy carbonyl, fluorenyl-9-methoxycarbonyl, cyclopentyloxycarbonyl, adamantyloxycarbonyl, cyclohexyloxycarbonyl, and phenylthiocarbonyl, arylalkyl groups such as benzyl, triphenylmethyl, and benzyloxymethyl, and silyl groups, such as trimethylsilyl. Preferred N-protecting groups are alloc, formyl, acetyl, benzoyl, pivaloyl, t-butylacetyl, alanyl, phenylsulfonyl, benzyl, t-butyloxycarbonyl (Boc), and benzyloxycarbonyl (Cbz).

The term "nitro," as used herein, represents an —$NO_2$ group.

The term "thiol," as used herein, represents an —SH group.

The alkyl, alkenyl, alkynyl, heteroalkyl, heteroalkenyl, heteroalkynyl, carbocyclyl (e.g., cycloalkyl), aryl, heteroaryl, and heterocyclyl groups may be substituted or unsubstituted. When substituted, there will generally be 1 to 4 substituents present, unless otherwise specified. Substituents include, for example: alkyl (e.g., unsubstituted and substituted, where the substituents include any group described herein, e.g., aryl, halo, hydroxy), aryl (e.g., substituted and unsubstituted phenyl), carbocyclyl (e.g., substituted and unsubstituted cycloalkyl), halo (e.g., fluoro), hydroxyl, heteroalkyl (e.g., substituted and unsubstituted methoxy, ethoxy, or thioalkoxy), heteroaryl, heterocyclyl, amino (e.g., $NH_2$ or mono- or dialkyl amino), azido, cyano, nitro, or thiol. Another exemplary substituent is oxo. For example, a carbonyl group is a carbon (e.g., alkyl carbon, alkenyl carbon, alkynyl carbon, heteroalkyl carbon, heteroalkenyl carbon, heteroalkynyl carbon, carbocyclyl carbon, etc.) substituted with oxo. Alternatively, sulfur may be substituted with one or two oxo groups (e.g., —SO— or —$SO_2$— within a substituted heteroalkyl, heteroalkenyl, heteroalkynyl, or heterocyclyl group). Aryl, carbocyclyl (e.g., cycloalkyl), heteroaryl, and heterocyclyl groups may also be substituted with alkyl (unsubstituted and substituted such as arylalkyl (e.g., substituted and unsubstituted benzyl)). In some embodiments, alkyl, alkenyl, alkynyl, heteroalkyl, heteroalkenyl, and heteroalkynyl are optionally substituted with 1, 2, 3, 4, or 5 substituents independently selected from the group consisting of aryl (e.g., substituted and unsubstituted phenyl), carbocyclyl (e.g., substituted and unsubstituted cycloalkyl), halo (e.g., fluoro), hydroxyl, heteroaryl, heterocyclyl, amino (e.g., $NH_2$ or mono- or dialkyl amino), azido, cyano, nitro, thiol, and oxo. In some embodiments, the substituents are themselves unsubstituted.

Compounds of the invention can have one or more asymmetric carbon atoms and can exist in the form of optically pure enantiomers, mixtures of enantiomers such as, for example, racemates, optically pure diastereoisomers, mixtures of diastereoisomers, diastereoisomeric racemates, or mixtures of diastereoisomeric racemates. The optically active forms can be obtained for example by resolution of the racemates, by asymmetric synthesis or asymmetric chromatography (chromatography with a chiral adsorbent or eluant). That is, certain of the disclosed compounds may exist in various stereoisomeric forms. Stereoisomers are compounds that differ only in their spatial arrangement. Enantiomers are pairs of stereoisomers whose mirror images are not superimposable, most commonly because they contain an asymmetrically substituted carbon atom that acts as a chiral center. "Enantiomer" means one of a pair of molecules that are mirror images of each other and are not superimposable. Diastereomers are stereoisomers that are not related as mirror images, most commonly because they contain two or more asymmetrically substituted carbon atoms and represent the configuration of substituents around one or more chiral carbon atoms. Enantiomers of a compound can be prepared, for example, by separating an enantiomer from a racemate using one or more well-known techniques and methods, such as, for example, chiral chromatography and separation methods based thereon. The appropriate technique and/or method for separating an enantiomer of a compound described herein from a racemic mixture can be readily determined by those of skill in the art. "Racemate" or "racemic mixture" means a compound containing two enantiomers, wherein such mixtures exhibit no optical activity; i.e., they do not rotate the plane of polarized light. "Geometric isomer" means isomers that differ in the orientation of substituent atoms in relationship to a carbon-carbon double bond, to a cycloalkyl ring, or to a bridged bicyclic system. Atoms (other than H) on each side of a carbon-carbon double bond may be in an E (substituents are on opposite sides of the carbon-carbon double bond) or Z (substituents are oriented on the same side) configuration. "R," "S," "S*," "R*," "E," "Z," "cis," and "trans," indicate configurations relative to the core molecule. Certain of the disclosed compounds may exist in atropisomeric forms. Atropisomers are stereoisomers resulting from hindered rotation about single bonds where the steric strain barrier to rotation is high enough to allow for the isolation of the conformers. The compounds of the invention may be prepared as individual isomers by either isomer-specific synthesis or resolved from an isomeric mixture. Conventional resolution techniques include forming the salt of a free base of each isomer of an isomeric pair using an optically active acid (followed by fractional crystallization and regeneration of the free base), forming the salt of the acid form of each isomer of an isomeric pair using an optically active amine (followed by fractional crystallization and regeneration of the free acid), forming an ester or amide of each of the isomers of an isomeric pair using an optically pure acid, amine or alcohol (followed by chromatographic separation and removal of the chiral auxiliary), or resolving an isomeric mixture of either a starting material or a final product using various well known chromatographic methods. When the stereochemistry of a disclosed compound is named or depicted by structure, the named or depicted stereoisomer is at least 60%, 70%, 80%, 90%, 99%, or 99.9% by weight relative to the other stereoisomers. When a single enantiomer is named or depicted by structure, the depicted or named enantiomer is at least 60%, 70%, 80%, 90%, 99%, or 99.9% by weight optically pure. When a single diastereomer is named or depicted by structure, the depicted or named diastereomer is at least 60%, 70%, 80%, 90%, 99%, or 99.9% by weight pure. Percent optical purity is the ratio of the weight of the enantiomer or over the weight of the enantiomer plus the weight of its optical isomer. Diastereomeric purity by weight is the ratio of the weight of one diastereomer or over the weight of all the diastereomers. When the stereochemistry of a disclosed compound is named or depicted by structure, the named or depicted stereoisomer is at least 60%, 70%, 80%, 90%, 99%, or 99.9% by mole fraction pure relative to the other stereoisomers. When a single enantiomer is named or depicted by structure, the depicted or named enantiomer is at least 60%, 70%, 80%, 90%, 99%, or 99.9% by mole fraction pure. When a single diastereomer is named or depicted by structure, the depicted or named diastereomer is at least 60%, 70%, 80%, 90%, 99%, or 99.9% by mole fraction pure. Percent purity by mole fraction is the ratio of the moles of the enantiomer or over the moles of the enantiomer plus the moles of its optical isomer. Similarly, percent purity by moles fraction is the ratio of the moles of the diastereomer or over the moles of the diastereomer plus the moles of its isomer. When a disclosed compound is named or depicted by structure without indicating the stereochemistry, and the compound has at least one chiral center, it is to be understood that the name or structure encompasses either enantiomer of the compound free from the corresponding optical isomer, a racemic mixture of the compound, or mixtures enriched in one enantiomer relative to its corresponding optical isomer. When a disclosed compound is named or depicted by structure without indicating the stereochemistry and has two or more chiral centers, it is to be understood that the name or structure encompasses a diastereomer free of other diastereomers, a number of diastereomers free from other diastereomeric pairs, mixtures of diastereomers, mixtures of diastereomeric pairs, mixtures of diastereomers in which one diastereomer is enriched relative to the other diastereomer(s), or mixtures of diastereomers in which one or more diastereomer is enriched relative to the other diastereomers. The invention embraces all of these forms.

Compounds of the present disclosure also include all of the isotopes of the atoms occurring in the intermediate or final compounds. "Isotopes" refers to atoms having the same atomic number but different mass numbers resulting from a different number of neutrons in the nuclei. For example, isotopes of hydrogen include tritium and deuterium.

Unless otherwise stated, structures depicted herein are also meant to include compounds that differ only in the presence of one or more isotopically enriched atoms. Exemplary isotopes that can be incorporated into compounds of the present invention include isotopes of hydrogen, carbon, nitrogen, oxygen, phosphorus, sulfur, fluorine, chlorine, and iodine, such as $^{2}H$, $^{3}H$, $^{11}C$, $^{13}C$, $^{14}C$, $^{13}N$, $^{15}N$, $^{15}O$, $^{17}O$, $^{18}O$, $^{32}P$, $^{33}P$, $^{35}S$, $^{18}F$, $^{36}Cl$, $^{123}I$ and $^{125}I$. Isotopically-labeled compounds (e.g., those labeled with $^{3}H$ and $^{14}C$) can be useful in compound or substrate tissue distribution assays. Tritiated (i.e., $^{3}H$) and carbon-14 (i.e., $^{14}C$) isotopes can be useful for their ease of preparation and detectability. Further, substitution with heavier isotopes such as deuterium (i.e., $^{2}H$) may afford certain therapeutic advantages resulting from greater metabolic stability (e.g., increased in vivo half-life or reduced dosage requirements). In some embodiments, one or more hydrogen atoms are replaced by $^{2}H$ or $^{3}H$, or one or more carbon atoms are replaced by $^{13}C$- or $^{14}C$-enriched carbon. Positron emitting isotopes such as $^{15}O$, $^{13}N$, $^{11}C$, and $^{18}F$ are useful for positron emission tomography (PET) studies to examine substrate receptor occupancy. Preparations of isotopically labelled compounds are known to those of skill in the art. For example, isotopically labeled compounds can generally be prepared by following procedures analogous to those disclosed for compounds of the present invention described herein, by substituting an isotopically labeled reagent for a non-isotopically labeled reagent. Unless otherwise defined, all technical and scientific terms used herein have the same meaning as commonly understood by one of ordinary skill in the art to which this invention belongs. Methods and materials are described herein for use in the present disclosure; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Definitions

In this application, unless otherwise clear from context, (i) the term "a" may be understood to mean "at least one"; (ii) the term "or" may be understood to mean "and/or"; and (iii) the terms "comprising" and "including" may be understood to encompass itemized components or steps whether presented by themselves or together with one or more additional components or steps.

As used herein, the terms "about" and "approximately" refer to a value that is within 10% above or below the value being described. For example, the term "about 5 nM" indicates a range of from 4.5 to 5.5 nM.

As used herein, the term "administration" refers to the administration of a composition (e.g., a compound or a preparation that includes a compound as described herein) to a subject or system.

Administration to an animal subject (e.g., to a human) may be by any appropriate route. For example, in some embodiments, administration may be bronchial (including by bronchial instillation), buccal, enteral, interdermal, intraarterial, intradermal, intragastric, intramedullary, intramuscular, intranasal, intraperitoneal, intrathecal, intratumoral, intravenous, intraventricular, mucosal, nasal, oral, rectal, subcutaneous, sublingual, topical, tracheal (including by intratracheal instillation), transdermal, vaginal, and vitreal.

As used herein, the term "BAF complex" refers to the BRG1- or HRBM-associated factors complex in a human cell.

As used herein, the term "BAF complex-related disorder" refers to a disorder that is caused or affected by the level of activity of a BAF complex.

As used herein, the term "BRG1 loss of function mutation" refers to a mutation in BRG1 that leads to the protein having diminished activity (e.g., at least 1% reduction in BRG1 activity, for example 2%, 5%, 10%, 25%, 50%, or 100% reduction in BRG1 activity). Exemplary BRG1 loss of function mutations include, but are not limited to, a homozygous BRG1 mutation and a deletion at the C-terminus of BRG1.

As used herein, the term "BRG1 loss of function disorder" refers to a disorder (e.g., cancer) that exhibits a reduction in BRG1 activity (e.g., at least 1% reduction in BRG1 activity, for example 2%, 5%, 10%, 25%, 50%, or 100% reduction in BRG1 activity).

The term "cancer" refers to a condition caused by the proliferation of malignant neoplastic cells, such as tumors, neoplasms, carcinomas, sarcomas, leukemias, and lymphomas.

As used herein, a "combination therapy" or "administered in combination" means that two (or more) different agents or treatments are administered to a subject as part of a defined treatment regimen for a particular disease or condition. The treatment regimen defines the doses and periodicity of administration of each agent such that the effects of the separate agents on the subject overlap. In some embodiments, the delivery of the two or more agents is simultaneous or concurrent and the agents may be co-formulated. In some embodiments, the two or more agents are not co-formulated and are administered in a sequential manner as part of a prescribed regimen. In some embodiments, administration of two or more agents or treatments in combination is such that the reduction in a symptom, or other parameter related to the disorder is greater than what would be observed with one agent or treatment delivered alone or in the absence of the other. The effect of the two treatments can be partially additive, wholly additive, or greater than additive (e.g., synergistic). Sequential or substantially simultaneous administration of each therapeutic agent can be effected by any appropriate route including, but not limited to, oral routes, intravenous routes, intramuscular routes, and direct absorption through mucous membrane tissues. The therapeutic agents can be administered by the same route or by different routes. For example, a first therapeutic agent of the combination may be administered by intravenous injection while a second therapeutic agent of the combination may be administered orally.

By "determining the level" of a protein or RNA is meant the detection of a protein or an RNA, by methods known in the art, either directly or indirectly. "Directly determining" means performing a process (e.g., performing an assay or test on a sample or "analyzing a sample" as that term is defined herein) to obtain the physical entity or value. "Indirectly determining" refers to receiving the physical entity or value from another party or source (e.g., a third-party laboratory that directly acquired the physical entity or value). Methods to measure protein level generally include, but are not limited to, western blotting, immunoblotting, enzyme-linked immunosorbent assay (ELISA), radioimmunoassay (RIA), immunoprecipitation, immunofluorescence, surface plasmon resonance, chemiluminescence, fluorescent polarization, phosphorescence, immunohistochemical analysis, matrix-assisted laser desorption/ionization time-of-flight (MALDI-TOF) mass spectrometry, liquid chromatography (LC)-mass spectrometry, microcytometry, microscopy, fluorescence activated cell sorting (FACS), and flow cytometry, as well as assays based on a property of a protein including, but not limited to, enzymatic activity or interaction with other protein partners. Methods to measure RNA levels are known in the art and include, but are not limited to, quantitative polymerase chain reaction (qPCR) and Northern blot analyses.

By "decreasing the activity of a BAF complex" is meant decreasing the level of an activity related to a BAF complex, or a related downstream effect. A non-limiting example of decreasing an activity of a BAF complex is Sox2 activation. The activity level of a BAF complex may be measured using any method known in the art, e.g., the methods described in Kadoch et al. Cell, 2013, 153, 71-85, the methods of which are herein incorporated by reference.

As used herein, the term "degrader" refers to a small molecule compound including a degradation moiety, wherein the compound interacts with a protein (e.g., BRG1 and/or BRM) in a way which results in degradation of the protein, e.g., binding of the compound results in at least 5% reduction of the level of the protein, e.g., in a cell or subject.

As used herein, the term "degradation moiety" refers to a moiety whose binding results in degradation of a protein, e.g., BRG1 and/or BRM. In one example, the moiety binds to a protease or a ubiquitin ligase that metabolizes the protein, e.g., BRG1 and/or BRM.

By "modulating the activity of a BAF complex," is meant altering the level of an activity related to a BAF complex (e.g., GBAF), or a related downstream effect. The activity level of a BAF complex may be measured using any method known in the art, e.g., the methods described in Kadoch et al, Cell 153:71-85 (2013), the methods of which are herein incorporated by reference.

By "reducing the activity of BRG1 and/or BRM," is meant decreasing the level of an activity related to an BRG1 and/or BRM, or a related downstream effect. A non-limiting example of inhibition of an activity of BRG1 and/or BRM is decreasing the level of a BAF complex in a cell. The activity level of BRG1 and/or BRM may be measured using any method known in the art. In some embodiments, an agent which reduces the activity of BRG1 and/or BRM is a small molecule BRG1 and/or BRM degrader.

By "reducing the level of BRG1 and/or BRM," is meant decreasing the level of BRG1 and/or BRM in a cell or subject. The level of BRG1 and/or BRM may be measured using any method known in the art.

By "level" is meant a level of a protein, or mRNA encoding the protein, as compared to a reference. The reference can be any useful reference, as defined herein. By a "decreased level" or an "increased level" of a protein is meant a decrease or increase in protein level, as compared to a reference (e.g., a decrease or an increase by about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, about 150%, about 200%, about 300%, about 400%, about 500%, or more; a decrease or an increase of more than about 10%, about 15%, about 20%, about 50%, about 75%, about 100%, or about 200%, as compared to a reference; a decrease or an increase by less than about 0.01-fold, about 0.02-fold, about 0.1-fold, about 0.3-fold, about 0.5-fold, about 0.8-fold, or less; or an increase by more than about 1.2-fold, about 1.4-fold, about 1.5-fold, about 1.8-fold, about 2.0-fold, about 3.0-fold, about 3.5-fold, about 4.5-fold, about 5.0-fold, about 10-fold, about 15-fold, about 20-fold, about 30-fold, about 40-fold, about 50-fold, about 100-fold, about 1000-fold, or more). A level of a protein may be expressed in mass/vol (e.g., g/dL, mg/mL, µg/mL, ng/mL) or percentage relative to total protein or mRNA in a sample.

As used herein, the term "inhibiting BRM" refers to blocking or reducing the level or activity of the ATPase catalytic binding domain or the bromodomain of the protein. BRM inhibition may be determined using methods known in the art, e.g., a BRM ATPase assay, a Nano DSF assay, or a BRM Luciferase cell assay.

The term "pharmaceutical composition," as used herein, represents a composition containing a compound described herein formulated with a pharmaceutically acceptable excipient and appropriate for administration to a mammal, for example a human. Typically, a pharmaceutical composition is manufactured or sold with the approval of a governmental regulatory agency as part of a therapeutic regimen for the treatment of disease in a mammal. Pharmaceutical compositions can be formulated, for example, for oral administration in unit dosage form (e.g., a tablet, capsule, caplet, gel cap, or syrup); for topical administration (e.g., as a cream, gel, lotion, or ointment); for intravenous administration (e.g., as a sterile solution free of particulate emboli and in a solvent system suitable for intravenous use); or in any other pharmaceutically acceptable formulation.

A "pharmaceutically acceptable excipient," as used herein, refers to any ingredient other than the compounds described herein (for example, a vehicle capable of suspending or dissolving the active compound) and having the properties of being substantially nontoxic and non-inflammatory in a patient. Excipients may include, for example: antiadherents, antioxidants, binders, coatings, compression aids, disintegrants, dyes (colors), emollients, emulsifiers, fillers (diluents), film formers or coatings, flavors, fragrances, glidants (flow enhancers), lubricants, preservatives, printing inks, sorbents, suspending or dispersing agents, sweeteners, and waters of hydration.

As used herein, the term "pharmaceutically acceptable salt" means any pharmaceutically acceptable salt of a compound, for example, any compound of Formula I. Pharmaceutically acceptable salts of any of the compounds described herein may include those that are within the scope of sound medical judgment, suitable for use in contact with the tissues of humans and animals without undue toxicity, irritation, allergic response and are commensurate with a reasonable benefit/risk ratio.

Pharmaceutically acceptable salts are well known in the art. For example, pharmaceutically acceptable salts are described in: Berge et al., J. Pharmaceutical Sciences 66:1-19, 1977 and in Pharmaceutical Salts: Properties, Selection, and Use, (Eds. P. H. Stahl and C.G. Wermuth), Wiley-VCH, 2008. The salts can be prepared in situ during the final isolation and purification of the compounds described herein or separately by reacting a free base group with a suitable organic acid.

The compounds of the invention may have ionizable groups so as to be capable of preparation as pharmaceutically acceptable salts. These salts may be acid addition salts involving inorganic or organic acids or the salts may, in the case of acidic forms of the compounds of the invention be prepared from inorganic or organic bases. Frequently, the compounds are prepared or used as pharmaceutically acceptable salts prepared as addition products of pharmaceutically acceptable acids or bases. Suitable pharmaceutically acceptable acids and bases and methods for preparation of the appropriate salts are well-known in the art. Salts may be prepared from pharmaceutically acceptable non-toxic acids and bases including inorganic and organic acids and bases.

By a "reference" is meant any useful reference used to compare protein or RNA levels. The reference can be any sample, standard, standard curve, or level that is used for comparison purposes. The reference can be a normal reference sample or a reference standard or level. A "reference sample" can be, for example, a control, e.g., a predetermined negative control value such as a "normal control" or a prior sample taken from the same subject; a sample from a normal healthy subject, such as a normal cell or normal tissue; a sample (e.g., a cell or tissue) from a subject not having a disease; a sample from a subject that is diagnosed with a disease, but not yet treated with a compound of the invention; a sample from a subject that has been treated by a compound of the invention; or a sample of a purified protein or RNA (e.g., any described herein) at a known normal concentration. By "reference standard or level" is meant a value or number derived from a reference sample. A "normal control value" is a pre-determined value indicative of non-disease state, e.g., a value expected in a healthy control subject. Typically, a normal control value is expressed as a range ("between X and Y"), a high threshold ("no higher than X"), or a low threshold ("no lower than X"). A subject having a measured value within the normal control value for a particular biomarker is typically referred to as "within normal limits" for that biomarker. A normal reference standard or level can be a value or number derived from a normal subject not having a disease or disorder (e.g., cancer); a subject that has been treated with a compound of the invention. In preferred embodiments, the reference sample, standard, or level is matched to the sample subject sample by at least one of the following criteria: age, weight, sex, disease stage, and overall health. A standard curve of levels of a purified protein or RNA, e.g., any described herein, within the normal reference range can also be used as a reference.

As used herein, the term "subject" refers to any organism to which a composition in accordance with the invention may be administered, e.g., for experimental, diagnostic, prophylactic, and/or therapeutic purposes. Typical subjects include any animal (e.g., mammals such as mice, rats, rabbits, non-human primates, and humans). A subject may seek or be in need of treatment, require treatment, be receiving treatment, be receiving treatment in the future, or be a human or animal who is under care by a trained professional for a particular disease or condition.

As used herein, the terms "treat," "treated," or "treating" mean therapeutic treatment or any measures whose object is to slow down (lessen) an undesired physiological condition, disorder, or disease, or obtain beneficial or desired clinical results. Beneficial or desired clinical results include, but are not limited to, alleviation of symptoms; diminishment of the extent of a condition, disorder, or disease; stabilized (i.e., not worsening) state of condition, disorder, or disease; delay in onset or slowing of condition, disorder, or disease progression; amelioration of the condition, disorder, or disease state or remission (whether partial or total); an amelioration of at least one measurable physical parameter, not necessarily discernible by the patient; or enhancement or improvement of condition, disorder, or disease. Treatment includes eliciting a clinically significant response without excessive levels of side effects. Treatment also includes prolonging survival as compared to expected survival if not receiving treatment. Compounds of the invention may also be used to "prophylactically treat" or "prevent" a disorder, for example, in a subject at increased risk of developing the disorder.

The details of one or more embodiments of the invention are set forth in the description below. Other features, objects, and advantages of the invention will be apparent from the description and from the claims.

DETAILED DESCRIPTION

The present disclosure features compounds useful for the inhibition of BRG1 and optionally BRM. These compounds may be used to modulate the activity of a BAF complex, for example, for the treatment of a BAF-related disorder, such as cancer (e.g., BRG1-loss of function disorders). Exemplary compounds described herein include compounds having a structure according to Formula I, or a pharmaceutically acceptable salt thereof.

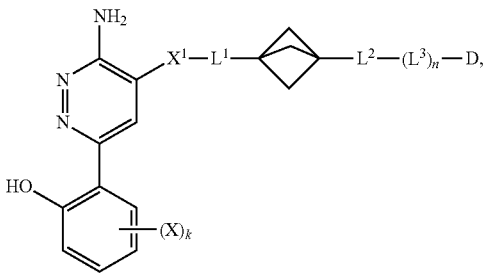

Formula I where
X is halo;
$X^1$ is absent, O, or $NR^1$;
k is 0, 1, 2, or 3;
n is 0, 1, or 2;
$R^1$ is H or optionally substituted $C_1$-$C_6$ alkyl;
$L^1$ is optionally substituted $C_1$-$C_6$ alkylene, optionally substituted $C_2$-$C_6$ alkenylene, or optionally substituted $C_2$-$C_6$ alkynylene;
$L^2$ is absent, optionally substituted $C_1$-$C_6$ alkylene, optionally substituted $C_1$-$C_{20}$ heteroalkylene, or optionally substituted $C_2$-$C_9$ heterocyclylene;
each $L^3$ is, independently, optionally substituted $C_1$-$C_{20}$ heteroalkylene, optionally substituted $C_3$-$C_{10}$ carbocyclylene, optionally substituted $C_3$-$C_{10}$ carbocyclylene-$C_1$-$C_6$ alkylene, optionally substituted $C_2$-$C_9$ heterocyclylene, optionally substituted $C_2$-$C_9$ heterocyclylene-$C_1$-$C_6$ alkylene, optionally substituted $C_6$-$C_{10}$ arylene, optionally substituted $C_6$-$C_{10}$ arylene-$C_1$-$C_6$ alkylene, optionally substituted $C_2$-$C_6$ alkynylene, O, or $NR^1$; and
D is a degradation moiety.

In some embodiments, the compound has the structure of any one of compounds 1-105 in Table 1, or pharmaceutically acceptable salt thereof.

Other embodiments, as well as exemplary methods for the synthesis of production of these compounds, are described herein.

Pharmaceutical Uses

The compounds described herein are useful in the methods of the invention and, while not bound by theory, are believed to exert their ability to modulate the level, status, and/or activity of a BAF complex, i.e., by inhibiting the activity of the BRG1 and/or BRM proteins within the BAF complex in a mammal. BAF complex-related disorders include, but are not limited to, BRG1 loss of function mutation-related disorders.

An aspect of the present invention relates to methods of treating disorders related to BRG1 loss of function mutations such as cancer (e.g., non-small cell lung cancer, colorectal cancer, bladder cancer, cancer of unknown primary, glioma, breast cancer, melanoma, non-melanoma skin cancer, endometrial cancer, or penile cancer) in a subject in need thereof. In some embodiments, the compound is administered in an amount and for a time effective to result in one or more (e.g., two or more, three or more, four or more) of: (a) reduced tumor size, (b) reduced rate of tumor growth, (c) increased tumor cell death (d) reduced tumor progression, (e) reduced number of metastases, (f) reduced rate of metastasis, (g) decreased tumor recurrence (h) increased survival of subject, (i) increased progression free survival of subject.

Treating cancer can result in a reduction in size or volume of a tumor. For example, after treatment, tumor size is reduced by 5% or greater (e.g., 10%, 20%, 30%, 40%, 50%, 60%, 70%, 80%, 90%, or greater) relative to its size prior to treatment. Size of a tumor may be measured by any reproducible means of measurement. For example, the size of a tumor may be measured as a diameter of the tumor.

Treating cancer may further result in a decrease in number of tumors. For example, after treatment, tumor number is reduced by 5% or greater (e.g., 10%, 20%, 30%, 40%, 50%, 60%, 70%, 80%, 90%, or greater) relative to number prior to treatment. Number of tumors may be measured by any reproducible means of measurement, e.g., the number of tumors may be measured by counting tumors visible to the naked eye or at a specified magnification (e.g., 2×, 3×, 4×, 5×, 10×, or 50×).

Treating cancer can result in a decrease in number of metastatic nodules in other tissues or organs distant from the primary tumor site. For example, after treatment, the number of metastatic nodules is reduced by 5% or greater (e.g., 10%, 20%, 30%, 40%, 50%, 60%, 70%, 80%, 90% or greater) relative to number prior to treatment. The number of metastatic nodules may be measured by any reproducible means of measurement. For example, the number of metastatic nodules may be measured by counting metastatic nodules visible to the naked eye or at a specified magnification (e.g., 2×, 10×, or 50×).

Treating cancer can result in an increase in average survival time of a population of subjects treated according to the present invention in comparison to a population of untreated subjects. For example, the average survival time is increased by more than 30 days (more than 60 days, 90 days, or 120 days). An increase in average survival time of a population may be measured by any reproducible means. An increase in average survival time of a population may be measured, for example, by calculating for a population the average length of survival following initiation of treatment with the compound of the invention. An increase in average survival time of a population may also be measured, for example, by calculating for a population the average length of survival following completion of a first round of treatment with a pharmaceutically acceptable salt of the invention.

Treating cancer can also result in a decrease in the mortality rate of a population of treated subjects in comparison to an untreated population. For example, the mortality rate is decreased by more than 2% (e.g., more than 5%, 10%, or 25%). A decrease in the mortality rate of a population of treated subjects may be measured by any reproducible means, for example, by calculating for a population the average number of disease-related deaths per unit time following initiation of treatment with a pharmaceutically acceptable salt of the invention. A decrease in the mortality rate of a population may also be measured, for example, by calculating for a population the average number of disease-related deaths per unit time following completion of a first round of treatment with a pharmaceutically acceptable salt of the invention.

Exemplary cancers that may be treated by the invention include, but are not limited to, non-small cell lung cancer, small-cell lung cancer, colorectal cancer, bladder cancer, glioma, breast cancer, melanoma, non-melanoma skin cancer, endometrial cancer, esophagogastric cancer, pancreatic cancer, hepatobiliary cancer, soft tissue sarcoma, ovarian cancer, head and neck cancer, renal cell carcinoma, bone cancer, non-Hodgkin lymphoma, prostate cancer, embryonal tumor, germ cell tumor, cervical cancer, thyroid cancer, salivary gland cancer, gastrointestinal neuroendocrine tumor, uterine sarcoma, gastrointestinal stromal tumor, CNS cancer, thymic tumor, Adrenocortical carcinoma, appendiceal cancer, small bowel cancer and penile cancer.

Combination Formulations and Uses Thereof

The compounds of the invention can be combined with one or more therapeutic agents. In particular, the therapeutic agent can be one that treats or prophylactically treats any cancer described herein.

Combination Therapies

A compound of the invention can be used alone or in combination with an additional therapeutic agent, e.g., other agents that treat cancer or symptoms associated therewith, or in combination with other types of treatment to treat cancer. In combination treatments, the dosages of one or more of the therapeutic compounds may be reduced from standard dosages when administered alone. For example, doses may be determined empirically from drug combinations and permutations or may be deduced by isobolographic analysis (e.g., Black et al., Neurology 65: S3-S6, 2005). In this case, dosages of the compounds when combined should provide a therapeutic effect.

In some embodiments, the second therapeutic agent is a chemotherapeutic agent (e.g., a cytotoxic agent or other chemical compound useful in the treatment of cancer). These include alkylating agents, antimetabolites, folic acid analogs, pyrimidine analogs, purine analogs and related inhibitors, vinca alkaloids, epipodophyllotoxins, antibiotics, L-Asparaginase, topoisomerase inhibitors, interferons, platinum coordination complexes, anthracenedione substituted urea, methyl hydrazine derivatives, adrenocortical suppressant, adrenocorticosteroids, progestins, estrogens, antiestrogen, androgens, antiandrogen, and gonadotropin-releasing hormone analog. Also included is 5-fluorouracil (5-FU), leucovorin (LV), irinotecan, oxaliplatin, capecitabine, paclitaxel and docetaxel. Non-limiting examples of chemotherapeutic agents include alkylating agents such as thiotepa and cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, triethylenephosphoramide, triethylenethiophosphoramide and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, and ranimnustine; antibiotics such as the enediyne antibiotics (e.g., calicheamicin, especially calicheamicin gammaII and calicheamicin omegaII (see, e.g., Agnew, Chem. Intl. Ed Engl. 33:183-186 (1994)); dynemicin, including dynemicin A; bisphosphonates, such as clodronate; an esperamicin; as well as neocarzinostatin chromophore and related chromoprotein enediyne antibiotic chromophores), aclacinomysins, actinomycin, authramycin, azaserine, bleomycins, cactinomycin, carabicin, caminomycin, carzinophilin, chromomycinis, dactinomycin, daunorubicin, detorubicin, 6-diazo-5-oxo-L-norleucine, Adriamycin® (doxorubicin, including morpholino-doxorubicin, cyanomorpholino-doxorubicin, 2-pyrrolino-doxorubicin and deoxydoxorubicin), epirubicin, esorubicin, idarubicin, marcellomycin, mitomycins such as mitomycin C, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; eniluracil; amsacrine; bestrabucil; bisantrene; edatraxate; defofamine; demecolcine; diaziquone; elfomithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSK® polysaccharide complex (JHS Natural Products, Eugene, Oreg.); razoxane; rhizoxin; sizofuran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; thiotepa; taxoids, e.g., Taxol® paclitaxel (Bristol-Myers Squibb Oncology, Princeton, N.J.), ABraxane®, cremophor-free, albumin-engineered nanoparticle formulation of paclitaxel (American Pharmaceutical Partners, Schaumberg, Ill.), and Taxotere® docetaxel (Rhone-Poulenc Rorer, Antony, France); chlorambucil; Gemzar® gemcitabine; 6-thioguanine; mercaptopurine; methotrexate; platinum coordination complexes such as cisplatin, oxaliplatin and carboplatin; vinblastine; platinum; etoposide (VP-16); ifosfamide; mitoxantrone; vincristine; Navelbine® vinorelbine; novantrone; teniposide; edatrexate; daunomycin; aminopterin; xeloda; ibandronate; irinotecan (e.g., CPT-11); topoisomerase inhibitor RFS 2000; difluoromethylornithine (DMFO); retinoids such as retinoic acid; capecitabine; and pharmaceutically acceptable salts or acids of any of the above. Two or more chemotherapeutic agents can be used in a cocktail to be administered in combination with the first therapeutic agent described herein. Suitable dosing regimens of combination chemotherapies are known in the art and described in, for example, Saltz et al. (1999) Proc ASCO 18:233a and Douillard et al. (2000) Lancet 355:1041-7.

In some embodiments, the second therapeutic agent is a therapeutic agent which is a biologic such a cytokine (e.g., interferon or an interleukin (e.g., IL-2)) used in cancer treatment. In some embodiments the biologic is an anti-angiogenic agent, such as an anti-VEGF agent, e.g., bevacizumab (Avastin®). In some embodiments the biologic is an immunoglobulin-based biologic, e.g., a monoclonal antibody (e.g., a humanized antibody, a fully human antibody, an Fc fusion protein or a functional fragment thereof) that agonizes a target to stimulate an anti-cancer response or antagonizes an antigen important for cancer. Such agents include Rituxan (Rituximab); Zenapax (Daclizumab); Simulect (Basiliximab); Synagis (Palivizumab); Remicade (Infliximab); Herceptin (Trastuzumab); Mylotarg (Gemtuzumab ozogamicin); Campath (Alemtuzumab); Zevalin (Ibritumomab tiuxetan); Humira (Adalimumab); Xolair (Omalizumab); Bexxar (Tositumomab-1-131); Raptiva (Efalizumab); Erbitux (Cetuximab); Avastin (Bevacizumab); Tysabri (Natalizumab); Actemra (Tocilizumab); Vectibix (Panitumumab); Lucentis (Ranibizumab); Soliris (Eculizumab); Cimzia (Certolizumab pegol); Simponi (Golimumab); Ilaris (Canakinumab); Stelara (Ustekinumab); Arzerra (Ofatumumab); Prolia (Denosumab); Numax (Motavizumab); ABThrax (Raxibacumab); Benlysta (Belimumab); Yervoy (Ipilimumab); Adcetris (Brentuximab Vedotin); Perjeta (Pertuzumab); Kadcyla (Ado-trastuzumab emtansine); and Gazyva (Obinutuzumab). Also included are antibody-drug conjugates.

The second agent may be a therapeutic agent which is a non-drug treatment. For example, the second therapeutic agent is radiation therapy, cryotherapy, hyperthermia and/or surgical excision of tumor tissue.

The second agent may be a checkpoint inhibitor. In one embodiment, the inhibitor of checkpoint is an inhibitory antibody (e.g., a monospecific antibody such as a monoclonal antibody). The antibody may be, e.g., humanized or fully human. In some embodiments, the inhibitor of checkpoint is a fusion protein, e.g., an Fc-receptor fusion protein. In some embodiments, the inhibitor of checkpoint is an agent, such as an antibody, that interacts with a checkpoint protein. In some embodiments, the inhibitor of checkpoint is an agent, such as an antibody, that interacts with the ligand of a checkpoint protein. In some embodiments, the inhibitor of checkpoint is an inhibitor (e.g., an inhibitory antibody or small molecule inhibitor) of CTLA-4 (e.g., an anti-CTLA4 antibody such as ipilimumab/Yervoy or tremelimumab). In some embodiments, the inhibitor of checkpoint is an inhibitor (e.g., an inhibitory antibody or small molecule inhibitor) of PD-1 (e.g., nivolumab/Opdivo®; pembrolizumab/Keytruda®; pidilizumab/CT-011). In some embodiments, the inhibitor of checkpoint is an inhibitor (e.g., an inhibitory antibody or small molecule inhibitor) of PDL1 (e.g., MPDL3280A/RG7446; MED14736; MSB0010718C; BMS 936559). In some embodiments, the inhibitor of checkpoint is an inhibitor (e.g., an inhibitory antibody or Fc fusion or small molecule inhibitor) of PDL2 (e.g., a PDL2/Ig fusion protein such as AMP 224). In some embodiments, the inhibitor of checkpoint is an inhibitor (e.g., an inhibitory antibody or small molecule inhibitor) of B7-H3 (e.g., MGA271), B7-H4, BTLA, HVEM, TIM3, GAL9, LAG3, VISTA, KIR, 2B4, CD160, CGEN-15049, CHK 1, CHK2, A2aR, B-7 family ligands, or a combination thereof.

In any of the combination embodiments described herein, the first and second therapeutic agents are administered simultaneously or sequentially, in either order. The first therapeutic agent may be administered immediately, up to 1 hour, up to 2 hours, up to 3 hours, up to 4 hours, up to 5 hours, up to 6 hours, up to 7 hours, up to 8 hours, up to 9 hours, up to 10 hours, up to 11 hours, up to 12 hours, up to 13 hours, 14 hours, up to hours 16, up to 17 hours, up 18 hours, up to 19 hours up to 20 hours, up to 21 hours, up to 22 hours, up to 23 hours up to 24 hours or up to 1-7, 1-14, 1-21 or 1-30 days before or after the second therapeutic agent.

Pharmaceutical Compositions

The compounds of the invention are preferably formulated into pharmaceutical compositions for administration to a mammal, preferably, a human, in a biologically compatible form suitable for administration in vivo. Accordingly, in an aspect, the present invention provides a pharmaceutical composition comprising a compound of the invention in admixture with a suitable diluent, carrier, or excipient.

The compounds of the invention may be used in the form of the free base, in the form of salts, solvates, and as prodrugs. All forms are within the scope of the invention. In accordance with the methods of the invention, the described compounds or salts, solvates, or prodrugs thereof may be administered to a patient in a variety of forms depending on the selected route of administration, as will be understood by those skilled in the art. The compounds of the invention may be administered, for example, by oral, parenteral, buccal, sublingual, nasal, rectal, patch, pump, or transdermal administration and the pharmaceutical compositions formulated accordingly. Parenteral administration includes intravenous, intraperitoneal, subcutaneous, intramuscular, transepithelial, nasal, intrapulmonary, intrathecal, rectal, and topical modes of administration. Parenteral administration may be by continuous infusion over a selected period of time.

A compound of the invention may be orally administered, for example, with an inert diluent or with an assimilable edible carrier, or it may be enclosed in hard- or soft-shell gelatin capsules, or it may be compressed into tablets, or it may be incorporated directly with the food of the diet. For oral therapeutic administration, a compound of the invention may be incorporated with an excipient and used in the form of ingestible tablets, buccal tablets, troches, capsules, elixirs, suspensions, syrups, and wafers. A compound of the invention may also be administered parenterally. Solutions of a compound of the invention can be prepared in water suitably mixed with a surfactant, such as hydroxypropylcellulose. Dispersions can also be prepared in glycerol, liquid polyethylene glycols, DMSO, and mixtures thereof with or without alcohol, and in oils. Under ordinary conditions of storage and use, these preparations may contain a preservative to prevent the growth of microorganisms. Conventional procedures and ingredients for the selection and preparation of suitable formulations are described, for example, in Remington's Pharmaceutical Sciences (2003, 20th ed.) and in The United States Pharmacopeia: The National Formulary (USP 24 NF19), published in 1999. The pharmaceutical forms suitable for injectable use include sterile aqueous solutions or dispersions and sterile powders for the extemporaneous preparation of sterile injectable solutions or dispersions. In all cases the form must be sterile and must be fluid to the extent that may be easily administered via syringe. Compositions for nasal administration may conveniently be formulated as aerosols, drops, gels, and powders. Aerosol formulations typically include a solution or fine suspension of the active substance in a physiologically acceptable aqueous or non-aqueous solvent and are usually presented in single or multidose quantities in sterile form in a sealed container, which can take the form of a cartridge or refill for use with an atomizing device. Alternatively, the sealed container may be a unitary dispensing device, such as a single dose nasal inhaler or an aerosol dispenser fitted with a metering valve which is intended for disposal after use. Where the dosage form comprises an aerosol dispenser, it will contain a propellant, which can be a compressed gas, such as compressed air or an organic propellant, such as fluorochlorohydrocarbon. The aerosol dosage forms can also take the form of a pump-atomizer. Compositions suitable for buccal or sublingual administration include tablets, lozenges, and pastilles, where the active ingredient is formulated with a carrier, such as sugar, acacia, tragacanth, gelatin, and glycerine. Compositions for rectal administration are conveniently in the form of suppositories containing a conventional suppository base, such as cocoa butter. A compound described herein may be administered intratumorally, for example, as an intratumoral injection. Intratumoral injection is injection directly into the tumor vasculature and is specifically contemplated for discrete, solid, accessible tumors. Local, regional, or systemic administration also may be appropriate. A compound described herein may advantageously be contacted by administering an injection or multiple injections to the tumor, spaced for example, at approximately, 1 cm intervals. In the case of surgical intervention, the present invention may be used preoperatively, such as to render an inoperable tumor subject to resection. Continuous administration also may be applied where appropriate, for example, by implanting a catheter into a tumor or into tumor vasculature.

The compounds of the invention may be administered to an animal, e.g., a human, alone or in combination with pharmaceutically acceptable carriers, as noted herein, the proportion of which is determined by the solubility and chemical nature of the compound, chosen route of administration, and standard pharmaceutical practice.

Dosages

The dosage of the compounds of the invention, and/or compositions comprising a compound of the invention, can vary depending on many factors, such as the pharmacodynamic properties of the compound; the mode of administration; the age, health, and weight of the recipient; the nature and extent of the symptoms; the frequency of the treatment, and the type of concurrent treatment, if any; and the clearance rate of the compound in the animal to be treated. One of skill in the art can determine the appropriate dosage based on the above factors. The compounds of the invention may be administered initially in a suitable dosage that may be adjusted as required, depending on the clinical response. In general, satisfactory results may be obtained when the compounds of the invention are administered to a human at a daily dosage of, for example, between 0.05 mg and 3000 mg (measured as the solid form). Dose ranges include, for example, between 10-1000 mg (e.g., 50-800 mg). In some embodiments, 50, 100, 150, 200, 250, 300, 350, 400, 450, 500, 550, 600, 650, 700, 750, 800, 850, 900, 950, or 1000 mg of the compound is administered.

Alternatively, the dosage amount can be calculated using the body weight of the patient. For example, the dose of a compound, or pharmaceutical composition thereof, administered to a patient may range from 0.1-100 mg/kg (e.g., 0.25-25 mg/kg). In exemplary, non-limiting embodiments, the dose may range from 0.5-5.0 mg/kg (e.g., 0.5, 1.0, 1.5, 2.0, 2.5, 3.0, 3.5, 4.0, 4.5, or 5.0 mg/kg) or from 5.0-20 mg/kg (e.g., 5.5, 6.0, 6.5, 7.0, 7.5, 8.0, 8.5, 9.0, 9.5, 10, 11, 12, 13, 14, 15, 16, 17, 18, 19, or 20 mg/kg).

EXAMPLES

The following abbreviations are used throughout the Examples below.

Ac acetyl
ACN or MeCN acetonitrile
AcOH acetic acid
$Ac_2O$ acetic anhydride
aq. aqueous
Boc tert-butoxycarbonyl
Bu or n-Bu butyl
CDI 1,1'-carbonyldiimidazole
DCE or 1,2-DCE 1,2-dichloroethane
DCM dichloromethane
DIAD diisopropyl azodicarboxylate
DIPEA or DIEA N.N-diisopropylethylamine
DMAP 4-(dimethylamino)pyridine
DME 1,2-dimethoxyethane
DMF N.N-dimethylformamide
DMSO dimethyl sulfoxide
EA or EtOAc ethyl acetate
EDCI N-(3-dimethylaminopropyl)-N'-ethylcarbodiimide hydrochloride
equiv equivalents
$Et_3N$ or TEA triethylamine
EtOH ethyl alcohol
FA formic acid
h or hr hour
HATU 1-[bis(dimethylamino)methylene]-1H-1,2,3-triazolo[4,5-b]pyridinium 3-oxid hexafluorophosphate
HOAt 1-hydroxy-7-azabenzotriazole
HOBt or HOBT 1-hydroxybenzotriazole hydrate
iPr Isopropyl
MeOH methyl alcohol
$Me_4$t-BuXphos ditert-butyl-[2,3,4,5-tetramethyl-6-(2,4,6-triisopropylphenyl)phenyl]phosphane
min minute
MTBE tert-butyl methyl ether
n-BuLi n-butyllithium
NMP 1-methyl-2-pyrrolidinone
OAc acetate
Pd/C palladium on carbon
PDC pyridinium dichromate
$PdCl_2$(dtbpf) or Pd(dtbpf)$Cl_2$ dichloro[1,1'-bis(di-t-butylphosphino)ferrocene]palladium(II)
$PdCl_2$(dppf) or Pd(dppf)$Cl_2$[1,1'-bis(diphenylphosphino)ferrocene]dichloropalladium(II)
$Pd_2$(dba)$_3$ tris(dibenzylideneacetone)dipalladium(0)
Pd(PPh$_3$)$_4$ tetrakis(triphenylphosphine)palladium(O
Pd(PPh$_3$)$_2$Cl$_2$ dichlorobis(triphenylphosphine)palladium (II)
PE petroleum ether
PPh$_3$ triphenylphosphine
Pr n-propyl
Py pyridine
rac racemic
Rf retention factor
r.t. or rt room temperature
sat. saturated
SFC supercritical fluid chromatography
t-Bu tert-butyl
tBuXphos-Pd-G3 or [2-(2-aminophenyl)phenyl]-methyl-sulfonyloxypalladium; ditert-tBuXphos Pd G$_3$ or butyl-[2-(2,4,6-triisopropylphenyl)phenyl]phosphane t-BuXphos-Pd (gen 3)
TFA trifluoroacetic acid
Tf₂O trifluoromethanesulfonic anhydride
THF tetrahydrofuran
TLC thin layer chromatography
Xantphos-Pd-G3  [2-(2-aminophenyl)phenyl]-methyl-sulfonyloxy-palladium; (5-diphenylphosphanyl-9,9-dimethyl-xanthen-4-yl)-diphenyl-phosphane
XPhos Pd G3 (2-Dicyclohexylphosphino-2',4',6'-triisopropyl-1,1'-biphenyl)[2-(2'-amino-1,1'-biphenyl)]palladium(II) methanesulfonate Example 1. Preparation of 2-(6-amino-5-[bicyclo[1.1.1]pentan-1-yl(methyl)amino]pyridazin-3-yl)phenol

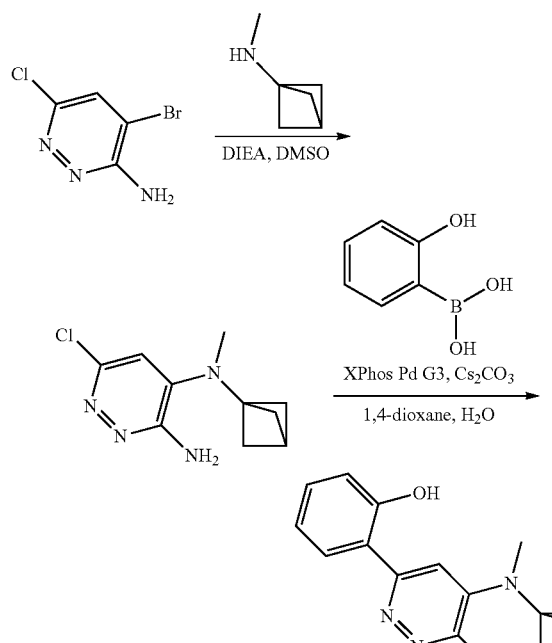

Step 1: Preparation of N4-[bicyclo[1.1.1]pentan-1-yl]-6-chloro-N4-methylpyridazine-3,4-diamine

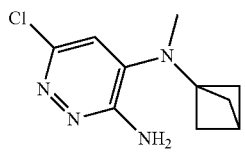

To a stirred mixture of 4-bromo-6-chloropyridazin-3-amine (200 mg, 0.960 mmol) and N-methylbicyclo[1.1.1]pentan-1-amine (112 mg, 1.15 mmol) in DMSO (1.00 mL) was added DIEA (18.6 mg, 0.144 mmol) at room temperature. The resulting mixture was stirred for overnight at 130° C. The reaction mixture was purified by reverse phase C18 flash chromatography with the following conditions to afford N4-[bicyclo[1.1.1]pentan-1-yl]-6-chloro-N4-methylpyridazine-3,4-diamine (71 mg, 32.3%) as a white solid. LCMS (ESI) m/z: [M+H]⁺=225.

Step 2: Preparation of 2-(6-amino-5-[bicyclo[1.1.1]pentan-1-yl(methyl)amino]pyridazin-3-yl)phenol

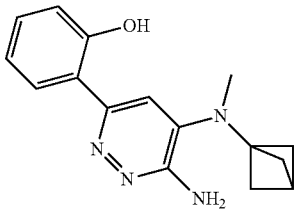 [SMILES: CN(c1cc(-c2ccccc2O)nnc1N)C12CC(C1)C2]

To a stirred mixture of N4-[bicyclo[1.1.1]pentan-1-yl]-6-chloro-N4-methylpyridazine-3,4-diamine (30.0 mg, 0.134 mmol) and 2-hydroxyphenylboronic acid (36.8 mg, 0.267 mmol) in 1,4-dioxane (4.00 ml) and H₂O (1.00 ml) were added XPhos Pd G3 (11.3 mg, 0.013 mmol) and Cs₂CO₃ (131 mg, 0.401 mmol) at room temperature. The resulting mixture was stirred overnight at 100° C. The reaction mixture was filtered through a short pad of Celite and concentrated in vacuo. The residue was purified by Prep-HPLC with the following conditions (Water:ACN:NH₄HCO₃) to afford the title compound (8 mg, 21.1%) as a white solid. ¹H NMR (300 MHz, DMSO-d₆) δ 14.04 (s, 1H), 7.87 (dd, J=8.3, 1.6 Hz, 1H), 7.67 (s, 1H), 7.25 (td, J=7.6, 7.0, 1.6 Hz, 1H), 6.94-6.86 (m, 2H), 6.38 (s, 2H), 2.76 (s, 3H), 2.45 (s, 1H), 1.97 (s, 6H). LCMS (ESI) m/z: [M+H]⁺=283.25.

Example 2. Preparation of (3-amino-N-methylbicyclo[1.1.1]pentane-1-carboxamide

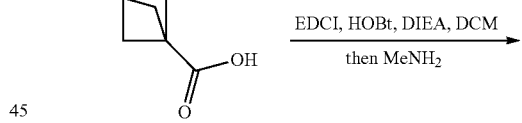

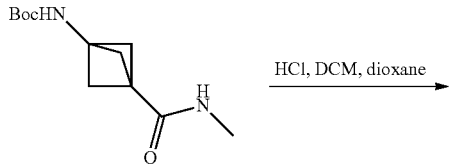

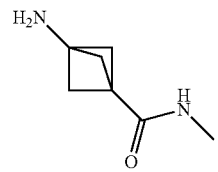

Step 1: Preparation of tert-butyl N-[3-(methylcarbamoyl)bicyclo[1.1.1]pentan-1-yl]carbamate

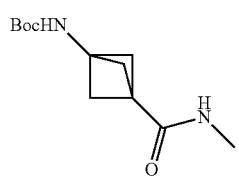 [SMILES: CNC(=O)C12CC(NC(=O)OC(C)(C)C)(C1)C2]

To a stirred mixture of 3-[(tert-butoxycarbonyl)amino]bicyclo[1.1.1]pentane-1-carboxylic acid (1.40 g, 6.16 mmol) and HOBT (1.00 g, 7.39 mmol) and EDC·HCl (1.42 g, 7.39 mmol) in DCM (60.0 mL) were added DIEA (3.98 g, 30.8 mmol) at room temperature under a nitrogen atmosphere. After stirring for 0.5 h at room temperature, methylamine (2 M in THF, 15.4 mL, 30.8 mmol) was added to the reaction mixture. After stirring for 16 h at room temperature, the resulting mixture was diluted with EtOAc and quenched with ice water at 0° C. The resulting mixture was extracted three times with EtOAc. The combined organic layers were washed twice with brine and dried over anhydrous $Na_2SO_4$. After filtration, the filtrate was concentrated under reduced pressure. The residue was purified by reverse phase C18 flash chromatography to afford tert-butyl N-[3-(methylcarbamoyl)bicyclo[1.1.1]pentan-1-yl]carbamate (800 mg, 54.0%) as a white solid. LCMS (ESI) m/z $[M+H]^+=241$.

Step 2: Preparation of (3-amino-N-methylbicyclo[1.1.1]pentane-1-carboxamide hydrochloride

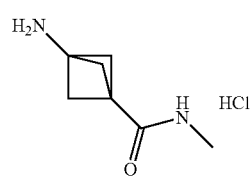

A solution of tert-butyl N-[3-(methylcarbamoyl)bicyclo[1.1.1]pentan-1-yl]carbamate (900 mg, 3.75 mmol) in HCl in 1,4-dioxane (20.00 mL) and DCM (20.00 mL) was stirred for 3 h at room temperature. The resulting mixture was filtered, the filter cake was washed twice with DCM. The filter cake was dried under reduced pressure. (3-Amino-N-methylbicyclo[1.1.1]pentane-1-carboxamide hydrochloride (750 mg, crude) was used in the next step directly without further purification. LCMS (ESI) m/z $[M+H]^+=141$.

Example 3. Preparation of Intermediates

The following compounds in Table A1 were prepared according to the procedure in Example 1 using the common starting material, 4-bromo-6-chloropyridazin-3-amine, and the appropriate amine.

TABLE A1

| Compound | Name | LCMS (ESI) m/z: [M + H]+ | $^1$H NMR |
|---|---|---|---|
| | 3-([[3-amino-6-(2-hydroxyphenyl)pyridazin-4-yl]amino]methyl)bicyclo[1.1.1]pentane-1-carbonitrile | 308 | $^1$H NMR (400 MHz, DMSO-$d_6$) δ 7.88 (dd, J = 8.0, 1.7 Hz, 1H), 7.28-7.09 (m, 1H), 7.01 (s, 1H), 6.95-6.78 (m, 2H), 6.31 (s, 2H), 6.23 (t, J = 6.2 Hz, 1H), 3.47 (d, J = 5.7 Hz, 2H), 2.25 (s, 6H) |
| | 3-([3-amino-6-(2-hydroxyphenyl)pyridazin-4-yl]amino)-N-methylbicyclo[1.1.1]pentane-1-carboxamide | 326.25 | $^1$H NMR (400 MHz, DMSO-$d_6$) δ 7.87 (q, J = 4.8 Hz, 1H), 7.77 (dd, J = 8.0, 1.2 Hz, 1H), 7.23 (ddd, J = 8.4, 7.2, 1.6 Hz, 1H), 7.06 (s, 1H), 6.99 (s, 1H), 6.91-6.85 (m, 2H), 6.31 (s, 2H), 2.61 (d, J = 4.8 Hz, 3H), 2.38 (s, 6H) |
| | tert-butyl (3-((3-amino-6-(2-hydroxyphenyl)pyridazin-4-yl)amino)bicyclo[1.1.1]pentan-1-yl)carbamate | 384 | |

TABLE A1-continued

Intermediates

| Compound | Name | LCMS (ESI) m/z: [M + H]+ | $^1$H NMR |
|---|---|---|---|
| 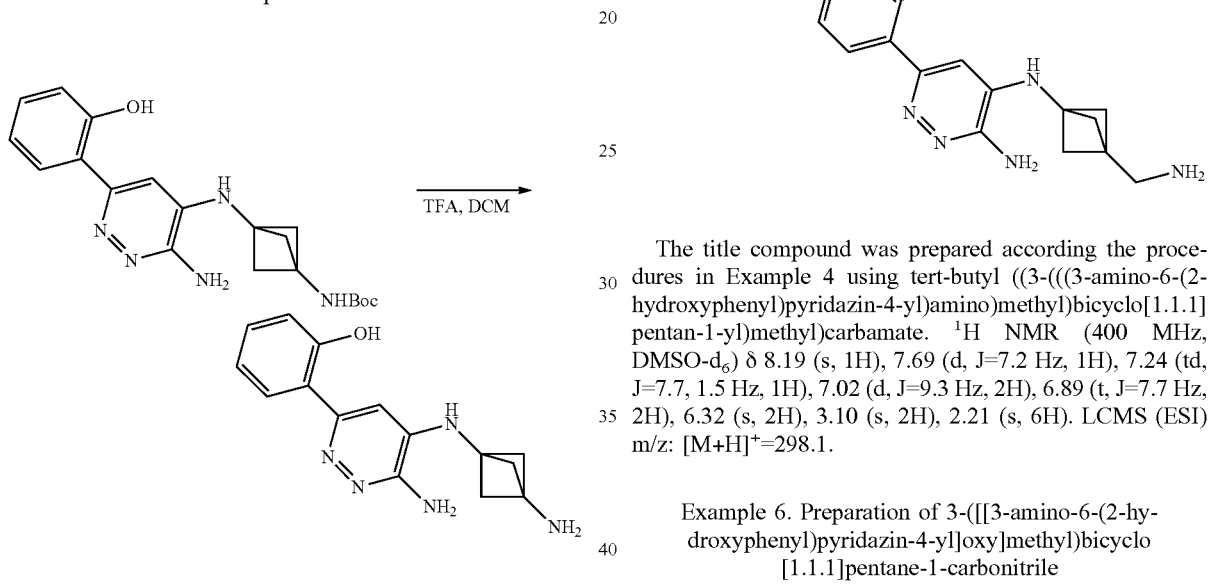 | tert-butyl ((3-(((3-amino-6-(2-hydroxyphenyl)pyridazin-4-yl)amino)methyl)bicyclo[1.1.1]pentan-1-yl)methyl)carbamate | 398 | |

Example 4. Preparation of 2-(6-amino-5-((3-amino-bicyclo[1.1.1]pentan-1-yl)amino)pyridazin-3-yl)phenol Into a 8-mL sealed tube, was placed Intermediate C (40.0 mg, 0.104 mmol), DCM (2.00 mL), and TEA (1.00 mL). The resulting solution was stirred for 1 h at room temperature. The solids were removed via filtration and filtrate was concentrated. The crude product was purified by Prep-HPLC (Water, ACN, $NH_4HCO_3$) to afford the title compound (9.3 mg, 31%) as an off-white solid. $^1$H NMR (400 MHz, DMSO-$d_6$) 14.86 (s, 1H), δ 7.69 (dd, J=8.0, 1.6 Hz, 1H), 7.22 (ddd, J=8.4, 7.2, 1.6 Hz, 1H), 7.00 (s, 1H), 6.95-6.81 (m, 3H), 6.30 (s, 2H), 2.15 (s, 6H). LCMS (ESI) m/z: [M+H]$^+$=284.15.

Example 5. Preparation of 2-(6-amino-5-[[3-(aminomethyl)bicyclo[1.1.1]pentan-1-yl]amino]pyridazin-3-yl)phenol The title compound was prepared according the procedures in Example 4 using tert-butyl ((3-(((3-amino-6-(2-hydroxyphenyl)pyridazin-4-yl)amino)methyl)bicyclo[1.1.1]pentan-1-yl)methyl)carbamate. $^1$H NMR (400 MHz, DMSO-$d_6$) δ 8.19 (s, 1H), 7.69 (d, J=7.2 Hz, 1H), 7.24 (td, J=7.7, 1.5 Hz, 1H), 7.02 (d, J=9.3 Hz, 2H), 6.89 (t, J=7.7 Hz, 2H), 6.32 (s, 2H), 3.10 (s, 2H), 2.21 (s, 6H). LCMS (ESI) m/z: [M+H]$^+$=298.1.

Example 6. Preparation of 3-([[3-amino-6-(2-hydroxyphenyl)pyridazin-4-yl]oxy]methyl)bicyclo[1.1.1]pentane-1-carbonitrile

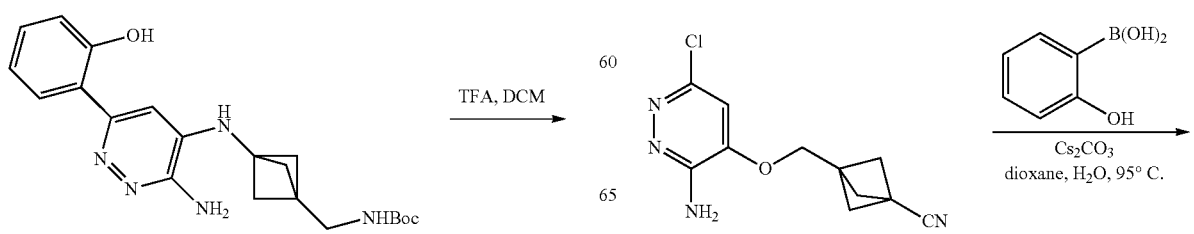

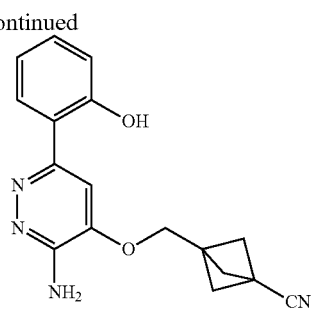

Step 1: Preparation of 3-[[(3-amino-6-chloro-pyridazin-4-yl)oxy]methyl]bicyclo[1.1.1]pentane-1-carbonitrile

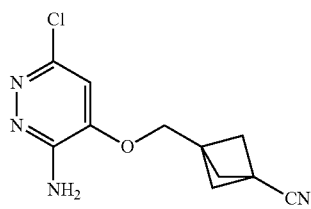 [SMILES: N#CC12CC(COc3cc(Cl)nnc3N)(C1)C2]

To a stirred mixture of 3-(hydroxymethyl)bicyclo[1.1.1]pentane-1-carbonitrile (2.00 g, 16.2 mmol) and 4-bromo-6-chloropyridazin-3-amine (6.77 g, 0.032 mmol) in DMF (20.0 mL) was added NaH (1.17 g, 0.049 mmol) at room temperature. The resulting mixture was stirred for overnight at 60° C. The residue was purified by C18 reverse flash chromatography to afford 3-[[(3-amino-6-chloropyridazin-4-yl)oxy]methyl]bicyclo[1.1.1]pentane-1-carbonitrile (2.3 g, 53.7%) as a brown yellow solid. LCMS (ESI) m/z: [M+H]⁺=251.1

Step 2: Preparation of 3-([[3-amino-6-(2-hydroxyphenyl)pyridazin-4-yl]oxy]methyl)bicyclo[1.1.1]pentane-1-carbonitrile

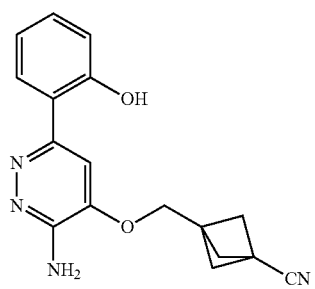 [SMILES: N#CC12CC(COc3cc(-c4ccccc4O)nnc3N)(C1)C2]

To a stirred mixture of 3-[[(3-amino-6-chloropyridazin-4-yl)oxy]methyl]bicyclo[1.1.1]pentane-1-carbonitrile (30.0 mg, 0.120 mmol) and 2-hydroxyphenylboronic acid (33.0 mg, 0.239 mmol) in dioxane (3.00 mL) and H₂O (0.50 ml) were added Xphos Pd G3 (10.1 mg, 0.012 mmol) and Cs₂CO₃ (117 mg, 0.359 mmol) at room temperature. The resulting mixture was stirred for overnight at 100° C. The crude product was purified by Prep-HPLC (Water:ACN:FA) to afford the title compound (14 mg, 37.1%) as a white solid.

¹H NMR (300 MHz, DMSO-d₆) δ 14.34 (s, 1H), 7.93 (dd, J=8.4, 1.6 Hz, 1H), 7.56 (s, 1H), 7.25 (td, J=7.6, 1.5 Hz, 1H), 6.95-6.83 (m, 2H), 6.62 (s, 2H), 4.29 (s, 2H), 2.39 (s, 6H). LCMS (ESI) m/z: [M+H]⁺=309.15

Example 7: Preparation of N-[3-(2-hydroxyethyl)bicyclo[1.1.1]pentan-1-yl]acetamide

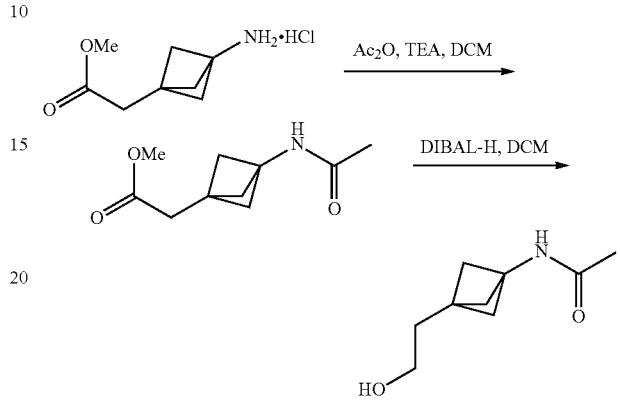

Step 1: Preparation of methyl 2-[3-acetamidobicyclo[1.1.1]pentan-1-yl]acetate

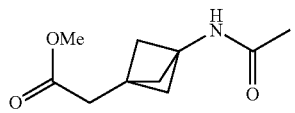

To a stirred solution of methyl 2-[3-aminobicyclo[1.1.1]pentan-1-yl]acetate hydrochloride (100 mg, 0.522 mmol) in DCM (10.0 mL) were added Ac₂O (63.9 mg, 0.626 mmol) and TEA (158 mg, 1.57 mmol) at room temperature. The resulting mixture was stirred for 1 h at room temperature. Then the reaction was quenched with water at room temperature. The resulting mixture was extracted three times with CH₂Cl₂. The combined organic layers were washed with brine and dried over anhydrous Na₂SO₄. After filtration, the filtrate was concentrated under reduced pressure to afford methyl 2-[3-acetamidobicyclo[1.1.1]pentan-1-yl]acetate (130 mg, crude) as an off-white solid. LCMS (ESI) m/z: [M+H]⁺=198.

Step 2: Preparation of N-[3-(2-hydroxyethyl)bicyclo[1.1.1]pentan-1-yl]acetamide

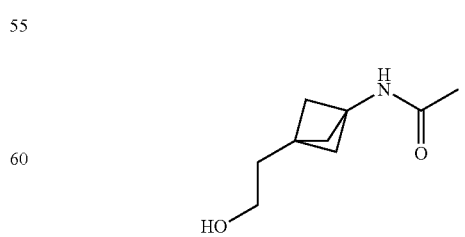

To a stirred solution of 2-[3-acetamidobicyclo[1.1.1]pentan-1-yl]acetate (110 mg, 0.558 mmol) in DCM (10.0 mL) was added DIBAL-H (1 M, 2.8 mL, 2.8 mmol) at room temperature. The resulting mixture was stirred for 2 h at room temperature and then quenched with water. The resulting mixture was extracted three times with EtOAc. The combined organic layers were washed with brine and dried over anhydrous $Na_2SO_4$. After filtration, the filtrate was concentrated under reduced pressure to afford N-[3-(2-hydroxyethyl)bicyclo[1.1.1]pentan-1-yl]acetamide (88 mg, crude) as a colorless oil. LCMS (ESI) m/z: $[M+H]^+=170$.

Example 8. Preparation of Intermediates

The following compounds in Table A2 were prepared according to the procedure in Example 6 using the common starting material, 4-bromo-6-chloropyridazin-3-amine, and the appropriate alcohol.

TABLE A2

Intermediates

| Compound | Name | LCMS (ESI) m/z: [M + H]+ | $^1$H NMR |
|---|---|---|---|
| | N-[3-(2-[[3-amino-6-(2-hydroxyphenyl)pyridazin-4-yl]oxy]ethyl)bicyclo[1.1.1]pentan-1-yl]acetamide | 355.25 | $^1$H NMR (300 MHz, DMSO-d$_6$) δ 14.35 (s, 1H), 8.32 (s, 1H), 8.14 (s, 0.3H, FA), 8.02-7.93 (m, 1H), 7.61 (s, 1H), 7.32-7.20 (m, 1H), 6.97-6.86 (m, 2H), 6.46 (s, 2H), 4.26 (t, J = 6.5 Hz, 2H), 2.06 (t, J = 6.4 Hz, 2H), 1.92 (s, 6H), 1.74 (s, 3H) |
| | tert-butyl (3-(2-((3-amino-6-(2-hydroxyphenyl)pyridazin-4-yl)oxy)ethyl)bicyclo[1.1.1]pentan-1-yl)carbamate | 413 | |

Example 9. Preparation of 2-(6-amino-5-[[3-(aminomethyl)bicyclo[1.1.1]pentan-1-yl]methoxy]pyridazin-3-yl)phenol

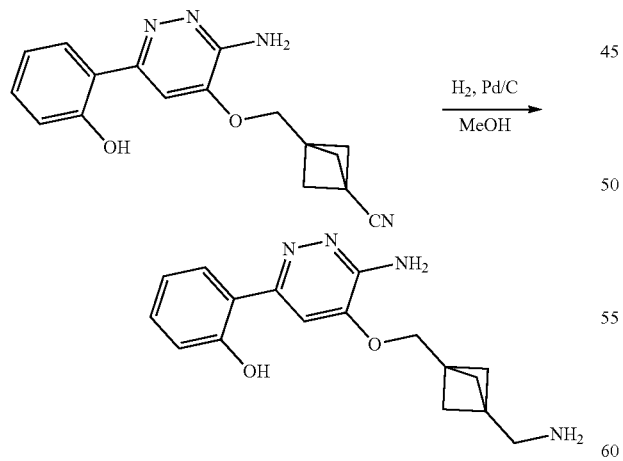

To a solution of 2-(6-amino-5-[[3-(cyano)bicyclo[1.1.1]pentan-1-yl]methoxy]pyridazin-3-yl)phenol (120 mg, 0.389 mmol) in MeOH (10 mL) was added Pd/C (10%, 100 mg) in a pressure tank. The mixture was hydrogenated at room temperature under 30 psi of hydrogen pressure for overnight. The reaction mixture was filtered through a short pad of Celite and concentrated under reduced pressure. The residue was purified by reverse phase C18 flash chromatography with the following conditions (MeOH:water) to afford 2-(6-amino-5-[[3-(aminomethyl)bicyclo[1.1.1]pentan-1-yl]methoxy]pyridazin-3-yl)phenol (29 mg, 23.9%) as an off-white solid. LCMS (ESI) m/z [M+H]+=313.

Example 10. Preparation of N-(3-((3-amino-6-(2-hydroxyphenyl)pyridazin-4-yl)amino)bicyclo [1.1.1] pentan-1-yl)acetamide

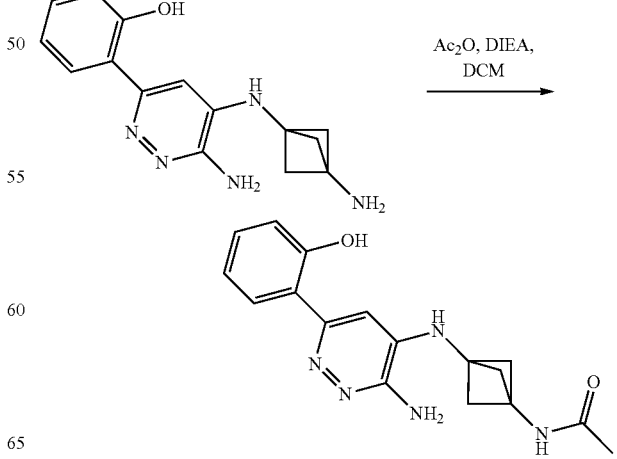

Into a 25-mL round-bottom flask, was placed 2-(6-amino-5-[[3-(aminomethyl)bicyclo[1.1.1]pentan-1-yl]methoxy]pyridazin-3-yl)phenol (40.0 mg, 0.141 mmol), DCM (2.00 mL), DIEA (36.5 mg, 0.282 mmol), Ac$_2$O (14.4 mg, 0.141 mmol). The resulting solution was stirred for 2 h at 0° C. in a water/ice bath. The resulting mixture was concentrated under vacuum. The residue was dissolved in 2 mL of DMF. The solids were filtered out. The crude product was purified by Prep-HPLC (Water:ACN:NH$_4$HCO$_3$) to afford the title compound (5.2 mg, 11.3%) as an off-white solid. $^1$H NMR (400 MHz, DMSO-d$_6$) δ 14.77 (s, 1H), 8.57 (s, 1H), 7.72 (dd, J=8.1, 1.6 Hz, 1H), 7.22 (ddd, J=8.5, 7.2, 1.6 Hz, 1H), 6.99 (d, J=13.9 Hz, 2H), 6.92-6.80 (m, 2H), 6.31 (s, 2H), 2.42 (s, 6H), 1.81 (s, 3H). LCMS (ESI) m/z: [M+H]$^+$=325.9.

Example 11. Preparation of Intermediates

The following compounds in Table A3 were synthesized following the synthetic procedure described in Example 10 using the appropriate amine.

TABLE A3

Intermediates

| Compound | Compound Name | LCMS (ESI) m/z: [M + H]+ | $^1$H NMR |
|---|---|---|---|
|  | N-[(3-[[3-amino-6-(2-hydroxyphenyl)pyridazin-4-yl]amino]bicyclo[1.1.1]pentan-1-yl)methyl]acetamide | 340.10 | $^1$H NMR (400 MHz, DMSO-d$_6$) δ 14.87 (br s, 1H), 7.87 (t, J = 5.7 Hz, 1H), 7.71 (d, J = 8.3 Hz, 1H), 7.23 (t, J = 8.0 Hz, 1H), 7.04 (s, 1H), 6.94-6.82 (m, 3H), 6.31 (s, 2H), 2.55-2.52 (m, 2H), 2.08 (s, 6H), 1.85 (s, 3H). |
|  | N-[[3-([[3-amino-6-(2-hydroxyphenyl)pyridazin-4-yl]oxy]methyl)bicyclo[1.1.1]pentan-1-yl]methyl]acetamide | 355.15 | $^1$H NMR (300 MHz, DMSO-d$_6$) δ 14.37 (s, 1H), 7.93 (dd, J = 8.3, 1.6 Hz, 1H), 7.76 (s, 1H), 7.57 (s, 1H), 7.24 (m, 1H), 6.93-6.81 (m, 2H), 6.49 (s, 2H), 4.30 (s, 2H), 3.15 (d, J = 5.8 Hz, 2H), 1.80 (s, 3H), 1.70 (s, 6H) |

Example 12. Preparation of 3-([[3-amino-6-(2-hydroxyphenyl)pyridazin-4-yl]amino]methyl)bicyclo[1.1.1]pentane-1-carboxylic acid

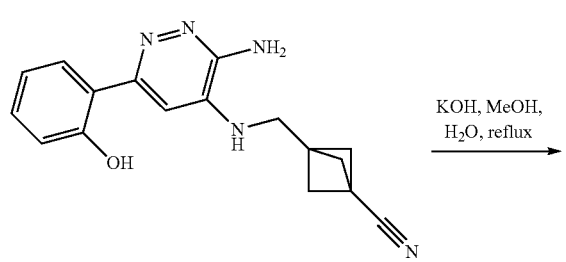

KOH, MeOH, H$_2$O, reflux

-continued

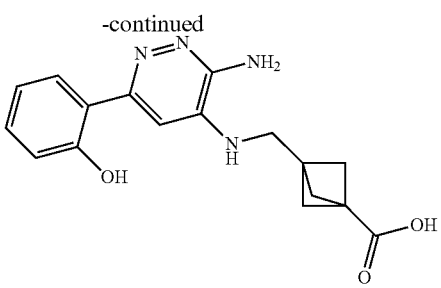

To a solution of 3-([[3-amino-6-(2-hydroxyphenyl)pyridazin-4-yl]amino]methyl)bicyclo[1.1.1]penta ne-1-carbonitrile (10.0 mg, 0.033 mmol) in H$_2$O (0.20 mL) and MeOH (1.80 mL) was added KOH (110 mg, 1.95 mmol). The resulting solution was stirred for 8 h at 80° C. The crude reaction solution was directly purified by Prep-HPLC (Water:MeCN:FA) to give the title compound (10.3 mg, 31.7%) as a white solid. $^1$H NMR (400 MHz, DMSO-d$_6$) δ 7.87 (dd, J=8.0, 1.6 Hz, 1H), 7.37-7.12 (m, 1H), 7.02 (s, 1H), 6.95-6.71 (m, 2H), 6.33 (s, 2H), 6.16 (s, 1H), 3.45 (d, J=5.5 Hz, 2H), 1.96 (s, 6H). LCMS (ESI) m/z: [M+H]$^+$=327.00.

Example 13. Preparation of 3-([[3-amino-6-(2-hydroxyphenyl)pyridazin-4-yl]oxy]methyl)bicyclo[1.1.1]pentane-1-carboxylic acid

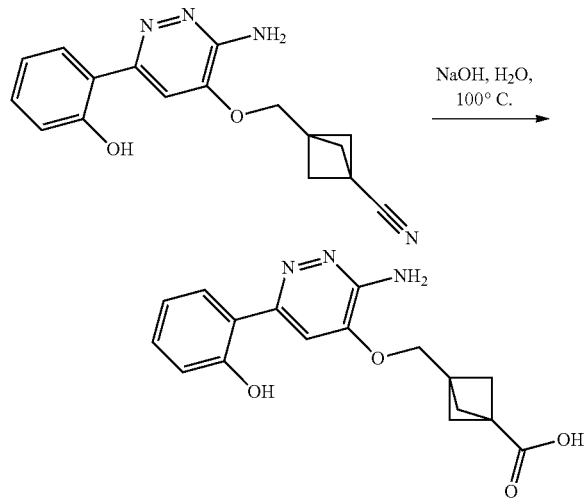

FHT-0015071-001 was prepared according the procedures in Example 12 using 3-([[3-amino-6-(2-hydroxyphenyl)pyridazin-4-yl]oxy]methyl)bicyclo[1.1.1]pentane-1-carbonitrile and sodium hydroxide. $^1$H NMR (300 MHz, DMSO-d$_6$) δ 7.95 (dd, J=8.3, 1.6 Hz, 1H), 7.58 (s, 1H), 7.25 (td, J=7.6, 7.0, 1.5 Hz, 1H), 6.95-6.84 (m, 2H), 6.58 (s, 2H), 4.31 (s, 2H), 2.08 (s, 6H). LCMS (ESI) m/z: [M+H]$^+$=328.15.

Example 14. Preparation of 3-([[3-amino-6-(2-hydroxyphenyl)pyridazin-4-yl]amino]methyl) bicycle[1.1.1]pentane-1-carboxamide

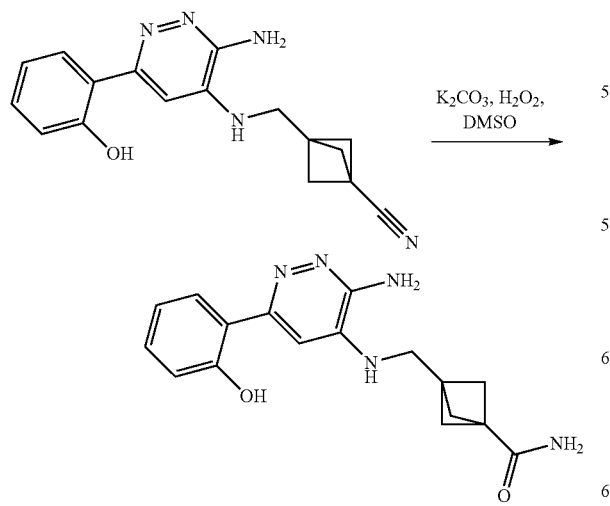

To a solution of 3-([[3-amino-6-(2-hydroxyphenyl)pyridazin-4-yl]amino]methyl)bicyclo[1.1.1]pentane-1-carbonitrile (40.0 mg, 0.130 mmol) and K$_2$CO$_3$ (36.0 mg, 0.260 mmol) in DMSO (2.00 mL) was added H$_2$O$_2$ (30% in H$_2$O, 44.3 mg, 1.30 mmol). The resulting solution was stirred at 25° C. for 15 hours. The crude reaction mixture was purified directly by Prep-HPLC (Water:ACN:NH$_4$HCO$_3$) to give the title compound (11.2 mg, 26.3%) as a white solid. $^1$H NMR (400 MHz, DMSO-d$_6$) δ 15.12 (s, 1H), 7.87 (dd, J=8.0, 1.6 Hz, 1H), 7.37-7.12 (m, 2H), 7.02 (s, 1H), 6.92-6.58 (m, 3H), 6.32 (s, 2H), 6.22 (t, J=5.6 Hz, 1H), 3.46 (d, J=5.6 Hz, 2H), 1.88 (s, 6H). LCMS (ESI) m/z: [M+H]$^+$=326.05.

Example 15. Preparation of 3-[2-[3-amino-6-(2-hydroxyphenyl)pyridazin-4yl]ethynyl]bicyclo[1.1.1]pentane-1-carboxylic acid

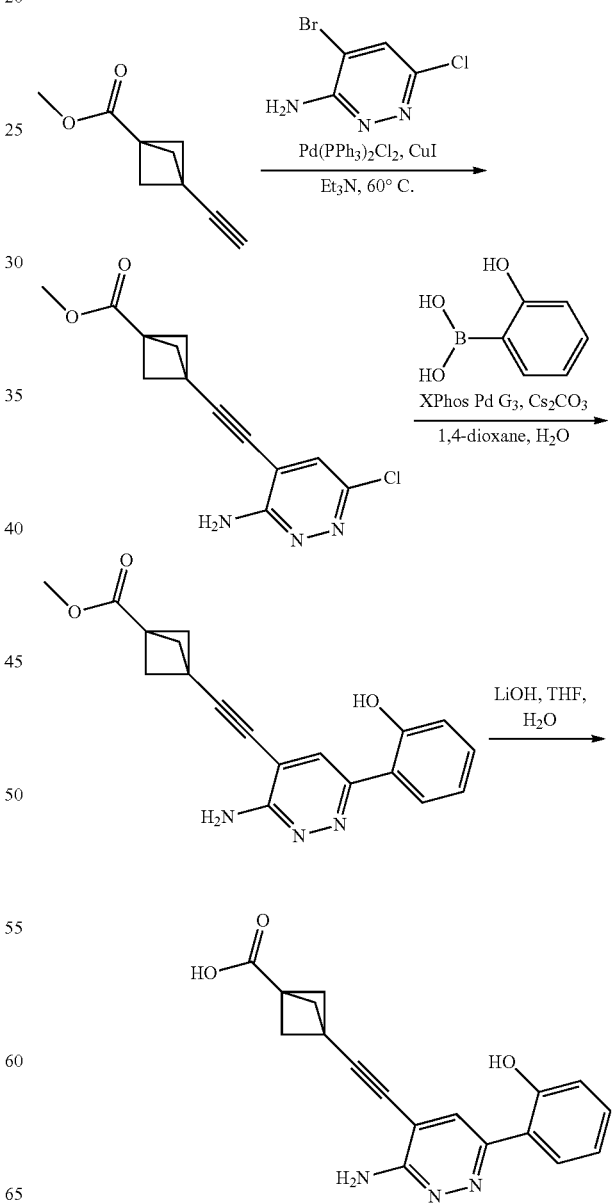

117

Step 1: Preparation of methyl 3-[2-(3-amino-6-chloropyridazin-4-yl)ethynyl]bicyclo[1.1.1]pentane-1-carboxylate

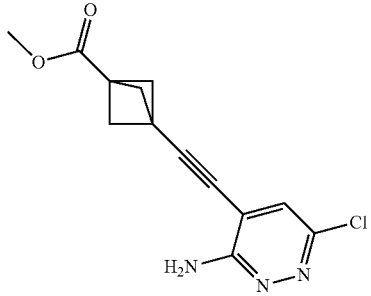 [SMILES: COC(=O)C12CC(C#Cc3cc(Cl)nnc3N)(C1)C2]

To a stirred mixture of methyl 3-ethynylbicyclo[1.1.1]pentane-1-carboxylate (450 mg, 3.00 mmol) and 4-bromo-6-chloropyridazin-3-amine (899 mg, 4.32 mmol) in THF were added Pd(PPh$_3$)$_4$ (693 mg, 0.599 mmol) and Et$_3$N (5.00 mL) dropwise/in portions at 80° C. and stirred overnight at 80° C. The resulting mixture was concentrated under reduced pressure. The crude product was purified by Prep-HPLC (Water:ACN:FA) to afford methyl 3-[2-(3-amino-6-chloropyridazin-4-yl)ethynyl]bicyclo[1.1.1]pentane-1-carboxylate (120 mg, 14.4%) as a white solid. LCMS (ESI) m/z: [M+H]$^+$=278.

Step 2: Preparation of methyl 3-[2-[3-amino-6-(2-hydroxyphenyl)pyridazin-4-yl]ethynyl]bicyclo[1.1.1]pentane-1-carboxylate

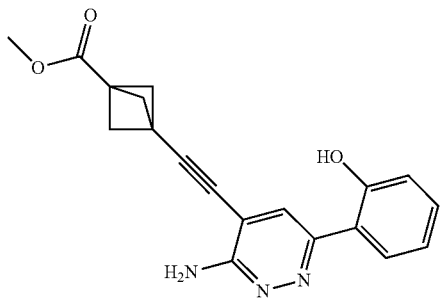 [SMILES: COC(=O)C12CC(C#Cc3cc(-c4ccccc4O)nnc3N)(C1)C2]

To a stirred mixture of methyl 3-[2-(3-amino-6-chloropyridazin-4-yl)ethynyl]bicyclo[1.1.1]pentane-1-carboxylate (120 mg, 0.432 mmol) and 2-hydroxyphenylboronic acid (179 mg, 1.30 mmol) in dioxane (4.00 mL) and H$_2$O (1.00 mL) were added Cs$_2$CO$_3$ (422 mg, 1.30 mmol) and XPhos Pd G3 (73.2 mg, 0.086 mmol) in portions at room temperature under a nitrogen atmosphere. The resulting mixture was stirred for 2 h at 80° C. under nitrogen atmosphere. The resulting mixture was concentrated under reduced pressure. The crude product (mg) was purified by Prep-HPLC (Water:ACN:FA) to afford methyl 3-[2-[3-amino-6-(2-hydroxyphenyl)pyridazin-4-yl]ethynyl]bicyclo[1.1.1]pentane-1-carboxylate (50 mg, 34.5%) as a white solid. LCMS (ESI) m/z: [M+H]$^+$=336.

118

Step 3: Preparation of 3-[2-[3-amino-6-(2-hydroxyphenyl)pyridazin-4-yl]ethynyl]bicyclo[1.1.1]pentane-1-carboxylic acid

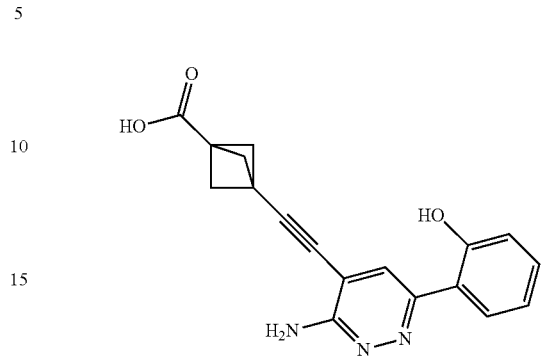

To a stirred solution of methyl 3-[2-[3-amino-6-(2-hydroxyphenyl)pyridazin-4-yl]ethynyl]bicyclo[1.1.1]pentane-1-carboxylate (5.00 mg, 0.015 mmol) in THF were added LiOH (1.07 mg, 0.045 mmol) and H$_2$O (0.20 mg) in portions at room temperature under a nitrogen atmosphere. The resulting mixture was stirred for 1 h at room temperature under a nitrogen atmosphere. The resulting mixture was concentrated under reduced pressure. The crude product was purified by Prep-HPLC (Water:ACN:FA) to afford the title compound (8.5 mg, 29.6%) as a yellow solid. $^1$H NMR (400 MHz, DMSO-d$_6$) δ 13.20 (s, 1H), 12.40 (s, 1H), 8.22 (s, 1H), 7.88 (dd, J=8.0, 1.6 Hz, 1H), 7.24 (ddd, J=8.4, 7.2, 1.6 Hz, 1H), 6.95-6.84 (m, 4H), 2.38 (s, 6H). LCMS (ESI) m/z: [M+H]$^+$=322.20.

Example 16. Preparation of 3-(2-(3-amino-6-(2-hydroxyphenyl)pyridazin-4-yl)ethyl)bicyclo[1.1.1]pentane-1-carboxylic acid

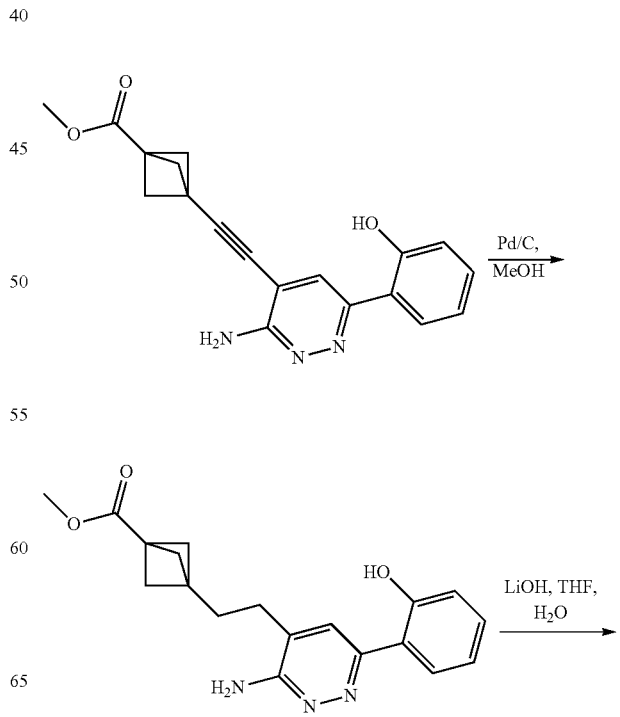

-continued

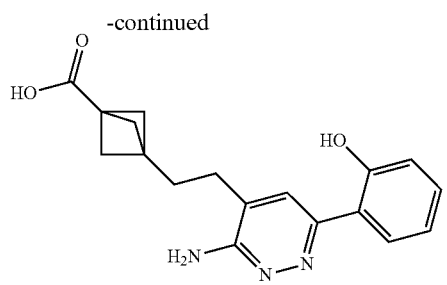

Step 1: Preparation of methyl 3-(2-(3-amino-6-(2-hydroxyphenyl)pyridazin-4-yl)ethyl)bicyclo[1.1.1]pentane-1-carboxylate

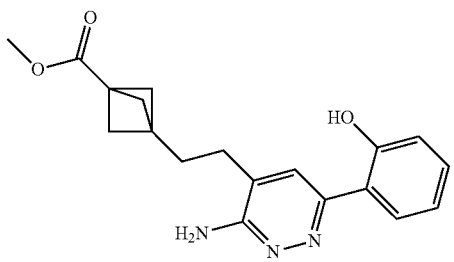 [SMILES: COC(=O)C12CC(CCc3cc(-c4ccccc4O)nnc3N)(C1)C2]

To a solution of methyl 3-[2-[3-amino-6-(2-hydroxyphenyl)pyridazin-4-yl]ethynyl]bicyclo[1.1.1]pentane-1-carboxylate (200 mg, 0.596 mmol) in 10 MeOH (10 mL) was added Pd/C (10%, 200 mg) under nitrogen atmosphere in a 50 mL round-bottom flask. The mixture was hydrogenated at room temperature for 2 h under a balloon of hydrogen. The mixture was filtered through a Celite pad and concentrated under reduced pressure to afford in methyl 3-(2-(3-amino-6-(2-hydroxyphenyl)pyridazin-4-yl)ethyl)bicyclo[1.1.1]pentane-1-carboxylate (150 mg, 74.1%) as a light yellow solid. LCMS (ESI) m/z: [M+H]$^+$=340.

Step 2: Preparation of 3-(2-(3-amino-6-(2-hydroxyphenyl)pyridazin-4-yl)ethyl)bicyclo[1.1.1]pentane-1-carboxylic acid

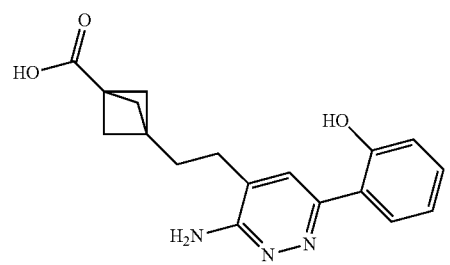 [SMILES: Nc1nnc(-c2ccccc2O)cc1CCC12CC(C(=O)O)(C1)C2]

To a stirred solution of methyl 3-(2-(3-amino-6-(2-hydroxyphenyl)pyridazin-4-yl)ethyl)bicyclo[1.1.1]pentane-1-carboxylate (200 mg, 0.589 mmol) in THF (10.0 mL) was added lithium hydroxide monohydrate (247 mg, 5.89 mmol) in H$_2$O (2.00 mL) at room temperature. The resulting mixture was stirred for 2 h at room temperature. The crude product was purified by Prep-HPLC with the following conditions (Water:ACN:FA) to afford the title compound (4.8 mg, 2.50%) as an off-white solid. $^1$H NMR (400 MHz, DMSO-d$_6$) δ 7.94 (s, 1H), 7.89 (dd, J=8.3, 1.7 Hz, 1H), 7.30-7.21 (m, 1H), 6.96-6.88 (m, 2H), 2.57-2.46 (m, 2H), 1.95-1.77 (m, 8H). LCMS (ESI) m/z: [M+H]$^+$=326.15.

Example 17. Preparation of 3-((3-amino-6-(2-hydroxyphenyl)pyridazin-4-yl)amino)bicyclo[1.1.1]pentane-1-carboxylic acid

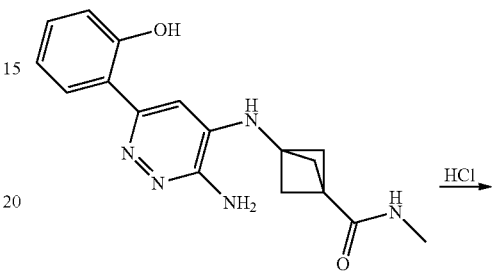

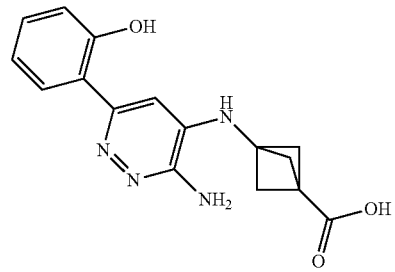

To a stirred solution of 3-([3-amino-6-(2-hydroxyphenyl)pyridazin-4-yl]amino)-N-methylbicyclo[1.1.1]pentane-1-carboxamide (195 mg, 0.599 mmol) in aqueous HCl (12 N, 10.0 mL). The resulting mixture was stirred for 2 h at 90° C. The resulting mixture was concentrated under reduced pressure. The residue was purified by reverse phase C18 flash chromatography (Water:ACN:FA) to afford the title compound (90 mg, 48.1%) as an off-white solid. $^1$H NMR (300 MHz, DMSO-d$_6$) δ 13.87 (s, 1H), 7.82 (d, J=7.8 Hz, 1H), 7.23-7.20 (m, 1H), 7.07 (s, 1H), 7.01 (s, 1H), 6.95-6.82 (m, 2H), 6.32 (s, 2H), 2.44 (s, 6H). LCMS (ESI) m/z: [M+H]$^+$=313.10.

Example 18. Preparation of 3-((3-amino-6-(2-hydroxyphenyl)pyridazin-4-yl)ethynyl)bicyclo[1.1.1]pentane-1-carboxamide

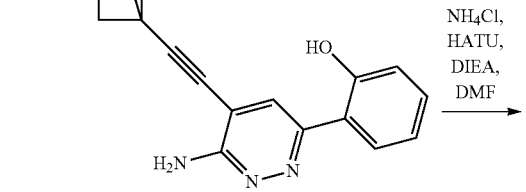

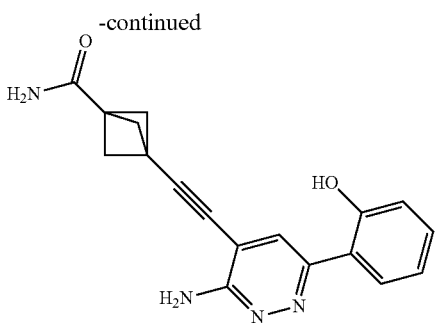

To a stirred solution of 3-[2-[3-amino-6-(2-hydroxyphenyl)pyridazin-4-yl]ethynyl]bicyclo[1.1.1]pentane-1-carboxylic acid (28.0 mg, 0.087 mmol) and NH₄Cl (14.0 mg, 0.261 mmol) in DMF (2.00 mL) were added HATU (66.3 mg, 0.174 mmol) and DIEA (56.3 mg, 0.436 mmol) at room temperature. The resulting mixture was stirred for 2 h at room temperature. The residue was purified by reverse phase C18 flash chromatography (Water:ACN:FA) to afford the title compound (3.5 mg, 12.5%) as an off-white solid. $^1$H NMR (300 MHz, DMSO-$d_6$) δ 13.24 (s, 1H), 8.23 (s, 1H), 7.89 (dd, J=8.0, 1.6 Hz, 1H), 7.38 (s, 1H), 7.31-7.19 (m, 1H), 7.04 (s, 1H), 6.96-6.82 (m, 4H), 2.32 (s, 6H). LCMS (ESI) m/z: [M+H]⁺=321.10.

Example 19. Preparation of Intermediates

The following compounds in Table A4 were synthesized following the synthetic procedure described in Example 18 using the appropriate carboxylic acid.

TABLE A4

| Compound | Compound Name | LCMS (ESI) m/z: [M + H]+ | $^1$H NMR |
|---|---|---|---|
|  | 3-[2-[3-amino-6-(2-hydroxyphenyl)pyridazin-4-yl]ethyl]bicyclo[1.1.1]pentane-1-carboxamide | 325.15 | $^1$H NMR (300 MHz, DMSO-$d_6$) δ 8.04 (s, 1H), 7.78-7.69 (m, 1H), 7.57-7.46 (m, 2H), 7.36-7.25 (m, 1H), 7.17 (s, 1H), 7.03-6.89 (m, 2H), 6.87 (s, 1H), 2.56 (t, J = 7.7 Hz, 2H), 1.90-1.74 (m, 8H) |
|  | 3-([[3-amino-6-(2-hydroxyphenyl)pyridazin-4-yl]oxy]methyl)bicyclo[1.1.1]pentane-1-carboxamide | 328.05 | $^1$H NMR (300 MHz, DMSO-$d_6$) δ 14.35 (s, 1H), 7.95 (dd, J = 8.3, 1.6 Hz, 1H), 7.59 (s, 1H), 7.31-7.14 (m, 2H), 7.00-6.82 (m, 3H), 6.56 (s, 2H), 4.33 (s, 2H), 2.00 (s, 6H) |
|  | 3-[[3-amino-6-(2-hydroxyphenyl)pyridazin-4-yl]amino]bicyclo[1.1.1]pentane-1-carboxamide | 312.10 | $^1$H NMR (300 MHz, DMSO-$d_6$) δ 14.83 (s, 1H), 7.78 (dd, J = 8.1, 1.5 Hz, 1H), 7.41 (s, 1H), 7.29-7.18 (m, 1H), 7.08 (s, 2H), 6.99 (s, 1H), 6.96-6.82 (m, 2H), 6.31 (s, 2H), 2.38 (s, 6H). |

Example 20. Preparation of 3-([[3-amino-6-(2-hydroxyphenyl)pyridazin-4-yl]oxy]methyl)-N-methylbicyclo[1.1.1]pentane-1-carboxamide

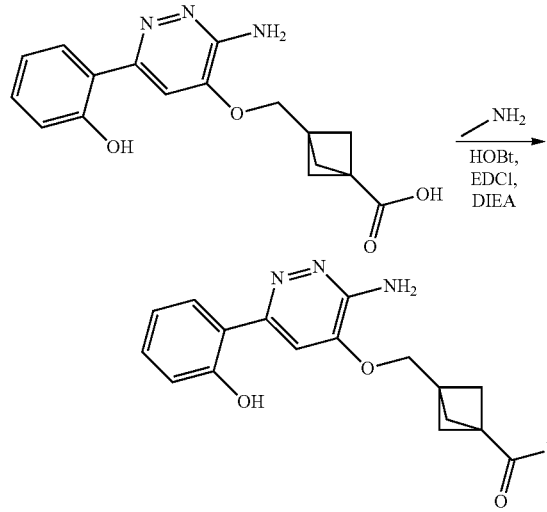

To a stirred mixture of 3-([[3-amino-6-(2-hydroxyphenyl)pyridazin-4-yl]oxy]methyl)bicyclo[1.1.1]pentane-1-carboxylic acid (30.0 mg, 0.092 mmol) and methylamine (5.69 mg, 0.184 mmol) in DMF (1.50 mL) was added EDCI (35.1 mg, 0.184 mmol), HOBT (24.8 mg, 0.184 mmol) and DIEA (35.5 mg, 0.276 mmol) at room temperature. The resulting mixture was stirred for 4 h at room temperature. The crude product was purified by Prep-HPLC (Water:ACN:FA) to afford the title compound (21 mg, 66.7%) as a white solid. $^1$H NMR (300 MHz, DMSO-$d_6$) δ 14.38 (s, 1H), 7.95 (dd, J=8.4, 1.6 Hz, 1H), 7.70 (d, J=4.8 Hz, 1H), 7.59 (s, 1H), 7.25 (td, J=7.6, 7.0, 1.5 Hz, 1H), 6.97-6.82 (m, 2H), 6.56 (s, 2H), 4.33 (s, 2H), 2.56 (d, J=4.6 Hz, 3H), 2.00 (s, 6H). LCMS (ESI) m/z: [M+H]$^+$=341.2

Example 21. Preparation of 3-([[3-amino-6-(2-hydroxyphenyl)pyridazin-4-yl]amino]methyl)-N-methylbicyclo[1.1.1]pentane-1-carboxamide

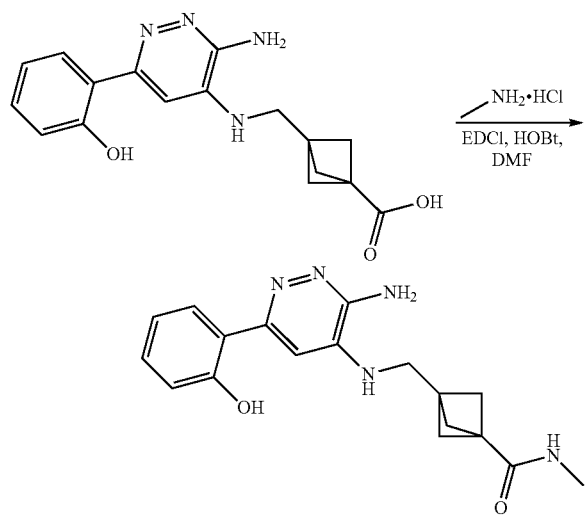

To a stirred solution of 3-([[3-amino-6-(2-hydroxyphenyl)pyridazin-4-yl]amino]methyl)bicyclo[1.1.1]pentane-1-carboxylic acid (44.0 mg, 0.135 mmol), HOBt (36.5 mg, 0.270 mmol) and EDCI (51.7 mg, 0.270 mmol) in DMF (1 mL) were added methylamine, hydrochloride (18.3 mg, 0.270 mmol) and DIEA (87.2 mg, 0.674 mmol). The resulting mixture was stirred for 5 h at 25° C. The crude reaction mixture was purified directly by Prep-HPLC (Water:ACN:NH$_4$HCO$_3$) to afford the title compound (7.5 mg, 15.4%) as a white solid. $^1$H NMR (300 MHz, Methanol-$d_4$) δ 7.74 (dd, J=8.3, 1.6 Hz, 1H), 7.27-7.18 (m, 1H), 7.04 (s, 1H), 6.94-6.83 (m, 2H), 3.52 (s, 2H), 2.68 (s, 3H), 2.01 (s, 6H). LCMS (ESI) m/z: [M+H]$^+$=340.05.

Example 22. Preparation of 3-((3-amino-6-(2-hydroxyphenyl)pyridazin-4-yl)ethynyl)-N-methylbicyclo[1.1.1]pentane-1-carboxamide

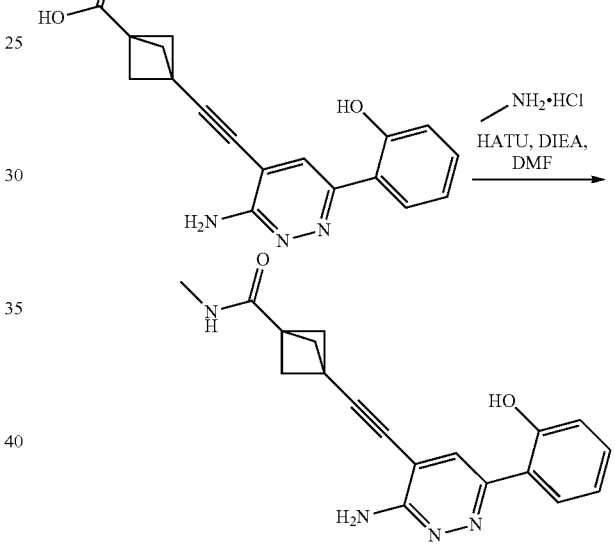

To a stirred solution of 3-[2-[3-amino-6-(2-hydroxyphenyl)pyridazin-4-yl]ethynyl]bicyclo[1.1.1]pentane-1-carboxylic acid (28.0 mg, 0.087 mmol) and methylamine, hydrochloride (11.8 mg, 0.174 mmol) in DMF (2.0 mL) were added HATU (66.3 mg, 0.174 mmol) and DIEA (56.3 mg, 0.436 mmol) at room temperature. The resulting mixture was stirred for 2 h at room temperature. The crude product was purified by Prep-HPLC (Water:ACN:FA) to afford the title compound (7.6 mg, 26.1%) as an off-white solid. $^1$H NMR (400 MHz, DMSO-$d_6$) δ 13.11 (s, 1H), 8.23 (s, 1H), 7.90-7.80 (m, 2H), 7.29-7.21 (m, 1H), 7.01 (s, 2H), 6.95-6.84 (m, 2H), 2.57 (d, J=4.6 Hz, 3H), 2.32 (s, 6H). LCMS (ESI) m/z: [M+H]$^+$=335.25.

Example 23. Preparation of Intermediates

The following compounds in Table A5 were synthesized following the synthetic procedure described in Example 22 using the appropriate carboxylic acid and amine.

TABLE A5

Intermediates

| Compound | Compound Name | LCMS (ESI) m/z: [M + H]+ | ¹H NMR |
|---|---|---|---|
| (structure) | 3-[2-[3-amino-6-(2-hydroxyphenyl)pyridazin-4-yl]ethyl]-N-methylbicyclo[1.1.1]pentane-1-carboxamide | 339.15 | ¹H NMR (300 MHz, DMSO-$d_6$) δ 13.97 (s, 1H), 7.96 (s, 1H), 7.91 (dd, J = 8.4, 1.7 Hz, 1H), 7.61 (d, J = 4.8 Hz, 1H), 7.24 (td, J = 7.6, 1.5 Hz, 1H), 6.95-6.84 (m, 2H), 6.63 (s, 2H), 2.57-2.45 (m, 5H), 1.92-1.83 (m, 2H), 1.80 (s, 6H) |
| (structure) | 3-[[3-amino-6-(2-hydroxyphenyl)pyridazin-4-yl]amino]-N,N-dimethylbicyclo[1.1.1]pentane-1-carboxamide | 340.15 | ¹H NMR (300 MHz, DMSO-$d_6$) δ 14.81 (s, 1H), 7.81 (dd, J = 8.0, 1.6 Hz, 1H), 7.28-7.17 (m, 1H), 7.08 (s, 1H), 6.97 (s, 1H), 6.94-6.81 (m, 2H), 6.32 (s, 2H), 3.12 (s, 3H), 2.85 (s, 3H), 2.52 (s, 6H) |
| (structure) | 3-[2-[3-amino-6-(2-hydroxyphenyl)pyridazin-4-yl]ethynyl]-N,N-dimethylbicyclo[1.1.1]pentane-1-carboxamide | 349.20 | ¹H NMR (400 MHz, DMSO-$d_6$) δ 8.25 (s, 1H), 7.78 (dd, J = 7.9, 1.6 Hz, 1H), 7.40 (s, 2H), 7.33-7.24 (m, 1H), 6.98-6.86 (m, 2H), 3.05 (s, 3H), 2.80 (s, 3H), 2.48 (s, 6H) |
| (structure) | 3-[2-[3-amino-6-(2-hydroxyphenyl)pyridazin-4-yl]ethyl]-N,N-dimethylbicyclo[1.1.1]pentane-1-carboxamide | 353.15 | ¹H NMR (300 MHz, DMSO-$d_6$) δ 13.96 (s, 1H), 7.96 (s, 1H), 7.91 (d, J = 7.2 Hz, 1H), 7.30-7.18 (m, 1H), 6.95-6.84 (m, 2H), 6.63 (s, 2H), 3.04 (s, 3H), 2.78 (s, 3H), 2.51 (t, J = 7.9 Hz, 2H), 1.96 (s, 6H), 1.88 (t, J = 7.9 Hz, 2H) |

Example 24. Preparation of (2S,4R)-1-[(2S)-2-(10-aminodecanamido)-3,3-dimethylbutanoyl]-4-hydroxy-N-[[4-(4-methyl-1,3-thiazol-5-yl)phenyl]methyl]pyrrolidine-2-carboxamide (I-1)
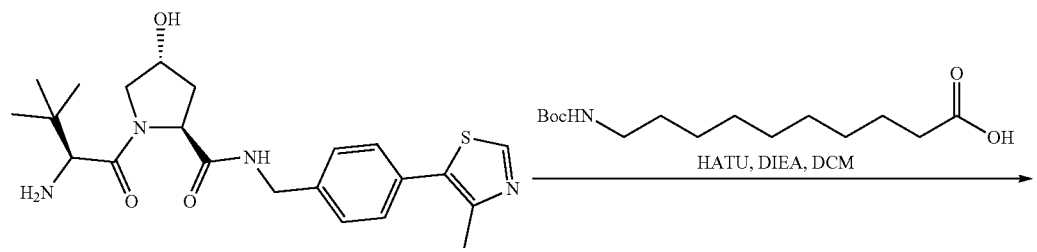
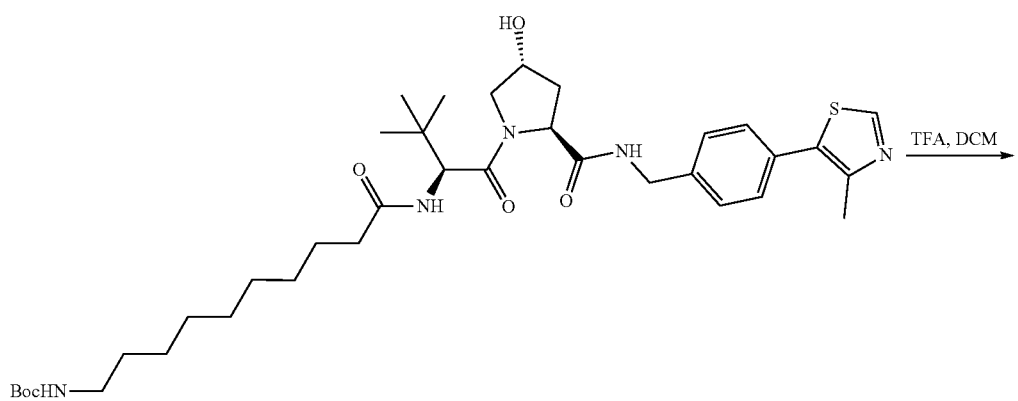
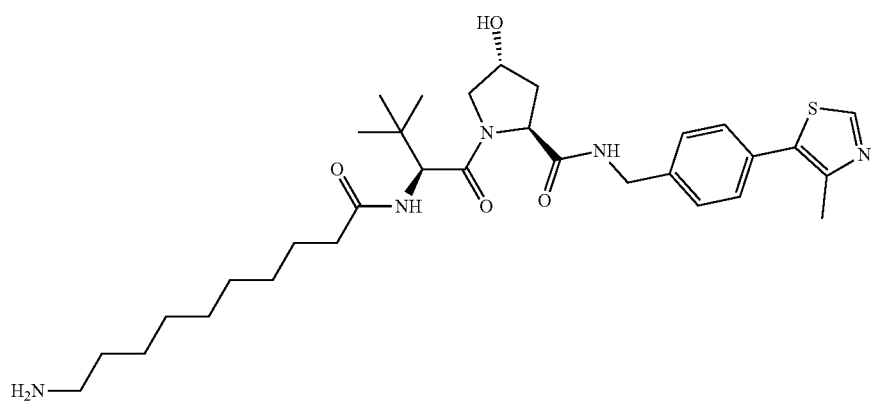

Step 1: Preparation of tert-butyl N-(9-[[(2S)-1-[(2S,4R)-4-hydroxy-2-([[4-(4-methyl-1,3-thiazol-5-yl)phenyl]methyl]carbamoyl)pyrrolidin-1-yl]-3,3-dimethyl-1-oxobutan-2-yl]carbamoyl]nonyl)carbamate

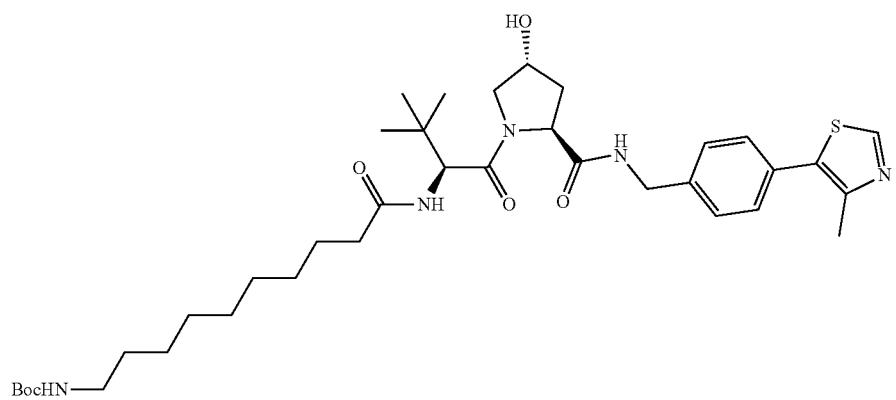 [SMILES: Cc1ncsc1-c1ccc(CNC(=O)[C@@H]2C[C@@H](O)CN2C(=O)[C@@H](NC(=O)CCCCCCCCCNC(=O)OC(C)(C)C)C(C)(C)C)cc1]

To a stirred mixture of (2S,4R)-1-[(2S)-2-amino-3,3-dimethylbutanoyl]-4-hydroxy-N-[[4-(4-methyl-1,3-thiazol-5-yl)phenyl]methyl]pyrrolidine-2-carboxamide (1.00 g, 0.002 mmol) and 10-[(tert-butoxycarbonyl)amino]decanoic acid (0.73 g, 0.003 mmol) in DCM (20.0 mL) was added DIEA (0.90 g, 0.007 mmol). The mixture was stirred at room temperature for 5 min, then HATU (1.32 g, 0.003 mmol) was added. After stirring at room temperature for 2 h, to the mixture was added water and the mixture was extracted four times with DCM. The organic fractions were combined and dried over anhydrous sodium sulfate and filtered. The filtrate was concentrated to give crude product that was purified by silica gel flash chromatography (DCM/MeOH) to give tert-butyl N-(9-[[(2S)-1-[(2S,4R)-4-hydroxy-2-([[4-(4-methyl-1,3-thiazol-5-yl)phenyl]methyl]carbamoyl)pyrrolidin-1-yl]-3,3-dimethyl-1-oxobutan-2-yl]carbamoyl]nonyl)carbamate (1.67 g, 92.5%). LCMS (ESI) m/z [M+H]$^+$=700.

Step 2: Preparation of (2S,4R)-1-[(2S)-2-(10-aminodecanamido)-3,3-dimethylbutanoyl]-4-hydroxy-N-[[4-(4-methyl-1,3-thiazol-5-yl)phenyl]methyl]pyrrolidine-2-carboxamide (I-1)

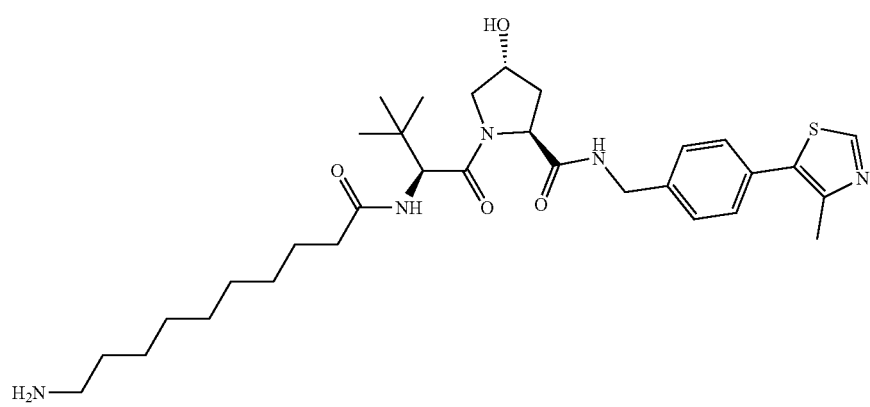

I-1

To a stirred solution of tert-butyl N-(9-[[(2S)-1-[(2S,4R)-4-hydroxy-2-([[4-(4-methyl-1,3-thiazol-5-yl)phenyl]methyl]carbamoyl)pyrrolidin-1-yl]-3,3-dimethyl-1-oxobutan-2-yl]carbamoyl]nonyl)carbamate (1.67 g, 2.39 mmol) in DCM (10 mL) was added TFA (2 mL, 26.9 mmol) and the mixture was stirred for 2 h at room temperature. The resulting mixture was concentrated under vacuum. A solution of 5% $K_2CO_3$ (MeOH/water=5/2) was added to the reaction mixture and the pH adjusted to ~8-9. The mixture was stirred for 2 h at room temperature. The final mixture was concentrated under vacuum and the crude material was purified by reverse C18 phase flash chromatography (Water:ACN:$NH_4HCO_3$) to provide (2S,4R)-1-[(2S)-2-(10-aminodecanamido)-3,3-dimethylbutanoyl]-4-hydroxy-N-[[4-(4-methyl-1,3-thiazol-5-yl)phenyl]methyl]pyrrolidine-2-carboxamide (I-1, 1.11 g, 73.68%). LCMS (ESI) m/z: $[M+H]^+$=600.40.

Example 25. Preparation of Intermediates

The following intermediates in Table B1 were prepared by a route analogous to that used for the preparation of intermediate 1-1 in Example 24.

TABLE B1

| Intermediates | | | |
|---|---|---|---|
| Structure | Intermediate No. | Name | LCMS (ESI) m/z: $[M + H]^+$ |
| | I-2 | (2S,4R)-1-[(2S)-2-(8-amino-octanamido)-3,3-dimethyl-butanoyl]-4-hydroxy-N-[[4-(4-methyl-1,3-thiazol-5-yl)phenyl]methyl]pyrrolidine-2-carboxamide | 572.2 |
| | I-3 | (2S,4R)-1-[(2S)-2-(6-amino-hexanamido)-3,3-dimethyl-butanoyl]-4-hydroxy-N-[[4-(4-methyl-1,3-thiazol-5-yl)phenyl]methyl]pyrrolidine-2-carboxamide | 544.4 |
| | I-4 | (2S,4R)-1-((S)-14-amino-2-(tert-butyl)-4-oxo-6,9,12-trioxa-3-azatetradecanoyl)-4-hydroxy-N-(4-(4-methylthiazol-5-yl)benzyl)pyrrolidine-2-carboxamide | 620.3 |

TABLE B1-continued

Intermediates

| Structure | Intermediate No. | Name | LCMS (ESI) m/z: $[M + H]^+$ |
|---|---|---|---|
| | I-5 | (2S,4R)-1-[(2S)-2-[2-[2-(2-aminoethoxy)ethoxy]acetamido]-3,3-dimethylbutanoyl]-4-hydroxy-N-[[4-(4-methyl-1,3-thiazol-5-yl)phenyl]methyl]pyrrolidine-2-carboxamide | 576.3 |

Example 26. Preparation of 5-(2-(4-aminopiperidin-1-yl)ethoxy)-2-(2,6-dioxopiperidin-3-yl)isoindoline-1,3-dione TFA (I-6)

Step 1: Preparation of 5-(2-bromoethoxy)-2-(2,6-dioxopiperidin-3-yl)isoindoline-1,3-dione

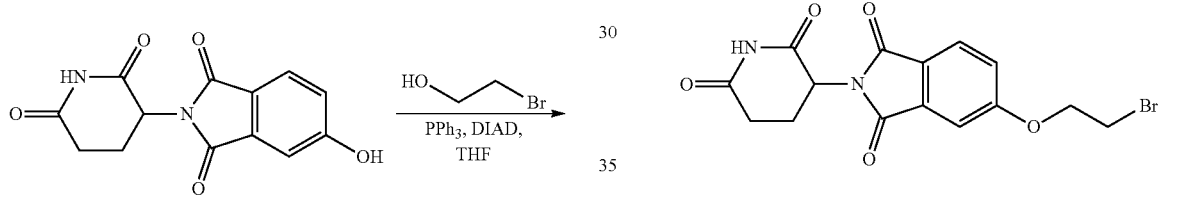

To a solution of 2-(2,6-dioxopiperidin-3-yl)-5-hydroxyisoindole-1,3-dione (1.37 g, 5.00 mmol) in THF (35 mL) was added 2-bromoethanol (0.94 g, 7.49 mmol), PPh$_3$ (1.97 g, 7.49 mmol) and DIAD (1.52 g, 7.49 mmol) at 0° C. The resulting mixture was stirred for 2 h at room temperature. The residue was purified by reverse phase 18 flash chromatography (Water:ACN) to provide 5-(2-bromoethoxy)-2-(2,6-dioxopiperidin-3-yl)isoindoline-1,3-dione (1.52 g, 79.82%) as a black solid. LCMS (ESI) m/z: [M+H]$^+$= 381.38.

Step 2: Preparation of tert-butyl (1-(2-((2-(2,6-dioxopiperidin-3-yl)-1,3-dioxoisoindolin-5-yl)oxy)ethyl)piperidin-4-yl)carbamate

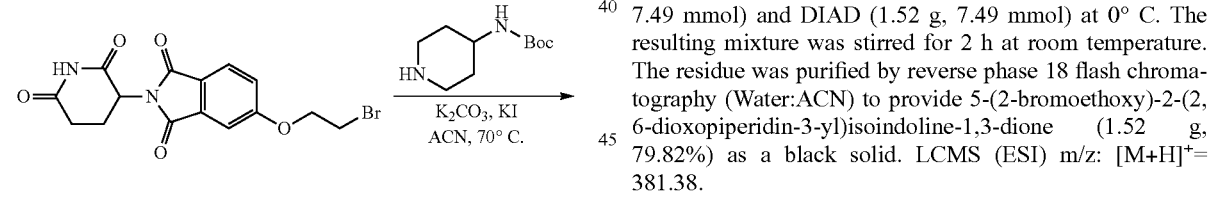

To a solution of 5-(2-bromoethoxy)-2-(2,6-dioxopiperidin-3-yl)isoindoline-1,3-dione (1.52 g, 3.99 mmol) in ACN (35.0 mL) was added tert-butyl N-(piperidin-4-yl)carbamate (0.80 g, 3.99 mmol), KI (0.66 g, 3.99 mmol) and K$_2$CO$_3$ (1.65 g, 12.0 mmol). The resulting solution was stirred at 70° C. for 2 h. The residue was purified by reverse phase C18

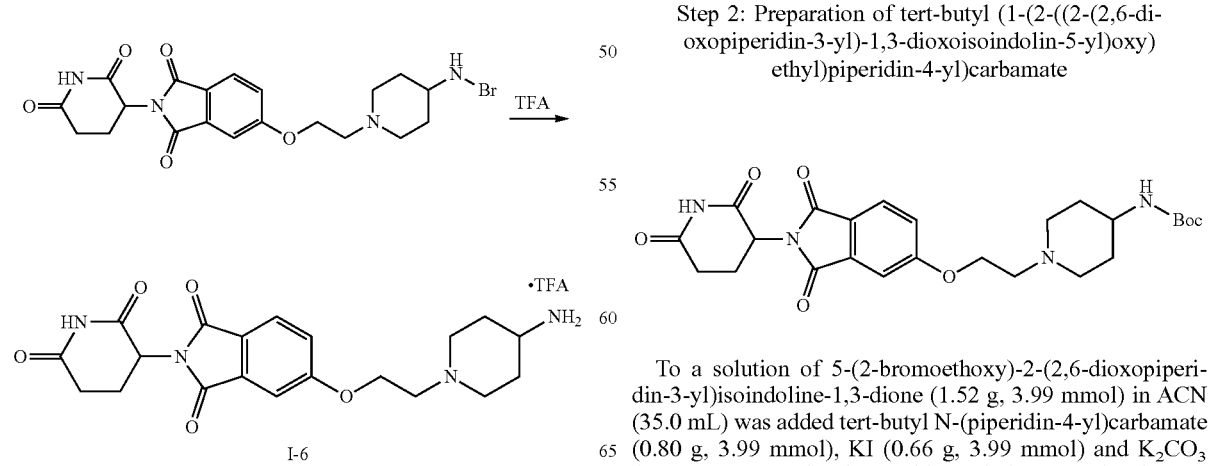

flash chromatography (Water:ACN) to provide tert-butyl (1-(2-((2-(2,6-dioxopiperidin-3-yl)-1,3-dioxoisoindolin-5-yl)oxy)ethyl)piperidin-4-yl)carbamate (1.402 g, 70.24%) as a colorless solid. LCMS (ESI) m/z: [M+H]⁺=501.

Step 3: Preparation of 5-(2-(4-aminopiperidin-1-yl)ethoxy)-2-(2,6-dioxopiperidin-3-yl)isoindoline-1,3-dione TFA (I-6)

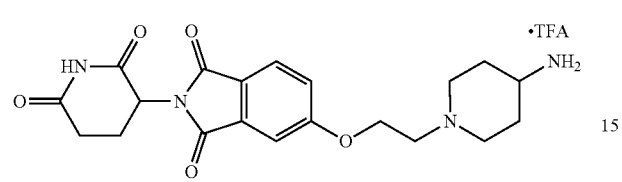

To a solution of tert-butyl (1-(2-((2-(2,6-dioxopiperidin-3-yl)-1,3-dioxoisoindolin-5-yl)oxy)ethyl)piperidin-4-yl)carbamate (1.66 g, 3.32 mmol) in DCM (10.0 mL) was added TFA (10.0 mL, 135 mmol). The resulting solution was stirred at room temperature for 3 h, then concentrated under reduced pressure. The residue was purified by reverse phase C18 flash chromatography (Water:ACN) to give 5-(2-(4-aminopiperidin-1-yl)ethoxy)-2-(2,6-dioxopiperidin-3-yl)isoindoline-1,3-dione formate (I-6, 840 mg, 62.52%) as a white solid. LCMS (ESI) m/z: [M+H]⁺=401.17.

Example 27. Preparation of Intermediates

The following intermediates in Table B2 were prepared by a route analogous to that described in Example 26 using the appropriate substituted bromo alcohol and N-Boc-diamine.

TABLE B2

| Intermediate | | | |
|---|---|---|---|
| Structure | Intermediate No. | Name | LCMS (ESI) m/z: [M + H]⁺ |
| 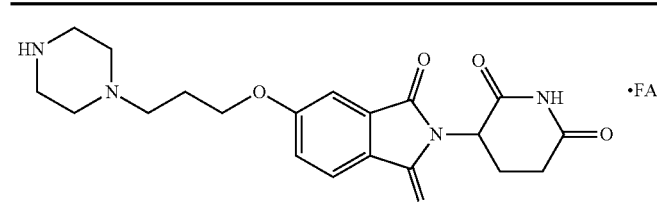<br>I-37 | I-37 | 2-(2,6-dioxopiperidin-3-yl)-5-[3-(piperazin-1-yl)propoxy]isoindole-1,3-dione formate | 401.17 |

Example 28. Preparation of 4-(azetidin-3-yl-methoxy)-2-(2,6-dioxopiperidin-3-yl)isoindoline-1,3-dione TFA (I-7)

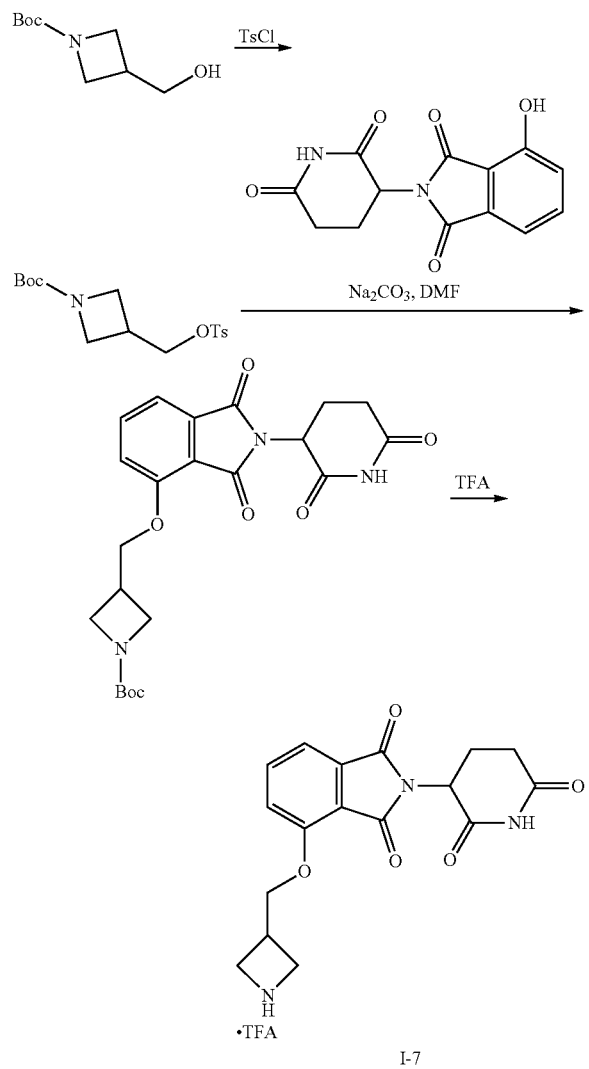

Step 1: Preparation of tert-butyl 3-((tosyloxy)methyl)azetidine-1-carboxylate

To a stirred solution of tert-butyl 3-(hydroxymethyl)azetidine-1-carboxylate (1.87 g, 9.99 mmol) in DCM (50.0 mL) was added DMAP (0.18 g, 1.50 mmol), TEA (2.53 g, 25.0 mmol) and p-toluenesulfonyl chloride (2.86 g, 15.0 mmol) at 0° C. The resulting mixture was stirred for 2 h at 0° C., then allowed to warm to room temperature and stirred for an additional 5 h. The residue was purified by silica gel column chromatography (petroleum ether/THF), to afford tert-butyl 3-((tosyloxy)methyl)azetidine-1-carboxylate (2.65 g, 77.7%) as a colorless oil. LCMS (ESI) m/z: [M+H]$^+$= 342.

Step 2: Preparation of tert-butyl 3-([[2-(2,6-dioxopiperidin-3-yl)-1,3-dioxoisoindol-4-yl]oxy]methyl)azetidine-1-carboxylate

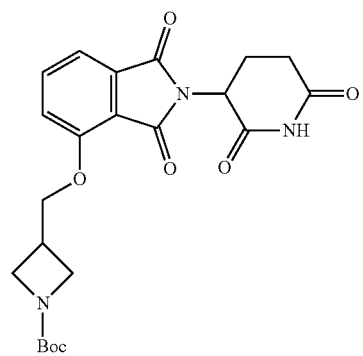 [SMILES: CC(C)(C)OC(=O)N1CC(COc2cccc3c2C(=O)N(C2CCC(=O)NC2=O)C3=O)C1]

To a solution of tert-butyl 3-((tosyloxy)methyl)azetidine-1-carboxylate (2.30 g, 8.39 mmol) in DMF (15.0 mL) was added 2-(2,6-dioxopiperidin-3-yl)-4-hydroxyisoindoline-1,3-dione (2.86 g, 8.39 mmol) and Na$_2$CO$_3$ (1.33 g, 12.6 mmol). The resulting mixture was stirred at 80° C. for 5 h under an atmosphere of dry nitrogen. The reaction was quenched with water at room temperature. The resulting mixture was extracted three times with EtOAc. The combined organic layers were washed three times with brine and dried over anhydrous Na$_2$SO$_4$. After filtration, the filtrate was concentrated under reduced pressure to provide tert-butyl 3-([[2-(2,6-dioxopiperidin-3-yl)-1,3-dioxoisoindol-4-yl]oxy]methyl)azetidine-1-carboxylate (3.37 g, 90.6%) as a light yellow solid. LCMS (ESI) m/z: [M+H]$^+$=444.

Step 3: Preparation of 4-(azetidin-3-ylmethoxy)-2-(2,6-dioxopiperidin-3-yl)isoindoline-1,3-dione TFA (I-7)

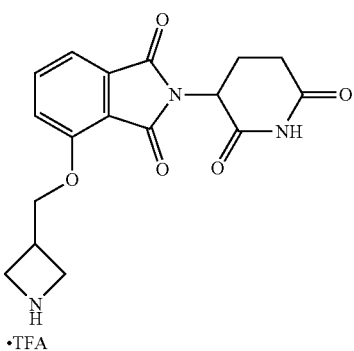

To a solution of tert-butyl 3-([[2-(2,6-dioxopiperidin-3-yl)-1,3-dioxoisoindol-4-yl]oxy]methyl)azetidine-1-carboxylate (2.39 g, 5.39 mmol) in DCM (10.0 mL) was added TFA (10.0 mL, 135 mmol). The resulting solution was stirred at room temperature for 3 h. The residue was purified by reverse phase C18 flash chromatography (Water:ACN), to provide 4-(azetidin-3-ylmethoxy)-2-(2,6-dioxopiperidin-3-yl)isoindoline-1,3-dione TFA (I-7, 1.71 g, 87.7%) as a light yellow solid. LCMS (ESI) m/z: [M+H]$^+$=344.12.

Example 29. Preparation of Intermediates

The following intermediates in Table B3 were prepared by a route analogous to that described in Example 28 using the appropriate substituted phenol and N-Boc-amino alcohol.

TABLE B3

Intermediates

| Structure | Intermediate No. | Name | LCMS (ESI) m/z: [M + H]$^+$ |
|---|---|---|---|
| I-8 | I-8 | Preparation of 5-(azetidin-3-ylmethoxy)-2-(2,6-dioxopiperidin-3-yl)isoindole-1,3-dione TFA | 344.12 |
| I-32 | I-32 | 4-[2-(azetidin-3-yl)ethoxy]-2-(2,6-dioxopiperidin-3-yl)isoindole-1,3-dione trifluoroacetate | 358.13 |

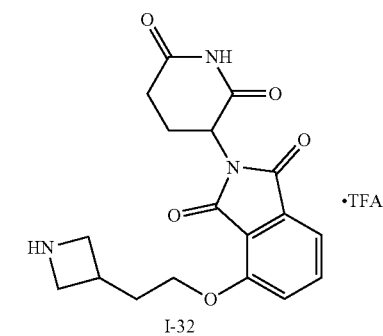

Example 30. Preparation of 3-[5-([2-[2-(2-aminoethoxy)ethoxy]ethyl]amino)-2-methyl-4-oxoquinazolin-3-yl]piperidine-2,6-dione TFA (I-11)

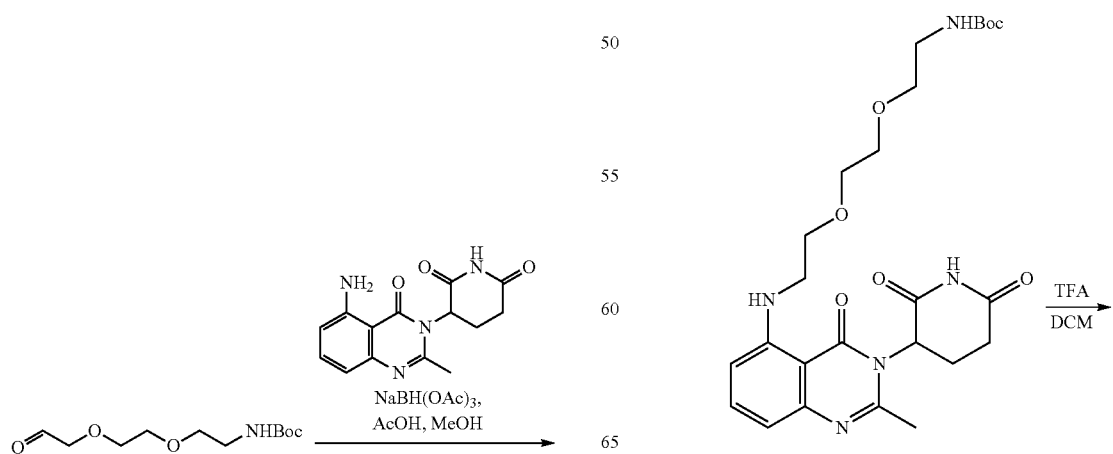

-continued

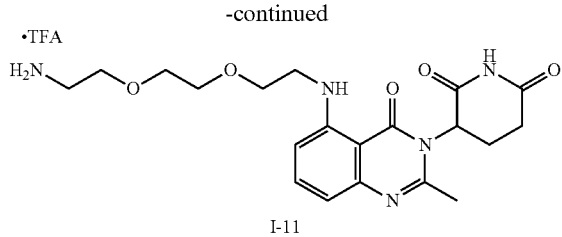

I-11

Step 1: Preparation of tert-butyl (2-(2-(2-((3-(2,6-dioxopiperidin-3-yl)-2-methyl-4-oxo-3,4-dihydroquinazolin-5-yl)amino)ethoxy)ethoxy)ethyl)carbamate

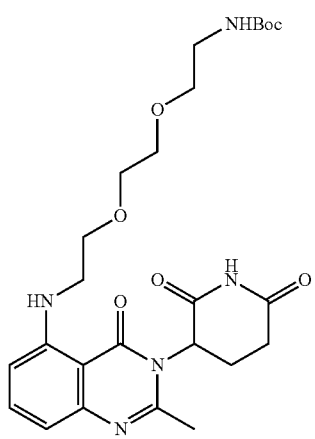 [SMILES: Cc1nc2cccc(NCCOCCOCCNC(=O)OC(C)(C)C)c2c(=O)n1C1CCC(=O)NC1=O]

To a stirred solution of 4-hydroxy-2,2-dimethyl-3,8,11-trioxa-5-azatridecan-13-al (1.25 g, 5.00 mmol) and 3-(5-amino-2-methyl-4-oxoquinazolin-3-yl)piperidine-2,6-dione (1.43 g, 5.00 mmol) in MeOH (30.0 mL) was added NaBH$_3$CN (0.63 g, 9.99 mmol) at room temperature and the resulting mixture was stirred for 1 h. The reaction was quenched with saturated aqueous NH$_4$Cl at 0° C., the solvent was evaporated, and the resulting residue was purified by silica gel column chromatography (petroleum ether/EtOAc) to afford tert-butyl (2-(2-(2-((3-(2,6-dioxopiperidin-3-yl)-2-methyl-4-oxo-3,4-dihydroquinazolin-5-yl)amino)ethoxy)ethoxy)ethyl)carbamate (1.29 g, 49.7%) as a yellow solid. LCMS (ESI) m/z [M+H]$^+$=518.

Step 2: Preparation of 3-[5-([2-[2-(2-aminoethoxy)ethoxy]ethyl]amino)-2-methyl-4-oxoquinazolin-3-yl]piperidine-2,6-dione TFA (I-11)

I-11

A solution of tert-butyl (2-(2-(2-((3-(2,6-dioxopiperidin-3-yl)-2-methyl-4-oxo-3,4-dihydroquinazolin-5-yl)amino)ethoxy)ethoxy)ethyl)carbamate (1.29 g, 2.48 mmol) and TFA (8.49 g, 74.5 mmol) in DCM (6.00 mL) was stirred for 1 h at room temperature. The reaction mixture was concentrated, and the resulting residue was purified by reverse phase C18 flash chromatography with the following conditions (Water:ACN) to afford 3-[5-([2-[2-(2-aminoethoxy)ethoxy]ethyl]amino)-2-methyl-4-oxoquinazolin-3-yl]piperidine-2,6-dione TFA (I-11, 1.56 g, 95.1%) as a light brown solid. LCMS (ESI) m/z: [M+H]$^+$=418.20.

Example 31. Preparation of Intermediates

The following intermediates in Table B4 were prepared by a route analogous to that described in Example 30 using and appropriate substituted aniline and aldehyde.

TABLE B4

Intermediates

| Structure | Intermediate No. | Name | LCMS (ESI) m/z: [M + H]$^+$ |
|---|---|---|---|
| | I-12 | 3-[4-([2-[2-(2-aminoethoxy)ethoxy]ethyl]amino)-1-oxo-3H-isoindol-2-yl]piperidine-2,6-dione TFA | 391.19 |

I-12

TABLE B4-continued
Intermediates
| Structure | Intermediate No. | Name | LCMS (ESI) m/z: [M + H]+ |
|---|---|---|---|
| I-13 | I-13 | 3-(5-((6-aminohexyl)amino)-2-methyl-4-oxoquinazolin-3(4H)-yl)piperidine-2,6-dione TFA | 386.21 |
| I-14 | I-14 | 3-(5-((8-aminooctyl)amino)-2-methyl-4-oxoquinazolin-3(4H)-yl)piperidine-2,6-dione TFA | 414.24 |
| I-15 | I-15 | 3-(4-((8-aminooctyl)amino)-1-oxoisoindolin-2-yl)piperidine-2,6-dione | 386.5 |
Example 32. Preparation of 5-[(8-aminooctyl)amino]-2-(2,6-dioxopiperidin-3-yl)isoindole-1,3-dione TFA (I-22)
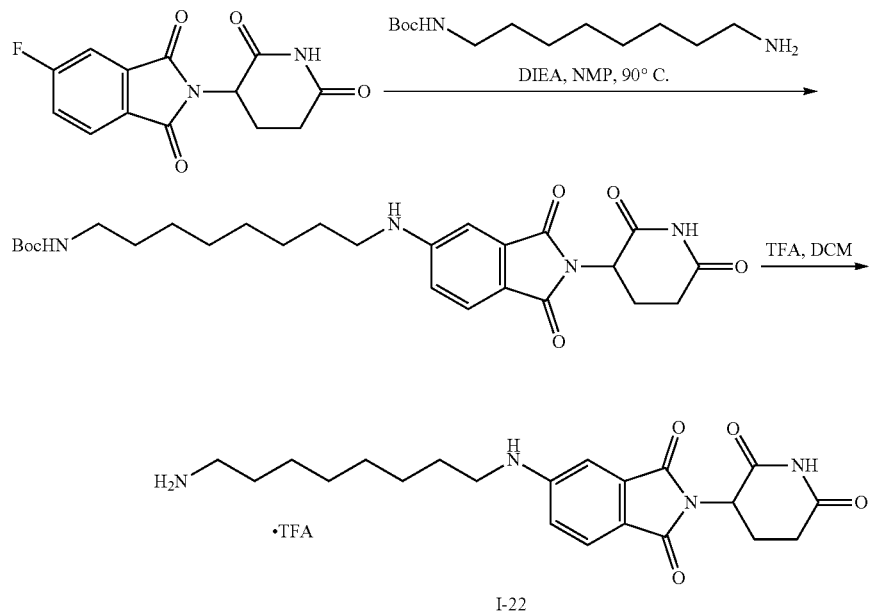

Step 1: Preparation of tert-butyl N-(8-[[2-(2,6-di-oxopiperidin-3-yl)-1,3-dioxo-2,3-dihydro-1H-isoindol-5-yl]amino]octyl)carbamate

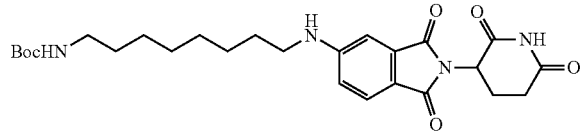 [SMILES: CC(C)(C)OC(=O)NCCCCCCCCNc1ccc2c(c1)C(=O)N(C1CCC(=O)NC1=O)C2=O]

To a stirred mixture of 2-(2,6-dioxopiperidin-3-yl)-5-fluoro-2,3-dihydro-1H-isoindole-1,3-dione (5.00 g, 18.1 mmol) and tert-butyl N-(8-aminooctyl)carbamate (6.64 g, 27.2 mmol) in NMP (50.0 mL) was added DIEA (7.02 g, 54.3 mmol) at 90° C. After 3 h, to the mixture was added water, followed by extraction three times with EtOAc. The residue was purified by reverse phase C18 flash chromatography (Water;ACN) to afford tert-butyl N-(8-[[2-(2,6-dioxopiperidin-3-yl)-1,3-dioxo-2,3-dihydro-1H-isoindol-5-yl]amino]octyl)carbamate (3.50 g, 36.69%) as a yellow solid. LCMS (ESI) m/z: [M+H]$^+$=501.

Step 3: Preparation of 5-[(8-aminooctyl)amino]-2-(2,6-dioxopiperidin-3-yl)isoindole-1,3-dione trifluoroacetate (I-22)

I-22

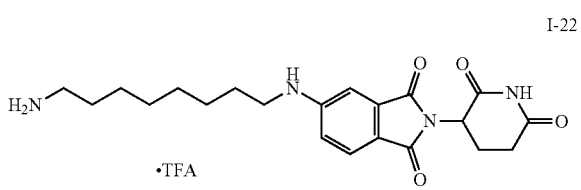 [SMILES: NCCCCCCCCNc1ccc2c(c1)C(=O)N(C1CCC(=O)NC1=O)C2=O]

To a stirred mixture of tert-butyl N-(8-[[2-(2,6-dioxopiperidin-3-yl)-1,3-dioxo-2,3-dihydro-1H-isoindol-5-yl]amino]octyl)carbamate (3.85 g, 7.69 mmol) in DCM (9.00 mL) was added TFA (3.00 mL) at room temperature. The resulting mixture was stirred for 1 h at room temperature. The resulting mixture was concentrated under reduced pressure. The residue was purified by flash chromatography to afford I-22 (2.22 g, 56.2%) as a yellow solid. $^1$H NMR (400 MHz, DMSO-d$_6$) δ 11.08 (s, 1H), 7.80-7.72 (m, 1H), 7.72-7.67 (m, 2H), 7.55 (dd, 1H), 7.14 (s, 1H), 6.95 (d, 1H), 6.88-6.77 (m, 1H), 5.08-4.98 (m, 1H), 3.21-3.05 (m, 1H), 2.95-2.75 (m, 2H), 2.66-2.51 (m, 2H), 2.12-1.94 (m, 1H), 1.63-1.49 (m, 3H), 1.45-1.31 (m, 4H). LCMS (ESI) m/z: [M+H]$^+$=401.21.

Example 33. Preparation of tert-butyl (4-((3-aminopropyl)sulfonyl)butyl)carbamate

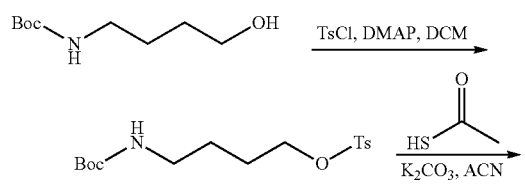

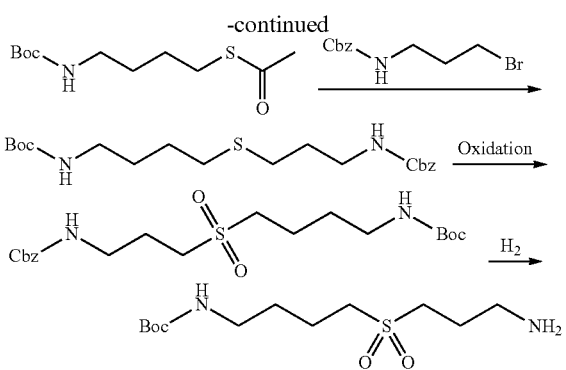

Step 1: Preparation of 4-((tert-butoxycarbonyl)amino)butyl 4-methylbenzenesulfonate

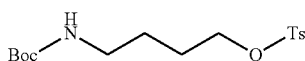 [SMILES: Cc1ccc(S(=O)(=O)OCCCCNC(=O)OC(C)(C)C)cc1]

To a stirred solution of tert-butyl N-(4-hydroxybutyl)carbamate (30.6 g, 162 mmol) in DCM (400 mL) was added DMAP (2.96 g, 24.2 mmol), TEA (40.9 g, 404 mmol) and p-toluenesulfonyl chloride (46.2 g, 242 mmol) at 0° C. The resulting mixture was stirred for 2 h at 0° C., then 5 h at room temperature. The solution was concentrated under reduced pressure and the residue was purified by silica gel column chromatography (petroleum ether/THF) to afford 4-((tert-butoxycarbonyl)amino)butyl 4-methylbenzenesulfonate (45.6 g, 82.2%) as a light-yellow oil. LCMS (ESI) m/z: [M+H]$^+$=344.

Step 2: Preparation of S-(4-((tert-butoxycarbonyl)amino)butyl) ethanethioate

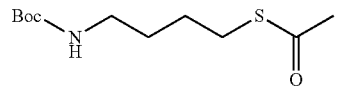 [SMILES: CC(=O)SCCCCNC(=O)OC(C)(C)C]

To a stirred solution of 4-((tert-butoxycarbonyl)amino) butyl 4-methylbenzenesulfonate (45.6 g, 133 mmol) in ACN (300 mL) was added ethanethioic S-acid (15.2 g, 199 mmol), and K$_2$CO$_3$ (55.1 g, 398 mmol). The resulting mixture was stirred for 12 h at room temperature. The mixture was concentrated under reduced pressure and the residue was purified by silica gel column chromatography (petroleum ether/THF) to afford S-(4-((tert-butoxycarbonyl)amino) butyl) ethanethioate (28.7 g, 87.4%) as a light-yellow oil. LCMS (ESI) m/z: [M+H]$^+$=248.

Step 3: Preparation of benzyl N-[3-([4-[(tert-butoxycarbonyl)amino]butyl]sulfanyl)propyl]carbamate

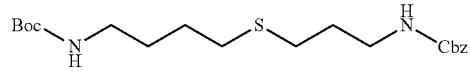 [SMILES: CC(C)(C)OC(=O)NCCCCSCCCNC(=O)OCc1ccccc1]

To a solution of S-(4-((tert-butoxycarbonyl)amino)butyl) ethanethioate (3.60 g, 14.6 mmol) in MeOH (90.0) was added benzyl (3-bromopropyl)carbamate (4.36 g, 16.0 mmol) and NaOMe (3.15 g, 58.2 mmol). The resulting solution was stirred at room temperature for 3 h. The reaction was quenched with water at room temperature. The resulting mixture was extracted three times with EtOAc. The combined organic layers were washed three times with brine and dried over anhydrous $Na_2SO_4$. After filtration, the filtrate was concentrated under reduced pressure. The residue was purified by reverse phase C18 flash chromatography (Water:ACN:$NH_4HCO_3$) to provide benzyl N-[3-([4-[(tert-butoxycarbonyl)amino]butyl]sulfanyl)propyl]carbamate (4.122 g, 71.42%) as a light yellow oil. LCMS (ESI) m/z: $[M+H]^+=397$.

Step 4: Preparation of benzyl N-(3-[4-[(tert-butoxycarbonyl)amino]butanesulfonyl]propyl)carbamate

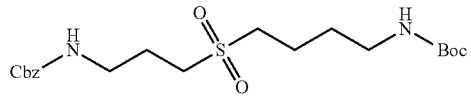 [SMILES: CC(C)(C)OC(=O)NCCCCS(=O)(=O)CCCNC(=O)OCc1ccccc1]

To a solution of benzyl N-[3-([4-[(tert-butoxycarbonyl)amino]butyl]sulfanyl)propyl]carbamate (4.13 g, 10.4 mmol) in MeOH (60.0 mL) was added Oxone® (3.50 g, 20.8 mmol). The resulting solution was stirred at room temperature for 12 h then concentrated under reduced pressure. The residue was purified by reverse phase C18 flash chromatography (Water:ACN:$NH_4HCO_3$) to provide benzyl N-(3-[4-[(tert-butoxycarbonyl)amino]butanesulfonyl]propyl)carbamate (2 g, 44.8%) as a white solid. LCMS (ESI) m/z: $[M+H]^+=429$.

Step 5: Preparation of tert-butyl (4-((3-aminopropyl)sulfonyl)butyl)carbamate

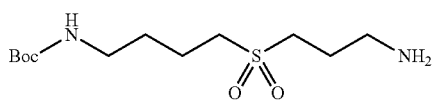 [SMILES: CC(C)(C)OC(=O)NCCCCS(=O)(=O)CCCN]

To a solution of benzyl N-(3-[4-[(tert-butoxycarbonyl)amino]butanesulfonyl]propyl)carbamate (1.95 g, 4.55 mmol) in EtOH (30.0 mL) was added ammonium formate (574 mg, 9.10 mmol) and 5% Pd(OH)$_2$/C (978 mg, 6.96 mmol). The resulting solution was stirred at 60° C. for 12 h under one atmosphere of hydrogen. The resulting mixture was filtered, the filter cake was washed three times with MeOH, and the filtrate was concentrated under reduced pressure to provide tert-butyl (4-((3-aminopropyl)sulfonyl) butyl)carbamate (1.12 g, crude) as a black solid. LCMS (ESI) m/z: $[M+H]^+=295$.

Example 34. Preparation of tert-butyl N-[2-(2-aminoethanesulfonyl)ethyl]carbamate

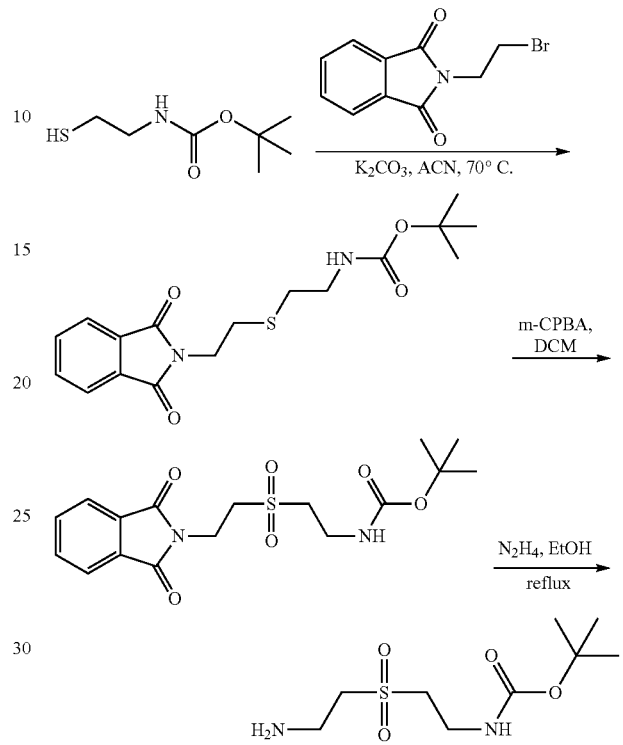

Step 1: Preparation of tert-butyl N-(2-[[2-(1,3-dioxoisoindol-2-yl)ethyl]sulfanyl]ethyl)carbamate

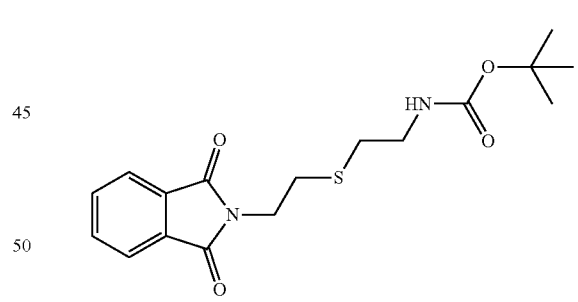

To a stirred mixture of tert-butyl N-(2-sulfanylethyl) carbamate (5.00 g, 28.2 mmol) and N-(2-bromoethyl)phthalimide (7.17 g, 0.028 mol) in ACN (10.0 mL) was added $K_2CO_3$ (11.7 g, 0.085 mol) at 70° C. under an atmosphere of dry nitrogen. After 5 h, the resulting mixture was extracted three times with EtOAc. The combined organic layers were washed three times with brine and dried over anhydrous $Na_2SO_4$. After filtration, the filtrate was concentrated under reduced pressure. The residue was purified by silica gel column chromatography (petroleum ether/EtOAc) to afford tert-butyl N-(2-[[2-(1,3-dioxoisoindol-2-yl)ethyl]sulfanyl] ethyl)carbamate (8.20 g, 82.96%) as a white solid. LCMS (ESI) m/z: $[M+H]^+=351$.

Step 2: Preparation of tert-butyl N-[2-[2-(1,3-di-oxoisoindol-2-yl)ethanesulfonyl]ethyl]carbamate

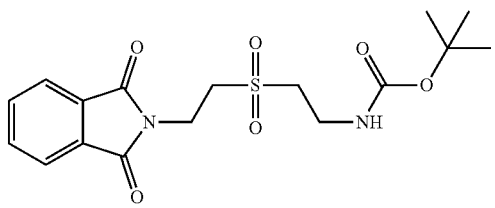 [SMILES: CC(C)(C)OC(=O)NCCS(=O)(=O)CCN1C(=O)c2ccccc2C1=O]

To a stirred mixture of tert-butyl N-(2-[[2-(1,3-dioxoisoindol-2-yl)ethyl]sulfanyl]ethyl)carbamate (8.20 g, 23.4 mmol) in DCM (100 mL) was added m-CPBA (12.1 g, 70.2 mmol) at room temperature under an atmosphere of dry nitrogen. Then reaction was quenched with saturated aqueous $Na_2S_2O_3$ at room temperature. To the resulting mixture was added saturated aqueous $NaHCO_3$ and the mixture was extracted three times with EtOAc. The organic phase was separated and dried over anhydrous $Na_2SO_4$. After filtration, the filtrate was concentrated under reduced pressure. The residue was purified by silica gel column chromatograph (petroleum ether/EtOAc) to afford tert-butyl N-[2-[2-(1,3-dioxoisoindol-2-yl)ethanesulfonyl]ethyl]carbamate (8.40 g, 87.3%) as a white solid. LCMS (ESI) m/z: $[M+H]^+=383$.

Step 3: Preparation of tert-butyl N-[2-(2-aminoethanesulfonyl)ethyl]carbamate

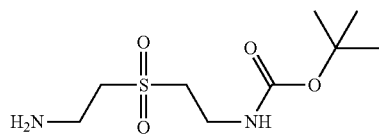 [SMILES: CC(C)(C)OC(=O)NCCS(=O)(=O)CCN]

To a stirred mixture of tert-butyl N-[2-[2-(1,3-dioxoisoindol-2-yl)ethanesulfonyl]ethyl]carbamate (3.40 g, 8.89 mmol) in EtOH (100 mL) was added hydrazine hydrate (0.89 g, 17.8 mmol) at 80° C. under an atmosphere of dry nitrogen. The resulting mixture was stirred for 1 h at 80° C. under an atmosphere of dry nitrogen. The resulting mixture was filtered, the filter cake was washed with EtOH, and the filtrate was concentrated under reduced pressure to provide tert-butyl N-[2-(2-aminoethanesulfonyl)ethyl]carbamate (1.88 g, 77.9%) as a white solid. LCMS (ESI) m/z: $[M+H]^+=253$.

Example 35. Preparation of tert-butyl 4-(azetidin-3-ylmethyl)piperazine-1-carboxylate

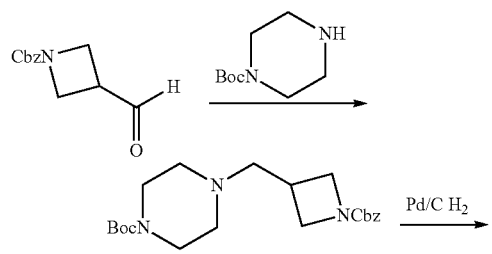

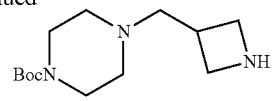

Step 1: Preparation of tert-butyl 4-([1-[(benzyloxy)carbonyl]azetidin-3-yl]methyl)piperazine-1-carboxylate

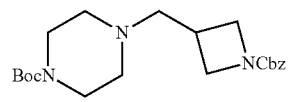 [SMILES: CC(C)(C)OC(=O)N1CCN(CC2CN(C(=O)OCc3ccccc3)C2)CC1]

To a stirred solution of benzyl 3-formylazetidine-1-carboxylate (2.0 g, 9.1 mmol) and tert-butyl piperazine-1-carboxylate (1.9 g, 10.2 mmol) in DMF (20 mL) was added in portions $NaBH(OAc)_3$ (7.6 g, 35.8 mmol). The mixture was stirred at 50° C. overnight. Aqueous $NH_4Cl$ was added to the mixtures and the mixtures was extracted three times with EtOAc. The combined organic phase was concentrated to dryness under reduced pressure. The residue was purified by reverse phase C18 flash chromatography (Water:ACN) to afford tert-butyl 4-([1-[(benzyloxy)carbonyl]azetidin-3-yl]methyl)piperazine-1-carboxylate (2.8 g, 79.1%) as a colorless oil. LCMS (ESI) m/z $[M+H]^+=390$.

Step 2: Preparation of tert-butyl 4-(azetidin-3-ylmethyl)piperazine-1-carboxylate

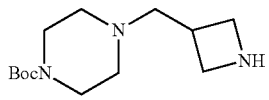

A solution of tert-butyl 4-([1-[(benzyloxy)carbonyl]azetidin-3-yl]methyl)piperazine-1-carboxylate (2.8 g, 7.2 mmol) and Pd/C (0.28 g) in methanol (30 mL) was stirred under $H_2$ atmosphere at room temperature for 2 h. The resulting mixture was filtered and the filter cake was washed with MeOH. The filtrate was concentrated under reduced pressure to afford tert-butyl 4-(azetidin-3-ylmethyl)piperazine-1-carboxylate (1.8 g quant.) LCMS (ESI) m/z $[M+H]^+=256$.

Example 36. Preparation of tert-butyl 7-(3-aminopropyl)-2,7-diazaspiro[3.5]nonane-2-carboxylate

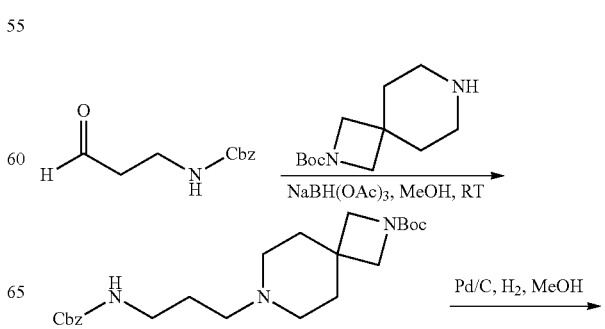

-continued

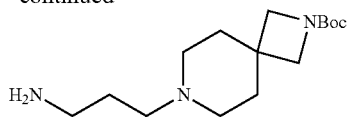

tert-Butyl 7-(3-aminopropyl)-2,7-diazaspiro[3.5]nonane-2-carboxylate was prepared following the synthetic scheme in Example 35 starting with benzyl N-(3-oxopropyl)carbamate and tert-butyl 2,7-diazaspiro[3.5]nonane-2-carboxylate. LCMS (ESI) m/z: [M+H]⁺=284.

Example 37. Preparation of benzyl N-[2-[3-(2-aminoethoxy)phenoxy]ethyl]carbamate

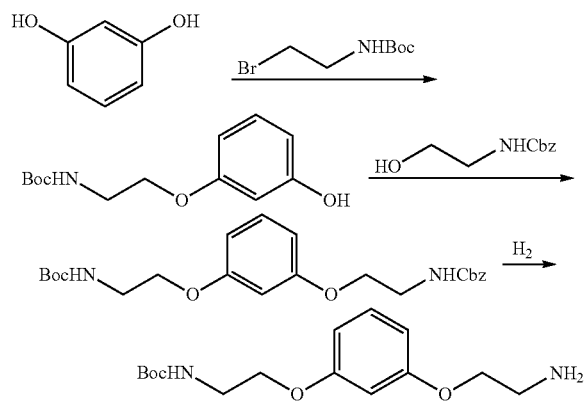

Step 1: Preparation of tert-butyl N-[2-(3-hydroxyphenoxy)ethyl]carbamate

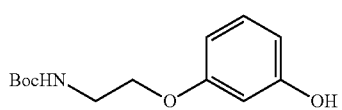 [SMILES: CC(C)(C)OC(=O)NCCOc1cccc(O)c1]

To a stirred solution of resorcinol (10.0 g, 90.8 mmol) and tert-butyl N-(2-bromoethyl)carbamate (20.4 g, 90.8 mmol) in DMF (250 mL) was added Cs₂CO₃ (88.8 g, 272 mmol) in portions at 40° C. The resulting mixture was washed three times with EtOAc. The resulting mixture was concentrated under reduced pressure. The residue was purified by reverse phase C18 flash chromatography (Water:MeOH) to afford tert-butyl N-[2-(3-hydroxyphenoxy)ethyl]carbamate (4.45 g, 19.3%) as a yellow oil. LCMS (ESI) m/z: [M+H]⁺=254.

Step 2: Preparation of benzyl N-[2-(3-[2-[(tert-butoxycarbonyl)amino]ethoxy]phenoxy)ethyl]carbamate

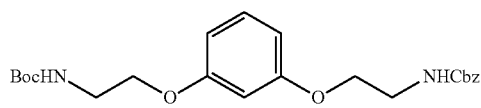 [SMILES: CC(C)(C)OC(=O)NCCOc1cccc(OCCNC(=O)OCc2ccccc2)c1]

To a stirred solution of tert-butyl N-[2-(3-hydroxyphenoxy)ethyl]carbamate (4.30 g, 17.0 mmol) and benzyl N-(2-hydroxyethyl)carbamate (3.31 g, 17.0 mmol) in THF (25.0 mL) were added PPh₃ (6.68 g, 25.5 mmol) and DIAD (5.15 g, 25.5 mmol) in portions at room temperature under a nitrogen atmosphere. The resulting mixture was concentrated under reduced pressure. The residue was purified by reverse phase C18 flash chromatography (Water:MeOH) to afford benzyl N-[2-(3-[2-[(tert-butoxycarbonyl)amino]ethoxy]phenoxy)ethyl]carbamate (5 g, 68.4%) as a yellow oil. LCMS (ESI) m/z: [M+H]⁺=431.

Step 3: Preparation of benzyl N-[2-[3-(2-aminoethoxy)phenoxy]ethyl]carbamate

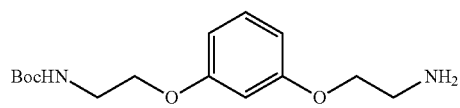 [SMILES: CC(C)(C)OC(=O)NCCOc1cccc(OCCN)c1]

A solution of benzyl N-[2-(3-[2-[(tert-butoxycarbonyl)amino]ethoxy]phenoxy)ethyl] carbamate (2.85 g, 6.62 mmol) and Pd/C (1.43 g, 13.4 mmol) in MeOH (15.0 mL) was stirred for overnight at 50° C. under a hydrogen atmosphere. The resulting mixture was filtered and the filter cake was washed three times with MeOH. The filtrate was concentrated under reduced pressure to afford benzyl N-[2-[3-(2-aminoethoxy)phenoxy]ethyl]carbamate (2.07 g, 86.9%) as an off-white oil. LCMS (ESI) m/z: [M+H]⁺=297.

Example 38. Preparation of Intermediates

The following intermediates in Table B5 were prepared in a similar manner as described in the preparation of 1-22 with the appropriate amine (Example 32).

TABLE B5

| Intermediates | | | |
| --- | --- | --- | --- |
| Structure | Intermediate No. | Name | LCMS (ESI)m/z: [M + H]⁺ |
| ![structure] | I-23 | 5-((6-aminohexyl)amino)-2-(2,6-dioxopiperidin-3-yl)isoindoline-1,3-dione | 373.3 |

TABLE B5-continued

| Structure | Intermediate No. | Name | LCMS (ESI)m/z: [M + H]+ |
|---|---|---|---|
| | I-24 | 5-((5-aminopentyl)amino)-2-(2,6-dioxopiperidin-3-yl)isoindoline-1,3-dione | 359.15 |
| | I-25 | 5-((4-aminobutyl)amino)-2-(2,6-dioxopiperidin-3-yl)isoindoline-1,3-dione | 345.15 |
| | I-26 | 4-([2-[(2-aminoethyl)(methyl)amino]ethyl]amino)-2-(2,6-dioxopiperidin-3-yl)isoindole-1,3-dione | 374.15 |
| | I-16 | 4-((8-aminooctyl)amino)-2-(2,6-dioxopiperidin-3-yl)isoindoline-1,3-dione TFA | 401.15 |
| | I-9 | 4-((3-((4-aminobutyl)sulfonyl)propyl)amino)-2-(2,6-dioxopiperidin-3-yl)isoindoline-1,3-dione FA | 451.16 |

TABLE B5-continued

Intermediates

| Structure | Intermediate No. | Name | LCMS (ESI)m/z: [M + H]+ |
|---|---|---|---|
| 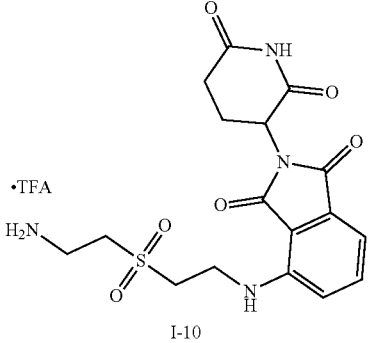 | I-10 | 4-[[2-(2-aminoethanesulfonyl)ethyl]amino]-2-(2,6-dioxopiperidin-3-yl)isoindole-1,3-dione TFA | 409.11 |
| 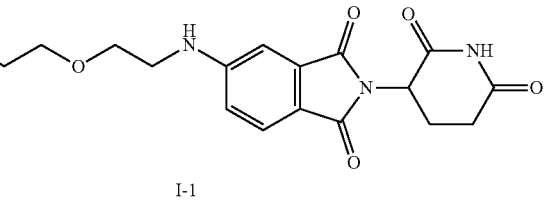 | •TFA I-1 | 5-([2-[2-(2-aminoethoxy)ethoxy]ethyl]amino)-2-(2,6-dioxopiperidin-3-yl)-2,3-dihydro-1H-isoindole-1,3-dione trifluoroacetate | 405.17 |
| 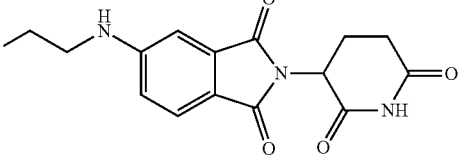 | I-43 | 5-((2-aminoethyl)amino)-2-(2,6-dioxopiperidin-3-yl)isoindoline-1,3-dione trifluoroacetate | 317.00 |
| 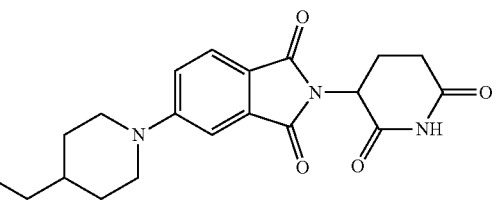 | | 5-(4-(2-aminoethyl)piperidin-1-yl)-2-(2,6-dioxopiperidin-3-yl)isoindoline-1,3-dione trifluoroacetic acid | 385.20 |
| 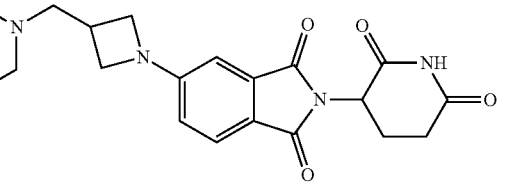 | | 2-(2,6-dioxopiperidin-3-yl)-5-[3-(piperazin-1-ylmethyl)azetidin-1-yl]isoindole-1,3-dione trifluoroacetic acid | 412.15 |
| 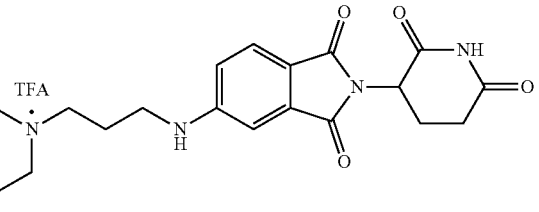 | | 5-((3-(2,7-diazaspiro[3.5]nonan-7-yl)propyl)amino)-2-(2,6-dioxopiperidin-3-yl)isoindoline-1,3-dione di-trifluoroacetic acid | 440.20 |

TABLE B5-continued
Intermediates
| Structure | Intermediate No. | Name | LCMS (ESI)m/z: [M + H]+ |
|---|---|---|---|
| 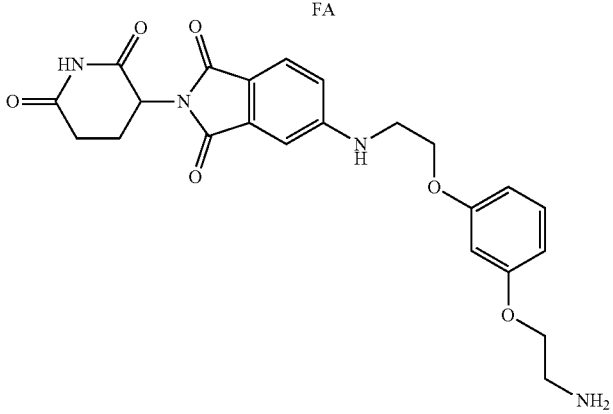 | | 5-([2-[3-(2-aminoethoxy)phenoxy]ethyl]amino)-2-(2,6-dioxopiperidin-3-yl)isoindole-1,3-dione | 453.17 |
| 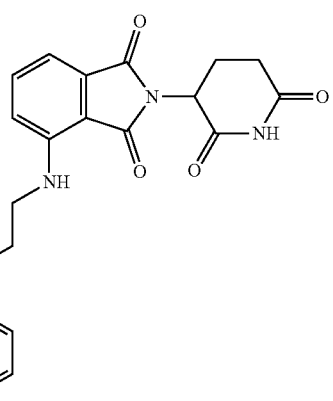 | | 4-([2-[3-(2-aminoethoxy)phenoxy]ethyl]amino)-2-(2,6-dioxopiperidin-3-yl)isoindole-1,3-dione | 453.10 |
| 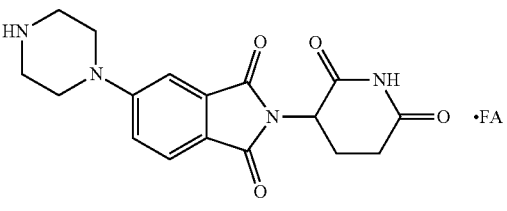 | I-39 | 2-(2,6-dioxopiperidin-3-yl)-5-(piperazin-1-yl)isoindole-1,3-dione formate | 343 |
| 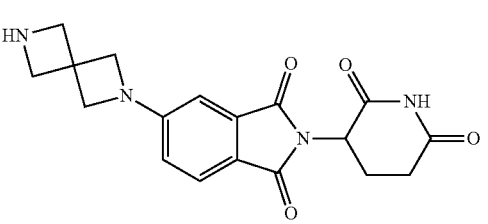 [SMILES: O=C1CCC(N2C(=O)c3ccc(N4CC5(CNC5)C4)cc3C2=O)C(=O)N1] | | 2-(2,6-dioxopiperidin-3-yl)-5-(2,6-diazaspiro[3.3]heptan-2-yl)isoindoline-1,3-dione | 355 |

Example 39. Preparation of 4-[[2-(2,6-Dioxopiperidin-3-yl)-1,3-dioxo-2,3-dihydro-1H-isoindol-4-yl]oxy]butanoic acid (I-29)

Step 1: Preparation of tert-butyl 4-[[2-(2,6-dioxopiperidin-3-yl)-1,3-dioxoisoindol-4-yl]oxy] butanoate

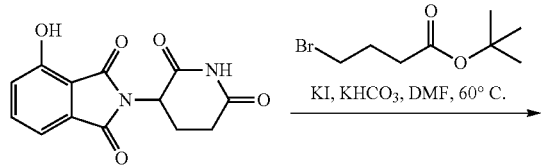

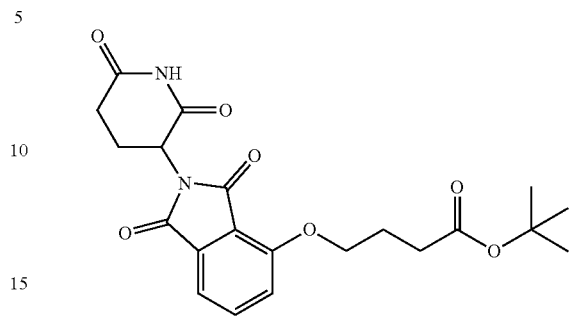

To a solution of 2-(2,6-dioxopiperidin-3-yl)-4-hydroxyisoindole-1,3-dione (2.00 g, 7.29 mmol) and tert-butyl 4-bromobutanoate (1.95 g, 8.752 mmol) in DMF (10.0 mL) was added KI (0.12 g, 0.729 mmol) and KHCO$_3$ (1.10 g, 10.9 mmol). The resulting solution was stirred at 60° C. for 5 h. The mixture was diluted with EtOAc and washed three times with water. The organic layer was dried over anhydrous sodium sulfate, filtered and concentrated to give a crude product. The crude product was purified by reverse phase C18 flash chromatography (Water:ACN) to give tert-butyl 4-[[2-(2,6-dioxopiperidin-3-yl)-1,3-dioxoisoindol-4-yl]oxy] butanoate (1.5 g, 49.4%) as an off-white solid. LCMS (ESI) m/z [M+H]$^+$=417.

Step 2: Preparation of 4-[[2-(2,6-dioxopiperidin-3-yl)-1,3-dioxo-2,3-dihydro-1H-isoindol-4-yl]oxy] butanoic acid (I-29)

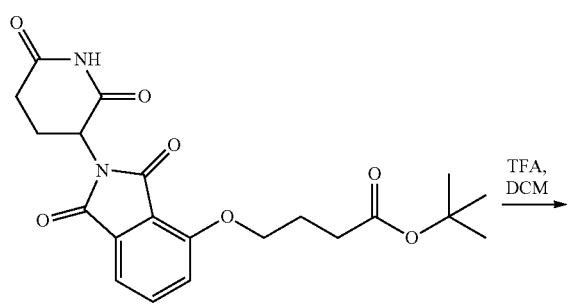

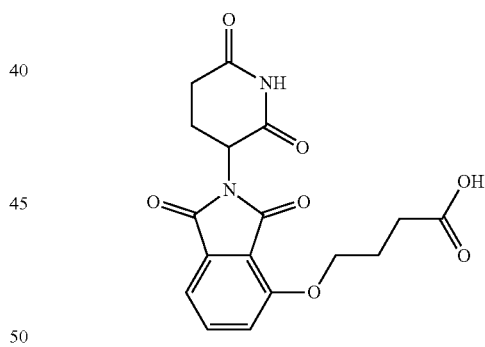

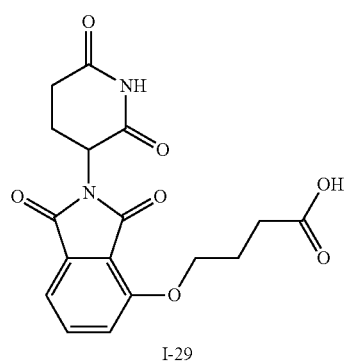

To a stirred solution of tert-butyl 4-[[2-(2,6-dioxopiperidin-3-yl)-1,3-dioxoisoindol-4-yl]oxy]butanoate (450 mg, 1.08 mmol) in DCM (5 mL) was added TFA (1 mL). The resulting solution was stirred for 2 h at 25° C. The resulting mixture was concentrated. This provided I-29 (360 mg, 92.5%) as a white solid. $^1$H NMR (400 MHz, Methanol-d4) δ 7.79 (t, J=8.4, 7.4 Hz, 1H), 7.47 (d, J=7.8 Hz, 2H), 5.12 (dd, J=12.6, 5.5 Hz, 1H), 4.30 (t, J=6.2 Hz, 2H), 2.95-2.66 (m, 3H), 2.60 (t, J=7.3 Hz, 2H), 2.25-2.18 (m, 3H). LCMS (ESI) m/z: [M+H]$^+$=361.10.

Example 40. Preparations of Intermediates

The following intermediates in Table B6 were prepared in a similar manner as described in the preparation of intermediate I-29 with the appropriate alkyl bromide (Example 39).

TABLE B6

Intermediates

| Structure | Intermediate No. | Name | LCMS (ESI) m/z: [M + H]+ |
|---|---|---|---|
| | I-30 | 5-((2-(2,6-dioxopiperidin-3-yl)-1,3-dioxoisoindolin-4-yl)oxy)pentanoic acid | 375.1 |
| | I-31 | 7-((2-(2,6-dioxopiperidin-3-yl)-1,3-dioxoisoindolin-4-yl)oxy)heptanoic acid | 403.1 |
| | I-14 | 8-((2-(2,6-dioxopiperidin-3-yl)-1,3-dioxoisoindolin-4-yl)oxy)octanoic acid | 417.15 |
| | I-15 | 3-(2-(2-((2-(2,6-dioxopiperidin-3-yl)-1,3-dioxoisoindolin-4-yl)oxy)ethoxy)ethoxy)propanoic acid | 435.25 |
| | I-16 | 3-(2-(2-((2-(2,6-dioxopiperidin-3-yl)-1,3-dioxoisoindolin-5-yl)oxy)ethoxy)ethoxy)propanoic acid | 435.2 |

Example 41. Preparation of 3-(2-(2-((2-(2,6-di-oxopiperidin-3-yl)-1,3-dioxoisoindolin-4-yl)amino)ethoxy)ethoxy)propanoic acid (I-34)

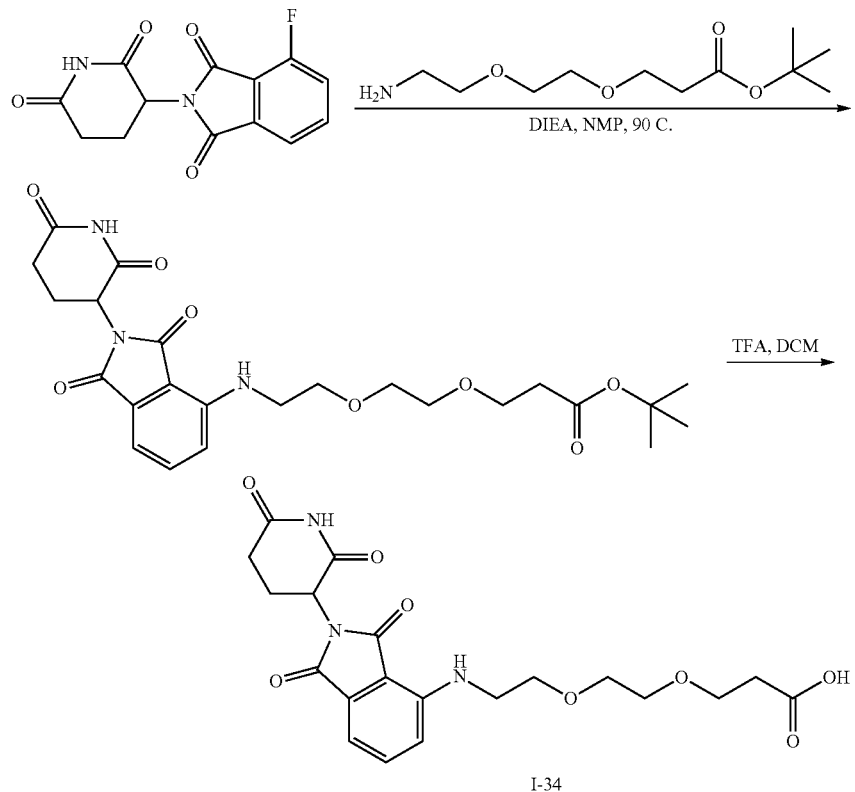

Step 1: Preparation of tert-butyl 3-(2-(2-((2-(2,6-dioxopiperidin-3-yl)-1,3-dioxoisoindolin-4-yl)amino)ethoxy)ethoxy)propanoate

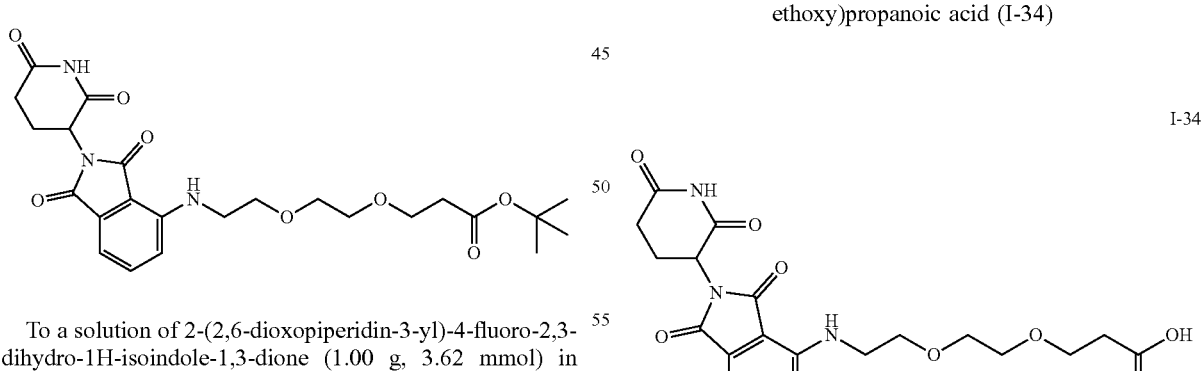

To a solution of 2-(2,6-dioxopiperidin-3-yl)-4-fluoro-2,3-dihydro-1H-isoindole-1,3-dione (1.00 g, 3.62 mmol) in NMP (10.0 mL) was added tert-butyl 3-[2-(2-aminoethoxy)ethoxy]propanoate (929 mg, 3.98 mmol). The resulting mixture was stirred overnight at 90° C. The mixture was allowed to cool down to room temperature. The resulting mixture was diluted with EtOAc. The organic layer was washed five times with water, and then brine. The resulting mixture was concentrated under reduced pressure. The residue was purified by silica gel column chromatography (Petroleum ether/EtOAc) to afford tert-butyl 3-(2-(2-((2-(2,6-dioxopiperidin-3-yl)-1,3-dioxoisoindolin-4-yl)amino)ethoxy)ethoxy)propanoate (1.14 g, 64.3%) as a yellow solid. LCMS (ESI) m/z: $[M+H]^+$=490.

Step 2: Preparation of 3-(2-(2-((2-(2,6-dioxopiperidin-3-yl)-1,3-dioxoisoindolin-4-yl)amino)ethoxy)ethoxy)propanoic acid (I-34)

To a stirred solution of tert-butyl 3-(2-(2-((2-(2,6-dioxopiperidin-3-yl)-1,3-dioxoisoindolin-4-yl)amino)ethoxy)ethoxy)propanoate (1.14 g, 2.33 mmol) in DCM (10.0 mL) was added TFA (0.52 mL, 4.55 mmol) dropwise at room temperature. The resulting mixture was stirred for 2 h at room temperature. The resulting mixture was concentrated under vacuum and the residue was purified by reverse phase 018 flash chromatography (Water:ACN) to provide 1-34 (896 mg, 70.3%) as a yellow solid. $^1$H NMR (400 MHz, DMSO-d$_6$) δ 12.15 (s, 1H), 11.09 (s, 1H), 7.63-7.55 (m, 1H), 7.15 (d, 1H), 7.05 (d, 1H), 6.61 (t, 1H), 5.06 (dd, 1H), 3.65-3.44 (m, 8H), 2.87 (d, 1H), 2.59 (d, 2H), 2.43 (t, 2H), 2.04 (in, 1H); LCMS (ESI) m/z: [M+H]$^+$=434.15.

Example 42. Preparation of Intermediates

The following intermediates in Table B7 were prepared in a similar manner as described in the preparation of intermediate 1-34 beginning with the appropriate aryl fluoride and amine (Example 41).

TABLE B7

Intermediates

| Structure | Intermediate No. | Name | LCMS (ESI) m/z: [M + H]$^+$ |
|---|---|---|---|
| | I-35 | 9-[[2-(2,6-dioxopiperidin-3-yl)-1,3-dioxo-2,3-dihydro-1H-isoindol-4-yl]amino]nonanoic acid | 430.19 |
| | I-36 | 11-((2-(2,6-dioxopiperidin-3-yl)-1,3-dioxoisoindolin-4-yl)amino)undecanoic acid | 458.3 |
| | I-37 | 11-((2-(2,6-dioxopiperidin-3-yl)-1,3-dioxoisoindolin-5-yl)amino)undecanoic acid | 458.4 |
| | I-38 | 9-((2-(2,6-dioxopiperidin-3-yl)-1,3-dioxoisoindolin-5-yl)amino)nonanoic acid | 430.2 |
| | I-39 | 3-(2-(2-((2-(2,6-dioxopiperidin-3-yl)-1,3-dioxoisoindolin-5-yl)amino)ethoxy)ethoxy)propanoic acid | 434.2 |

Example 43. Preparation of 2-[(2-[[2-(2,6-dioxopiperidin-3-yl)-1,3-dioxoisoindol-5-yl]oxy]acetamido)methyl]cyclopropane-1-carboxylic acid (I-42)

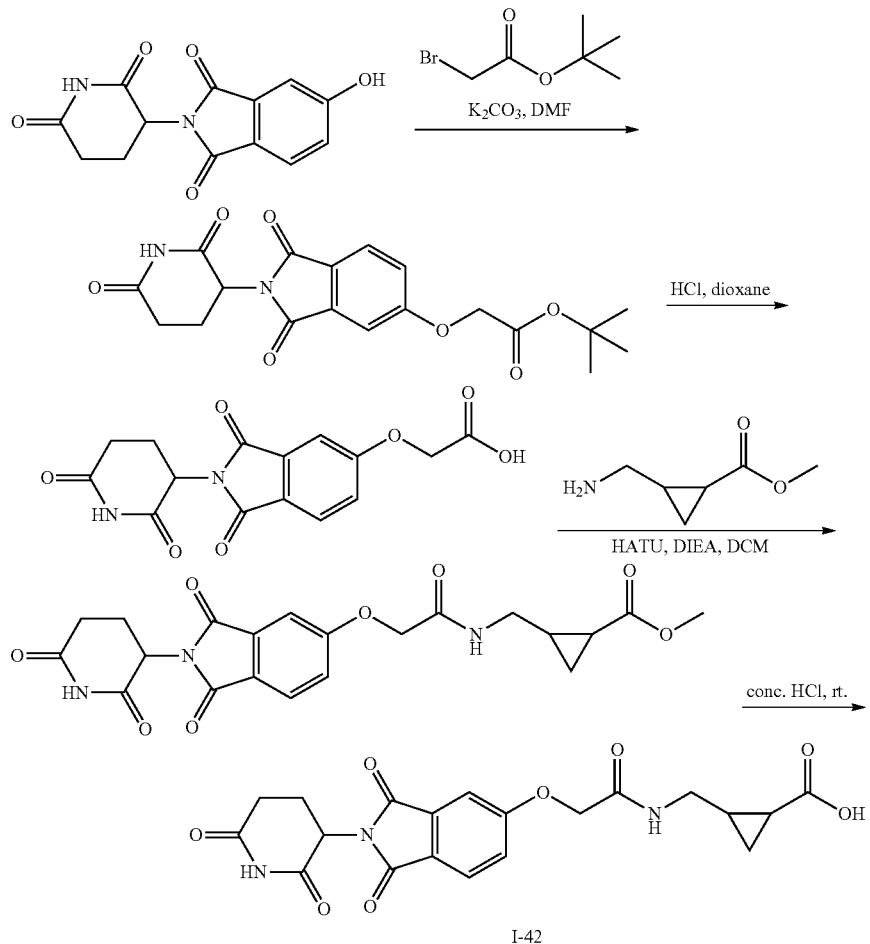

Step 1: Preparation of tert-butyl 2-[[2-(2,6-dioxopiperidin-3-yl)-1,3-dioxoisoindol-5-yl]oxy] acetate

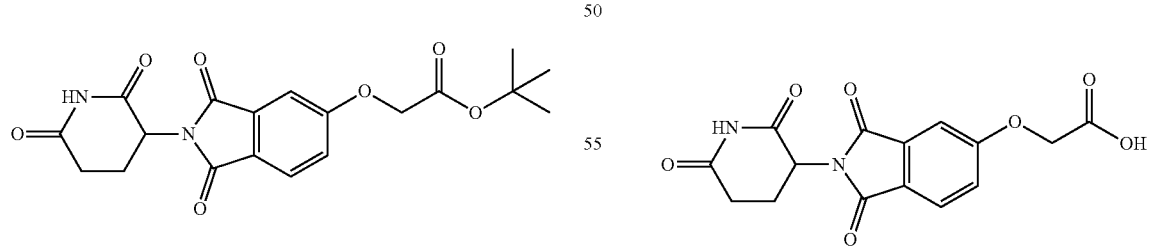

To a stirred solution of 2-(2,6-dioxopiperidin-3-yl)-5-hydroxyisoindole-1,3-dione (5.50 g, 20.1 mmol) and tert-butyl 2-bromoacetate (3.91 g, 20.1 mmol) in DMF (15.0 mL) was added $K_2CO_3$ (8.32 g, 60.2 mmol). The resulting mixture stirred overnight at room temperature, then taken up in water, extracted three times with EtOAc, and concentrated. The residue was purified by reverse phase C18 flash chromatography (Water:ACN) to afford tert-butyl 2-[[2-(2, 6-dioxopiperidin-3-yl)-1,3-dioxoisoindol-5-yl]oxy] acetate (3.2 g, 45.2%) as an off-white solid. LCMS (ESI) m/z: $[M+H]^+=389$.

Step 2: Preparation of [[2-(2,6-dioxopiperidin-3-yl)-1,3-dioxoisoindol-5-yl]oxy]acetic acid A solution of tert-butyl 2-[[2-(2,6-dioxopiperidin-3-yl)-1,3-dioxoisoindol-5-yl]oxy] acetate (3.20 g, 8.24 mmol) and dry HCl in dioxane (15.0 mL, 494 mmol) was stirred for 2 h at room temperature. The resulting mixture was concentrated under reduced pressure. This provided the [[2-(2,6-dioxopiperidin-3-yl)-1,3-dioxoisoindol-5-yl]oxy]acetic acid (1.12 g) as a yellow solid. LCMS (ESI) m/z: $[M+H]^+=289$.

Step 3: Preparation of methyl 2-[(2-[[2-(2,6-di-oxopiperidin-3-yl)-1,3-dioxoisoindol-5-yl]oxy]acet-amido) methyl]cyclopropane-1-carboxylate

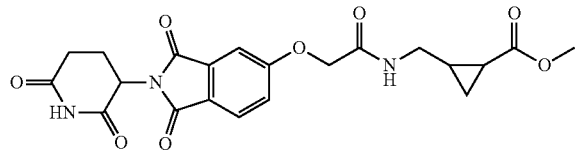 [SMILES: COC(=O)C1CC1CNC(=O)COc1ccc2c(c1)C(=O)N(C1CCC(=O)NC1=O)C2=O]

To a stirred solution of [[2-(2,6-dioxopiperidin-3-yl)-1,3-dioxoisoindol-5-yl]oxy]acetic acid (670 mg, 2.02 mmol) and methyl 2-(aminomethyl)cyclopropane-1-carboxylate (260 mg, 2.02 mmol) in DMF (15.0 mL) was added HATU (1.15 g, 3.03 mmol) and DIEA (782 mg, 6.05 mmol) dropwise at room temperature over 2 h. The resulting mixture was concentrated under reduced pressure. The residue was purified by reverse phase C18 flash chromatography (Water:ACN) to afford methyl 2-[(2-[[2-(2,6-dioxopiperidin-3-yl)-1,3-dioxoisoindol-5-yl]oxy]acetamido) methyl] cyclopropane-1-carboxylate (779 mg, 78.4%) as a yellow oil. LCMS (ESI) m/z: [M+H]+=444.

Step 4: Preparation of 2-[(2-[[2-(2,6-dioxopiperidin-3-yl)-1,3-dioxoisoindol-5-yl]oxy]acetamido)methyl] cyclopropane-1-carboxylic acid (I-42)

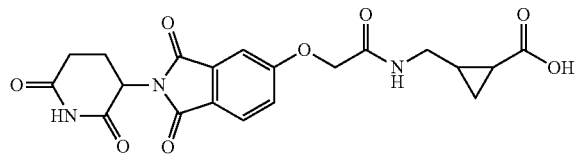

A mixture of methyl 2-[(2-[[2-(2,6-dioxopiperidin-3-yl)-1,3-dioxoisoindol-5-yl]oxy]acetamido) methyl]cyclopro-pane-1-carboxylate (764 mg) and HCl in dioxane (4 N, 5.00 mL, 20 mmol) was stirred for 2 h at room temperature. The resulting mixture was concentrated under reduced pressure. The residue was purified by reverse phase C18 flash chromatography with the following conditions (Water:ACN) to afford I-42 (338 mg) as a yellow solid. $^1$H NMR (400 MHz, DMSO-d$_6$) δ 12.17 (s, 1H), 11.12 (s, 1H), 8.33 (t, 1H), 7.88 (d, 1H), 7.46 (d, 1H), 7.39 (dd, 1H), 5.13 (dd, 1H), 4.74 (s, 2H), 2.96-2.83 (m, 1H), 2.65-2.52 (m, 1H), 2.08 (s, 4H), 1.66 (td, 1H), 1.48 (h, 1H), 1.02 (td, 1H), 0.85 (dt, 1H). LCMS (ESI) m/z: [M+H]+=430.05.

Example 44. Preparation of methyl 2-[(2-[[2-(2,6-dioxopiperidin-3-yl)-1,3-dioxoisoindol-4-yl]oxy] acetamido)methyl]cyclopropane-1-carboxylic acid (I-43)

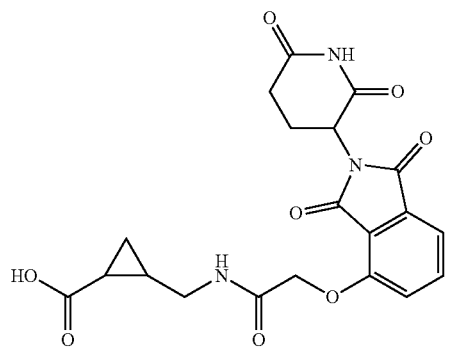

I-43 (423 mg, 35.74%) as a white solid was prepared in a similar manner as described in the preparation of 1-42 starting with the appropriate phenol (Example 43). $^1$H NMR (300 MHz, DMSO-d$_6$) δ 12.16 (s, 1H), 11.12 (s, 1H), 8.10 (s, 1H), 7.82 (t, 1H), 7.51 (d, 1H), 7.41 (d, 1H), 5.17-5.07 (m, 1H), 4.80 (s, 2H), 2.60 (d, 2H), 2.08 (s, 3H), 1.70-1.60 (m, 1H), 1.47 (d, 1H), 1.03 (d, 1H), 0.84 (d, 1H). LCMS (ESI) m/z: [M+H]+=430.12.

Example 45. Preparation of 6-(((S)-1-((2S,4R)-4-hydroxy-2-((4-(4-methylthiazol-5-yl)benzyl)carbam-oyl)pyrrolidin-1-yl)-3,3-dimethyl-1-oxobutan-2-yl) amino)-6-oxohexanoic acid

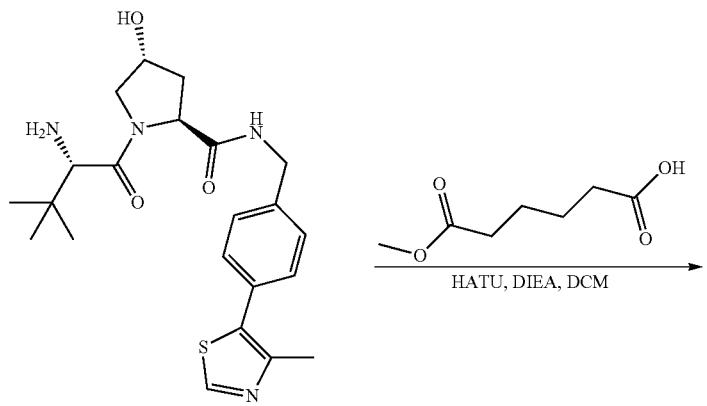

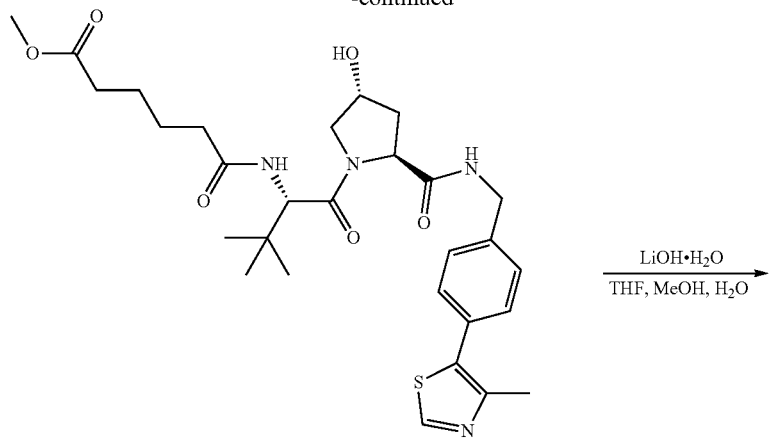

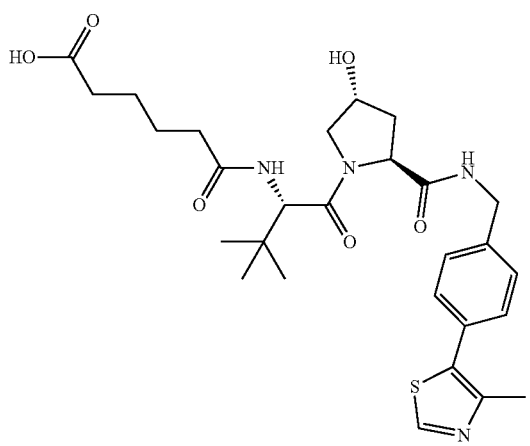

Step 1: Preparation of methyl 6-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-6-oxohexanoate

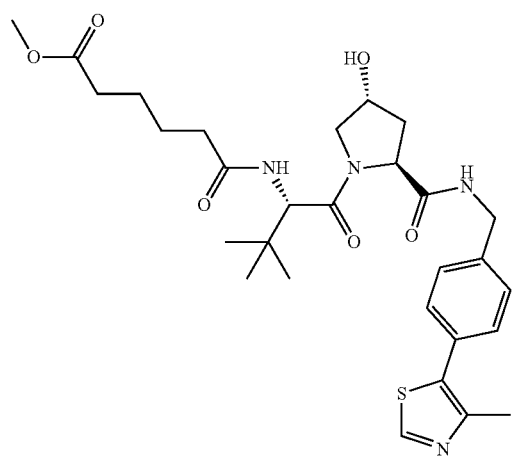 [SMILES: COC(=O)CCCCC(=O)N[C@H](C(=O)N1C[C@H](O)C[C@H]1C(=O)NCc1ccc(-c2scnc2C)cc1)C(C)(C)C]

To a solution of (2S,4R)-1-[(2S)-2-amino-3,3-dimethyl-butanoyl]-4-hydroxy-N-[[4-(4-methyl thiazol-5-yl)phenyl]methyl]pyrrolidine-2-carboxamide (300 mg, 0.697 mmol) and 6-methoxy-6-oxohexanoic acid (93.0 µL, 0.627 mmol) in DCM (3 mL) was added HATU (265 mg, 0.697 mmol) and DIEA (485 µL, 2.79 mmol). The mixture was stirred at 30° C. for 2 h. The reaction mixture was diluted with water and extracted twice with DCM. The combined organic layers were dried over anhydrous $Na_2SO_4$, filtered and concentrated under reduced pressure to give a residue. The reaction was purified by reverse phase (0.1% FA condition) and the eluent was concentrated to remove MeCN. The residue was extracted twice with EtOAc. The combined organic layers were dried over anhydrous $Na_2SO_4$, filtered and concentrated to afford methyl 6-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-6-oxohexanoate (340 mg, 85.2%) as a colorless oil. LCMS (ESI) m/z=[M+H]$^+$=573.6.

Step 2: Preparation of 6-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-6-oxohexanoic acid

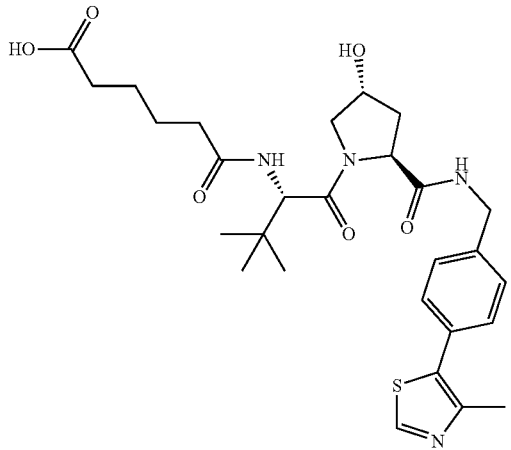 [SMILES: Cc1ncsc1-c1ccc(CNC(=O)[C@@H]2C[C@@H](O)CN2C(=O)[C@@H](NC(=O)CCCCC(=O)O)C(C)(C)C)cc1]

To a solution of methyl 6-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-6-oxohexanoate (340 mg, 0.594 mmol) in THF/MeOH/H$_2$O (2/1/1, 4 mL) was added LiOH·H$_2$O (42.7 mg, 1.78 mmol). The mixture was stirred at 30° C. for 4 h. The reaction mixture was diluted with water and washed twice with EtOAc.

The aqueous phase was adjusted pH=5 with 1 N HCl. Then the mixture was extracted twice with EtOAc. The combined organic layers were dried over anhydrous Na$_2$SO$_4$, filtered and concentrated under reduced pressure. The residue was lyophilized to afford the 6-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-6-oxohexanoic acid (185 mg, 55.9%) as a white solid. $^1$H NMR (400 MHz, MeOD-d$_4$) δ 8.87 (s, 1H), 7.47-7.40 (m, 4H), 4.63-4.49 (m, 5H), 4.37 (d, J=15.6 Hz, 1H), 3.89-3.82 (m, 1H), 3.81-3.79 (m, 1H), 2.48 (s, 3H), 2.31-2.27 (m, 5H), 2.10-2.08 (m, 1H), 1.66-1.60 (m, 4H), 1.03 (s, 9H). LCMS (ESI) m/z=[M+H]$^+$=559.2.

Example 46. Preparation of Intermediates

The following intermediates in Table B8 were prepared in a similar manner as described in Example 45 with (2S,4R)-1-[(2S)-2-amino-3,3-dimethyl-butanoyl]-4-hydroxy-N-[[4-(4-methyl thiazol-5-yl)phenyl]methyl]pyrrolidine-2-carboxamide and the appropriate carboxylic acid.

TABLE B8

| Intermediates | | | |
|---|---|---|---|
| Structure | Intermediate No. | Name | LCMS (ESI) m/z |
| 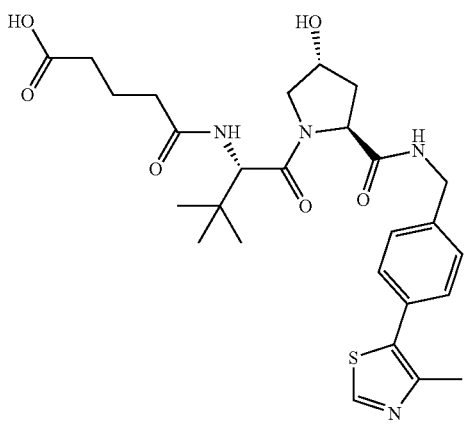 [SMILES: Cc1ncsc1-c1ccc(CNC(=O)[C@@H]2C[C@@H](O)CN2C(=O)[C@@H](NC(=O)CCCC(=O)O)C(C)(C)C)cc1] | I-46 | 5-[[(1S)-1-[(2S,4R)-4-hydroxy-2-[[4-(4-methylthiazol-5-yl)phenyl]methylcarbamoyl]pyrrolidine-1-carbonyl]-2,2-dimethyl-propyl]amino]-5-oxopentanoic acid | 567.4 |

TABLE B8-continued

| Structure | Intermediate No. | Name | LCMS (ESI) m/z |
|---|---|---|---|
| | I-47 | 9-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-9-oxononanoic acid | 601.4 |
| | I-48 | 16-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-16-oxohexadecanoic acid | 699.6 |

TABLE B8-continued

Intermediates

| Structure | Intermediate No. | Name | LCMS (ESI) m/z |
|---|---|---|---|
| | I-49 | N-(2-((4-(3-(3-methoxyazetidin-1-yl)phenyl)thiazol-2-yl)amino)-2-oxoethyl)-1-(methylsulfonyl)-1H-pyrrole-3-carboxamide | 651.4 |
| | I-51 | 4-[[(1S)-1-[(2S,4R)-4-hydroxy-2-[[4-(4-methylthiazol-5-yl)phenyl]methyl carbamoyl]pyrrolidine-1-carbonyl]-2,2-dimethyl-propyl]amino]-4-oxobutanoic acid | 531.2 |
| | I-54 | 12-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-12-oxododecanoic acid | 643.5 |

TABLE B8-continued

Intermediates

| Structure | Intermediate No. | Name | LCMS (ESI) m/z |
|---|---|---|---|
| | I-55 | 14-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-14-oxotetradecanoic acid | 671.4 |
| | I-58 | 16-(((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)amino)-16-oxohexadecanoic acid | 699.6 |

Example 47. Preparation of (S)-16-((2S,4R)-4-hydroxy-2-((4-(4-methylthiazol-5-yl)benzyl)carbamoyl)pyrrolidine-1-carbonyl)-17,17-dimethyl-14-oxo-3,6,9,12-tetraoxa-15-azaoctadecan-1-oic acid

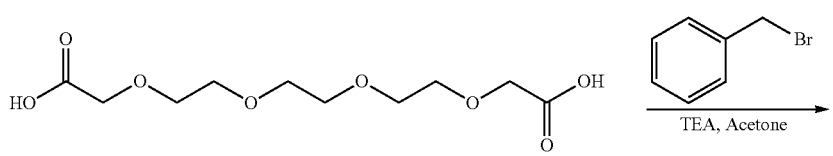

181 182
-continued
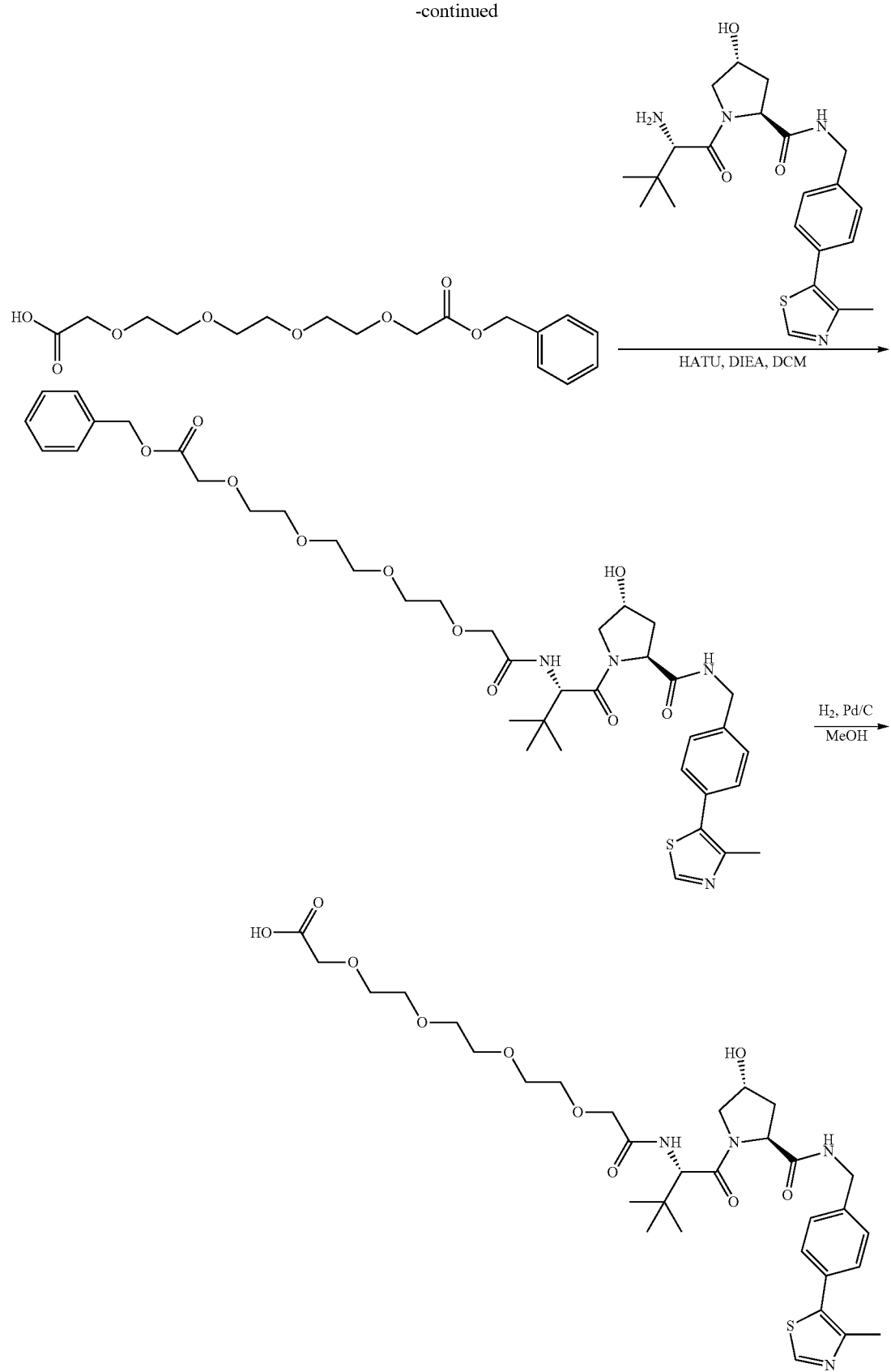

Step 1: Preparation of 3-oxo-1-phenyl-2,5,8,11,14-pentaoxahexadecan-16-oic acid

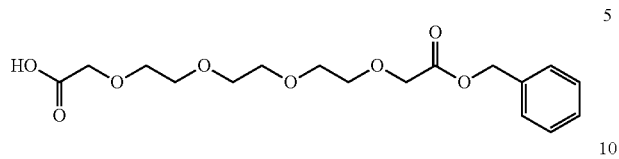

To a mixture of 2-[2-[2-[2-(carboxymethoxy)ethoxy]ethoxy]ethoxy]acetic acid (1 g, 3.76 mmol) and TEA (1.34 mL, 9.66 mmol) in acetone (5 mL) was added benzyl bromide (0.468 mL, 3.94 mmol) dropwise at 0° C. The mixture was stirred at 20° C. for 16 h. The mixture was filtered and the filter cake was washed by acetone. The filtrate was concentrated and the residue was dissolved in water. The mixture was extracted three times with EtOAc then treated by HCl (2 M) to adjust the pH=3-5. The mixture was extracted three times with EtOAc. The combined organic layer was washed with brine, then dried over Na$_2$SO$_4$, filtered and concentrated under vacuum to afford 3-oxo-1-phenyl-2,5,8,11,14-pentaoxahexadecan-16-oic acid (690 mg, 51.6% yield) as a yellow oil. $^1$H NMR (400 MHz, CDCl$_3$) δ 7.32-7.25 (m, 5H), 5.12 (s, 2H), 4.13 (s, 2H), 4.08 (s, 2H), 3.69-3.65 (m, 4H), 3.64-3.59 (m, 8H).

Step 2: Preparation of (S)-benzyl 16-((2S,4R)-4-hydroxy-2-((4-(4-methylthiazol-5-yl)benzyl)carbamoyl)pyrrolidine-1-carbonyl)-17,17-dimethyl-14-oxo-3,6,9,12-tetraoxa-15-azaoctadecan-1-oate

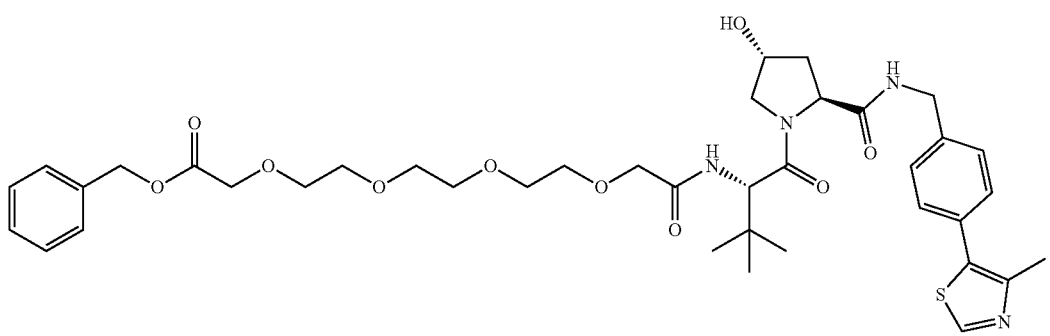 [SMILES: Cc1ncsc1-c1ccc(CNC(=O)[C@@H]2C[C@@H](O)CN2C(=O)[C@@H](NC(=O)COCCOCCOCCOCC(=O)OCc2ccccc2)C(C)(C)C)cc1]

To a solution of 3-oxo-1-phenyl-2,5,8,11,14-pentaoxahexadecan-16-oic acid (572 mg, 1.61 mmol) in DCM (6 mL) was added HATU (795 mg, 2.09 mmol) and DIEA (728 µL, 4.18 mmol). (2S,4R)-1-[(2S)-2-amino-3,3-dimethyl-butanoyl]-4-hydroxy-N-[[4-(4-methylthiazol-5-yl)phenyl]methyl]pyrrolidine-2-carboxamide hydrochloride (600 mg, 1.28 mmol) was added to the mixture. The mixture was stirred at 30° C. for 2 h. The mixture was concentrated under vacuum to give yellow solid. The residue was purified by reverse phase flash chromatography (FA condition) to give (S)-benzyl 16-((2S,4R)-4-hydroxy-2-((4-(4-methylthiazol-5-yl)benzyl)carbamoyl)pyrrolidine-1-carbonyl)-17,17-dimethyl-14-oxo-3,6,9,12-tetraoxa-15-azaoctadecan-1-oate (810 mg, 72.0%) as a yellow oil. $^1$H NMR (400 MHz, CDCl$_3$) δ 8.70 (s, 1H), 7.41-7.34 (m, 10H), 4.77-4.76 (m, 1H), 4.63-4.47 (m, 3H), 4.38-4.33 (m, 1H), 4.22 (s, 2H), 4.13 (d, J=11.2 Hz, 1H), 4.08-3.96 (m, 2H), 3.75-3.59 (m, 12H), 2.64-2.55 (m, 1H), 2.54 (s, 3H), 2.19-2.09 (m, 1H), 0.97 (s, 9H). LCMS (ESI) m/z: [M+H]$^+$=769.4.

Step 3: Preparation of (S)-16-((2S,4R)-4-hydroxy-2-((4-(4-methylthiazol-5-yl)benzyl)carbamoyl) pyrrolidine-1-carbonyl)-17,17-dimethyl-14-oxo-3,6,9,12-tetraoxa-15-azaoctadecan-1-oic acid

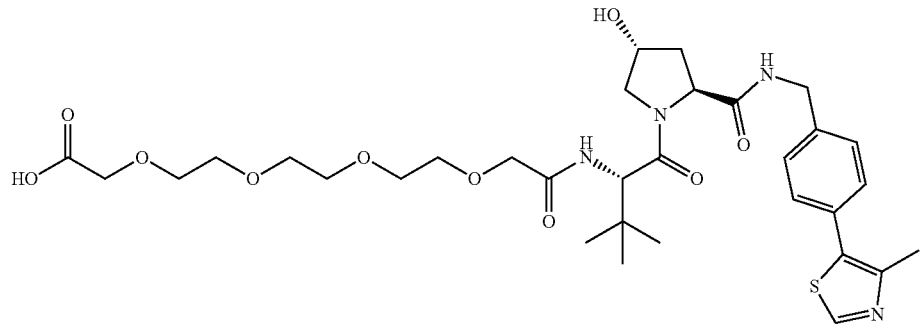 [SMILES: Cc1ncsc1-c1ccc(CNC(=O)[C@@H]2C[C@@H](O)CN2C(=O)[C@@H](NC(=O)COCCOCCOCCOCC(=O)O)C(C)(C)C)cc1]

To a mixture of (S)-benzyl 16-((2S,4R)-4-hydroxy-2-((4-(4-methylthiazol-5-yl)benzyl)carbamoyl)pyrrolidine-1-carbonyl)-17,17-dimethyl-14-oxo-3,6,9,12-tetraoxa-15-azaoctadecan-1-oate (780 mg, 1.01 mmol) in MeOH (5 mL) was added Pd/C (10%, 216 mg, 0.203 mmol). The mixture was purged by $H_2$ then pressured by $H_2$ (15 psi) and stirred at 25° C. for 12 h and then at 40° C. for 8 h. The mixture was filtered and the filtrate was concentrated under vacuum. The residue was purified by reverse phase flash chromatography ($NH_4OH$ condition) to give (S)-16-((2S,4R)-4-hydroxy-2-((4-(4-methylthiazol-5-yl)benzyl)carbamoyl)pyrrolidine-1-carbonyl)-17,17-dimethyl-14-oxo-3,6,9,12-tetraoxa-15-azaoctadecan-1-oic acid (300 mg, 42.9%) as a white solid. $^1$H NMR (400 MHz, Methanol-$d_4$) δ 8.90 (s, 1H), 7.55-7.39 (m, 4H), 4.62-4.51 (m, 3H), 4.42-4.35 (m, 1H), 4.16-4.12 (m, 2H), 4.08 (d, J=3.6 Hz, 2H), 3.93-3.79 (m, 2H), 3.75-3.64 (m, 13H), 2.52-2.49 (m, 3H), 2.29-2.21 (m, 1H), 2.17-2.06 (m, 1H), 1.08-1.04 (m, 9H). LCMS (ESI) m/z: $[M+H]^+$=679.2.

Example 48. Preparation of 1-(2-[[2-(2,6-dioxopiperidin-3-yl)-1,3-dioxoisoindol-5-yl]oxy]ethyl)piperidine-4-carboxylic acid (I-61)

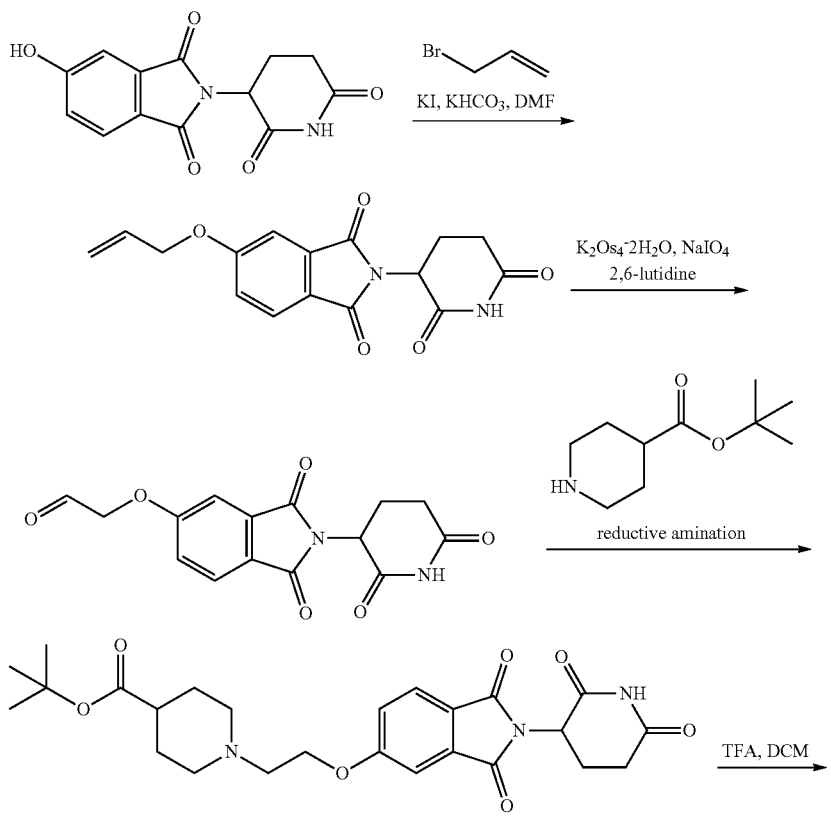

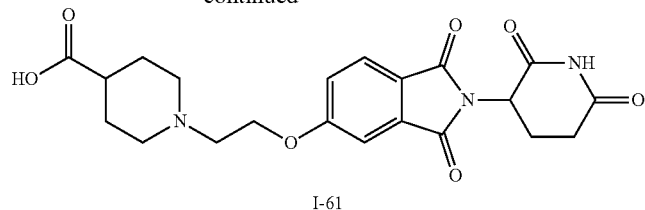

I-61

Step 1: Preparation of 2-(2,6-dioxopiperidin-3-yl)-5-(prop-2-en-1-yloxy)isoindole-1,3-dione

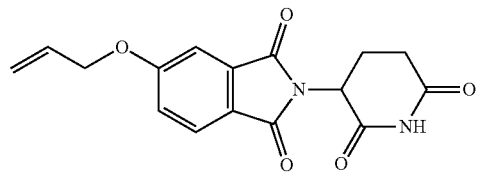 [SMILES: C=CCOc1ccc2c(c1)C(=O)N(C1CCC(=O)NC1=O)C2=O]

To a solution of 2-(2,6-dioxopiperidin-3-yl)-5-hydroxyisoindole-1,3-dione (5.48 g, 20.0 mmol) and allyl bromide (3.63 g, 30.0 mmol) in DMF (50.0 mL) were added KI (332 mg, 2.00 mmol) and KHCO$_3$ (3.00 g, 30.0 mmol). The resulting mixture was stirred for 12 h at 65° C., then diluted with water and extracted three times with EtOAc. The combined organic layers were washed three times with brine and dried over anhydrous Na$_2$SO$_4$. After filtration, the filtrate was concentrated under reduced pressure. The residue was purified by silica gel column chromatography (hexane/EtOAc) to afford 2-(2,6-dioxopiperidin-3-yl)-5-(prop-2-en-1-yloxy)isoindole-1,3-dione (6.7 g, crude) as a yellow-green solid. LCMS (ESI) m/z: [M+H]$^+$=315.

Step 2: Preparation of 2-[[2-(2,6-dioxopiperidin-3-yl)-1,3-dioxoisoindol-5-yl]oxy]acetaldehyde

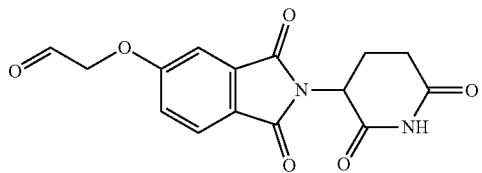 [SMILES: O=CCOc1ccc2c(c1)C(=O)N(C1CCC(=O)NC1=O)C2=O]

To a solution of 2-(2,6-dioxopiperidin-3-yl)-5-(prop-2-en-1-yloxy)isoindole-1,3-dione (3.14 g, 9.99 mmol) in dioxane (30.0 mL) were added NaIO$_4$ (10.7 g, 50.0 mmol), water (3.00 mL), and 2,6-lutidine (3.21 g, 30.0 mmol). To the above mixture was added K$_2$OsO$_4$ dihydrate (0.37 g, 0.999 mmol) at room temperature. The resulting mixture was stirred for additional an 2 h at room temperature. The reaction was quenched with water at room temperature and the resulting mixture was extracted three times with EtOAc. The combined organic layers were washed three times with brine and dried over anhydrous Na$_2$SO$_4$. After filtration, the filtrate was concentrated under reduced pressure. This resulted in 2-[[2-(2,6-dioxopiperidin-3-yl)-1,3-dioxoisoindol-5-yl]oxy]acetaldehyde (1.83 g, 57.9%) as a light brown solid. LCMS (ESI) m/z: [M+H]$^+$=317.

Step 3: Preparation of tert-butyl 1-(2-[[2-(2,6-dioxopiperidin-3-yl)-1,3-dioxoisoindol-5-yl]oxy]ethyl)piperidine-4-carboxylate

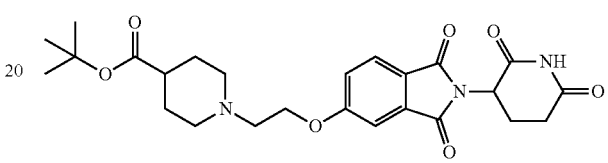

To a solution of 2-[[2-(2,6-dioxopiperidin-3-yl)-1,3-dioxoisoindol-5-yl]oxy]acetaldehyde (1.83 g, 5.79 mmol) and tert-butyl piperidine-4-carboxylate (1.07 g, 5.79 mmol) in DMF (35.0 mL) was added NaBH(OAc)$_3$ (3.68 g, 17.4 mmol). The resulting mixture was stirred for 3 h at room temperature. The residue was purified by reverse phase C18 flash chromatography (Water:ACN:FA) to afford tert-butyl 1-(2-[[2-(2,6-dioxopiperidin-3-yl)-1,3-dioxoisoindol-5-yl]oxy]ethyl)piperidine-4-carboxylate (1.16 g, 41.3%) as an off-white solid. LCMS (ESI) m/z: [M+H]$^+$=401.

Step 4: Preparation of 1-(2-[[2-(2,6-dioxopiperidin-3-yl)-1,3-dioxoisoindol-5-yl]oxy]ethyl)piperidine-4-carboxylic acid (I-61)

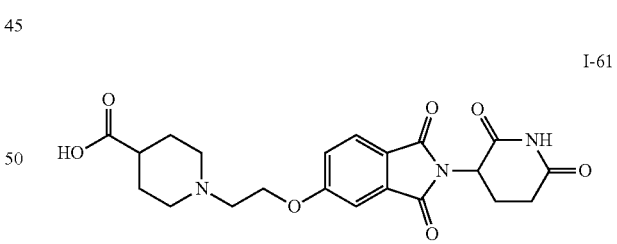

I-61

To a solution of tert-butyl 1-(2-[[2-(2,6-dioxopiperidin-3-yl)-1,3-dioxoisoindol-5-yl]oxy]ethyl)piperidine-4-carboxylate (1.16 g, 2.39 mmol) in DCM (10.0 mL) was added TFA (10.0 mL, 135 mmol). The resulting mixture was stirred for 5 h at room temperature. The residue was purified by reverse phase C18 flash chromatography (Water:ACN:FA) to afford I-61 (845 mg, 73.4%) as a white solid. $^1$H NMR (300 MHz, DMSO-d$_6$) δ 11.11 (s, 1H), 8.15 (d, 1H), 7.84 (d, 1H), 7.47 (d, 1H), 7.37 (dd, 1H), 5.12 (dd, 1H), 4.31 (t, 2H), 3.02-2.85 (m, 3H), 2.79 (t, 2H), 2.66-2.60 (m, 1H), 2.59-2.54 (m, 1H), 2.29-2.12 (m, 3H), 2.15-1.99 (m, 1H), 1.87-1.75 (m, 2H), 1.66-1.47 (m, 2H). LCMS (ESI) m/z: [M+H]$^+$=430.15.

Example 49. Preparation of N-[2-[(2-aminoethyl)(methyl)amino]ethyl]-2-[[2-(2,6-dioxopiperidin-3-yl)-1,3-dioxo-2,3-dihydro-1H-isoindol-4-yl]oxy]acetamide hydrochloride (I-63)

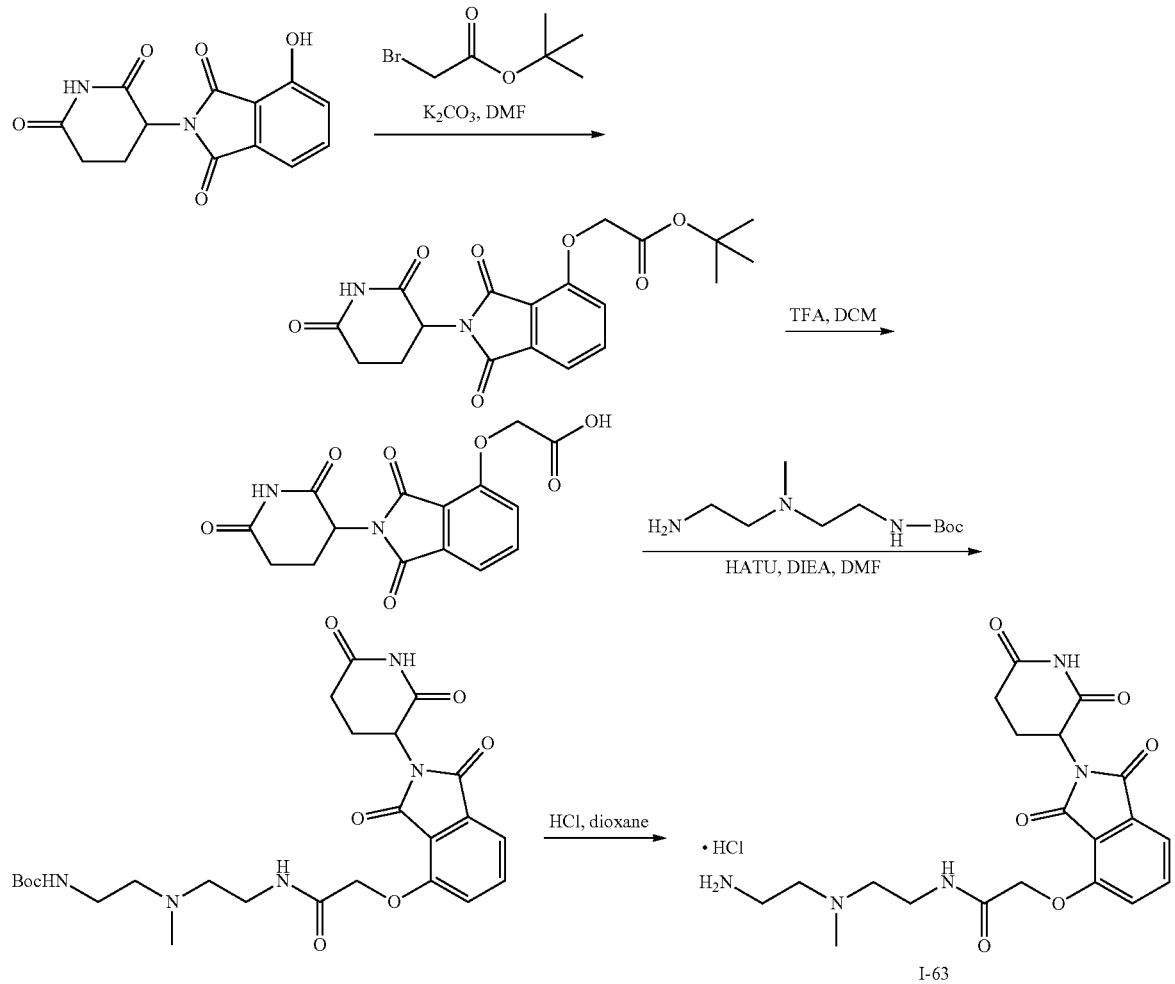

Step 1: Preparation of tert-butyl 2-[[2-(2,6-dioxopiperidin-3-yl)-1,3-dioxoisoindol-4-yl]oxy]acetate

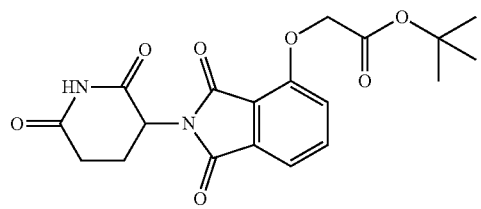 [SMILES: CC(C)(C)OC(=O)COc1cccc2c1C(=O)N(C1CCC(=O)NC1=O)C2=O]

To a solution of 2-(2,6-dioxopiperidin-3-yl)-4-hydroxyisoindole-1,3-dione (5.50 g, 20.1 mmol) in DMF (65.0 mL) were added tert-butyl 2-bromoacetate (3.91 g, 20.1 mmol) and K$_2$CO$_3$ (8.32 g, 60.2 mmol). The resulting solution was stirred at room temperature for 12 h. The solution was concentrated under reduced pressure. The residue was purified by silica gel column chromatography (petroleum ether/ EtOAc) to afford tert-butyl 2-[[2-(2,6-dioxopiperidin-3-yl)-1,3-dioxoisoindol-4-yl]oxy]acetate (5.2 g, 66.8%) as a white solid. LCMS (ESI) m/z: [M+H]$^+$=389.

Step 2: Preparation of [[2-(2,6-dioxopiperidin-3-yl)-1,3-dioxoisoindol-4-yl]oxy]acetic acid

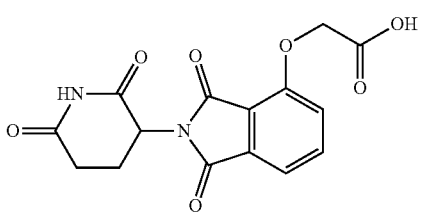 [SMILES: O=C(O)COc1cccc2c1C(=O)N(C1CCC(=O)NC1=O)C2=O]

A solution of tert-butyl 2-[[2-(2,6-dioxopiperidin-3-yl)-1,3-dioxoisoindol-4-yl]oxy]acetate (5.32 g, 13.7 mmol) in HCl in dioxane (4 N, 50.0 mL, 200 mmol) was stirred for 12 h at room temperature. The solution was concentrated under reduced pressure. The residue was purified by reverse phase C18 flash chromatography (Water:ACN) to afford [[2-(2,6-dioxopiperidin-3-yl)-1,3-dioxoisoindol-4-yl]oxy]acetic acid (4.66 g, 100%) as a white solid. LCMS (ESI) m/z: [M+H]$^+$= 333.

Step 3: Preparation of tert-butyl N-(2-[[2-(2-[[2-(2,6-dioxopiperidin-3-yl)-1,3-dioxoisoindol-4-yl]oxy]acetamido)ethyl](methyl)amino]ethyl)carbamate

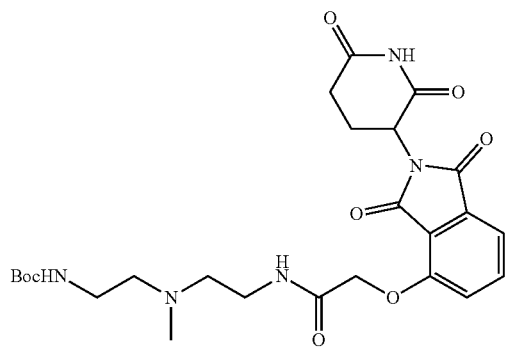 [SMILES: CN(CCNC(=O)COc1cccc2c1C(=O)N(C1CCC(=O)NC1=O)C2=O)CCNC(=O)OC(C)(C)C]

To a solution of [[2-(2,6-dioxopiperidin-3-yl)-1,3-dioxoisoindol-4-yl]oxy]acetic acid (926 mg, 2.79 mmol) in DCM (35.0 mL) were added tert-butyl N-[2-[(2-aminoethyl)(methyl)amino]ethyl]carbamate (908 mg, 4.18 mmol), HATU (1.59 g, 4.18 mmol) and DIEA (1.08 g, 8.36 mmol). The resulting solution was stirred at room temperature for 3 h. The residue was purified by silica gel column chromatography (petroleum ether/EtOAc) to afford tert-butyl N-(2-[[2-(2-[[2-(2,6-dioxopiperidin-3-yl)-1,3-dioxoisoindol-4-yl]oxy]acetamido)ethyl](methyl)amino]ethyl)carbamate (1.53 g, crude) as a light yellow solid. LCMS (ESI) m/z: [M+H]$^+$= 532.

Step 4: Preparation of N-[2-[(2-aminoethyl)(methyl)amino]ethyl]-2-[[2-(2,6-dioxopiperidin-3-yl)-1,3-dioxo-2,3-dihydro-1H-isoindol-4-yl]oxy]acetamide hydrochloride (I-63)

A solution of tert-butyl N-(2-[[2-(2-[[2-(2,6-dioxopiperidin-3-yl)-1,3-dioxoisoindol-4-yl]oxy]acetamido)ethyl](methyl)amino]ethyl)carbamate (600 mg, 1.13 mmol) was prepared in 4 NM HCl (123 mg, 3.39 mmol) in dioxane (20.0 mL) stirred at room temperature for 2 h. The resulting mixture was concentrated under reduced pressure. The residue was purified by reverse phase O18 flash chromatography (Water:ACN) to afford N-[2-[(2-aminoethyl)(methyl)amino]ethyl]-2-[[2-(2,6-dioxopiperidin-3-yl)-1,3-dioxo-2,3-dihydro-1H-isoindol-4-yl]oxy]acetamide (I-63, 200 mg, 41.1%) as a yellow solid.

LCMS (ESI) m/z: [M+H]$^+$=432.18.

Example 50. Preparation of Intermediates

The intermediates in Table B9 were prepared in a similar manner as described in example 49 beginning with the appropriate subsisted phenol and amine.

TABLE B9

| Structures | # | Name | LCMS (ESI) m/z: [M + H]$^+$ |
|---|---|---|---|
|  | I-25 | N-[2-[(2-aminoethyl)(methyl)amino]ethyl]-2-[[2-(2,6-dioxo-piperidin-3-yl)-1,3-dioxo-isoindol-5-yl]oxy]acetamide formate | 432.20 |

TABLE B9-continued

| Structures | # | Name | LCMS (ESI) m/z: [M + H]+ |
|---|---|---|---|
| | I-89 | N-(2-(2-(2-aminoethoxy)ethoxy)ethyl)-2-((2-(2,6-dioxopiperidin-3-yl)-1,3-dioxoisoindolin-4-yl)oxy)acetamide | 463.25 |
| | | N-(2-(2-(2-(2-aminoethoxy)ethoxy)ethoxy)ethyl)-2-((2-(2,6-dioxopiperidin-3-yl)-1,3-dioxoisoindolin-5-yl)oxy)acetamide formate | 507.20 |
| | | N-(2-(2-(2-aminoethoxy)ethoxy)ethyl)-2-((2-(2,6-dioxopiperidin-3-yl)-1,3-dioxoisoindolin-5-yl)oxy)acetamide formate | 463.20 |
| | | N-(2-(2-(2-(2-aminoethoxy)ethoxy)ethoxy)ethyl)-2-((2-(2,6-dioxopiperidin-3-yl)-1,3-dioxoisoindolin-4-yl)oxy)acetamide formate | 507.20 |

Example 51. Preparation of 4-(2-[2-[(2-aminoethyl)(methyl)amino]ethoxy]ethoxy)-2-(2,6-dioxopiperidin-3-yl)isoindole-1,3-dione formate (I-29)

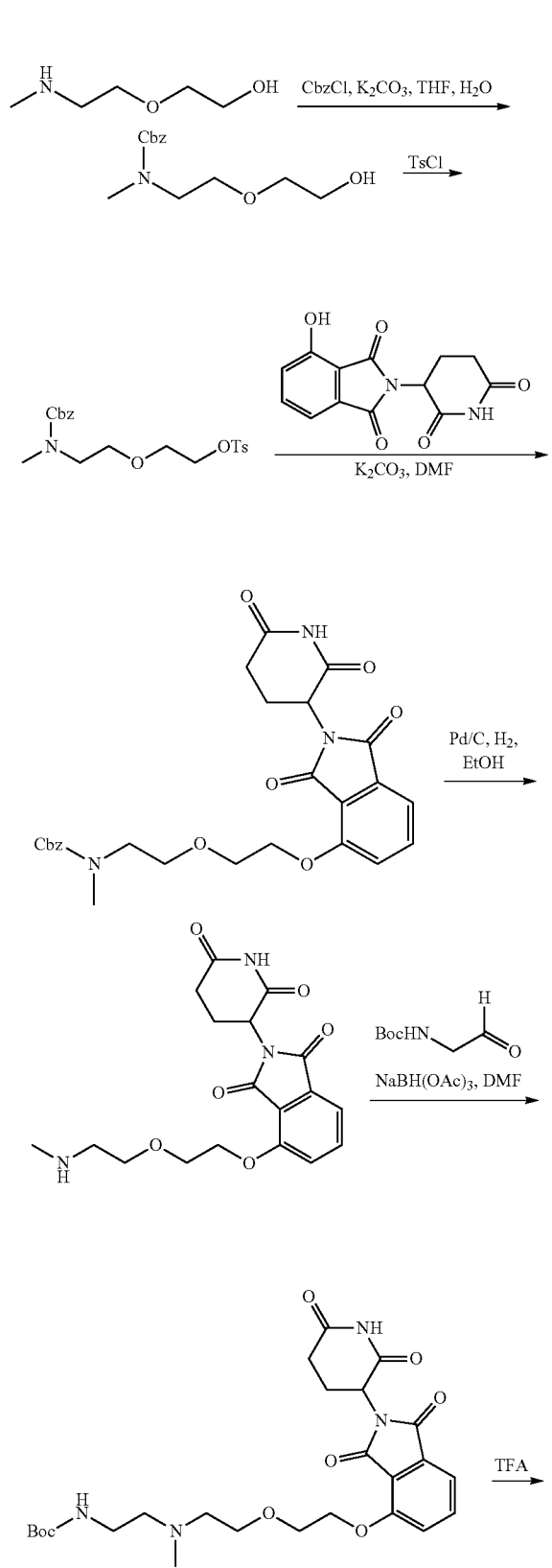

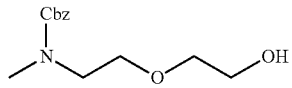 [SMILES: CN(CCOCCO)C(=O)OCc1ccccc1]

I-29

Step 1: Preparation of benzyl N-[2-(2-hydroxyethoxy)ethyl]-N-methylcarbamate

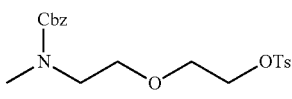

To the solution of 2-(2-(methylamino)ethoxy)ethan-1-ol (10.0 g, 83.9 mmol) in THF (30.0 mL) was added benzyl chloroformate (2.29 g, 13.4 mmol), $K_2CO_3$ (3.83 g, 27.7 mmol) and water (30.0 mL). The resulting mixture was stirred at room temperature for 12 h, then extracted three times with EtOAc. The combined organic layers were washed three times with brine and dried over anhydrous $Na_2SO_4$. After filtration, the liquid was concentrated under reduced pressure and purified by reverse phase C18 flash chromatography (Water:ACN:$NH_4HCO_3$) to afford benzyl N-[2-(2-hydroxyethoxy)ethyl]-N-methylcarbamate (2.14 g, 17.5%) as a colorless oil; LCMS (ESI) m/z: $[M+H]^+$=254.

Step 2: Preparation of benzyl N-methyl-N-(2-[2-[(4-methylbenzenesulfonyl)oxy]ethoxy]ethyl)carbamate To a stirred solution of benzyl N-[2-(2-hydroxyethoxy)ethyl]-N-methylcarbamate (2.14 g, 8.45 mmol) in DCM (30.0 mL) was added DMAP (0.15 g, 1.27 mmol), TEA (2.14 g, 21.1 mmol) and p-toluenesulfonyl chloride (2.42 g, 12.7 mmol) at 0° C. The resulting mixture was stirred for 2 h at 0° C., then stirred for an additional 5 h at room temperature. The residue was purified by silica gel column chromatography (Petroleum ether/THF) to afford benzyl N-methyl-N-(2-[2-[(4-methylbenzenesulfonyl)oxy]ethoxy]ethyl)carbamate (3.51 g, crude) as a colorless oil; LCMS (ESI) m/z: $[M+^H]^+$=408.

Step 3: Preparation of benzyl N-[2-(2-[[2-(2,6-di-oxopiperidin-3-yl)-1,3-dioxoisoindol-4-yl]oxy]ethoxy)ethyl]-N-methylcarbamate

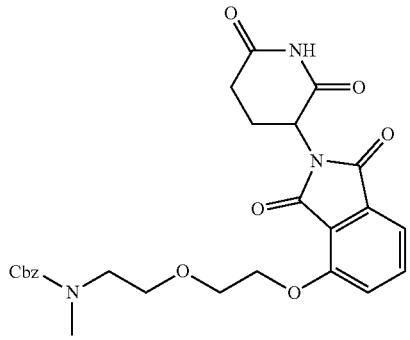 [SMILES: CN(CCOCCOc1cccc2c1C(=O)N(C1CCC(=O)NC1=O)C2=O)C(=O)OCc1ccccc1]

To a solution of benzyl N-methyl-N-(2-[2-[(4-methylbenzenesulfonyl)oxy]ethoxy]ethyl)carbamate (3.51 g, 8.61 mmol) in DMF (30.0 mL) was added 2-(2,6-dioxopiperidin-3-yl)-4-hydroxyisoindole-1,3-dione (2.36 g, 8.61 mmol) and Na$_2$CO$_3$ (1.37 g, 12.9 mmol). The resulting mixture was stirred at 80° C. for 12 h and then concentrated. The residue was purified by reverse phase flash C18 chromatography under the following conditions (Water:ACN) to afford benzyl N-[2-(2-[[2-(2,6-dioxopiperidin-3-yl)-1,3-dioxoisoindol-4-yl]oxy]ethoxy)ethyl]-N-methylcarbamate (1.53 g, 34.8%) as a light yellow solid; LCMS (ESI) m/z: [M+H]$^+$=510.

Step 4: Preparation of 2-(2,6-dioxopiperidin-3-yl)-4-[2-[2-(methylamino)ethoxy]ethoxy]isoindole-1,3-dione

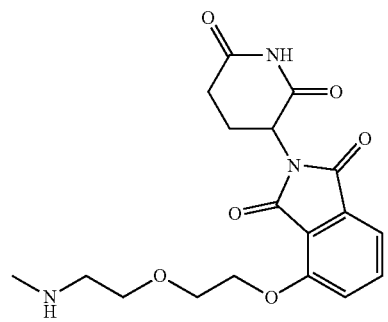 [SMILES: CNCCOCCOc1cccc2c1C(=O)N(C1CCC(=O)NC1=O)C2=O]

To the solution of benzyl N-[2-(2-[[2-(2,6-dioxopiperidin-3-yl)-1,3-dioxoisoindol-4-yl]oxy]ethoxy)ethyl]-N-methylcarbamate (1.52 g, 3.00 mmol) in EtOH (30.0 mL) was added ammonium formate (378 mg, 5.99 mmol) and Pd(OH)$_2$/C (5.43 mmol). The resulting suspension was stirred at 60° C. for 12 h under 1 atmosphere of hydrogen, then filtered. The filter cake was washed three times with MeOH, and the filtrate concentrated under reduced pressure to afford 2-(2,6-dioxopiperidin-3-yl)-4-[2-[2-(methylamino)ethoxy]ethoxy]isoindole-1,3-dione (1.06 g, 94.8%) as a light yellow solid; LCMS (ESI) m/z [M+H]$^+$=376.

Step 5: Preparation of tert-butyl N-(2-[[2-(2-[[2-(2,6-dioxopiperidin-3-yl)-1,3-dioxoisoindol-4-yl]oxy]ethoxy)ethyl](methyl)amino]ethyl)carbamate

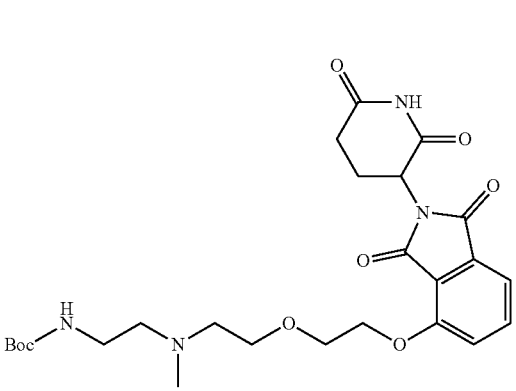 [SMILES: CN(CCNC(=O)OC(C)(C)C)CCOCCOc1cccc2c1C(=O)N(C1CCC(=O)NC1=O)C2=O]

To a solution of 2-(2,6-dioxopiperidin-3-yl)-4-[2-[2-(methylamino)ethoxy]ethoxy]isoindole-1,3-dione (1.06 g, 2.82 mmol) in DMF (10.0 mL) was added tert-butyl N-(2-oxoethyl)carbamate (539 mg, 3.39 mmol) and NaBH(OAc)$_3$ (1.80 g, 8.47 mmol). The resulting solution was stirred at room temperature for 2 h. Follow aqueous workup, extraction with DCM, and concentration under reduced pressure, the residue was purified by silica gel column chromatography (DCM/MeOH) to afford tert-butyl N-(2-[[2-(2-[[2-(2,6-dioxopiperidin-3-yl)-1,3-dioxoisoindol-4-yl]oxy]ethoxy)ethyl](methyl)amino]ethyl)carbamate (386 mg, 26.4%) as a light yellow solid; LCMS (ESI) m/z: [M+H]$^+$=519.

Step 6: Preparation of 4-(2-[2-[(2-aminoethyl)(methyl)amino]ethoxy]ethoxy)-2-(2,6-dioxopiperidin-3-yl)isoindole-1,3-dione formate (I-29)

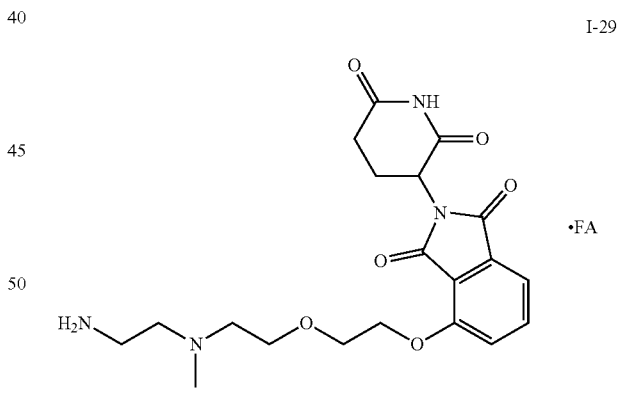

I-29

To the solution of tert-butyl N-(2-[[2-(2-[[2-(2,6-dioxopiperidin-3-yl)-1,3-dioxoisoindol-4-yl]oxy]ethoxy)ethyl](methyl)amino]ethyl)carbamate (511 mg, 0.985 mmol) in DCM (5.00 mL) was added TFA (5.00 mL, 67.3 mmol). The resulting solution was stirred at room temperature for 3 h. The solution was concentrated and the residue was purified by reverse phase C18 flash chromatography under the following conditions (Water:ACN) to afford I-29 (307 mg, 73.9%) as a brown oil; $^1$H NMR (300 MHz, DMSO-d$_6$) δ 11.70-10.30 (m, 1H), 8.18 (s, 1H, formic acid), 7.83 (dd, 1H), 7.51 (dd, 2H), 5.09 (dd, 1H), 4.41-4.32 (m, 2H), 3.84-3.75 (m, 2H), 3.63 (d, 2H), 2.99-2.80 (m, 3H), 2.65-

2.58 (m, 5H), 2.24 (s, 3H), 2.08 (s, 1H), 1.98-2.06 (m, 1H); LCMS (ESI) m/z: [M+H]$^+$=419.

Example 52. Preparation of 5-(azetidin-3-yloxy)-2-(2,6-dioxopiperidin-3-yl) isoindole-1,3-dione (I-33)

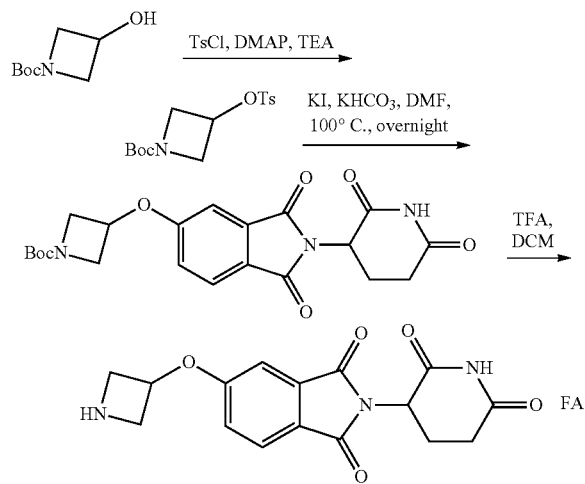

Step 1: Preparation of tert-butyl 3-[(4-methylbenzenesulfonyl)oxy]azetidine-1-carboxylate

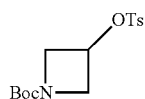

To a stirred solution of tert-butyl 3-hydroxyazetidine-1-carboxylate (2.50 g, 14.4 mmol) and p-toluenesulfonyl chloride (4.13 g, 21.7 mmol) in DCM was added DMAP (264 mg, 2.17 mmol) and TEA (4.38 g, 43.3 mmol) in portions at 0° C. The resulting mixture was concentrated under reduced pressure and the residue purified by silica gel column chromatography (Petroleum ether/EtOAc) to afford tert-butyl 3-[(4-methylbenzenesulfonyl)oxy]azetidine-1-carboxylate (4.4 g, 93.1%) as a brown oil. LCMS (ESI) m/z: [M+H]$^+$=328.

Step 2: Preparation of tert-butyl 3-[[2-(2,6-dioxopiperidin-3-yl)-1,3-dioxoisoindol-5-yl] oxy]azetidine-1-carboxylate

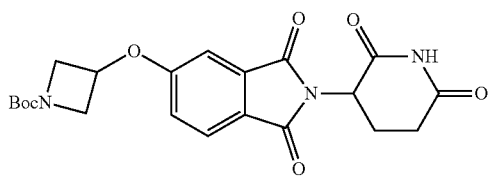 [SMILES: CC(C)(C)OC(=O)N1CC(Oc2ccc3c(c2)C(=O)N(C2CCC(=O)NC2=O)C3=O)C1]

To a stirred solution of tert-butyl 3-[(4-methylbenzenesulfonyl)oxy]azetidine-1-carboxylate (4.40 g, 13.4 mmol) and KI (0.22 g, 1.34 mmol) in DMF was added KHCO$_3$ (4.04 g, 40.3 mmol) in portions. After stirring for 8 h at 100° C. the resulting mixture was extracted three times with of EtOAc and the organic extracts concentrated under reduced pressure. The residue was purified by reverse phase C18 flash chromatography (Water:ACN) to afford tert-butyl 3-[[2-(2,6-dioxopiperidin-3-yl)-1,3-dioxoisoindol-5-yl] oxy]azetidine-1-carboxylate (1.73 g, 30.0%) as an off-white solid. LCMS (ESI) m/z: [M+H]$^+$=430.

Step 3: Preparation of 5-(azetidin-3-yloxy)-2-(2,6-dioxopiperidin-3-yl)isoindole-1,3-dione formate (I-33)

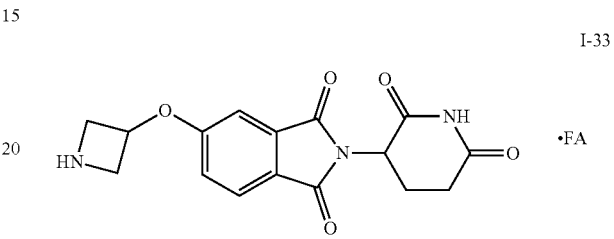

A solution of tert-butyl 3-[[2-(2,6-dioxopiperidin-3-yl)-1,3-dioxoisoindol-5-yl] oxy]azetidine-1-carboxylate (1.53 g, 3.56 mmol) and TFA (5.00 mL, 67.3 mmol) in DCM was stirred for 2 h at room temperature. The resulting mixture was concentrated under reduced pressure and the residue purified by reverse phase C18 flash chromatography under the following conditions (Water:ACN) to afford I-33 (1.08 g, 96.4%) as a white solid. $^1$H NMR (300 MHz, DMSO-d$_6$) δ 11.11 (s, 1H), 8.25 (s, formic acid, 1H), 7.88 (d, 1H), 7.32 (d, 2H), 5.30 (p, 1H), 5.13 (dd, 1H), 4.31 (dd, 2H), 3.89 (dd, 2H), 2.99-2.80 (m, 1H), 2.68-2.52 (m, 2H), 2.13-1.97 (m, 1H). LCMS (ESI) m/z: [M+H]$^+$=330.05.

Example 53. Preparation of 5-[7-azaspiro[3.5]nonan-2-yloxy]-2-(2,6-dioxopiperidin-3-yl)isoindole-1,3-dione formate (I-35)

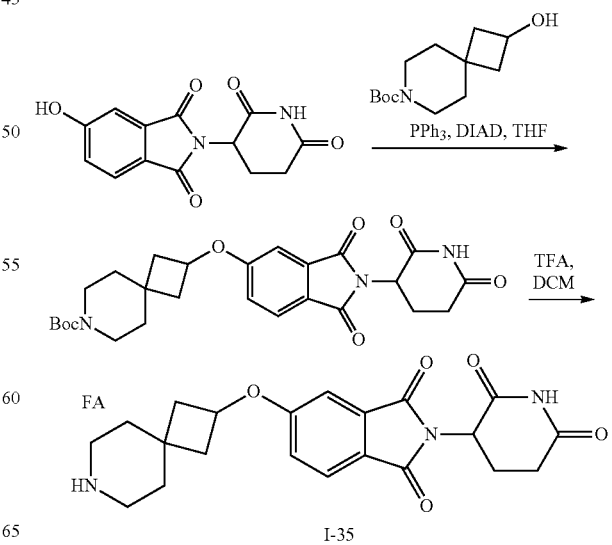

Step 1: Preparation of tert-butyl 2-[[2-(2,6-dioxopiperidin-3-yl)-1,3-dioxoisoindol-5-yl]oxy]-7-azaspiro[3.5]nonane-7-carboxylate

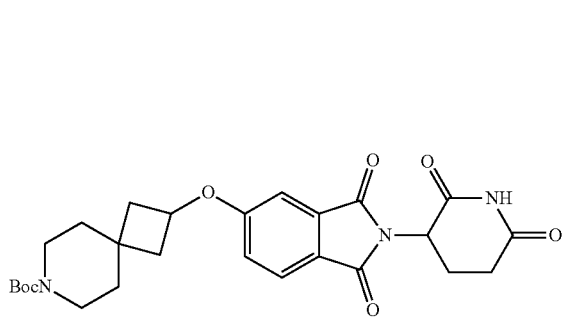 [SMILES: CC(C)(C)OC(=O)N1CCC2(CC1)CC(Oc1ccc3c(c1)C(=O)N(C1CCC(=O)NC1=O)C3=O)C2]

To a solution of 2-(2,6-dioxopiperidin-3-yl)-5-hydroxyisoindole-1,3-dione (1.37 g, 4.99 mmol) and tert-butyl 2-hydroxy-7-azaspiro[3.5]nonane-7-carboxylate (1.81 g, 7.49 mmol) in THF (30.0 mL) was added PPh$_3$ (1.97 g, 7.49 mmol). To this mixture was added DIAD (1.52 g, 7.49 mmol) dropwise over 10 min at 0° C. The reaction was stirred for an additional 5 h at room temperature. The resulting mixture was concentrated under reduced pressure, and the residue purified by reverse phase C18 flash chromatography (Water:ACN:FA) to afford tert-butyl 2-[[2-(2,6-dioxopiperidin-3-yl)-1,3-dioxoisoindol-5-yl]oxy]-7-azaspiro[3.5]nonane-7-carboxylate (1.96 g, 79.0%) as a white solid; LCMS (ESI) m/z: [M+H]$^+$=498.

Step 2: Preparation of 5-[7-azaspiro[3.5]nonan-2-yloxy]-2-(2,6-dioxopiperidin-3-yl)isoindole-1,3-dione formate (I-35)

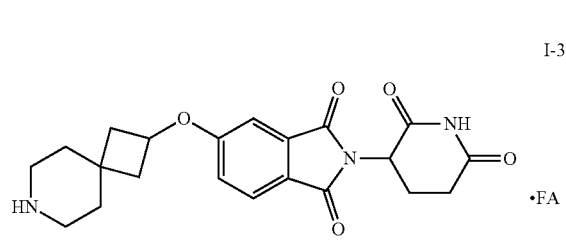

To a solution of tert-butyl 2-[[2-(2,6-dioxopiperidin-3-yl)-1,3-dioxoisoindol-5-yl]oxy]-7-azaspiro[3.5]nonane-7-carboxylate (1.96 g, 3.94 mmol) in DCM (10.0 mL) was added TFA (10.0 mL, 135 mmol). The resulting mixture was stirred for 5 h at room temperature, then concentrated and purified by reverse phase C18 flash chromatography (Water:ACN:FA) to afford I-35 (1.63 g, 93.1%) as a light grey solid: $^1$H NMR (300 MHz, DMSO-d$_6$) δ 8.39 (s, formic acid, 1H), 7.84 (d, 1H), 7.35-7.24 (m, 2H), 5.12 (dd, 1H), 5.00 (p, 1H), 3.00-2.81 (m, 5H), 2.67-2.43 (m, 2H), 2.51-2.43 (m, 3H), 2.16-1.95 (m, 1H), 1.95-1.82 (m, 2H), 1.65-1.78 (m, 4H); LCMS (ESI) m/z: [M+H]$^+$=398.16.

Example 54. Preparation of 2-(2,6-dioxopiperidin-3-yl)-5-[2-(piperazin-1-yl)ethoxy]isoindole-1,3-dione formate (I-36)

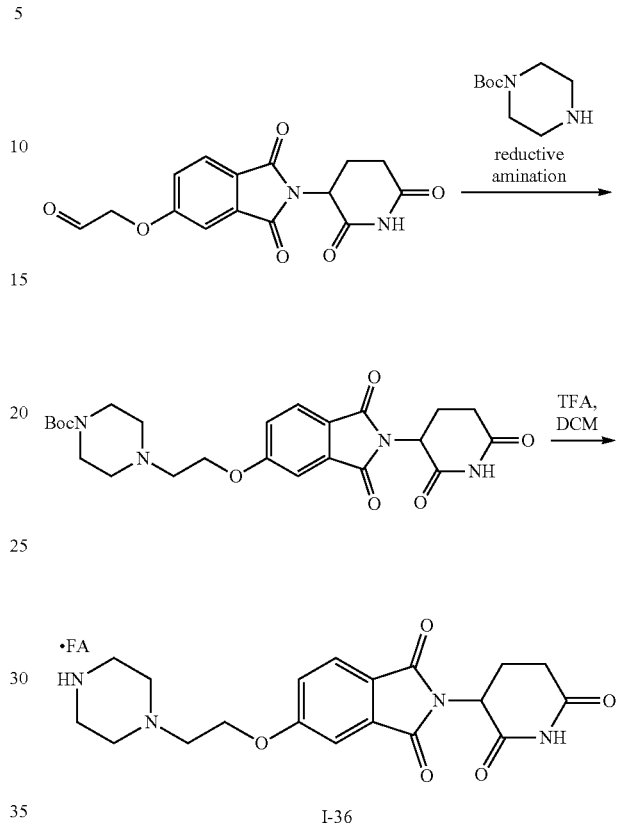

Step 1: Preparation of tert-butyl 4-(2-[[2-(2,6-dioxopiperidin-3-yl)-1,3-dioxoisoindol-5-yl]oxy]ethyl)piperazine-1-carboxylate

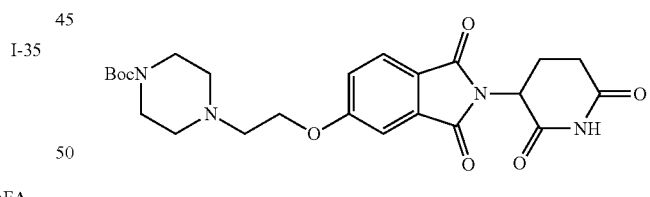

To a solution of 2-((2-(2,6-dioxopiperidin-3-yl)-1,3-dioxoisoindolin-5-yl)oxy)acetaldehyde (628 mg, 1.99 mmol) and tert-butyl piperazine-1-carboxylate (370 mg, 1.99 mmol) in DMF (10.0 mL) was added NaBH(OAc)$_3$ (1.26 g, 5.96 mmol) at room temperature. The resulting mixture was stirred for 3 h at room temperature then quenched with water, extracted into DCM, and concentrated. The residue was purified by reverse phase C18 flash chromatography under the following conditions (Water:ACN:FA) to afford tert-butyl 4-(2-[[2-(2,6-dioxopiperidin-3-yl)-1,3-dioxoisoindol-5-yl]oxy]ethyl)piperazine-1-carboxylate (812 mg, 84.05%) as an off-white solid; LCMS (ESI) m/z: [M+H]$^+$= 487.

Step 2: Preparation of 2-(2,6-dioxopiperidin-3-yl)-5-[2-(piperazin-1-yl)ethoxy]isoindole-1,3-dione formate (I-36)

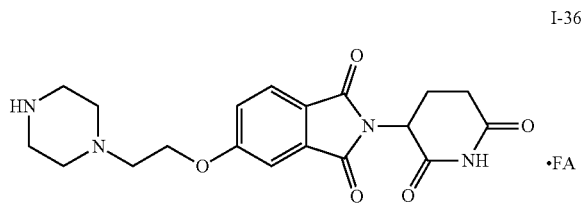

I-36

To a solution tert-butyl 4-(2-[[2-(2,6-dioxopiperidin-3-yl)-1,3-dioxoisoindol-5-yl]oxy]ethyl)piperazine-1-carboxylate (2.10 g, 4.32 mmol) in DCM (10.0 mL) was added TFA (10.0 mL, 135 mmol). The resulting mixture was stirred for 3 h at room temperature, then concentrated under reduced pressure. The residue was purified by reverse phase C18 flash chromatography (Water:ACN:FA) to afford I-36 (1.43 g, 74.2%) as a white solid; $^1$H NMR (300 MHz, DMSO-$d_6$) δ 11.07 (s, 1H), 8.34 (s, 1H), 7.84 (d, 1H), 7.47 (d, 1H), 7.37 (dd, 1H), 5.12 (dd, 1H), 4.30 (t, 2H), 2.99-2.86 (m, 5H), 2.77 (t, 2H), 2.67-2.55 (m, 5H), 2.13-1.96 (m, 1H). LCMS (ESI) m/z: [M+H]$^+$=387.16.

Example 55. Preparation of 5-[4-(azetidin-3-ylmethyl)piperazin-1-yl]-2-(2,6-dioxopiperidin-3-yl)isoindole-1,3-dione formate (I-40)

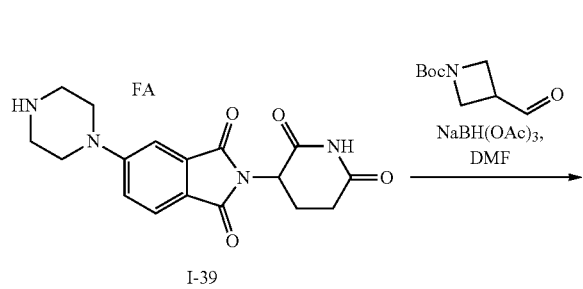

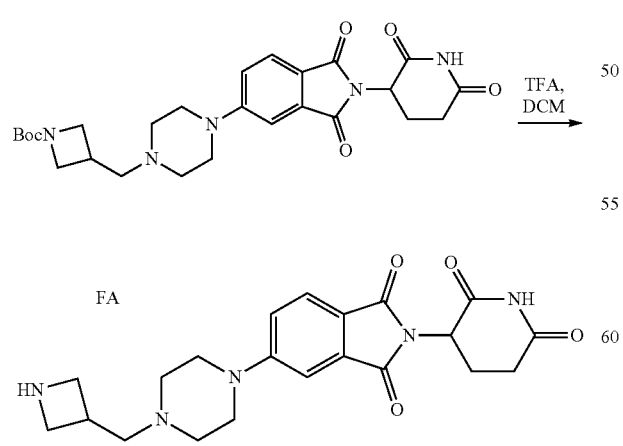

Step 1: Preparation of tert-butyl 3-([4-[2-(2,6-dioxopiperidin-3-yl)-1,3-dioxoisoindol-5-yl]piperazin-1-yl]methyl)azetidine-1-carboxylate

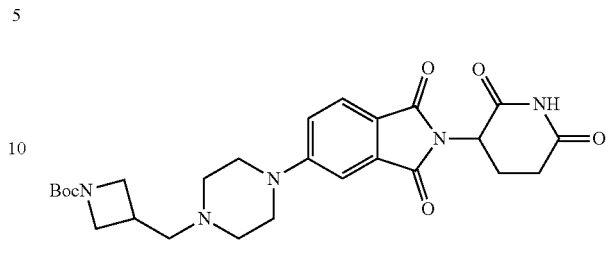

To a solution of 2-(2,6-dioxopiperidin-3-yl)-5-(piperazin-1-yl)isoindole-1,3-dione formate (1.10 g, 3.21 mmol) and tert-butyl 3-formylazetidine-1-carboxylate (595 mg, 3.21 mmol) in DMF (10.0 mL) was added NaBH(OAc)$_3$ (2.04 g, 9.64 mmol). The resulting mixture was stirred for 3 h at room temperature. After aqueous workup, DCM extraction, and concentration, the residue was purified by reverse phase C18 flash chromatography under the following conditions (Water:ACN:FA) to afford tert-butyl 3-([4-[2-(2,6-dioxopiperidin-3-yl)-1,3-dioxoisoindol-5-yl]piperazin-1-yl]methyl)azetidine-1-carboxylate (991 mg, 60.3%) as a light yellow solid; LCMS (ESI) m/z: [M+H]$^+$=512.

Step 2: Preparation of 5-[4-(azetidin-3-ylmethyl)piperazin-1-yl]-2-(2,6-dioxopiperidin-3-yl)isoindole-1,3-dione formate (I-40)

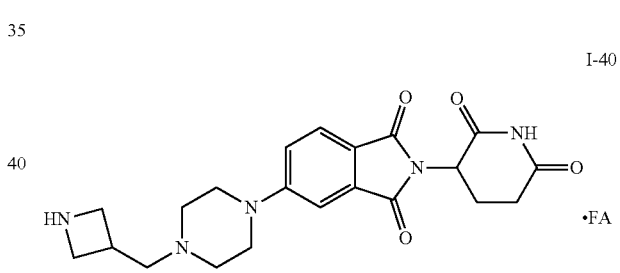

To a solution of tert-butyl 3-([4-[2-(2,6-dioxopiperidin-3-yl)-1,3-dioxoisoindol-5-yl]piperazin-1-yl]methyl)azetidine-1-carboxylate (991 mg, 1.94 mmol) in DCM (10.0 mL) was added TFA (10.0 mL, 135 mmol). The resulting mixture was stirred for 3 h at room temperature, then concentrated under reduced pressure. The residue was purified by reverse phase C18 flash chromatography (Water:ACN:FA) to afford I-40 (702 mg, 85.3%) as a yellow solid; $^1$H NMR (300 MHz, DMSO-$d_6$) δ 11.07 (s, 1H), 8.25 (s, formic acid, 1H), 7.69 (d, 1H), 7.34 (d, 1H), 7.26 (dd, 1H), 5.08 (dd, 1H), 4.00 (t, 2H), 3.66 (dd, 2H), 3.43 (t, 4H), 3.11-2.96 (m, 1H), 2.95-2.79 (m, 1H), 2.65-2.51 (m, 4H), 2.50-2.44 (m, 4H), 2.09-1.96 (m, 1H). LCMS (ESI) m/z: [M+H]$^+$=412.19.

Example 56. Preparation of Intermediates

The intermediates in Table B10 were prepared in a similar manner as described in the example 55 from the common intermediate 2-(2,6-dioxopiperidin-3-yl)-5-(piperazin-1-yl)isoindole-1,3-dione formate and the appropriate aldehyde.

TABLE B10

Intermediates

| Structures | # | Name | LCMS (ESI) m/z: [M + H]+ |
|---|---|---|---|
| 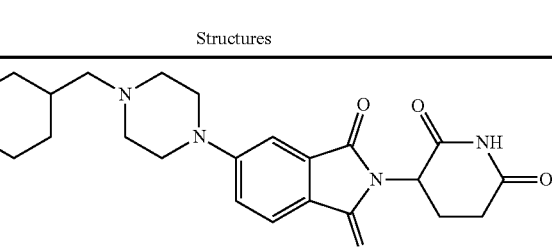 I-42 | I-42 | 2-(2,6-dioxopiperidin-3-yl)-5-(4-(piperidin-4-ylmethyl)piperazin-1-yl)isoindoline-1,3-dione trifluoroacetate | 440.35 |
| 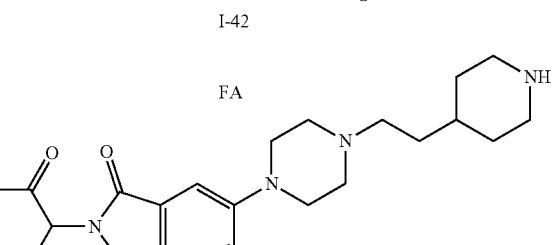 | | 2-(2,6-dioxopiperidin-3-yl)-5-[4-[2-(piperidin-4-yl)ethyl]piperazin-1-yl]isoindole-1,3-dione | 454.25 |
| 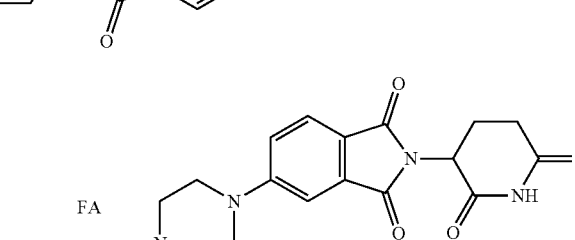 | | 2-(2,6-dioxopiperidin-3-yl)-5-[4-[4-(piperidin-4-yl)butyl]piperazin-1-yl]isoindole-1,3-dione | 482.27 |

Example 57. Preparation of 3-[4-[2-(2,6-dioxopiperidin-3-yl)-1,3-dioxoisoindol-5-yl]piperazin-1-yl]propanoic acid (I-41)

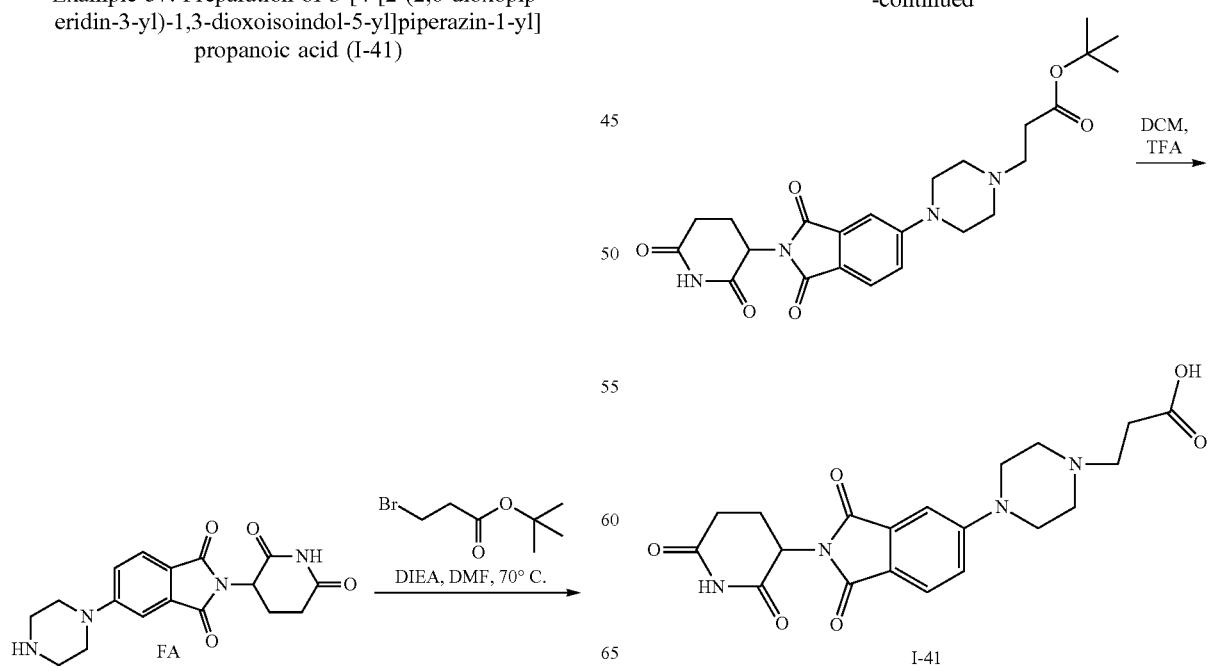

Step 1: Preparation of tert-butyl 3-[4-[2-(2,6-di-oxopiperidin-3-yl)-1,3-dioxoisoindol-5-yl]piperazin-1-yl]propanoate

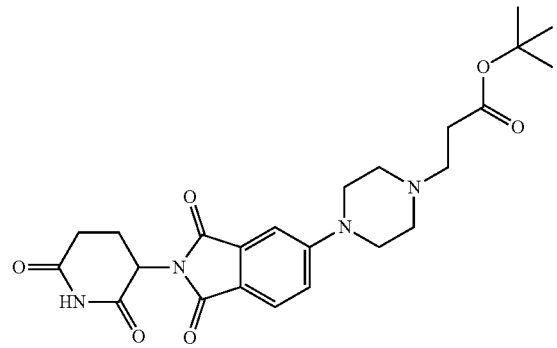 [SMILES: CC(C)(C)OC(=O)CCN1CCN(c2ccc3c(c2)C(=O)N(C2CCC(=O)NC2=O)C3=O)CC1]

To a solution of 2-(2,6-dioxopiperidin-3-yl)-5-(piperazin-1-yl)isoindole-1,3-dione formate (5.0 g, 14.6 mmol) and tert-butyl 3-bromopropanoate (3.6 g 17.2 mmol) in DMF (50 mL) was added DIEA (2.8 g, 21.7 mmol) dropwise, and the mixture was stirred at 70° C. for 6 h. The reaction mixture was concentrated, and the residue purified by reverse phase C18 flash chromatography (Water:ACN) to afford tert-butyl 3-[4-[2-(2,6-dioxopiperidin-3-yl)-1,3-dioxoisoindol-5-yl]piperazin-1-yl]propanoate (2.1 g, 30.6%) as a yellow solid. LCMS (ESI) m/z [M+H]$^+$=471.

Step 2: Preparation of 3-[4-[2-(2,6-dioxopiperidin-3-yl)-1,3-dioxoisoindol-5-yl] piperazin-1-yl] propanoic acid (I-41)

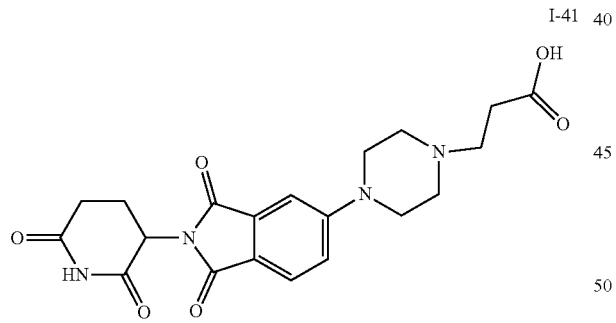

I-41

A solution of tert-butyl 3-[4-[2-(2,6-dioxopiperidin-3-yl)-1,3-dioxoisoindol-5-yl]piperazin-1-yl]propanoate (2.1 g, 4.5 mmol) in DCM (20 mL) and TFA (5 mL) was stirred at room temperature for 2 h.

The mixture was concentrated under reduced pressure and the residue purified by reverse phase C18 flash chromatography (Water:MeOH) to afford 3-[4-[2-(2,6-dioxopiperidin-3-yl)-1,3-dioxoisoindol-5-yl]piperazin-1-yl]propanoic acid (I-41) (0.78 g, 42.2%) as yellow solid. $^1$H NMR (300 MHz, DMSO-d$_6$) δ 12.03 (br, 1H), 11.10 (s, 1H), 7.68 (d, J=8.5 Hz, 1H), 7.35 (d, J=1.7 Hz, 1H), 7.27 (dd, J=8.6, 2.0 Hz, 1H), 5.08 (dd, J=12.8, 5.4 Hz, 1H), 3.49-3.40 (m, 4H), 2.96-2.80 (m, 1H), 2.67-2.52 (m, 8H), 2.44 (t, J=6.9 Hz, 2H), 2.07-1.97 (m, 1H). LCMS (ESI) m/z [M+H]$^+$=415.10.

Example 58. Preparation of 5-(2-aminoethoxy)-2-(2,6-dioxopiperidin-3-yl)isoindoline-1,3-dione trifluoroacetate (I-44)

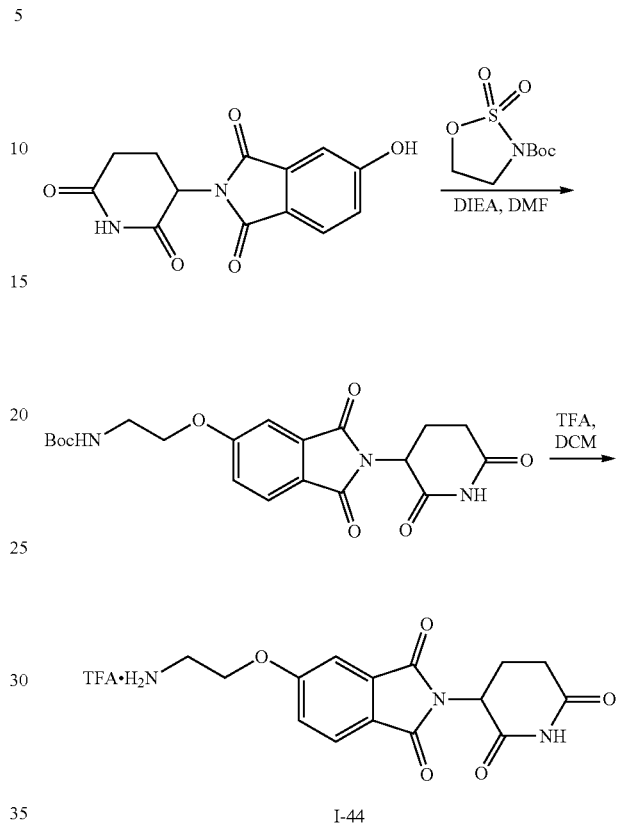

I-44

Step 1: Preparation of (tert-butyl (2-((2-(2,6-dioxopiperidin-3-yl)-1,3-dioxoisoindolin-5-yl)oxy)ethyl)carbamate

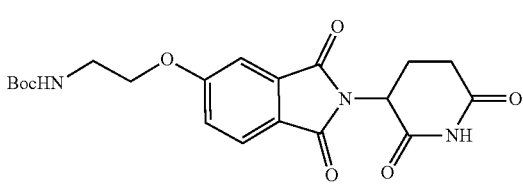 [SMILES: CC(C)(C)OC(=O)NCCOc1ccc2c(c1)C(=O)N(C1CCC(=O)NC1=O)C2=O]

To a stirred solution of 2-(2,6-dioxopiperidin-3-yl)-5-hydroxyisoindoline-1,3-dione (1.0 g, 3.6 mmol) and tert-butyl 1,2,3-oxathiazolidine-3-carboxylate 2,2-dioxide (0.98 g, 4.4 mmol) in DMF (10 mL) was added DIEA (0.94 g, 7.3 mmol) under a nitrogen atmosphere. After stirring at 80° C. for 2 h, water was added, followed by extraction three times with EtOAc. The combined organic layers were washed three times with water and dried over anhydrous Na$_2$SO$_4$. After filtration, the filtrate was concentrated to dryness under reduced pressure, and the residue purified by reverse phase C18 flash chromatography (Water:ACN) to afford (tert-butyl (2-((2-(2,6-dioxopiperidin-3-yl)-1,3-dioxoisoindolin-5-yl)oxy) ethyl)carbamate (1.7 g, 94.4%) as a yellow oily material. LCMS (ESI) m/z: [M+H]$^+$=418.

Step 2: Preparation of 5-(2-aminoethoxy)-2-(2,6-dioxopiperidin-3-yl)isoindoline-1,3-dione; trifluoroacetate (I-44)

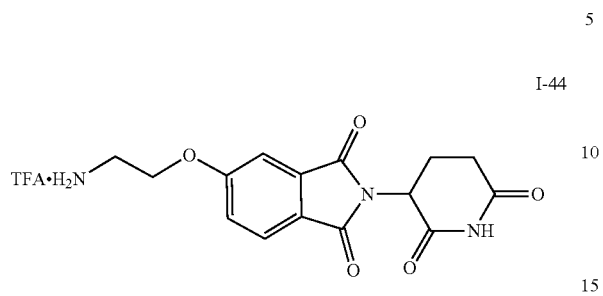

I-44

To a stirred solution of (tert-butyl (2-((2-(2,6-dioxopiperidin-3-yl)-1,3-dioxoisoindolin-5-yl)oxy) ethyl)carbamate (1.4 g, 3.4 mmol) in DCM (20 mL) was added TFA (5 mL) dropwise. After stirring for 2 h at room temperature, the reaction mixture was concentrated under reduced pressure and the residue purified by silica gel flash column chromatography to afford I-44 (750 mg, 51.2%) as a yellow solid. $^1$H NMR (300 MHz, DMSO-$d_6$) δ 11.15 (s, 1H), 8.04 (br, 3H), 7.91 (d, J=8.3 Hz, 1H), 7.50 (d, J=2.2 Hz, 1H), 7.41 (dd, J=8.3, 2.3 Hz, 1H), 5.14 (dd, J=12.9, 5.3 Hz, 1H), 4.38 (t, J=4.9 Hz, 2H), 3.35-3.23 (m, 2H), 2.98-2.81 (m, 1H), 2.66-2.54 (m, 2H), 2.11-2.01 (m, 1H). LCMS (ESI) m/z: [M+H]$^+$=418.10.

Example 59. Preparation of 4-(5-aminopent-1-yn-1-yl)-2-(2,6-dioxopiperidin-3-yl)isoindole-1,3-dione trifluoroacetate (I-81)

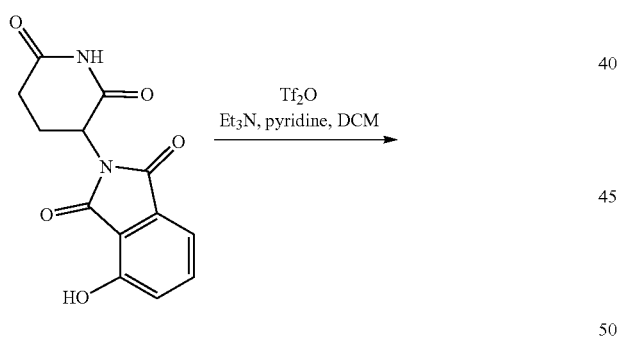

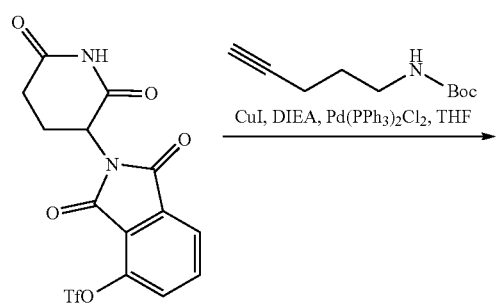

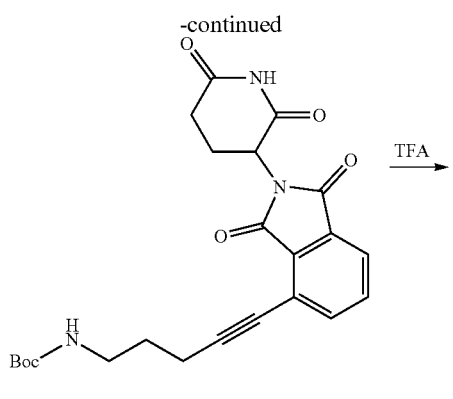

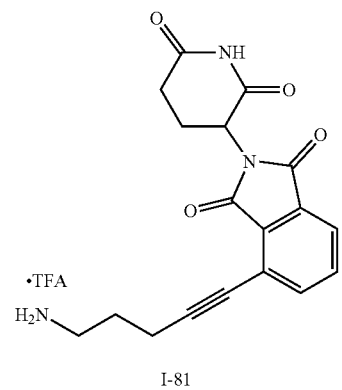

I-81

Step 1: Preparation of 2-(2,6-dioxopiperidin-3-yl)-1,3-dioxoisoindol-4-yl trifluoromethanesulfonate

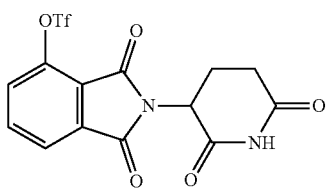 [SMILES: O=C1CCC(N2C(=O)c3cccc(OS(=O)(=O)C(F)(F)F)c3C2=O)C(=O)N1]

To a stirred mixture of 2-(2,6-dioxopiperidin-3-yl)-4-hydroxyisoindole-1,3-dione (2.00 g, 7.29 mmol) in DCM (21.0 mL) was added TEA (2.28 mL, 16.4 mmol) and pyridine (2.28 mL, 28.3 mmol). The reaction was cooled to 0° C., then triflic anhydride (3.09 g, 10.9 mmol) was added dropwise. The mixture was warmed to room temperature and stirred for 2 h. The resulting mixture was diluted with water and extracted three times with DCM. The combined organic layers were dried over anhydrous Na$_2$SO$_4$ and concentrated under reduced pressure. The residue was diluted with DCM (50 mL) and stirred for 0.5 h at room temperature. The resulting mixture was filtered, and the filter cake was washed with DCM to give 2-(2,6-dioxopiperidin-3-yl)-1,3-dioxoisoindol-4-yl trifluoromethanesulfonate (1.92 g, 58.3%) as an off-white solid. LCMS (ESI) m/z [M+H]$^+$=407.

Step 2: Preparation of tert-butyl N-[5-[2-(2,6-di-oxopiperidin-3-yl)-1,3-dioxoisoindol-4-yl]pent-4-yn-1-yl]carbamate

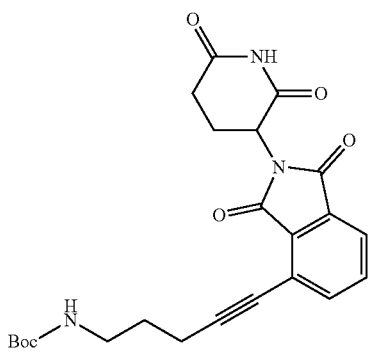 [SMILES: CC(C)(C)OC(=O)NCCCC#Cc1cccc2c1C(=O)N(C1CCC(=O)NC1=O)C2=O]

To a stirred solution of 2-(2,6-dioxopiperidin-3-yl)-1,3-dioxoisoindol-4-yl trifluoromethanesulfonate (1.60 g, 3.94 mmol) and tert-butyl N-(pent-4-yn-1-yl)carbamate (2.02 g, 11.3 mmol) in THF (40 mL) was added CuI (75.0 mg, 0.394 mmol), DIEA (6.86 mL, 53.1 mmol), and Pd(PPh$_3$)$_2$Cl$_2$ (276 mg, 0.394 mmol). The resulting mixture was stirred for 1 h at 70° C. The reaction was filtered, and the filter cake washed three times with EtOAc. The filtrate was concentrated under reduced pressure and the residue taken up in water and extracted twice with EtOAc. The combined organic layers were washed with brine, dried over anhydrous Na$_2$SO$_4$, and concentrated under reduced pressure. The residue was purified by silica gel column chromatography (Petroleum ether/EtOAc) to afford tert-butyl N-[5-[2-(2,6-dioxopiperidin-3-yl)-1,3-dioxoisoindol-4-yl]pent-4-yn-1-yl]carbamate (1.12 g, 64.7%) as an off-white solid. LCMS (ESI) m/z: [M+H]$^+$=440.

Step 3: Preparation of 4-(5-aminopent-1-yn-1-yl)-2-(2,6-dioxopiperidin-3-yl)isoindole-1,3-dione trifluoroacetate (I-81)

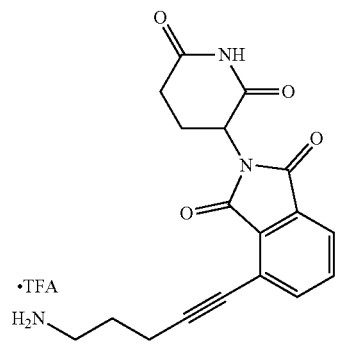

To a stirred solution of tert-butyl N-[5-[2-(2,6-dioxopiperidin-3-yl)-1,3-dioxoisoindol-4-yl]pent-4-yn-1-yl]carbamate (1.10 g, 2.50 mmol) in dichloromethane (6 mL) was added TFA (3.00 mL) at room temperature. The resulting mixture was stirred for 1 h at room temperature, followed by concentration under reduced pressure. The residue was purified by silica gel flash column chromatography to afford I-81 (890 mg, 91.2%) as a white solid. $^1$H NMR (400 MHz, DMSO-d$_6$) δ 11.15 (s, 1H), 7.97-7.73 (m, 6H), 5.14 (dd, 1H), 3.09-2.97 (m, 2H), 2.96-2.84 (m, 1H), 2.67 (t, 3H), 2.62-2.54 (m, 1H), 2.12-2.02 (m, 1H), 1.82-1.94 (m, 2H). LCMS (ESI) m/z: [M+H]$^+$=340.12.

Example 60. Preparation of tert-butyl 4-[3-(prop-2-yn-1-yloxy)propyl]piperazine-1-carboxylate

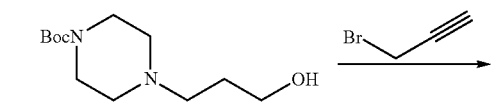

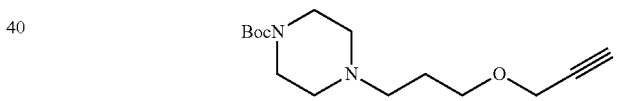

To a stirred solution of tert-butyl 4-(3-hydroxypropyl)piperazine-1-carboxylate (22.4 g, 0.09 mol) in THF (500 mL), NaH (4.4 g, 0.18 mol) was added in portions at 0° C. over 30 min. Propargyl bromide (32.7 g, 0.27 mol) was then added into the reactor dropwise at room temperature, and the mixture was stirred for 12 h. The reaction mixture was filtered and the filter cake was washed with THF. The filtrate was concentrated to dryness and the residue was purified by reverse flash C18 chromatography (Water:ACN) to give tert-butyl 4-[3-(prop-2-yn-1-yloxy)propyl]piperazine-1-carboxylate (14.9 g, 57.6%) as an off-white solid. LCMS (ESI) m/z: [M+H]$^+$=283.

Example 61. Preparation of Intermediates

The following compounds in Table B11 were synthesized following the protocols in Example 59 with 5-bromo-2-(2,6-dioxopiperidin-3-yl)isoindole-1,3-dione instead of 2-(2,6-dioxopiperidin-3-yl)-1,3-dioxoisoindol-4-yl trifluoromethanesulfonate with the appropriate alkyne.

TABLE B11

Intermediates

| Structure | Name | LCMS (ESI) m/z: [M + H]+ |
|---|---|---|
| (structure: 5-(5-aminopent-1-yn-1-yl)-2-(2,6-dioxopiperidin-3-yl)isoindole-1,3-dione · TFA) | 5-(5-aminopent-1-yn-1-yl)-2-(2,6-dioxopiperidin-3-yl)isoindole-1,3-dione | 340.12 |
| (structure: piperazine-propoxy-propynyl-isoindole-dione · 2HCl) | 2-(2,6-dioxopiperidin-3-yl)-5-[3-[3-(piperazin-1-yl)propoxy]prop-1-yn-1-yl]isoindole-1,3-dione dihydrogen chloride | 439.0 |

Example 62. Preparation of 3-(6-(2-(2,6-dioxopiperidin-3-yl)-1,3-dioxoisoindolin-5-yl)-2,6-diazaspiro[3.3]heptan-2-yl)propanoic acid formic acid Example 63. Preparation of 5-[3-(2-aminoethoxy)azetidin-1-yl]-2-(2,6-dioxopiperidin-3-yl)isoindole-1,3-dione

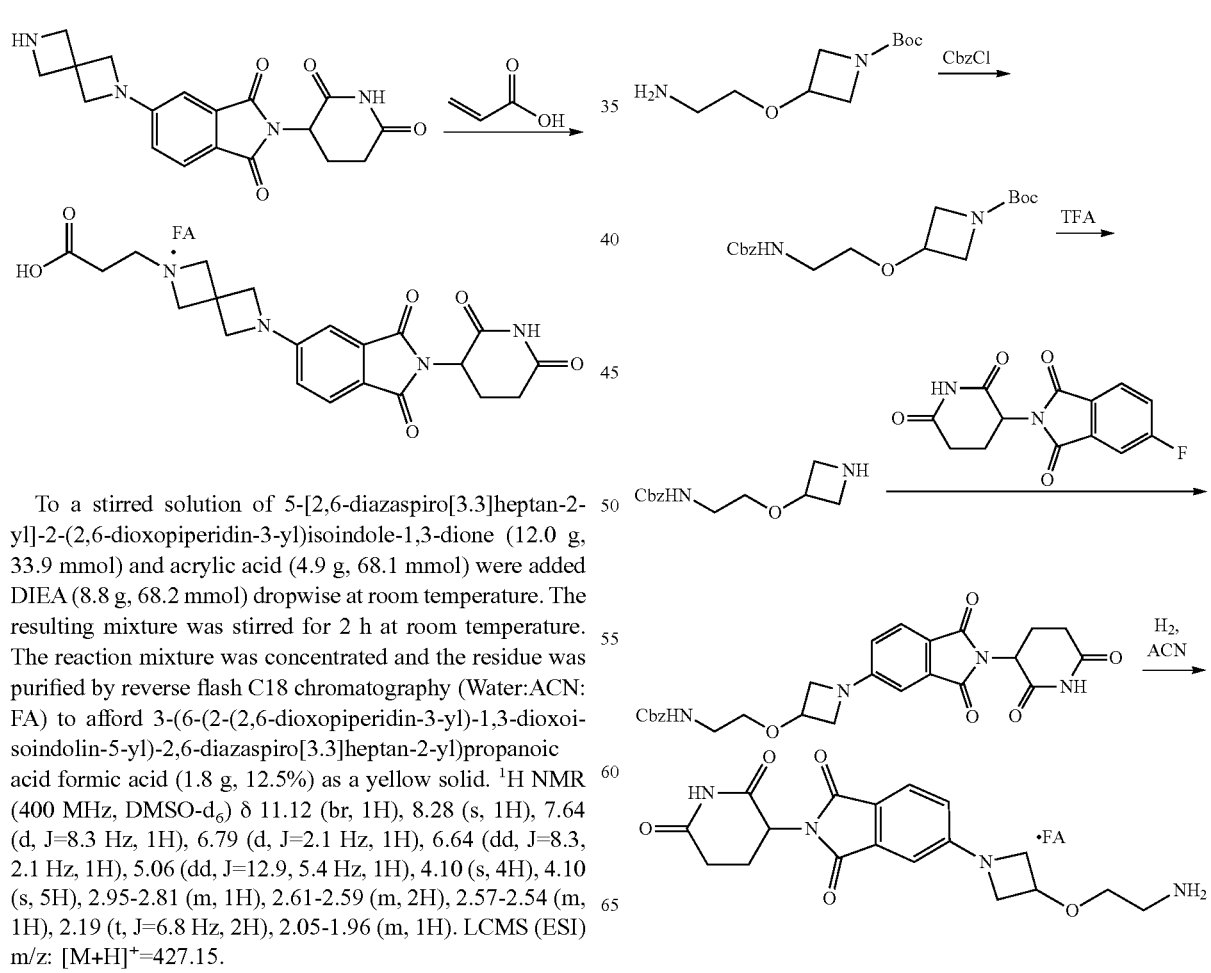

To a stirred solution of 5-[2,6-diazaspiro[3.3]heptan-2-yl]-2-(2,6-dioxopiperidin-3-yl)isoindole-1,3-dione (12.0 g, 33.9 mmol) and acrylic acid (4.9 g, 68.1 mmol) were added DIEA (8.8 g, 68.2 mmol) dropwise at room temperature. The resulting mixture was stirred for 2 h at room temperature. The reaction mixture was concentrated and the residue was purified by reverse flash C18 chromatography (Water:ACN:FA) to afford 3-(6-(2-(2,6-dioxopiperidin-3-yl)-1,3-dioxoisoindolin-5-yl)-2,6-diazaspiro[3.3]heptan-2-yl)propanoic acid formic acid (1.8 g, 12.5%) as a yellow solid. $^1$H NMR (400 MHz, DMSO-$d_6$) δ 11.12 (br, 1H), 8.28 (s, 1H), 7.64 (d, J=8.3 Hz, 1H), 6.79 (d, J=2.1 Hz, 1H), 6.64 (dd, J=8.3, 2.1 Hz, 1H), 5.06 (dd, J=12.9, 5.4 Hz, 1H), 4.10 (s, 4H), 4.10 (s, 5H), 2.95-2.81 (m, 1H), 2.61-2.59 (m, 2H), 2.57-2.54 (m, 1H), 2.19 (t, J=6.8 Hz, 2H), 2.05-1.96 (m, 1H). LCMS (ESI) m/z: [M+H]$^+$=427.15.

Step 1: Preparation of tert-butyl 3-(2-[[(benzyloxy)carbonyl]amino]ethoxy)azetidine-1-carboxylate

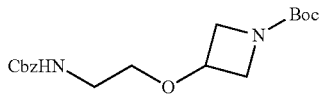

To the solution of tert-butyl 3-(2-aminoethoxy)azetidine-1-carboxylate (10.2 g, 47.3 mmol) in THF (50.0 mL) was added benzyl chloroformate (8.07 g, 47.3 mmol), H$_2$O (50.0 mL) and K$_2$CO$_3$ (19.61 g, 142 mmol). The resulting solution was stirred at room temperature for 3 h. The resulting mixture was extracted three times with EtOAc. The combined organic layers were washed three times with brine and dried over anhydrous Na$_2$SO$_4$. After filtration, the filtrate was concentrated under reduced pressure. The residue was purified by silica gel column chromatography (hexane/EtOAc) to afford tert-butyl 3-(2-[[(benzyloxy)carbonyl]amino]ethoxy)azetidine-1-carboxylate (4.23 g, 25.5%) as a colorless oil; LCMS (ESI) m/z: [M+H]$^+$=351.

Step 2: Preparation of benzyl N-[2-(azetidin-3-yloxy)ethyl]carbamate

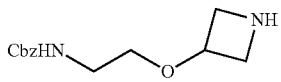 [SMILES: O=C(NCCOC1CNC1)OCc1ccccc1]

To a stirred solution of tert-butyl 3-(2-[[(benzyloxy)carbonyl]amino]ethoxy)azetidine-1-carboxylate (4.23 g, 12.1 mmol) in DCM (10.0 mL) was added TFA (10.0 mL, 135 mmol). The resulting mixture was stirred for 2 h at room temperature. The resulting mixture was concentrated under vacuum. The residue was purified by reverse phase C18 flash chromatography (Water:ACN:NH$_4$HCO$_3$) to afford benzyl N-[2-(azetidin-3-yloxy)ethyl]carbamate (4.56 g) as a colorless oil; LCMS (ESI) m/z [M+H]$^+$=251.

Step 3: Preparation of benzyl N-[2-([1-[2-(2,6-dioxopiperidin-3-yl)-1,3-dioxoisoindol-5-yl]azetidin-3-yl]oxy)ethyl]carbamate

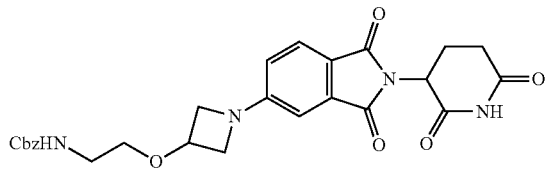 [SMILES: O=C1CCC(N2C(=O)c3ccc(N4CC(OCCNC(=O)OCc5ccccc5)C4)cc3C2=O)C(=O)N1]

To a stirred solution of 2-(2,6-dioxopiperidin-3-yl)-5-fluoroisoindoline-1,3-dione (3.30 g, 11.9 mmol) in DMF (45.0 mL) was added benzyl N-[2-(azetidin-3-yloxy)ethyl]carbamate (2.99 g, 11.9 mmol) and DIEA (4.63 g, 35.8 mmol). The resulting mixture was stirred for 2 h at 90° C. The reaction was quenched with water at room temperature. The resulting mixture was extracted three times with EtOAc. The combined organic layers were washed three times with brine, dried over anhydrous Na$_2$SO$_4$. After filtration, the filtrate was concentrated under reduced pressure to afford benzyl N-[2-([1-[2-(2,6-dioxopiperidin-3-yl)-1,3-dioxoisoindol-5-yl]azetidin-3-yl]oxy)ethyl]carbamate (3.41 g) as a light yellow solid; LCMS (ESI) m/z: [M+H]$^+$=507.

Step 4: Preparation of 5-[3-(2-aminoethoxy)azetidin-1-yl]-2-(2,6-dioxopiperidin-3-yl)isoindole-1,3-dione

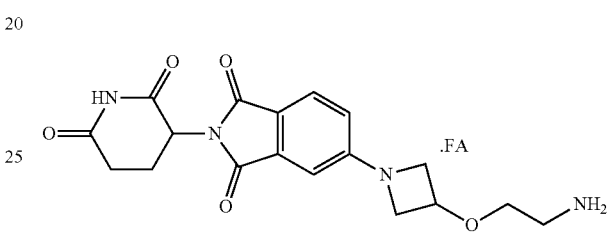

To a stirred solution of benzyl N-[2-([1-[2-(2,6-dioxopiperidin-3-yl)-1,3-dioxoisoindol-5-yl]azetidin-3-yl]oxy)ethyl]carbamate (3.10 g, 6.12 mmol) in ACN (45.0 mL) was added Pd/C (1.55 g, 14.6 mmol). The resulting mixture was stirred for 2 h at room temperature under a hydrogen atmosphere. The resulting mixture was concentrated under vacuum. The residue was purified by reverse flash C18 chromatography to afford the title compound (391 mg, 17.2%) as a light yellow solid. $^1$H NMR (300 MHz, DMSO-d$_6$) δ 8.45-8.25 (d, 1H), 7.71-7.51 (m, 1H), 7.44-7.25 (m, 1H), 6.83 (d, 1H), 6.69 (dd, 1H), 5.12-4.99 (m, 1H), 4.61-4.50 (m, 1H), 4.27 (dd, 2H), 3.90 (dd, 2H), 3.61-3.43 (m, 2H), 2.98-2.69 (m, 3H), 2.66-2.51 (m, 1H), 2.10-1.95 (m, 1H); LCMS (ESI) m/z: [M+H]$^+$=373.14.

Example 64. Preparation of 5-[2-([3-[(2-aminoethoxy)methyl]phenyl]methoxy)ethoxy]-2-(2,6-dioxopiperidin-3-yl)isoindole-1,3-dione

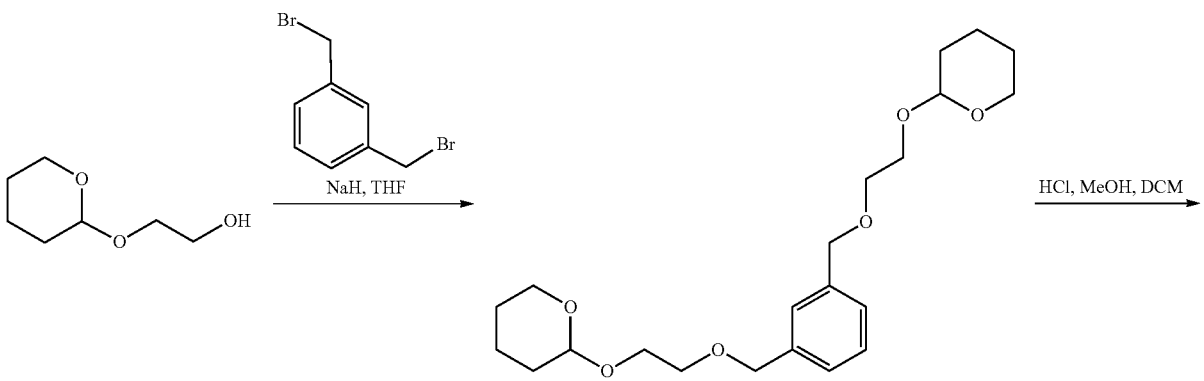

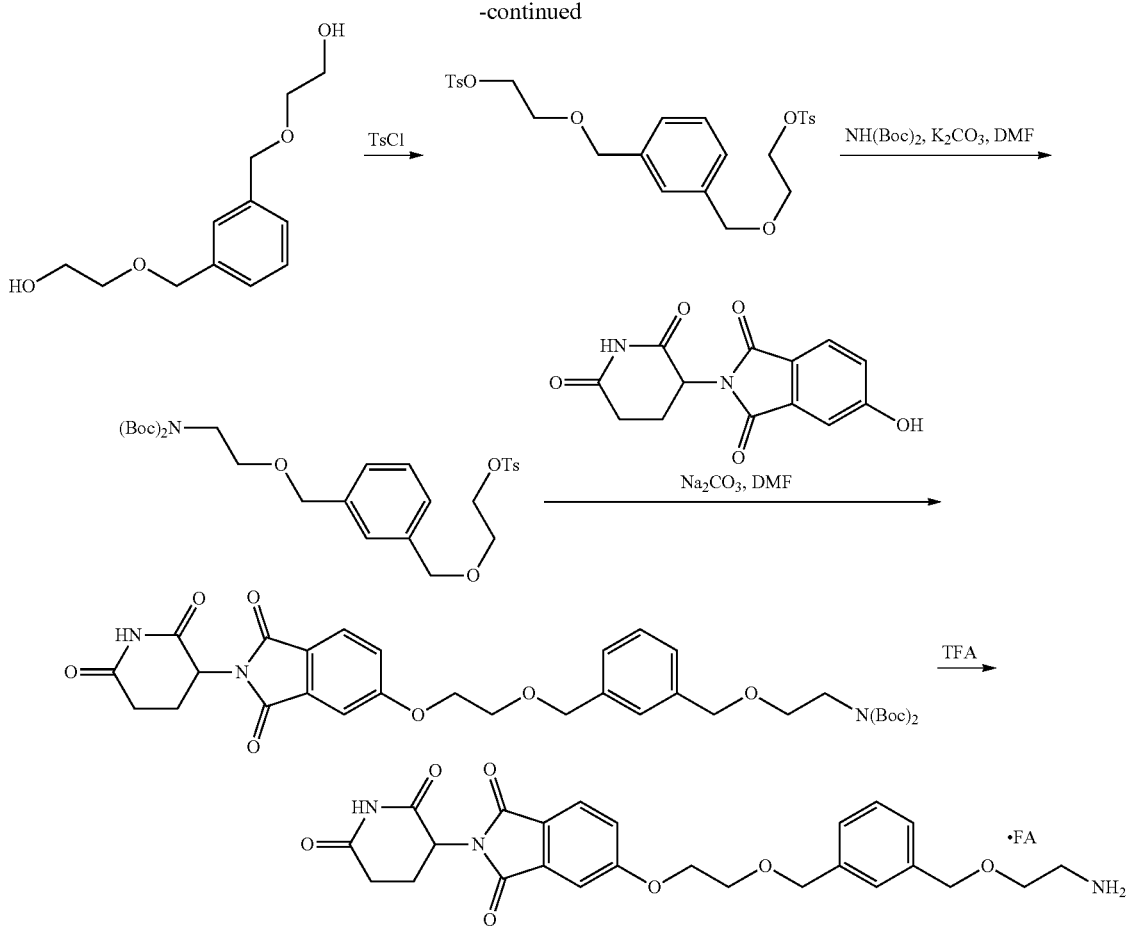

Step 1: Preparation of 2-[2-[(3-[[2-(oxan-2-yloxy)ethoxy]methyl]phenyl)methoxy]ethoxy]oxane

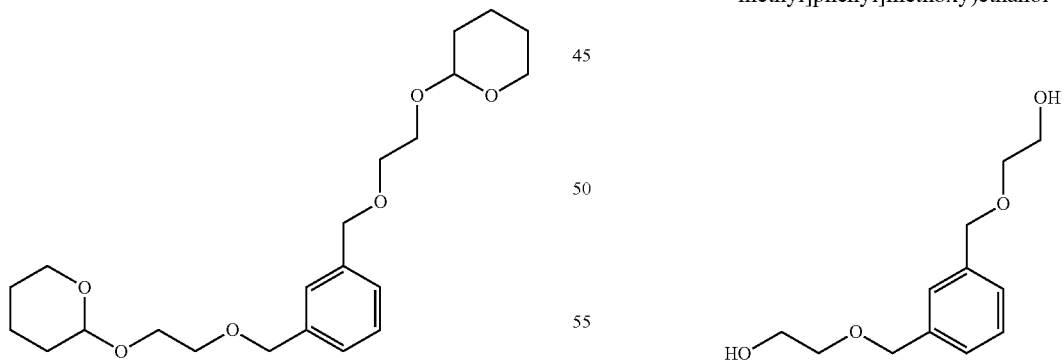

To a solution of 2-((tetrahydro-2H-pyran-2-yl)oxy)ethan-1-ol (9.50 g, 65.0 mmol) in anhydrous THF (75.0 mL) was added NaH (2.34 g, 97.5 mmol). The reaction mixture was stirred at 70° C. THF solvent was evaporated. The crude material was dissolved in EtOAc, washed with water, washed with brine, and then dried over $Na_2SO_4$. After filtration, the filtrate was concentrated under reduced pressure. The residue was purified by column chromatography to give the compound 2-[2-[(3-[[2-(oxan-2-yloxy)ethoxy] methyl]phenyl)methoxy]ethoxy]oxane (13.9 g, 54.2%); LCMS (ESI) m/z: $[M+H]^+$=395.

Step 2: Preparation of 2-([3-[(2-hydroxyethoxy)methyl]phenyl]methoxy)ethanol

To a stirred solution of 2-[2-[(3-[[2-(oxan-2-yloxy)ethoxy]methyl]phenyl)methoxy]ethoxy]oxane (13.9 g, 35.2 mmol) in MeOH (15.0 mL) was added DCM (15.0 mL) and HCl (30.0 mL, 987 mmol) at room temperature. The reaction mixture was stirred overnight at room temperature. The residue was purified by reverse phase C18 flash chromatography to afford 2-([3-[(2-hydroxyethoxy)methyl]phenyl]methoxy)ethanol (5.2 g, 65.2%) as a colorless oil; LCMS (ESI) m/z: $[M+H]^+$=227.

Step 3: Preparation of 2-[[3-([2-[(4-methylbenzene-sulfonyl)oxy]ethoxy]methyl)phenyl]methoxy]ethyl 4-methylbenzenesulfonate

Step 4: Preparation of tert-butyl N-(tert-butoxycarbonyl)-N-(2-[[3-([2-[(4-methylbenzenesulfonyl)oxy]ethoxy]methyl)phenyl]methoxy]ethyl)carbamate

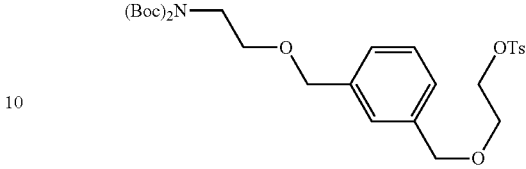

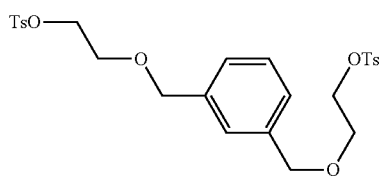 [SMILES: Cc1ccc(S(=O)(=O)OCCOCc2cccc(COCCOS(=O)(=O)c3ccc(C)cc3)c2)cc1]

To a stirred solution of 2-([3-[(2-hydroxyethoxy)methyl]phenyl]methoxy)ethanol (5.20 g, 23.0 mmol) in DCM (80.0 mL) was added DMAP (421 mg, 3.45 mmol), TEA (9.30 g, 91.9 mmol) and p-toluenesulfonyl chloride (13.1 g, 68.9 mmol) at 0° C. The resulting mixture was stirred for 2 h at 0° C. The resulting mixture was stirred for additional 5 h at room temperature. The residue was purified by silica gel column chromatography (Petroleum ether/THF) to afford 2-[[3-([2-[(4-methylbenzenesulfonyl)oxy]ethoxy]methyl)phenyl]methoxy]ethyl 4-methylbenzenesulfonate (10.3 g, 83.4%) as a light yellow oil; LCMS (ESI) m/z: [M+H]$^+$=535.

To a solution of 2-[[3-([2-[(4-methylbenzenesulfonyl)oxy]ethoxy]methyl)phenyl]methoxy]ethyl 4-methylbenzenesulfonate (10.3 g, 19.2 mmol) in DMF (80.0 mL), was added tert-butyl N-(tert-butoxycarbonyl)carbamate (4.58 g, 21.1 mmol) and K$_2$CO$_3$ (3.97 g, 28.8 mmol). The reaction mixture was stirred at 60° C. for 9 h. The reaction mixture was then cooled to room temperature and poured into 50 mL EtOAc. The EtOAc layer was then washed three times with 1 N aqueous HCl and once with brine. The EtOAc layer was dried over MgSO$_4$, filtered, and the solvent was removed by rotary evaporation. The crude product was purified by silica gel flash chromatography (Hexanes:EtOAc) to afford tert-butyl N-(tert-butoxycarbonyl)-N-(2-[[3-([2-[(4-methylbenzenesulfonyl)oxy]ethoxy]methyl)phenyl]methoxy]ethyl)carbamate (1.69 g, 15.2%) as a colorless oil; LCMS (ESI) m/z: [M+H]$^+$=580.

Step 5: Preparation of tert-butyl N-(tert-butoxycarbonyl)-N-[2-([3-[(2-[[2-(2,6-dioxopiperidin-3-yl)-1,3-dioxoisoindol-5-yl]oxy]ethoxy)methyl]phenyl]methoxy)ethyl]carbamate

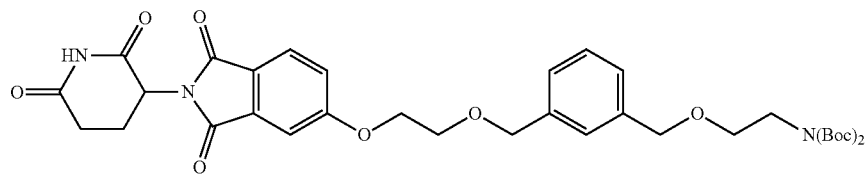

To a solution of tert-butyl N-(tert-butoxycarbonyl)-N-(2-[[3-([2-[(4-methylbenzenesulfonyl)oxy]ethoxy]methyl)phenyl]methoxy]ethyl)carbamate (800 mg, 1.38 mmol) and 2-(2,6-dioxopiperidin-3-yl)-5-hydroxyisoindole-1,3-dione (799 mg, 2.91 mmol) in DMF (20.0 mL) was added $Na_2CO_3$ (439 mg, 4.14 mmol). The resulting mixture was stirred for 5 h at 80° C. The residue was purified by reverse phase C18 flash chromatography (Water:MeOH) to afford tert-butyl N-(tert-butoxycarbonyl)-N-[2-([3-[(2-[[2-(2,6-dioxopiperidin-3-yl)-1,3-dioxoisoindol-5-yl]oxy]ethoxy)methyl]phenyl]methoxy)ethyl]carbamate (920 mg, 97.8%) as a colorless solid; LCMS (ESI) m/z [M+H]$^+$=682.

Step 6: Preparation of 5-[2-([3-[(2-aminoethoxy)methyl]phenyl]methoxy)ethoxy]-2-(2,6-dioxopiperidin-3-yl)isoindole-1,3-dione

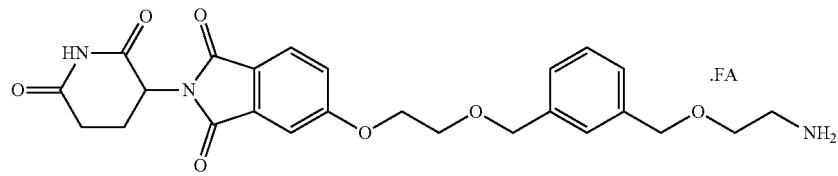

To a solution of tert-butyl N-(tert-butoxycarbonyl)-N-[2-([3-[(2-[[2-(2,6-dioxopiperidin-3-yl)-1,3-dioxoisoindol-5-yl]oxy]ethoxy)methyl]phenyl]methoxy)ethyl]carbamate (920 mg) in DCM was added TFA (5.00 mL). The resulting mixture was stirred for 3 h at room temperature. The resulting mixture was concentrated under reduced pressure. The residue was purified by reverse phase C18 flash chromatography to afford the title compound (510 mg) as a light yellow solid. $^1$H NMR (300 MHz, DMSO-$d_6$) δ 8.40 (s, 1H), 7.85 (d, 1H), 7.48 (d, 1H), 7.42-7.24 (m, 5H), 5.13 (dd, 1H), 4.58 (s, 2H), 4.50 (s, 2H), 4.43-4.34 (m, 2H), 3.83 (t, 2H), 3.54 (t, 2H), 2.96-2.82 (m, 3H), 2.66-2.46 (m, 2H), 2.12-1.98 (m, 1H); LCMS (ESI) m/z: [M+H]$^+$=482.18.

Example 65. Preparation of Intermediates

The following compounds in Table B12 were prepared using the procedure in Example 64 use the appropriate substituted phenol.

TABLE B12

Intermediates

| Structures | Name | LCMS (ESI) m/z: [M + H]$^+$ |
|---|---|---|
|  | 4-[2-([3-[(2-aminoethoxy)methyl]phenyl]methoxy)ethoxy]-2-(2,6-dioxopiperidin-3-yl)isoindole-1,3-dione | 482.18 |

Example 66. Preparation of 2-(2,6-dioxopiperidin-3-yl)-5-(5-(piperazin-1-yl)pent-1-yn-1-yl)isoindoline-1,3-dione trifluoroacetic acid

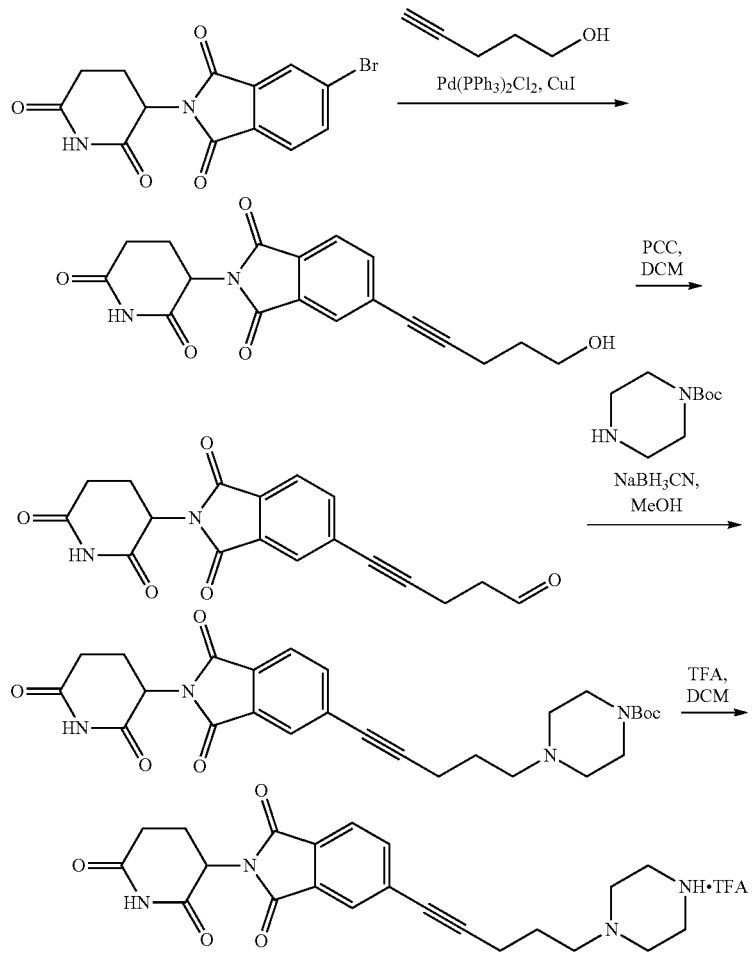

Step 1: Preparation of 2-(2,6-dioxopiperidin-3-yl)-5-(5-hydroxypent-1-yn-1-yl)isoindoline-1,3-dione

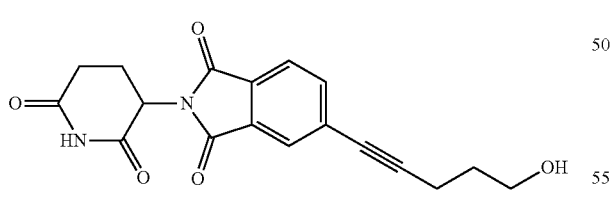

To a stirred solution of 5-bromo-2-(2,6-dioxopiperidin-3-yl)isoindoline-1,3-dione (5.0 g, 14.8 mmol), $Pd(PPh_3)_2Cl_2$ (2.1 g, 3.0 mmol) and copper(I) iodide (0.56 g, 3.0 mmol) in THF (40 ml) were added DIEA (19.2 g, 148 mmol) and pent-4-yn-1-ol (3.7 g, 44.5 mmol) dropwise at room temperature. The resulting mixture was stirred for 4 h at 50° C. The resulting mixture was filtered and the filter cake was washed three times with THF. The filtrate was concentrated under reduced pressure. The residue was purified by silica gel column chromatography (petroleum ether/EtOAc) to afford 2-(2,6-dioxopiperidin-3-yl)-5-(5-hydroxypent-1-yn-1-yl)isoindoline-1,3-dione (1.9 g, 37.6%) as a yellow solid. LCMS (ESI) m/z: $[M+H]^+=341$.

Step 2: Preparation of 5-(2-(2,6-dioxopiperidin-3-yl)-1,3-dioxoisoindolin-5-yl)pent-4-ynal To a stirred solution of 2-(2,6-dioxopiperidin-3-yl)-5-(5-hydroxypent-1-yn-1-yl)isoindoline-1,3-dione (4.0 g, 11.7 mmol) in DCM (40 mL) were added PCC (5.1 g, 23.5 mmol) in portions at room temperature. The resulting mixture was stirred for 8 h at room temperature. The mixture was filtered and the filter cake was washed three times with DCM. The filtrate was concentrated under reduced pressure to afford 5-(2-(2,6-dioxopiperidin-3-yl)-1,3-dioxoisoindolin-5-yl)pent-4-ynal (3.6 g, 89.8%) as a yellow solid. LCMS (ESI) m/z: [M+H]$^+$=339.

Step 3: Preparation of tert-butyl 4-(5-(2-(2,6-dioxopiperidin-3-yl)-1,3-dioxoisoindolin-5-yl)pent-4-yn-1-yl)piperazine-1-carboxylate

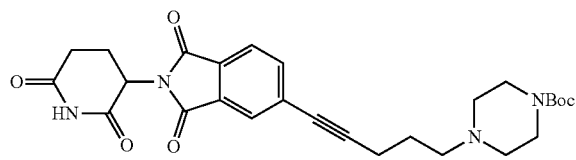 [SMILES: CC(C)(C)OC(=O)N1CCN(CCCC#Cc2ccc3c(c2)C(=O)N(C2CCC(=O)NC2=O)C3=O)CC1]

To a stirred mixture of 5-(2-(2,6-dioxopiperidin-3-yl)-1,3-dioxoisoindolin-5-yl)pent-4-ynal (3.6 g, 10.6 mmol) and tert-butyl piperazine-1-carboxylate (1.98 g, 10.6 mmol) in MeOH (35.0 mL) were added NaBH$_3$CN (2.7 g, 42.6 mmol) in portions at room temperature. The mixture was stirred for 3 h at room temperature. The resulting mixture was added to aqueous NH$_4$Cl solution and extracted three times with EtOAc. The combined organic layers were washed twice with water, dried over anhydrous Na$_2$SO$_4$. After filtration, the filtrate was concentrated under reduced pressure. The residue was purified by silica gel column chromatography (DCM/MeOH) to afford tert-butyl 4-(5-(2-(2,6-dioxopiperidin-3-yl)-1,3-dioxoisoindolin-5-yl)pent-4-yn-1-yl)piperazine-1-carboxylate (2.1 g, 38.9%) as a yellow semi-solid. LCMS (ESI) m/z: [M+H]$^+$=509.

Step 4: Preparation of 2-(2,6-dioxopiperidin-3-yl)-5-(5-(piperazin-1-yl)pent-1-yn-1-yl)isoindoline-1,3-dione trifluoroacetic acid

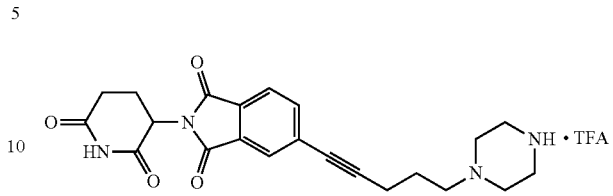

To a stirred solution of tert-butyl 4-(5-(2-(2,6-dioxopiperidin-3-yl)-1,3-dioxoisoindolin-5-yl)pent-4-yn-1-yl)piperazine-1-carboxylate (1.2 g, 2.4 mmol) in DCM (20 mL) were added TFA (5 mL) dropwise at room temperature. The resulting mixture was stirred for 3 h at room temperature. The resulting mixture was concentrated under vacuum. The residue was purified by reverse phase C18 flash chromatography with the following conditions: column (Water:ACN:TFA) to afford the title compound (0.80 g, 66.7%) as a light yellow solid. $^1$H NMR (400 MHz, DMSO-d$_6$) δ 11.16 (s, 1H), 9.01 (br, 2H), 7.96-7.85 (m, 3H), 5.17 (dd, J=12.8, 5.4 Hz, 1H), 4.49 (br, 3H), 3.08 (br, 3H), 2.90 (ddd, J=16.9, 13.9, 5.3 Hz, 1H), 2.66-2.57 (m, 4H), 2.56-2.53 (m, 4H), 2.12-2.03 (m, 1H), 1.98-1.85 (m, 1H). LCMS (ESI) m/z: [M+H]$^+$=409.40.

Example 67. Preparation of 2-(2,6-dioxopiperidin-3-yl)-5-[[5-(piperazin-1-yl) pentyl]oxy]isoindole-1,3-dione

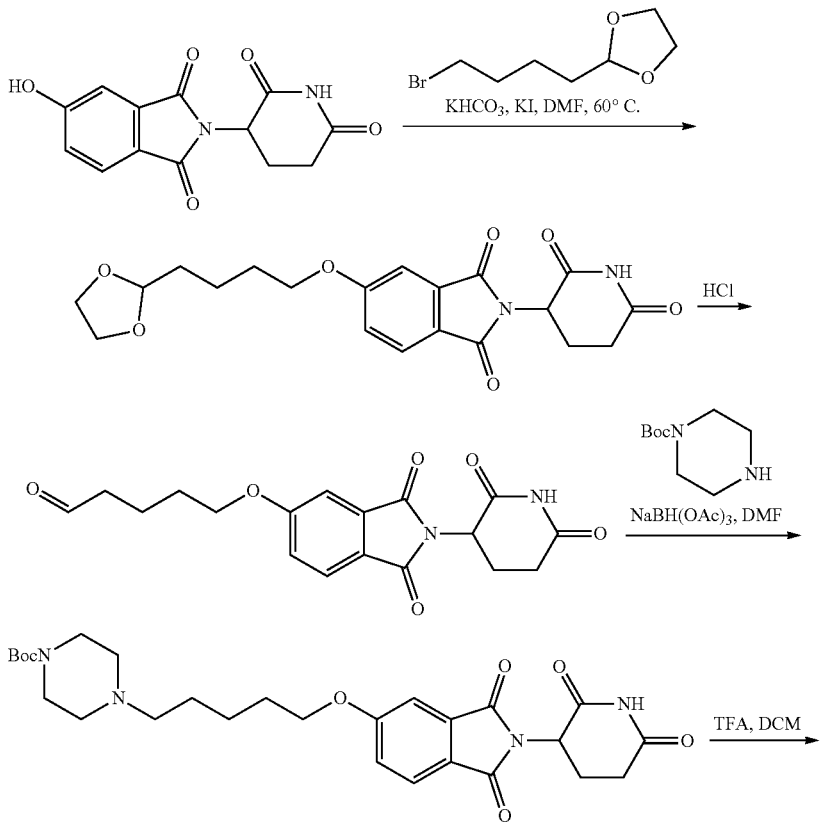

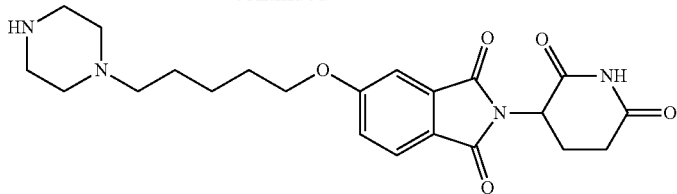

Step 1: Preparation of 5-[4-(1,3-dioxolan-2-yl)butoxy]-2-(2,6-dioxopiperidin-3-yl)isoindole-1,3-dione

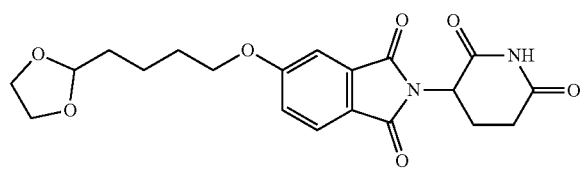 [SMILES: O=C1CCC(N2C(=O)c3ccc(OCCCCC4OCCO4)cc3C2=O)C(=O)N1]

To a stirred solution of 2-(2,6-dioxopiperidin-3-yl)-5-hydroxyisoindole-1,3-dione (3.00 g, 10.9 mmol) and 2-(4-bromobutyl)-1,3-dioxolane (2.74 g, 13.1 mmol) in DMF (25.0 mL) were added KHCO$_3$ (2.19 g, 21.9 mmol) and KI (272 mg, 1.64 mmol) in portions at 60° C. under an air atmosphere. The residue was purified by reverse phase C18 flash chromatography (Water:ACN) to afford 5-[4-(1,3-dioxolan-2-yl)butoxy]-2-(2,6-dioxopiperidin-3-yl)isoindole-1,3-dione (2.4 g, 54.5%) as an off-white solid. LCMS (ESI) m/z: [M+H]$^+$=403.

Step 2: Preparation of 5-[[2-(2,6-dioxopiperidin-3-yl)-1,3-dioxoisoindol-5-yl]oxy]pentanal

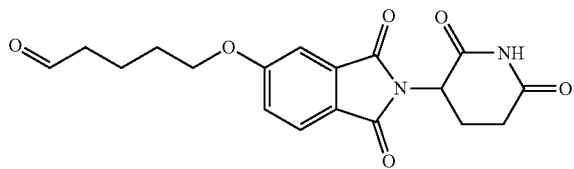 [SMILES: O=CCCCCOc1ccc2c(c1)C(=O)N(C1CCC(=O)NC1=O)C2=O]

A solution of 5-[4-(1,3-dioxolan-2-yl)butoxy]-2-(2,6-dioxopiperidin-3-yl)isoindole-1,3-dione (2.40 g, 5.96 mmol) and HCl in 1,4-dioxane (4 N, 12.0 mL, 48 mmol) and 1,4-dioxane (12.0 mL) was stirred for 2 h at room temperature. The resulting mixture was concentrated under reduced pressure. The crude product was used in the next step directly without further purification to afford 5-[[2-(2,6-dioxopiperidin-3-yl)-1,3-dioxoisoindol-5-yl]oxy]pentanal (1.92 g, 89.8%) as an off-white solid. LCMS (ESI) m/z: [M+H]$^+$=359.

Step 3: Preparation of tert-butyl 4-(5-[[2-(2,6-dioxopiperidin-3-yl)-1,3-dioxoisoindol-5-yl]oxy]pentyl)piperazine-1-carboxylate

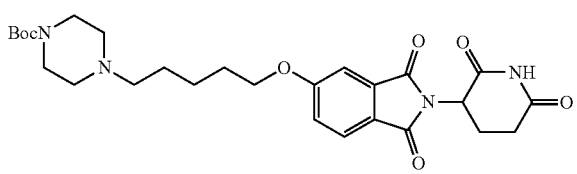 [SMILES: CC(C)(C)OC(=O)N1CCN(CCCCCOc2ccc3c(c2)C(=O)N(C2CCC(=O)NC2=O)C3=O)CC1]

To a stirred solution of 5-[[2-(2,6-dioxopiperidin-3-yl)-1,3-dioxoisoindol-5-yl]oxy]pentanal (1.89 g, 5.27 mmol) and tert-butyl piperazine-1-carboxylate (0.98 g, 5.27 mmol) in DMF (20.0 mL) was added NaBH(OAc)$_3$ (2.24 g, 10.5 mmol) in portions at room temperature. The residue was purified by reverse phase C18 flash chromatography (Water:ACN) to afford tert-butyl 4-(5-[[2-(2,6-dioxopiperidin-3-yl)-1,3-dioxoisoindol-5-yl] oxy]pentyl)piperazine-1-carboxylate (1.46 g, 52.4%) as an off-white solid. LCMS (ESI) m/z: [M+H]$^+$=529.

Step 4: Preparation of 2-(2,6-dioxopiperidin-3-yl)-5-[[5-(piperazin-1-yl)pentyl]oxy] isoindole-1,3-dione

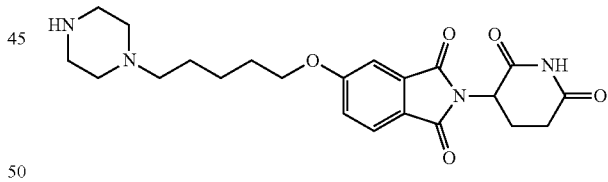

A solution of tert-butyl 4-(5-[[2-(2,6-dioxopiperidin-3-yl)-1,3-dioxoisoindol-5-yl]oxy]pentyl)piperazine-1-carboxylate (1.40 g, 2.65 mmol) and TFA (5.00 mL, 67.3 mmol) in DCM was stirred for 2 h at room temperature. The resulting mixture was concentrated under reduced pressure. The residue was purified by reverse phase C18 flash chromatography (Water:ACN) to afford 2-(2,6-dioxopiperidin-3-yl)-5-[[5-(piperazin-1-yl)pentyl]oxy] isoindole-1,3-dione (724 mg, 63.8%) as a white solid. $^1$H NMR (300 MHz, DMSO-d$_6$) δ 11.81 (s, 1H), 11.12 (s, 1H), 9.75 (s, 2H), 7.85 (d, 1H), 7.46-7.32 (m, 2H), 5.12 (dd, 1H), 4.20 (t, 2H), 3.66 (s, 1H), 3.48 (s, 2H), 3.40-3.30 (m, 1H), 3.15 (d, 2H), 2.99-2.81 (m, 1H), 2.67-2.52 (m, 1H), 2.13-1.98 (m, 1H), 1.88-1.71 (m, 4H), 1.56-1.40 (m, 2H). LCMS (ESI) m/z: [M+H]$^+$=429.15.

Example 68. Preparation of N-[[3-([[3-amino-6-(2-hydroxyphenyl)pyridazin-4-yl]oxy]methyl)bicyclo[1.1.1]pentan-1-yl]methyl]-3-[2-(2-[[2-(2,6-dioxopiperidin-3-yl)-1,3-dioxoisoindol-5-yl]oxy]ethoxy)ethoxy]propanamide (Compound 1)

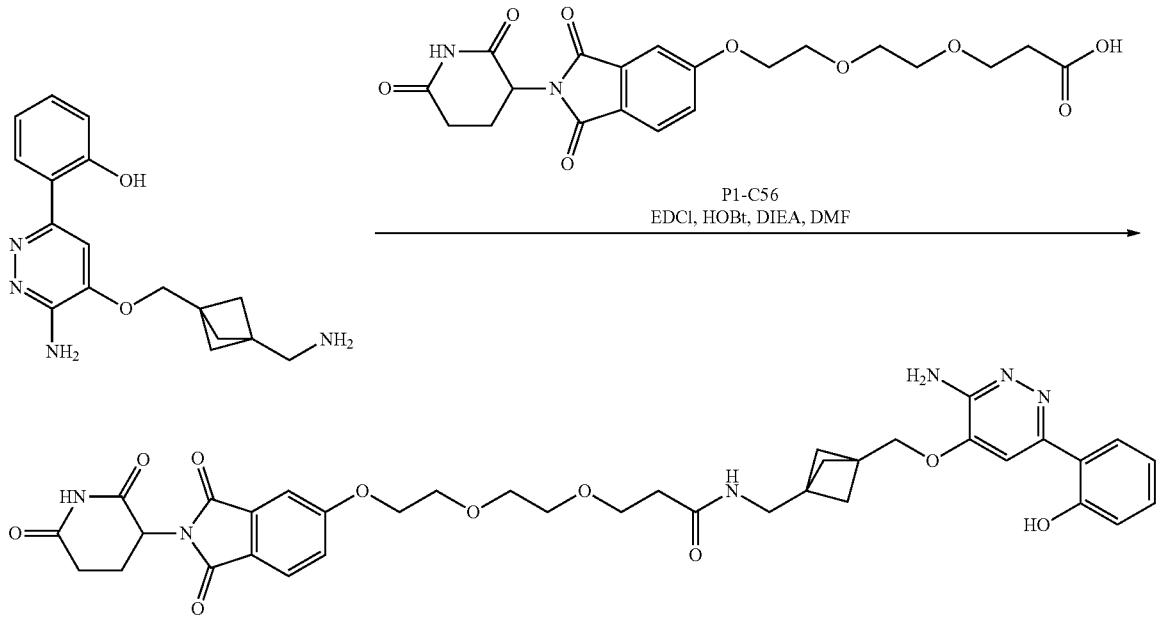

To a stirred mixture of 2-(6-amino-5-[[3-(aminomethyl)bicyclo[1.1.1]pentan-1-yl]methoxy]pyridazin-3-yl)phenol (10.00 mg, 0.032 mmol) and 3-[2-(2-[[2-(2,6-dioxopiperidin-3-yl)-1,3-dioxoisoindol-5-yl]oxy]ethoxy)ethoxy]propanoic acid (13.9 mg, 0.032 mmol) in DMF (2.00 mL) were added EDCI (12.3 mg, 0.064 mmol), HOBT (8.65 mg, 0.064 mmol) and DIEA (12.4 mg, 0.096 mmol) at room temperature. The resulting mixture was stirred for 4 h at room temperature. The crude product was purified by Prep-HPLC (Water:ACN:FA) to afford compound 1 (7.6 mg, 32.0%) as a white solid. $^1$H NMR (300 MHz, DMSO-$d_6$) δ 14.34 (s, 1H), 11.12 (s, 1H), 7.92 (dd, J=8.3, 1.6 Hz, 1H), 7.85-7.75 (m, 2H), 7.57 (s, 1H), 7.44 (d, J=2.3 Hz, 1H), 7.35 (dd, J=8.3, 2.3 Hz, 1H), 7.30-7.19 (m, 1H), 6.94-6.83 (m, 2H), 6.55 (s, 2H), 5.12 (dd, J=12.9, 5.3 Hz, 1H), 4.30 (d, J=4.2 Hz, 4H), 3.77 (t, J=4.4 Hz, 2H), 3.63-3.54 (m, 4H), 3.54-3.47 (m, 2H), 3.16 (d, J=5.7 Hz, 2H), 2.96-2.82 (m, 1H), 2.66-2.53 (m, 2H), 2.31 (t, 2H), 2.11-1.98 (m, 1H), 1.70 (s, 6H). LCMS (ESI) m/z: [M+H]$^+$=729.35.

Example 69. Preparation of 2-(6-amino-5-(2-(3-aminobicyclo[1.1.1]pentan-1-yl)ethoxy)pyridazin-3-yl)phenol hydrochloride

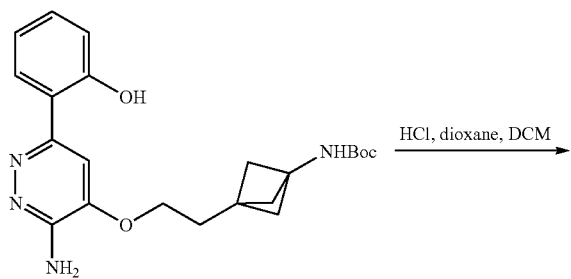

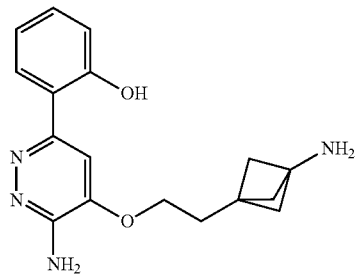

To a stirred solution of tert-butyl (3-(2-((3-amino-6-(2-hydroxyphenyl)pyridazin-4-yl)oxy)ethyl)bicyclo[1.1.1]pentan-1-yl)carbamate (150, 0.364 mmol) in 1,4-dioxane (3.00 mL) was added HCl (gas) in 1,4-dioxane (3.00 mL) dropwise at room temperature. The resulting mixture was stirred for 1 h at room temperature under a nitrogen atmosphere. The resulting mixture was concentrated under reduced pressure. This resulted in 2-(6-amino-5-(2-(3-aminobicyclo[1.1.1]pentan-1-yl)ethoxy)pyridazin-3-yl)phenol hydrochloride (100 mg, 88.0%) as a light yellow solid. LCMS (ESI) m/z: [M+H]$^+$=313.

Example 70. Preparation of Compounds

The compounds in Table C1 were prepared following the scheme protocol in Example 68 using the appropriate and amine and carboxylic acid.

TABLE C1

Compounds of the Invention

| No. | Name | LCMS (ESI) m/z | ¹H NMR |
|-----|------|----------------|--------|
| 2 | N-[[3-([[3-amino-6-(2-hydroxyphenyl)pyridazin-4-yl]oxy]methyl)bicyclo[1.1.1]pentan-1-yl]methyl]-4-[[2-(2,6-dioxopiperidin-3-yl)-1,3-dioxoisoindol-4-yl]oxy]butanamide | 655.35 | ¹H NMR (400 MHz, DMSO-$d_6$) δ 14.39 (s, 1H), 11.11 (s, 1H), 7.94 (dd, J = 8.3, 1.6 Hz, 1H), 7.89-7.78 (m, 2H), 7.57 (s, 1H), 7.52 (d, J = 8.4 Hz, 1H), 7.45 (d, J = 7.2 Hz, 1H), 7.27-7.21 (m, 1H), 6.92-6.85 (m, 2H), 6.52 (s, 2H), 5.11-5.04 (m, 1H), 4.28 (s, 2H), 4.21 (t, J = 6.4 Hz, 2H), 3.17 (d, J = 5.8 Hz, 2H), 2.95-2.82 (m, 1H), 2.63-2.52 (m, 2H), 2.35-2.27 (m, 2H), 2.07-1.93 (m, 3H), 1.69 (s, 6H) |
| 3 | N-[[3-([[3-amino-6-(2-hydroxyphenyl)pyridazin-4-yl]oxy]methyl)bicyclo[1.1.1]pentan-1-yl]methyl]-5-[[2-(2,6-dioxopiperidin-3-yl)-1,3-dioxoisoindol-4-yl]oxy]pentanamide | 669.2 | ¹H NMR (300 MHz, DMSO-$d_6$) δ 14.40 (s, 1H), 11.10 (s, 1H), 7.94 (dd, J = 8.4, 1.7 Hz, 1H), 7.87-7.74 (m, 2H), 7.58 (s, 1H), 7.51 (d, J = 8.5 Hz, 1H), 7.45 (d, J = 7.2 Hz, 1H), 7.30-7.18 (m, 1H), 6.90-6.86 (m, 2H), 6.52 (s, 2H), 5.08 (dd, J = 12.9, 5.4 Hz, 1H), 4.30 (s, 2H), 4.21 (t, J = 5.9 Hz, 2H), 3.18 (d, J = 5.8 Hz, 2H), 2.97-2.79 (m, 1H), 2.65-2.46 (m, 2H), 2.23-2.13 (m, 2H), 2.02 (d, J = 12.9 Hz, 1H), 1.82-1.59 (m, 10H) |
| 4 | N-[[3-([[3-amino-6-(2-hydroxyphenyl)pyridazin-4-yl]oxy]methyl)bicyclo[1.1.1]pentan-1-yl]methyl]-7-[[2-(2,6-dioxopiperidin-3-yl)-1,3-dioxoisoindol-4-yl]oxy]heptanamide | 697.35 | ¹H NMR (300 MHz, DMSO-$d_6$) δ 14.39 (s, 1H), 11.10 (s, 1H), 7.94 (dd, J = 8.3, 1.6 Hz, 1H), 7.85-7.69 (m, 2H), 7.62-7.39 (m, 3H), 7.28-7.18 (m, 1H), 6.94-6.83 (m, 2H), 6.52 (s, 2H), 5.08 (dd, J = 12.8, 5.4 Hz, 1H), 4.30 (s, 2H), 4.19 (t, J = 6.4 Hz, 2H), 3.16 (d, J = 5.8 Hz, 2H), 2.95-2.80 (m, 1H), 2.67-2.54 (m, 2H), 2.15-1.98 (m, 3H), 1.81-1.64 (m, 8H), 1.59-1.42 (m, 4H), 1.39-1.24 (m, 2H) |
| 5 | N-[[3-([[3-amino-6-(2-hydroxyphenyl)pyridazin-4-yl]oxy]methyl)bicyclo[1.1.1]pentan-1-yl]methyl]-8-[[2-(2,6-dioxopiperidin-3-yl)-1,3-dioxoisoindol-4-yl]oxy]octanamide | 711.4 | ¹H NMR (300 MHz, DMSO-$d_6$) δ 14.40 (s, 1H), 11.10 (s, 1H), 7.96-7.89 (m, 1H), 7.84-7.70 (m, 2H), 7.57 (s, 1H), 7.51 (d, J = 8.6 Hz, 1H), 7.43 (d, J = 7.2 Hz, 1H), 7.24 (t, J = 7.8 Hz, 1H), 6.95-6.80 (m, 2H), 6.51 (s, 2H), 5.08 (dd, J = 12.9, 5.3 Hz, 1H), 4.30 (s, 2H), 4.19 (t, J = 6.5 Hz, 2H), 3.16 (d, J = 5.8 Hz, 2H), 2.91-2.81 (m, 1H), 2.65-2.54 (m, 2H), 2.13-1.97 (m, 3H), 1.86-1.58 (m, 8H), 1.57-1.38 (m, 4H), 1.38-1.18 (m, 4H) |
| 6 | N-[[3-([[3-amino-6-(2-hydroxyphenyl)pyridazin-4-yl]oxy]methyl)bicyclo[1.1.1]pentan-1-yl]methyl]-3-[2-(2-[[2-(2,6-dioxopiperidin-3-yl)-1,3-dioxoisoindol-5-yl]amino]ethoxy)ethoxy]propanamide | 728.4 | ¹H NMR (300 MHz, DMSO-$d_6$) δ 14.39 (s, 1H), 11.09 (s, 1H), 7.93 (dd, J = 8.3, 1.6 Hz, 1H), 7.78 (t, J = 5.9 Hz, 1H), 7.65-7.50 (m, 2H), 7.29-7.18 (m, 1H), 7.13 (d, J = 8.6 Hz, 1H), 7.03 (d, J = 7.0 Hz, 1H), 6.93-6.84 (m, 2H), 6.60 (t, J = 5.8 Hz, 1H), 6.51 (s, 2H), 5.06 (dd, J = 12.9, 5.3 Hz, 1H), 4.30 (s, 2H), 3.64-3.56 (m, 4H), 3.56-3.41 (m, 6H), 3.16 (d, J = 5.8 Hz, 2H), 2.96-2.81 (m, 1H), 2.64-2.53 (m, 2H), 2.32 (t, J = 6.4 Hz, 2H), 2.08-1.98 (m, 1H), 1.70 (s, 6H) |
| 7 | N-[[3-([[3-amino-6-(2-hydroxyphenyl)pyridazin-4-yl]oxy]methyl)bicyclo[1.1.1]pentan-1-yl]methyl]-9-[[2-(2,6-dioxopiperidin-3-yl)-1,3-dioxoisoindol-4-yl]amino]nonanamide | 724.45 | ¹H NMR (300 MHz, DMSO-$d_6$) δ 14.40 (s, 1H), 11.09 (s, 1H), 7.93 (d, J = 8.0 Hz, 1H), 7.74 (s, 1H), 7.62-7.53 (m, 2H), 7.24 (t, J = 7.7 Hz, 1H), 7.08 (d, J = 8.6 Hz, 1H), 7.01 (d, J = 7.0 Hz, 1H), 6.94-6.83 (m, 2H), 6.52 (s, 3H), 5.05 (dd, J = 12.7, 5.4 Hz, 1H), 4.30 (s, 2H), 3.30-3.21 (m, 2H), 3.15 (d, J = 5.7 Hz, 2H), 2.96-2.79 (m, 1H), 2.65-2.55 |

TABLE C1-continued

Compounds of the Invention

| No. | Name | LCMS (ESI) m/z | $^1$H NMR |
|---|---|---|---|
| | | | (m, 2H), 2.05 (d, J = 20.8 Hz, 3H), 1.70 (s, 6H), 1.62-1.52 (m, 2H), 1.52-1.42 (m, 2H), 1.40-1.11 (m, 8H) |
| 8 | N-[[3-([[3-amino-6-(2-hydroxyphenyl)pyridazin-4-yl]oxy]methyl)bicyclo[1.1.1]pentan-1-yl]methyl]-11-[[2-(2,6-dioxopiperidin-3-yl)-1,3-dioxoisoindol-4-yl]amino]undecanamide | 752.45 | $^1$H NMR (400 MHz, DMSO-d$_6$) δ 14.38 (s, 1H), 11.09 (s, 1H), 7.93-7.85 (m, 1H), 7.77-7.70 (m, 1H), 7.61-7.53 (m, 2H), 7.29-7.21 (m, 1H), 7.10-7.05 (m, 1H), 7.01 (d, J = 7.0 Hz, 1H), 6.93-6.85 (m, 2H), 6.72-6.55 (m, 1H), 6.54-6.47 (m, 1H), 5.08-5.01 (m, 1H), 4.31 (s, 2H), 3.30-3.23 (m, 2H), 3.15 (d, J = 5.8 Hz, 2H), 2.94-2.81 (m, 1H), 2.63-2.52 (m, 2H), 2.10-1.97 (m, 3H), 1.69 (s, 6H), 1.60-1.51 (m, 2H), 1.51-1.40 (m, 2H), 1.37-1.15 (m, 12H) |
| 9 | N-[[3-([[3-amino-6-(2-hydroxyphenyl)pyridazin-4-yl]oxy]methyl)bicyclo[1.1.1]pentan-1-yl]methyl]-9-[[2-(2,6-dioxopiperidin-3-yl)-1,3-dioxoisoindol-5-yl]amino]nonanamide | 724.40 | $^1$H NMR (400 MHz, DMSO-d$_6$) δ 14.39 (s, 1H), 11.06 (s, 1H), 7.93 (dd, J = 8.3, 1.6 Hz, 1H), 7.73 (t, J = 5.9 Hz, 1H), 7.59-7.51 (m, 2H), 7.28-7.20 (m, 1H), 7.12-7.05 (m, 1H), 6.96-6.79 (m, 4H), 6.51 (s, 2H), 5.06-4.99 (m, 1H), 4.30 (s, 2H), 3.19-3.08 (m, 4H), 2.93-2.80 (m, 1H), 2.62-2.52 (m, 2H), 2.06 (t, J = 7.3 Hz, 2H), 2.02-1.94 (m, 1H), 1.69 (s, 6H), 1.61-1.42 (m, 4H), 1.40-1.17 (m, 8H) |
| 10 | N-[[3-([[3-amino-6-(2-hydroxyphenyl)pyridazin-4-yl]oxy]methyl)bicyclo[1.1.1]pentan-1-yl]methyl]-11-[[2-(2,6-dioxopiperidin-3-yl)-1,3-dioxoisoindol-5-yl]amino]undecanamide | 752.45 | $^1$H NMR (400 MHz, DMSO-d$_6$) δ 11.06 (s, 1H), 7.82-7.70 (m, 2H), 7.59 (s, 1H), 7.55 (d, J = 8.4 Hz, 1H), 7.35-7.24 (m, 1H), 7.14-7.06 (m, 2H), 7.01-6.89 (m, 3H), 6.83 (dd, J = 8.4, 2.1 Hz, 1H), 5.02 (dd, J = 12.8, 5.4 Hz, 1H), 4.35 (s, 2H), 3.18-3.09 (m, 4H), 2.94-2.81 (m, 1H), 2.62-2.52 (m, 2H), 2.06 (t, J = 7.4 Hz, 2H), 2.02-1.95 (m, 1H), 1.69 (s, 6H), 1.60-1.41 (m, 4H), 1.40-1.17 (m, 12H) |
| 11 | N-[[3-([[3-amino-6-(2-hydroxyphenyl)pyridazin-4-yl]oxy]methyl)bicyclo[1.1.1]pentan-1-yl]methyl]-3-[2-(2-[[2-(2,6-dioxopiperidin-3-yl)-1,3-dioxoisoindol-4-yl]amino]ethoxy)ethoxy]propanamide | 728.35 | $^1$H NMR (400 MHz, DMSO-d$_6$) δ 11.09 (s, 1H), 7.89-7.74 (m, 2H), 7.61-7.53 (m, 2H), 7.29 (t, J = 7.7 Hz, 1H), 7.12 (d, J = 8.6 Hz, 1H), 7.03 (d, J = 7.0 Hz, 1H), 6.97-6.87 (m, 2H), 6.87-6.66 (m, 1H), 6.59 (t, J = 5.8 Hz, 1H), 5.05 (dd, J = 13.0, 5.4 Hz, 1H), 4.32 (s, 2H), 3.63-3.56 (m, 4H), 3.56-3.51 (m, 2H), 3.51-3.41 (m, 4H), 3.15 (d, J = 5.8 Hz, 2H), 2.94-2.81 (m, 1H), 2.63-2.52 (m, 2H), 2.31 (t, J = 6.5 Hz, 2H), 2.07-1.97 (m, 1H), 1.69 (s, 6H) |
| 12 | N-[[3-([[3-amino-6-(2-hydroxyphenyl)pyridazin-4-yl]oxy]methyl)bicyclo[1.1.1]pentan-1-yl]methyl]-2-[(2-[[2-(2,6-dioxopiperidin-3-yl)-1,3-dioxoisoindol-4-yl]oxy]acetamido)methyl]cyclopropane-1-carboxamide | 724.3 | $^1$H NMR (300 MHz, DMSO-d$_6$) δ 14.40 (s, 1H), 11.12 (s, 1H), 8.04 (s, 1H), 7.99-7.90 (m, 2H), 7.80 (dd, J = 8.5, 7.3 Hz, 1H), 7.55 (s, 1H), 7.48 (d, J = 7.3 Hz, 1H), 7.41 (d, J = 8.5 Hz, 1H), 7.24 (td, J = 7.6, 1.6 Hz, 1H), 6.93-6.85 (m, 2H), 6.52 (s, 2H), 5.13 (dd, J = 12.8, 5.3 Hz, 1H), 4.78 (s, 2H), 4.26 (s, 2H), 3.31-3.23 (m, 2H), 3.20 (d, J = 5.1 Hz, 2H), 2.97-2.83 (m, 1H), 2.67-2.55 (m, 2H), 2.12-1.98 (m, 1H), 1.80-1.58 (m, 7H), 1.42-1.25 (m, 1H), 0.93-0.77 (m, 2H) |
| 13 | N-[[3-([[3-amino-6-(2-hydroxyphenyl)pyridazin-4-yl]oxy]methyl)bicyclo[1.1.1]pentan-1-yl]methyl]-2-[(2-[[2-(2,6-dioxopiperidin-3-yl)-1,3-dioxoisoindol-5- | 724.35 | $^1$H NMR (400 MHz, DMSO-d$_6$) δ 14.39 (s, 1H), 11.11 (s, 1H), 8.34 (t, J = 5.7 Hz, 1H), 7.99-7.90 (m, 2H), 7.86 (d, J = 8.4 Hz, 1H), 7.57 (s, 1H), 7.45 (d, J = 2.3 Hz, 1H), |

TABLE C1-continued

Compounds of the Invention

| No. | Name | LCMS (ESI) m/z | $^1$H NMR |
|-----|------|----------------|-----------|
|  | yl]oxy]acetamido)methyl]cyclopropane-1-carboxamide |  | 7.38 (dd, J = 8.4, 2.3 Hz, 1H), 7.27-7.20 (m, 1H), 6.92-6.85 (m, 2H), 6.51 (s, 2H), 5.15-5.08 (m, 1H), 4.73 (s, 2H), 4.29 (s, 2H), 3.27-3.14 (m, 2H), 3.14-3.06 (m, 1H), 3.04-2.95 (m, 1H), 2.94-2.82 (m, 1H), 2.64-2.52 (m, 2H), 2.10-2.00 (m, 1H), 1.71 (s, 6H), 1.56-1.49 (m, 1H), 1.42-1.31 (m, 1H), 0.88-0.77 (m, 1H), 0.68-0.60 (m, 1H) |
| 14 | N-((3-(((3-amino-6-(2-hydroxyphenyl)pyridazin-4-yl)oxy)methyl)bicyclo[1.1.1]pentan-1-yl)methyl)-3-(2-(2-((2-(2,6-dioxopiperidin-3-yl)-1,3-dioxoisoindolin-4-yl)oxy)ethoxy)ethoxy)propanamide | 728.76 | $^1$H NMR (300 MHz, DMSO-d$_6$) δ 14.39 (s, 1H), 11.10 (s, 1H), 7.98-7.89 (m, 1H), 7.86-7.74 (m, 2H), 7.60-7.48 (m, 2H), 7.45 (d, J = 7.2 Hz, 1H), 7.30-7.19 (m, 1H), 6.95-6.83 (m, 2H), 6.51 (s, 2H), 5.09 (dd, J = 12.8, 5.4 Hz, 1H), 4.39-4.22 (m, 4H), 3.85-3.73 (m, 2H), 3.67-3.55 (m, 4H), 3.54-3.46 (m, 2H), 3.20-3.10 (m, 2H), 2.97-2.80 (m, 1H), 2.65-2.53 (m, 2H), 2.32 (t, J = 6.4 Hz, 2H), 2.10-1.97 (m, 1H), 1.70 (s, 6H) |
| 15 | N-((3-(((3-amino-6-(2-hydroxyphenyl)pyridazin-4-yl)oxy)methyl)bicyclo[1.1.1]pentan-1-yl)methyl)-1-(2-((2-(2,6-dioxopiperidin-3-yl)-1,3-dioxoisoindolin-5-yl)oxy)ethyl)piperidine-4-carboxamide | 724.00 | $^1$H NMR (300 MHz, DMSO-d$_6$) δ 14.27 (s, 1H), 11.19 (s, 1H), 8.24 (s, 1H, FA), 8.05-7.97 (m, 1H), 7.91 (d, J = 8.3 Hz, 1H), 7.79 (t, J = 5.8 Hz, 1H), 7.65 (s, 1H), 7.53 (d, J = 2.2 Hz, 1H), 7.44 (dd, J = 8.3, 2.2 Hz, 1H), 7.37-7.25 (m, 1H), 7.01-6.90 (m, 2H), 6.59 (s, 2H), 5.19 (dd, J = 12.9, 5.3 Hz, 1H), 4.36 (d, J = 4.3 Hz, 4H), 3.22 (d, J = 5.8 Hz, 2H), 3.08-2.87 (m, 4H), 2.78 (d, J = 5.7 Hz, 2H), 2.73-2.58 (m, 1H), 2.16-2.03 (m, 4H), 1.76 (s, 6H), 1.72-1.66 (m, 4H) |
| 16 | N-((3-(((3-amino-6-(2-hydroxyphenyl)pyridazin-4-yl)oxy)methyl)bicyclo[1.1.1]pentan-1-yl)methyl)-3-(4-(2-(2,6-dioxopiperidin-3-yl)-1,3-dioxoisoindolin-5-yl)piperazin-1-yl) propanamide | 709.25 | $^1$H NMR (300 MHz, DMSO-d$_6$) δ 14.45 (s, 1H), 11.15 (s, 1H), 8.05-7.92 (m, 2H), 7.75 (d, J = 8.5 Hz, 1H), 7.65 (s, 1H), 7.42 (d, J = 2.2 Hz, 1H), 7.31 (td, J = 7.5, 6.7, 1.7 Hz, 1H), 7.01-6.90 (m, 2H), 6.58 (s, 2H), 5.14 (dd, J = 12.7, 5.3 Hz, 1H), 4.38 (s, 2H), 3.57-3.45 (m, 8H), 3.25 (d, J = 5.7 Hz, 2H), 2.99-2.87 (m, 1H), 2.70-2.59 (m, 4H), 2.38 (d, J = 7.0 Hz, 2H), 2.13-2.03 (m, 1H), 1.79 (s, 6H) |
| 17 | N-((3-(((3-amino-6-(2-hydroxyphenyl)pyridazin-4-yl)oxy)methyl)bicyclo[1.1.1]pentan-1-yl)methyl)-3-(6-(2-(2,6-dioxopiperidin-3-yl)-1,3-dioxoisoindolin-5-yl)-2,6-diazaspiro [3.3]heptan-2-yl)propanamide | 721.25 | $^1$H NMR (300 MHz, DMSO-d$_6$) δ 14.35 (s, 1H), 11.07 (s, 1H), 8.23 (s, 1H, FA), 7.94 (dd, J = 8.4, 1.6 Hz, 1H), 7.87 (t, J = 5.8 Hz, 1H), 7.67-7.56 (m, 2H), 7.30-7.19 (m, 1H), 6.95-6.84 (m, 2H), 6.78 (d, J = 2.1 Hz, 1H), 6.63 (dd, J = 8.3, 2.1 Hz, 1H), 6.52 (s, 2H), 5.05 (dd, J = 12.9, 5.4 Hz, 1H), 4.32 (s, 2H), 4.08 (s, 4H), 3.29 (s, 4H), 3.16 (d, J = 5.7 Hz, 2H), 2.94-2.82 (m, 1H), 2.64-2.53 (m, 4H), 2.09 (t, J = 7.0 Hz, 2H), 2.05-1.91 (m, 1H), 1.72 (s, 6H) |
| 18 | N-(3-(2-((3-amino-6-(2-hydroxyphenyl)pyridazin-4-yl)oxy)ethyl)bicyclo[1.1.1]pentan-1-yl)-4-((2-(2,6-dioxopiperidin-3-yl)-1,3-dioxoisoindolin-4-yl)oxy)butanamide | 655.20 | $^1$H NMR (400 MHz, DMSO-d$_6$) δ 11.10 (s, 1H), 8.36 (s, 1H), 7.87-7.74 (m, 2H), 7.64 (s, 1H), 7.51 (d, J = 8.5 Hz, 1H), 7.45 (d, J = 7.2 Hz, 1H), 7.34 (t, J = 7.9 Hz, 1H), 7.11-6.87 (m, 3H), 5.07 (dd, J = 12.7, 5.4 Hz, 1H), 4.31 (t, J = 6.5 Hz, 2H), |

TABLE C1-continued

Compounds of the Invention

| No. | Name | LCMS (ESI) m/z | $^1$H NMR |
|---|---|---|---|
| | | | 4.20 (t, J = 6.3 Hz, 2H), 2.88-2.85 (m, 1H), 2.67-2.52 (m, 2H), 2.24 (t, J = 7.4 Hz, 2H), 2.11-1.98 (m, 3H), 1.98-1.88 (m, 8H) |
| 19 | N-(3-(2-((3-amino-6-(2-hydroxyphenyl)pyridazin-4-yl)oxy)ethyl)bicyclo[1.1.1]pentan-1-yl)-5-((2-(2,6-dioxopiperidin-3-yl)-1,3-dioxoisoindolin-4-yl)oxy)pentanamide | 669.30 | $^1$H NMR (400 MHz, DMSO-d$_6$) δ 11.11 (s, 1H), 8.31 (s, 1H), 7.81 (dd, J = 8.5, 7.2 Hz, 1H), 7.69-7.54 (m, 3H), 7.50 (d, J = 8.6 Hz, 1H), 7.47-7.36 (m, 2H), 7.06 (d, J = 8.1 Hz, 1H), 7.00 (t, J = 7.5 Hz, 1H), 5.07 (dd, J = 12.7, 5.4 Hz, 1H), 4.35 (t, J = 6.5 Hz, 2H), 4.19 (t, J = 6.2 Hz, 2H), 2.95-2.81 (m, 1H), 2.64-2.51 (m, 2H), 2.13-1.98 (m, 5H), 1.91 (s, 6H), 1.78-1.60 (m, 4H) |
| 20 | N-[3-(2-[[3-amino-6-(2-hydroxyphenyl)pyridazin-4-yl]oxy]ethyl)bicyclo[1.1.1]pentan-1-yl]-7-[[2-(2,6-dioxopiperidin-3-yl)-1,3-dioxoisoindol-4-yl]oxy]heptanamide | 697.30 | $^1$H NMR (300 MHz, DMSO-d$_6$) δ 14.42 (s, 1H), 11.06 (s, 1H), 8.24 (s, 1H), 7.98 (d, J = 7.9 Hz, 1H), 7.81 (t, J = 7.8 Hz, 1H), 7.60 (s, 1H), 7.51 (d, J = 8.5 Hz, 1H), 7.44 (d, J = 7.2 Hz, 1H), 7.26 (t, J = 7.7 Hz, 1H), 6.91 (t, J = 7.2 Hz, 1H), 6.45 (s, 2H), 5.08 (dd, J = 12.8, 5.5 Hz, 1H), 4.23 (dt, J = 19.7, 6.3 Hz, 4H), 2.94-2.82 (m, 1H), 2.64-2.54 (m, 2H), 2.02 (dd, J = 14.7, 6.9 Hz, 5H), 1.92 (s, 6H), 1.80-1.68 (m, 2H), 1.54-1.39 (m, 4H), 1.36-1.24 (m, 2H) |
| 21 | N-[3-(2-[[3-amino-6-(2-hydroxyphenyl)pyridazin-4-yl]oxy]ethyl)bicyclo[1.1.1]pentan-1-yl]-8-[[2-(2,6-dioxopiperidin-3-yl)-1,3-dioxoisoindol-4-yl]oxy]octanamide | 711.35 | $^1$H NMR (300 MHz, DMSO-d$_6$) δ 14.44 (d, J = 28.3 Hz, 1H), 11.11 (s, 1H), 8.24 (s, 1H), 7.98 (d, J = 7.9 Hz, 1H), 7.81 (t, J = 7.9 Hz, 1H), 7.60 (s, 1H), 7.51 (d, J = 8.6 Hz, 1H), 7.44 (d, J = 7.2 Hz, 1H), 7.25 (t, J = 7.7 Hz, 1H), 6.89 (d, J = 7.8 Hz, 2H), 6.45 (s, 2H), 5.09 (dd, 1H), 4.32-4.12 (m, 4H), 2.92 (d, J = 4.7 Hz, 1H), 2.67-2.55 (m, 2H), 2.10-1.97 (m, 5H), 1.92 (s, 6H), 1.80-1.68 (m, 2H), 1.52-1.39 (m, 4H), 1.37-1.19 (m, 4H) |
| 22 | N-[3-(2-[[3-amino-6-(2-hydroxyphenyl)pyridazin-4-yl]oxy]ethyl)bicyclo[1.1.1]pentan-1-yl]-3-[2-[[2-(2,6-dioxopiperidin-3-yl)-1,3-dioxoisoindol-5-yl]amino]ethoxy)ethoxy]propanamide | 728.35 | $^1$H NMR (300 MHz, DMSO-d$_6$) δ 14.42 (s, 1H), 11.10 (s, 1H), 8.30 (s, 1H), 7.97 (dd, J = 8.4, 1.7 Hz, 1H), 7.62-7.53 (m, 2H), 7.25 (ddd, J = 8.5, 7.2, 1.5 Hz, 1H), 7.14 (d, J = 8.6 Hz, 1H), 7.04 (d, J = 7.0 Hz, 1H), 6.94-6.85 (m, 2H), 6.60 (t, J = 5.7 Hz, 1H), 6.45 (s, 2H), 5.06 (dd, J = 12.7, 5.3 Hz, 1H), 4.26 (t, J = 6.4 Hz, 2H), 3.65-3.50 (m, 6H), 3.51-3.41 (m, 4H), 2.93-2.83 (m, 1H), 2.64-2.54 (m, 2H), 2.31-2.20 (m, 2H), 2.08-1.98 (m, 3H), 1.92 (s, 6H) |
| 23 | N-[3-(2-[[3-amino-6-(2-hydroxyphenyl)pyridazin-4-yl]oxy]ethyl)bicyclo[1.1.1]pentan-1-yl]-9-[[2-(2,6-dioxopiperidin-3-yl)-1,3-dioxoisoindol-4-yl]amino]nonanamide | 723.90 | $^1$H NMR (300 MHz, DMSO-d$_6$) δ 14.42 (s, 1H), 11.10 (s, 1H), 8.23 (s, 1H), 7.98 (dd, J = 8.3, 1.7 Hz, 1H), 7.63-7.53 (m, 2H), 7.29-7.21 (m, 1H), 7.05 (dd, J = 21.2, 7.8 Hz, 2H), 6.95-6.86 (m, 2H), 6.57-6.42 (m, 3H), 5.05 (dd, J = 12.8, 5.3 Hz, 1H), 4.26 (t, J = 6.5 Hz, 2H), 3.29-3.23 (m, 2H), 2.94-2.83 (m, 1H), 2.64-2.53 (m, 2H), 2.09-1.95 (m, 5H), 1.91 (s, 6H), 1.62-1.41 (m, 4H), 1.37-1.17 (m, 8H) |
| 24 | N-[3-(2-[[3-amino-6-(2-hydroxyphenyl)pyridazin-4-yl]oxy]ethyl)bicyclo[1.1.1]pentan-1-yl]- | 752.45 | $^1$H NMR (300 MHz, DMSO-d$_6$) δ 11.17 (s, 1H), 8.30 (s, 1H), 7.81-7.70 (m, 2H), 7.68-7.61 (m, 1H), |

TABLE C1-continued

Compounds of the Invention

| No. | Name | LCMS (ESI) m/z | $^1$H NMR |
|---|---|---|---|
|  | 11-[[2-(2,6-dioxopiperidin-3-yl)-1,3-dioxoisoindol-4-yl]amino]undecanamide |  | 7.51-7.32 (m, 2H), 7.20-7.00 (m, 4H), 6.64-6.55 (m, 1H), 5.16-5.07 (m, 1H), 4.40 (t, J = 6.4 Hz, 2H), 3.40-3.28 (m, 2H), 3.04-2.87 (m, 1H), 2.71-2.60 (m, 2H), 2.18-2.09 (m, 3H), 2.04 (t, J = 7.5 Hz, 2H), 1.97 (s, 6H), 1.70-1.57 (m, 2H), 1.56-1.44 (m, 2H), 1.44-1.20 (m, 12H) |
| 25 | N-[3-(2-[[3-amino-6-(2-hydroxyphenyl)pyridazin-4-yl]oxy]ethyl)bicyclo[1.1.1]pentan-1-yl]-9-[[2-(2,6-dioxopiperidin-3-yl)-1,3-dioxoisoindol-5-yl]amino]nonanamide | 724.40 | $^1$H NMR (400 MHz, DMSO-d$_6$) δ 14.41 (s, 1H), 11.06 (s, 1H), 8.23 (s, 1H), 7.97 (dd, J = 8.4, 1.7 Hz, 1H), 7.60 (s, 1H), 7.55 (d, J = 8.4 Hz, 1H), 7.28-7.21 (m, 1H), 7.10 (t, J = 5.4 Hz, 1H), 6.96-6.86 (m, 3H), 6.83 (dd, J = 8.4, 2.1 Hz, 1H), 6.44 (s, 2H), 5.02 (dd, J = 12.9, 5.4 Hz, 1H), 4.25 (t, J = 6.4 Hz, 2H), 3.18-3.09 (m, 2H), 2.93-2.81 (m, 1H), 2.62-2.52 (m, 2H), 2.05 (t, J = 6.3 Hz, 2H), 2.02-1.94 (m, 3H), 1.91 (s, 6H), 1.61-1.50 (m, 2H), 1.50-1.40 (m, 2H), 1.40-1.16 (m, 8H) |
| 26 | N-[3-(2-[[3-amino-6-(2-hydroxyphenyl)pyridazin-4-yl]oxy]ethyl)bicyclo[1.1.1]pentan-1-yl]-11-[[2-(2,6-dioxopiperidin-3-yl)-1,3-dioxoisoindol-5-yl]amino]undecanamide | 752.45 | $^1$H NMR (400 MHz, DMSO-d$_6$) δ 14.41 (s, 1H), 11.06 (s, 1H), 8.22 (s, 1H), 8.00-7.94 (m, 1H), 7.60 (s, 1H), 7.55 (d, J = 8.4 Hz, 1H), 7.28-7.21 (m, 1H), 7.09 (t, J = 5.4 Hz, 1H), 6.95-6.86 (m, 3H), 6.83 (dd, J = 8.4, 2.1 Hz, 1H), 6.44 (s, 2H), 5.02 (dd, J = 12.9, 5.5 Hz, 1H), 4.25 (t, J = 6.5 Hz, 2H), 3.18-3.09 (m, 2H), 2.93-2.81 (m, 1H), 2.61-2.52 (m, 2H), 2.05 (t, J = 6.3 Hz, 2H), 2.01-1.94 (m, 3H), 1.91 (s, 6H), 1.60-1.50 (m, 2H), 1.49-1.39 (m, 2H), 1.39-1.15 (m, 12H) |
| 27 | N-[3-(2-[[3-amino-6-(2-hydroxyphenyl)pyridazin-4-yl]oxy]ethyl)bicyclo[1.1.1]pentan-1-yl]-3-[2-(2-[[2-(2,6-dioxopiperidin-3-yl)-1,3-dioxoisoindol-4-yl]amino]ethoxy)ethoxy]propanamide | 728.35 | $^1$H NMR (400 MHz, DMSO-d$_6$) δ 14.41 (s, 1H), 11.09 (s, 1H), 8.30 (s, 1H), 7.97 (dd, J = 8.5, 1.6 Hz, 1H), 7.61-7.53 (m, 2H), 7.28-7.21 (m, 1H), 7.14 (d, J = 8.6 Hz, 1H), 7.03 (d, J = 7.0 Hz, 1H), 6.93-6.86 (m, 2H), 6.63-6.56 (m, 1H), 6.44 (s, 2H), 5.09-5.01 (m, 1H), 4.25 (t, J = 6.4 Hz, 2H), 3.63-3.51 (m, 6H), 3.50-3.42 (m, 4H), 2.94-2.82 (m, 1H), 2.63-2.52 (m, 2H), 2.24 (t, J = 6.5 Hz, 2H), 2.08-1.97 (m, 3H), 1.91 (s, 6H) |
| 28 | N-[3-(2-[[3-amino-6-(2-hydroxyphenyl)pyridazin-4-yl]oxy]ethyl)bicyclo[1.1.1]pentan-1-yl]-2-[(2-[[2-(2,6-dioxopiperidin-3-yl)-1,3-dioxoisoindol-4-yl]oxy]acetamido)methyl]cyclopropane-1-carboxamide | 723.80 | $^1$H NMR (300 MHz, DMSO-d$_6$) δ 14.42 (s, 1H), 11.10 (s, 1H), 8.53 (s, 1H), 8.01-7.92 (m, 2H), 7.81 (t, J = 7.9 Hz, 1H), 7.60 (s, 1H), 7.50 (d, J = 7.2 Hz, 1H), 7.41 (d, J = 8.5 Hz, 1H), 7.26 (t, J = 7.8 Hz, 1H), 6.91 (t, J = 7.2 Hz, 2H), 6.45 (s, 2H), 5.13 (dd, J = 12.5, 5.3 Hz, 1H), 4.78 (s, 2H), 4.24 (d, J = 6.6 Hz, 2H), 3.30-3.24 (m, 2H), 2.96-2.84 (m, 1H), 2.65-2.56 (m, 2H), 2.11-2.00 (m, 3H), 1.91 (s, 6H), 1.62-1.55 (m, 1H), 1.36-1.26 (m, 1H), 0.91-0.76 (m, 2H) |
| 29 | N-(3-(2-((3-amino-6-(2-hydroxyphenyl)pyridazin-4-yl)oxy)ethyl)bicyclo[1.1.1]pentan-1-yl)-2-((2-((2-(2,6-dioxopiperidin-3-yl)-1,3-dioxoisoindolin-5-yl)oxy)acetamido)methyl)cyclopropane-1-carboxamide | 723.90 | $^1$H NMR (400 MHz, DMSO-d$_6$) δ 14.42 (s, 1H), 11.12 (s, 1H), 8.54 (s, 1H), 8.36 (t, J = 5.7 Hz, 1H), 8.00-7.94 (m, 1H), 7.87 (d, J = 8.3 Hz, 1H), 7.60 (s, 1H), 7.45 (d, J = 2.3 Hz, 1H), 7.38 (dd, J = 8.3, 2.3 Hz, 1H), 7.29-7.21 (m, 1H), 6.90 (t, J = 7.4 Hz, 2H), 6.44 (s, 2H), 5.12 (dd, J = 12.9, 5.4 Hz, 1H), 4.73 (s, 2H), 4.26 (t, J = 6.4 Hz, 2H), |

TABLE C1-continued

Compounds of the Invention

| No. | Name | LCMS (ESI) m/z | $^1$H NMR |
|---|---|---|---|
| | | | 3.21-3.10 (m, 1H), 3.08-2.99 (m, 1H), 2.98-2.81 (m, 1H), 2.64-2.53 (m, 2H), 2.05 (t, J = 6.4 Hz, 3H), 1.92 (s, 6H), 1.43-1.29 (m, 2H), 0.88-0.75 (m, 1H), 0.67-0.58 (m, 1H) |
| 30 | N-(3-(2-((3-amino-6-(2-hydroxyphenyl)pyridazin-4-yl)oxy)ethyl)bicyclo[1.1.1]pentan-1-yl)-3-(2-(2-((2-(2,6-dioxopiperidin-3-yl)-1,3-dioxoisoindolin-4-yl)oxy)ethoxy)ethoxy)propanamide | 728.9 | $^1$H NMR (400 MHz, DMSO-d$_6$) δ 11.11 (s, 1H), 8.32 (s, 1H), 7.85-7.76 (m, 1H), 7.71 (d, J = 7.6 Hz, 1H), 7.64 (s, 1H), 7.53 (d, J = 8.5 Hz, 1H), 7.45 (d, J = 7.2 Hz, 1H), 7.37 (t, J = 7.8 Hz, 1H), 7.31-7.25 (m, 1H), 7.04-6.93 (m, 2H), 5.08 (dd, J = 12.7, 5.4 Hz, 1H), 4.32 (q, J = 6.8, 5.2 Hz, 4H), 3.79 (dd, J = 5.7, 3.4 Hz, 2H), 3.65-3.57 (m, 2H), 3.56-3.51 (m, 2H), 3.50-3.45 (m, 4H), 2.94-2.80 (m, 1H), 2.65-2.52 (m, 2H), 2.24 (t, J = 6.5 Hz, 2H), 2.10-1.97 (m, 3H), 1.90 (s, 6H) |
| 31 | N-(3-(2-((3-amino-6-(2-hydroxyphenyl)pyridazin-4-yl)oxy)ethyl)bicyclo[1.1.1]pentan-1-yl)-3-(2-(2-((2-(2,6-dioxopiperidin-3-yl)-1,3-dioxoisoindolin-5-yl)oxy)ethoxy)ethoxy)propanamide | 729.35 | $^1$H NMR (400 MHz, DMSO-d$_6$) δ 14.41 (s, 1H), 11.11 (s, 1H), 8.32 (s, 1H), 7.96 (dd, J = 8.3, 1.7 Hz, 1H), 7.83 (d, J = 8.3 Hz, 1H), 7.59 (s, 1H), 7.45 (d, J = 2.3 Hz, 1H), 7.36 (dd, J = 8.4, 2.3 Hz, 1H), 7.25 (ddd, J = 8.5, 7.2, 1.6 Hz, 1H), 6.90 (ddd, J = 8.2, 6.2, 1.4 Hz, 2H), 6.44 (s, 2H), 5.11 (dd, J = 12.9, 5.4 Hz, 1H), 4.33-4.21 (m, 4H), 3.81-3.74 (m, 2H), 3.61-3.53 (m, 4H), 3.50 (d, J = 5.2 Hz, 2H), 2.94-2.81 (m, 1H), 2.64-2.52 (m, 2H), 2.25 (t, J = 6.5 Hz, 2H), 2.04 (t, J = 6.4 Hz, 3H), 1.92 (s, 6H) |
| 32 | N-(3-(2-((3-amino-6-(2-hydroxyphenyl)pyridazin-4-yl)oxy)ethyl)bicyclo[1.1.1]pentan-1-yl)-1-(2-((2-(2,6-dioxopiperidin-3-yl)-1,3-dioxoisoindolin-5-yl)oxy)ethyl)piperidine-4-carboxamide | 724.30 | $^1$H NMR (300 MHz, DMSO-d$_6$) δ 11.11 (s, 1H), 8.22 (s, 1H), 8.20 (s, 1H, FA), 7.97 (dd, J = 8.4, 1.7 Hz, 1H), 7.82 (d, J = 8.3 Hz, 1H), 7.60 (s, 1H), 7.45 (d, J = 2.3 Hz, 1H), 7.36 (dd, J = 8.3, 2.3 Hz, 1H), 7.31-7.19 (m, 1H), 6.96-6.85 (m, 2H), 6.44 (s, 2H), 5.12 (dd, J = 12.9, 5.4 Hz, 1H), 4.32-4.21 (m, 4H), 2.99-2.88 (m, 3H), 2.76-2.66 (m, 2H), 2.65-2.51 (m, 2H), 2.10-1.93 (m, 6H), 1.91 (s, 6H), 1.65-1.43 (m, 4H) |
| 33 | N-(3-(2-((3-amino-6-(2-hydroxyphenyl)pyridazin-4-yl)oxy)ethyl)bicyclo[1.1.1]pentan-1-yl)-3-(4-(2-(2,6-dioxopiperidin-3-yl)-1,3-dioxoisoindolin-5-yl)piperazin-1-yl)propanamide | 709.15 | $^1$H NMR (300 MHz, DMSO-d$_6$) δ 14.20 (s, 1H), 11.09 (s, 1H), 8.39 (s, 1H), 8.20 (s, 1H, FA), 7.98 (d, J = 7.8 Hz, 1H), 7.68 (d, J = 8.5 Hz, 1H), 7.61 (s, 1H), 7.35 (s, 1H), 7.25 (t, J = 7.3 Hz, 2H), 6.91 (t, J = 7.2 Hz, 2H), 6.45 (s, 2H), 5.07 (dd, J = 12.7, 5.4 Hz, 1H), 4.27 (t, J = 6.2 Hz, 2H), 3.55-3.35 (m, 8H), 2.92-2.81 (m, 1H), 2.66-2.53 (m, 4H), 2.22 (t, J = 7.3 Hz, 2H), 2.12-2.01 (m, 3H), 1.94 (s, 6H) |
| 34 | N-(3-(2-((3-amino-6-(2-hydroxyphenyl)pyridazin-4-yl)oxy)ethyl)bicyclo[1.1.1]pentan-1-yl)-3-(6-(2-(2,6-dioxopiperidin-3-yl)-1,3-dioxoisoindolin-5-yl)-2,6-diazaspiro[3.3]heptan-2-yl)propanamide | 721.25 | $^1$H NMR (300 MHz, DMSO-d$_6$) δ 14.40 (s, 1H), 11.14 (s, 1H), 8.42 (s, 1H), 8.28 (s, 1H, FA), 8.10-8.01 (m, 1H), 7.75-7.65 (m, 2H), 7.38-7.27 (m, 1H), 7.03-6.92 (m, 2H), 6.86 (d, J = 2.0 Hz, 1H), 6.76-6.66 (m, 1H), 6.53 (s, 2H), 5.13 (dd, J = 12.8, 5.4 Hz, 1H), 4.33 (t, J = 6.4 Hz, 2H), 4.15 (s, 4H), 3.36-3.26 (m, 6H), 2.98-2.88 (m, 1H), 2.65-2.58 (m, 2H), 2.16-2.01 (m, 5H), 2.00 (s, 6H) |

TABLE C1-continued

Compounds of the Invention

| No. | Name | LCMS (ESI) m/z | $^1$H NMR |
|---|---|---|---|
| 35 | N1-((3-(((3-amino-6-(2-hydroxyphenyl)pyridazin-4-yl)oxy)methyl)bicyclo[1.1.1]pentan-1-yl)methyl)-N6-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)adipamide | 852.90 | $^1$H NMR (400 MHz, DMSO-d$_6$) δ 14.32 (s, 1H), 8.91 (s, 1H), 8.50 (t, J = 6.0 Hz, 1H), 7.92-7.65 (m, 3H), 7.53-7.12 (m, 6H), 6.82 (dd, J = 8.0, 4.2 Hz, 2H), 6.45 (s, 2H), 5.09 (s, 1H), 4.47 (d, J = 9.2 Hz, 1H), 4.41-4.30 (m, 2H), 4.29-4.05 (m, 4H), 3.58 (s, 2H), 2.37 (s, 3H), 2.20 (d, J = 14.2 Hz, 1H), 1.99 (dq, J = 20.0, 12.1, 8.6 Hz, 4H), 1.87-1.78 (m, 1H), 1.62 (s, 6H), 1.40 (s, 4H), 0.85 (s, 9H) |
| 36 | N1-((3-(((3-amino-6-(2-hydroxyphenyl)pyridazin-4-yl)oxy)methyl)bicyclo[1.1.1]pentan-1-yl)methyl)-N14-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)-3,6,9,12-tetraoxatetradecanediamide | 972.20 | $^1$H NMR (400 MHz, DMSO-d$_6$) δ 14.40 (s, 1H), 8.98 (s, 1H), 8.62 (d, J = 6.0 Hz, 1H), 7.94 (d, J = 8.1 Hz, 1H), 7.67 (t, J = 5.5 Hz, 1H), 7.57 (s, 1H), 7.40 (s, 5H), 7.27-7.18 (m, 1H), 6.88 (ddd, J = 7.1, 3.7, 2.4 Hz, 2H), 6.53 (s, 2H), 5.17 (s, 1H), 4.56 (d, J = 9.5 Hz, 1H), 4.46-4.21 (m, 6H), 3.92 (d, J = 38.1 Hz, 4H), 3.71-3.46 (m, 14H), 3.23 (d, J = 6.1 Hz, 2H), 2.44 (s, 3H), 2.12-2.01 (m, 2H), 1.94-1.83 (m, 2H), 1.70 (s, 6H), 0.94 (s, 9H) |
| 37 | N1-((3-(((3-amino-6-(2-hydroxyphenyl)pyridazin-4-yl)oxy)methyl)bicyclo[1.1.1]pentan-1-yl)methyl)-N5-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)glutaramide | 838.90 | $^1$H NMR (400 MHz, DMSO-d$_6$) δ 14.39 (s, 1H), 8.98 (s, 1H), 8.57 (t, J = 6.1 Hz, 1H), 7.98-7.85 (m, 2H), 7.77 (t, J = 5.9 Hz, 1H), 7.57 (s, 1H), 7.40 (q, J = 8.2 Hz, 4H), 7.28-7.17 (m, 1H), 6.88 (ddd, J = 8.3, 3.7, 2.1 Hz, 2H), 6.52 (s, 2H), 5.15 (d, J = 3.5 Hz, 1H), 4.53 (d, J = 9.2 Hz, 1H), 4.42 (ddd, J = 10.4, 6.5, 3.1 Hz, 2H), 4.35 (s, 1H), 4.32-4.17 (m, 3H), 3.66 (d, J = 4.4 Hz, 2H), 3.16 (t, J = 5.0 Hz, 2H), 2.44 (s, 3H), 2.26-2.13 (m, 2H), 2.11-2.00 (m, 3H), 1.94-1.85 (m, 1H), 1.70 (s, 8H), 0.93 (s, 9H) |
| 38 | N1-((3-(((3-amino-6-(2-hydroxyphenyl)pyridazin-4-yl)oxy)methyl)bicyclo[1.1.1]pentan-1-yl)methyl)-N12-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)dodecanediamide | 937.25 | $^1$H NMR (400 MHz, DMSO-d$_6$) δ 14.38 (s, 1H), 8.98 (s, 1H), 8.57 (t, J = 6.1 Hz, 1H), 7.86 (t, J = 10.4 Hz, 2H), 7.74 (t, J = 5.9 Hz, 1H), 7.58 (s, 1H), 7.40 (q, J = 8.2 Hz, 4H), 7.26 (t, J = 7.6 Hz, 1H), 6.90 (t, J = 7.5 Hz, 2H), 6.67 (s, 2H), 5.13 (s, 1H), 4.54 (d, J = 9.4 Hz, 1H), 4.43 (td, J = 8.9, 8.4, 4.9 Hz, 2H), 4.33 (d, J = 11.9 Hz, 3H), 4.21 (dd, J = 15.8, 5.4 Hz, 1H), 3.70-3.57 (m, 2H), 3.15 (d, J = 5.7 Hz, 2H), 2.44 (s, 3H), 2.25 (dt, J = 14.7, 7.6 Hz, 1H), 2.06 (tq, J = 13.2, 7.2 Hz, 4H), 1.90 (ddd, J = 13.0, 8.6, 4.6 Hz, 1H), 1.69 (s, 6H), 1.47 (d, J = 8.6 Hz, 4H), 1.22 (s, 12H), 0.93 (s, 9H) |
| 39 | N1-((3-(((3-amino-6-(2-hydroxyphenyl)pyridazin-4-yl)oxy)methyl)bicyclo[1.1.1]pentan-1-yl)methyl)-N11-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)undecanediamide | 922.90 | $^1$H NMR (400 MHz, DMSO-d$_6$) δ 14.29 (s, 1H), 8.98 (s, 1H), 8.56 (t, J = 6.0 Hz, 1H), 7.94 (d, J = 8.0 Hz, 1H), 7.85 (d, J = 9.2 Hz, 1H), 7.75 (t, J = 6.0 Hz, 1H), 7.57 (s, 1H), 7.40 (q, J = 7.6 Hz, 4H), 7.24 (t, J = 7.6 Hz, 1H), 6.88 (dt, J = 7.6, 3.2 Hz, 2H), 6.52 (s, 2H), 5.15 (s, 1H), 4.54 (d, J = 9.2 Hz, 1H), 4.42 (q, J = 7.2 Hz, 2H), 4.34-4.30 (m, 1H), 4.24 (s, 2H), 4.23-4.20 (m, 1H), 3.58 (d, J = 4.4 Hz, 2H), 3.08 (d, J = 5.6 Hz, 2H), 2.44 (s, 3H), 2.23-2.20 (m, 1H), 2.15-2.00 (m, 4H), |

TABLE C1-continued

Compounds of the Invention

| No. | Name | LCMS (ESI) m/z | ¹H NMR |
|---|---|---|---|
| | | | 1.92-1.85 (m, 1H), 1.69 (s, 6H), 1.47 (br, 4H), 1.22 ((s, 10H), 0.91 (s, 9H) |
| 40 | N1-((3-(((3-amino-6-(2-hydroxyphenyl)pyridazin-4-yl)oxy)methyl)bicyclo[1.1.1]pentan-1-yl)methyl)-N14-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)tetradecanediamide | 965.45 | ¹H NMR (400 MHz, DMSO-$d_6$) δ 14.29 (s, 1H), 8.98 (s, 1H), 8.56 (t, J = 6.0 Hz, 1H), 7.94 (d, J = 8.0 Hz, 1H), 7.85 (d, J = 9.2 Hz, 1H), 7.75 (t, J = 6.0 Hz, 1H), 7.57 (s, 1H), 7.40 (q, J = 7.6 Hz, 4H), 7.24 (t, J = 7.6 Hz, 1H), 6.88 (dt, J = 7.6, 3.2 Hz, 2H), 6.52 (s, 2H), 5.15 (s, 1H), 4.54 (d, J = 9.2 Hz, 1H), 4.42 (q, J = 7.2 Hz, 2H), 4.34-4.30 (m, 1H), 4.24 (s, 2H), 4.23-4.20 (m, 1H), 3.58 (d, J = 4.4 Hz, 2H), 3.08 (d, J = 5.6 Hz, 2H), 2.44 (s, 3H), 2.23-2.20 (m, 1H), 2.15-2.00 (m, 4H), 1.92-1.85 (m, 1H), 1.69 (s, 6H), 1.47 (br, 4H), 1.22 (s, 16H), 0.91 (s, 9H) |
| 41 | N1-((3-(((3-amino-6-(2-hydroxyphenyl)pyridazin-4-yl)oxy)methyl)bicyclo[1.1.1]pentan-1-yl)methyl)-N16-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)hexadecanediamide | 993.35 | ¹H NMR (400 MHz, DMSO-$d_6$) δ 14.29 (s, 1H), 8.98 (s, 1H), 8.56 (t, J = 6.0 Hz, 1H), 7.94 (d, J = 8.0 Hz, 1H), 7.85 (d, J = 9.2 Hz, 1H), 7.75 (t, J = 6.0 Hz, 1H), 7.57 (s, 1H), 7.40 (q, J = 7.6 Hz, 4H), 7.24 (t, J = 7.6 Hz, 1H), 6.88 (dt, J = 7.6, 3.2 Hz, 2H), 6.52 (s, 2H), 5.15 (s, 1H), 4.54 (d, J = 9.2 Hz, 1H), 4.42 (q, J = 7.2 Hz, 2H), 4.34-4.30 (m, 1H), 4.24 (s, 2H), 4.23-4.20 (m, 1H), 3.58 (d, J = 4.4 Hz, 2H), 3.08 (d, J = 5.6 Hz, 2H), 2.44 (s, 3H), 2.23-2.20 (m, 1H), 2.15-2.00 (m, 4H), 1.92-1.85 (m, 1H), 1.69 (s, 6H), 1.47 (br, 4H), 1.22 ((s, 20H), 0.93 (s, 9H) |

Example 71. Preparation of N1-(3-(2-((3-amino-6-(2-hydroxyphenyl)pyridazin-4-yl)oxy)ethyl)bicyclo[1.1.1]pentan-1-yl)-N4-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)succinamide (Compound 42)

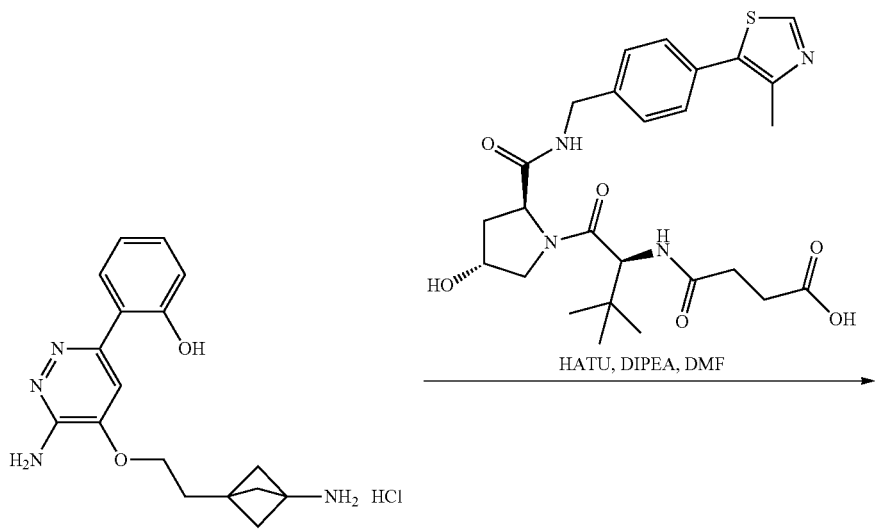

-continued

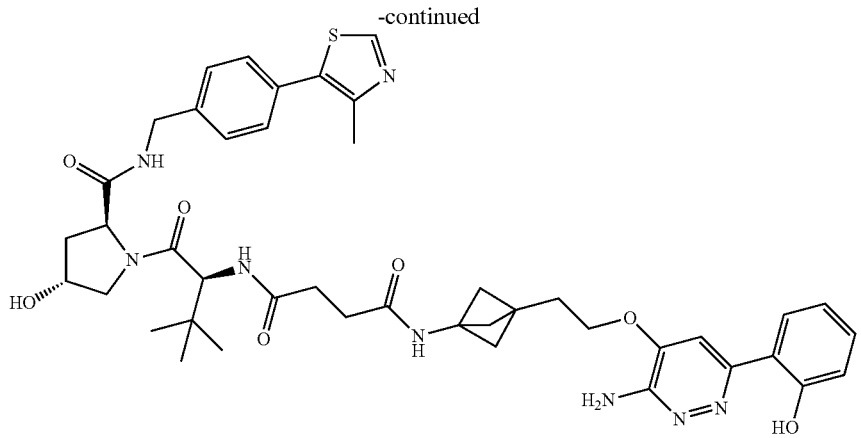

To a stirred mixture of 3-[[(2S)-1-[(2S,4R)-4-hydroxy-2-([[4-(4-methyl-1,3-thiazol-5-yl)phenyl]methyl]carbamoyl)pyrrolidin-1-yl]-3,3-dimethyl-1-oxobutan-2-yl]carbamoyl]propanoic acid (10.0 mg, 0.019 mmol) and 2-(6-amino-5-(2-(3-aminobicyclo[1.1.1]pentan-1-yl)ethoxy)pyridazin-3-yl)phenol hydrochloride (5.89 mg, 0.019 mmol) in DMF (1.00 mL) was added HATU (8.60 mg, 0.023 mmol) and DIPEA (7.31 mg, 0.057 mmol) at room temperature under a nitrogen atmosphere. The mixture solution was purified by Prep-HPLC to afford compound 42 (8.7 mg, 54.8%) as a white solid. $^1$H NMR (300 MHz, DMSO-$d_6$) δ 14.45 (s, 1H), 9.06 (s, 1H), 8.64 (t, J=6.0 Hz, 1H), 8.39 (s, 1H), 8.05 (dd, J=8.4, 1.6 Hz, 1H), 7.94 (d, J=9.3 Hz, 1H), 7.67 (s, 1H), 7.54-7.41 (m, 4H), 7.38-7.26 (m, 1H), 7.03-6.92 (m, 2H), 6.52 (s, 2H), 5.20 (s, 1H), 4.63-4.39 (m, 4H), 4.38-4.23 (m, 3H), 3.71 (d, J=7.3 Hz, 2H), 2.52 (s, 4H), 2.49-2.23 (m, 3H), 2.18-2.04 (m, 3H), 2.00-1.89 (m, 7H), 0.99 (s, 9H). LCMS (ESI) m/z [M+H]$^+$=825.10.

Example 72. Preparation of Compounds

The compounds in Table C2 were prepared following the scheme protocol in Example 71 using the appropriate and amine and carboxylic acid.

TABLE C2

Compounds of the Invention

| No. | Name | LCMS (ESI) m/z | $^1$H NMR |
|---|---|---|---|
| 43 | N1-(3-(2-((3-amino-6-(2-hydroxyphenyl)pyridazin-4-yl)oxy)ethyl)bicyclo[1.1.1]pentan-1-yl)-N6-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)adipamide | 853.20 | $^1$H NMR (300 MHz, DMSO-$d_6$) δ 14.51 (s, 1H), 9.06 (s, 1H), 8.65 (s, 1H), 8.33 (s, 1H), 7.98 (dd, J = 39.1, 8.6 Hz, 2H), 7.67 (s, 1H), 7.47 (q, J = 7.7 Hz, 4H), 6.96 (d, J = 7.8 Hz, 2H), 3.91-3.65 (m, 4H), 7.32 (t, J = 7.6 Hz, 1H), 6.52 (s, 2H), 5.22 (s, 1H), 4.76-4.15 (m, 7H), 3.72 (s, 2H), 2.61 (s, 3H), 2.52 (s, 2H), 2.41-2.04 (m, 6H), 1.99 (s, 6H), 1.50 (s, 4H), 1.00 (s, 9H) |
| 44 | N1-(3-(2-((3-amino-6-(2-hydroxyphenyl)pyridazin-4-yl)oxy)ethyl)bicyclo[1.1.1]pentan-1-yl)-N9-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)nonanediamide nmXR24tm | 895.25 | $^1$H NMR (300 MHz, DMSO-$d_6$) δ 14.82-14.12 (m, 1H), 9.06 (s, 1H), 8.64 (t, J = 6.0 Hz, 1H), 8.31 (s, 1H), 8.09-8.00 (m, 1H), 7.92 (d, J = 9.3 Hz, 1H), 7.67 (s, 1H), 7.54-7.41 (m, 4H), 7.38-7.26 (m, 1H), 7.03-6.92 (m, 2H), 6.52 (s, 2H), 5.20 (d, J = 3.5 Hz, 1H), 4.61 (d, J = 9.4 Hz, 1H), 4.58-4.39 (m, 3H), 4.38-4.22 (m, 3H), 3.72 (s, 2H), 2.52 (s, 3H), 2.41-2.24 (m, 2H), 2.11 (ddq, J = 23.4, 14.8, 7.4 Hz, 6H), 1.98 (s, 6H), 1.52 (s, 4H), 1.29 (s, 6H), 1.00 (s, 9H) |
| 45 | N1-(3-(2-((3-amino-6-(2-hydroxyphenyl)pyridazin-4-yl)oxy)ethyl)bicyclo[1.1.1]pentan-1-yl)-N14-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)-3,6,9,12-tetraoxatetradecanediamide | 973.16 | $^1$H NMR (300 MHz, DMSO-$d_6$) δ 14.47 (s, J = 25.4, 6.8 Hz, 1H), 9.05 (s, 1H), 8.68 (t, J = 6.0 Hz, 1H), 8.19 (d, J = 13.6 Hz, 1H), 8.10-7.99 (m, 1H), 7.68 (s, 1H), 7.47 (s, 5H), 7.39-7.24 (m, 1H), 7.05-6.88 (m, 2H), 6.53 (s, 2H), 5.23 (d, J = 3.5 Hz, 1H), 4.64 (d, J = 9.5 Hz, 1H), 4.51 (t, J = 8.1 Hz, 1H), 4.44 (d, J = 6.3 Hz, 2H), 4.33 (t, J = 6.9 Hz, 3H), 4.04 (s, 2H), 3.86 (s, 2H), 3.74-3.56 (m, 14H), 2.51 (s, 3H), 2.13 (t, J = 6.4 Hz, 3H), 2.03 (s, 7H), 1.01 (s, 9H) |

TABLE C2-continued

Compounds of the Invention

| No. | Name | LCMS (ESI) m/z | $^1$H NMR |
|---|---|---|---|
| 46 | N1-(3-(2-((3-amino-6-(2-hydroxyphenyl)pyridazin-4-yl)oxy)ethyl)bicyclo[1.1.1]pentan-1-yl)-N5-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)glutaramide | 839.40 | $^1$H NMR (300 MHz, DMSO-d$_6$) δ 14.83-14.14 (m, 1H), 9.06 (s, 1H), 8.64 (t, J = 6.0 Hz, 1H), 8.33 (s, 1H), 8.05 (dd, J = 8.4, 1.7 Hz, 1H), 7.95 (d, J = 9.2 Hz, 1H), 7.67 (s, 1H), 7.54-7.41 (m, 4H), 7.32 (td, J = 7.6, 7.1, 1.5 Hz, 1H), 7.03-6.92 (m, 2H), 6.57 (d, J = 29.4 Hz, 2H), 5.21 (d, J = 3.6 Hz, 1H), 4.72-4.20 (m, 7H), 3.82-3.63 (m, 2H), 2.62 (s, 2H), 2.52 (s, 2H), 2.25 (tt, J = 14.1, 7.0 Hz, 2H), 2.20-2.01 (m, 5H), 1.99 (s, 6H), 1.74 (q, J = 7.4 Hz, 2H), 1.01 (s, 9H) |
| 47 | N1-(3-(2-((3-amino-6-(2-hydroxyphenyl)pyridazin-4-yl)oxy)ethyl)bicyclo[1.1.1]pentan-1-yl)-N12-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)dodecanediamide | 937.50 | $^1$H NMR (300 MHz, DMSO-d$_6$) δ 14.92-13.97 (m, 0H), 9.06 (s, 1H), 8.64 (t, J = 6.0 Hz, 1H), 8.31 (s, 1H), 8.05 (dd, J = 8.4, 1.7 Hz, 1H), 7.92 (d, J = 9.2 Hz, 1H), 7.67 (s, 1H), 7.54-7.41 (m, 4H), 7.38-7.26 (m, 1H), 6.97 (dd, J = 7.9, 6.5 Hz, 2H), 6.52 (s, 2H), 5.20 (s, 1H), 4.69-4.19 (m, 7H), 3.73 (d, J = 4.3 Hz, 2H), 2.52 (s, 3H), 2.30 (t, J = 7.4 Hz, 1H), 2.23-2.01 (m, 7H), 1.98 (s, 6H), 1.62-1.41 (m, 4H), 1.29 (s, 12H), 1.00 (s, 9H) |
| 48 | N1-(3-(2-((3-amino-6-(2-hydroxyphenyl)pyridazin-4-yl)oxy)ethyl)bicyclo[1.1.1]pentan-1-yl)-N11-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)undecanediamide; formic acid | 923.20 | $^1$H NMR (300 MHz, DMSO-d$_6$) δ 14.37 (s, 1H), 9.06 (s, 1H), 8.64 (t, J = 6.1 Hz, 1H), 8.43 (s, 1H), 8.31 (s, 1H), 8.05 (dd, J = 8.3, 1.7 Hz, 1H), 7.92 (d, J = 9.3 Hz, 1H), 7.67 (s, 1H), 7.54-7.41 (m, 4H), 7.38-7.26 (m, 1H), 6.97 (dd, J = 7.8, 6.5 Hz, 2H), 6.52 (s, 2H), 5.20 (s, 1H), 4.61-4.22(m, 7H), 3.72 (s, 2H), 2.52 (s, 3H), 2.30 (t, J = 7.6 Hz, 1H), 2.11 (ddt, J = 24.0, 14.9, 7.4 Hz, 6H), 1.98 (s, 6H), 1.55-1.47 (m, 4H), 1.29 (s, 10H), 1.00 (s, 9H). |
| 49 | N1-(3-(2-((3-amino-6-(2-hydroxyphenyl)pyridazin-4-yl)oxy)ethyl)bicyclo[1.1.1]pentan-1-yl)-N14-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)tetradecanediamide | 965.20 | $^1$H NMR (300 MHz, DMSO-d$_6$) δ 8.98 (s, 1H), 8.56 (t, J = 6.0 Hz, 1H), 8.22 (s, 1H), 7.87 (dd, J = 15.8, 8.6 Hz, 2H), 7.61 (s, 1H), 7.46-7.34 (m, 4H), 7.29 (t, J = 7.7 Hz, 1H), 6.92 (dt, J = 7.3, 3.1 Hz, 2H), 6.68 (s, 2H), 5.12 (s, 1H), 4.54-4.18 (m, 7H), 3.65 (s, 2H), 2.44 (s, 3H), 2.23 (t, J = 7.6 Hz, 1H), 2.17-2.01 (m, 4H), 2.00-1.92 (m, 2H), 1.91 (s, 7H), 1.44 (d, J = 7.0 Hz, 2H), 1.22 (s, 16H), 0.93 (s, 9H) |
| 50 | N1-(3-(2-((3-amino-6-(2-hydroxyphenyl)pyridazin-4-yl)oxy)ethyl)bicyclo[1.1.1]pentan-1-yl)-N16-((S)-1-((2S,4R)-4-hydroxy-2-((4-(4-methylthiazol-5-yl)benzyl)carbamoyl)pyrrolidin-1-yl)-3,3-dimethyl-1-oxobutan-2-yl)hexadecanediamide; formic acid | 993.30 | $^1$H NMR (300 MHz, DMSO-d$_6$) δ 14.43 (s, 1H), 8.98 (s, 1H), 8.57 (t, J = 6.0 Hz, 1H), 8.31 (s, 1H), 8.23 (s, 1H, FA), 7.97 (dd, J = 8.5, 1.6 Hz, 1H), 7.84 (d, J = 9.3 Hz, 1H), 7.60 (s, 1H), 7.46-7.33 (m, 4H), 7.31-7.19 (m, 1H), 6.90 (dd, J = 7.8, 6.4 Hz, 2H), 6.45 (s, 2H), 5.13 (s, 1H), 4.54 (d, J = 9.4 Hz, 1H), 4.50-4.31 (m, 3H), 4.30-4.14 (m, 3H), 3.65 (d, J = 4.3 Hz, 2H), 3.51 (s, 0H), 2.44 (s, 3H), 2.23-2.08 (m, 5H), 1.97 (t, J = 7.6 Hz, 3H), 1.91 (s, 6H), 1.44 (d, J = 7.3 Hz, 4H), 1.22 (s, 20H), 0.93 (s, 9H) |

Example 73. Preparation of Compounds

The compounds in Table C3 were prepared following the scheme protocol in Example 22 using the appropriate and amine and carboxylic acid.

TABLE C3

Compounds of the Invention

| No. | Name | LCMS (ESI) m/z | 1H NMR |
|---|---|---|---|
| 51 | 5-(5-(4-(3-(((3-amino-6-(2-hydroxyphenyl)pyridazin-4-yl)oxy)methyl)bicyclo[1.1.1]pentane-1-carbonyl)piperazin- | 718.2 | $^1$H NMR (400 MHz, DMSO-d$_6$) δ 14.38 (s, 1H), 11.14 (s, 1H), 8.02-7.76 (m, 4H), 7.58 (s, 1H), 7.30-7.16 (m, 1H), 6.89 (ddd, J = 7.2, 3.9, 2.6 Hz, 2H), 6.61 (s, 2H), 5.16 (dd, J = |

TABLE C3-continued

Compounds of the Invention

| No. | Name | LCMS (ESI) m/z | 1H NMR |
|---|---|---|---|
| | 1-yl)pent-1-yn-1-yl)-2-(2,6-dioxopiperidin-3-yl)isoindoline-1,3-dione | | 12.8, 5.4 Hz, 1H), 4.30 (s, 2H), 3.60 (s, 2H), 3.44 (s, 2H), 2.89 (ddd, J = 17.0, 13.7, 5.3 Hz, 1H), 2.71-2.53 (m, 4H), 2.33 (p, J = 1.9 Hz, 6H), 2.17 (s, 6H), 2.07 (dd, J = 11.3, 5.3 Hz, 1H), 1.77 (s, 2H) |
| 52 | 5-(3-(3-(4-(3-(((3-amino-6-(2-hydroxyphenyl)pyridazin-4-yl)oxy)methyl)bicyclo[1.1.1]pentane-1-carbonyl)piperazin-1-yl)propoxy)prop-1-yn-1-yl)-2-(2,6-dioxopiperidin-3-yl)isoindoline-1,3-dione | 748.3 | $^1$H NMR (300 MHz, DMSO-d$_6$) δ 14.8-14.2 (s, 1H), 11.22 (s, 1H), 8.21 (s, 1H, FA), 8.02 (d, J = 3.3 Hz, 4H), 7.65 (s, 1H), 7.40-7.25 (m, 1H), 7.05-6.88 (m, 2H), 6.64 (d, J = 20.3 Hz, 2H), 5.24 (dd, J = 12.9, 5.4 Hz, 1H), 4.52 (s, 2H), 4.37 (s, 2H), 3.67 (t, J = 6.2 Hz, 2H), 3.10-2.87 (m, 2H), 2.84-2.69 (m, 6H), 2.68-2.61 (m, 4H), 2.23 (s, 6H), 2.19-2.08 (m, 2H), 1.87 (s, 2H) |
| 53 | 5-((7-(3-(((3-amino-6-(2-hydroxyphenyl)pyridazin-4-yl)oxy)methyl)bicyclo[1.1.1]pentane-1-carbonyl)-7-azaspiro[3.5]nonan-2-yl)oxy)-2-(2,6-dioxopiperidin-3-yl)isoindoline-1,3-dione | 707.35 | $^1$H NMR (300 MHz, DMSO-d$_6$) δ 14.45 (s, 1H), 11.19 (s, 1H), 8.02 (d, J = 8.0 Hz, 1H), 7.91 (d, J = 8.2 Hz, 1H), 7.65 (d, J = 3.8 Hz, 1H), 7.44-7.25 (m, 3H), 6.96 (d, J = 7.8 Hz, 2H), 6.69 (s, 2H), 5.29-5.02 (m, 2H), 4.37 (d, J = 5.9 Hz, 2H), 3.75-3.54 (m, 4H), 3.07-2.86 (m, 2H), 2.84-2.58 (m, 2H), 2.39-1.83 (m, 10H), 1.61 (d, J = 23.8 Hz, 4H) |
| 54 | 5-(4-(3-(((3-amino-6-(2-hydroxyphenyl)pyridazin-4-yl)oxy)methyl)bicyclo[1.1.1]pentane-1-carbonyl)piperazin-1-yl)-2-(2,6-dioxopiperidin-3-yl)isoindoline-1,3-dione | 652.2 | $^1$H NMR (300 MHz, DMSO-d$_6$) δ 14.39 (s, 1H), 11.08 (s, 1H), 8.00-7.91 (m, 1H), 7.71 (d, J = 8.5 Hz, 1H), 7.59 (s, 1H), 7.34 (d, J = 2.2 Hz, 1H), 7.30-7.19 (m, 2H), 6.95-6.84 (m, 2H), 6.61 (s, 2H), 5.08 (dd, J = 12.7, 5.4 Hz, 1H), 4.33 (s, 2H), 3.79 (s, 2H), 3.61 (s, 2H), 3.51 (s, 4H), 2.95-2.83 (m, 1H), 2.58 (d, J = 16.9 Hz, 2H), 2.20 (s, 6H), 2.02 (d, J = 12.4 Hz, 1H) |
| 55 | 3-(((3-amino-6-(2-hydroxyphenyl)pyridazin-4-yl)oxy)methyl)-N-(2-((2-(2,6-dioxopiperidin-3-yl)-1,3-dioxoisoindolin-5-yl)oxy)ethyl)bicyclo[1.1.1]pentane-1-carboxamide | 627.3 | $^1$H NMR (300 MHz, DMSO-d$_6$) δ 14.45 (s, 1H), 11.19 (s, 1H), 8.18-7.83 (m, 3H), 7.71-7.48 (m, 2H), 7.47-7.27 (m, 2H), 7.05-6.86 (m, 2H), 6.62 (s, 2H), 5.19 (dd, J = 12.9, 5.3 Hz, 1H), 4.40 (s, 2H), 4.29 (t, J = 5.7 Hz, 2H), 3.75-3.49 (m, 2H), 3.11-2.85 (m, 2H), 2.86-2.59 (m, 2H), 2.17 (d, J = 18.5 Hz, 1H), 2.08 (s, 6H |
| 56 | 3-(((3-amino-6-(2-hydroxyphenyl)pyridazin-4-yl)oxy)methyl)-N-(2-((2-(2,6-dioxopiperidin-3-yl)-1,3-dioxoisoindolin-5-yl)amino)ethyl)bicyclo[1.1.1]pentane-1-carboxamide | 626.25 | $^1$H NMR (300 MHz, DMSO-d$_6$) δ 14.44 (s, 1H), 11.14 (s, 1H), 8.07-7.93 (m, 2H), 7.64 (d, J = 9.2 Hz, 2H), 7.31 (dd, J = 16.8, 9.1 Hz, 2H), 7.07 (d, J = 2.0 Hz, 1H), 6.96 (qd, J = 5.4, 3.0 Hz, 3H), 6.62 (d, J = 5.2 Hz, 2H), 5.11 (dd, J = 12.8, 5.4 Hz, 1H), 4.40 (s, 2H), 3.31 (s, 4H), 2.95 (t, J = 13.0 Hz, 1H), 2.84-2.59 (m, 3H), 2.06 (s, 6H) |
| 57 | 3-(((3-amino-6-(2-hydroxyphenyl)pyridazin-4-yl)oxy)methyl)-N-(8-((2-(2,6-dioxopiperidin-3-yl)-1,3-dioxoisoindolin-4-yl)amino)octyl)bicyclo[1.1.1]pentane-1-carboxamide | 710.35 | $^1$H NMR (300 MHz, DMSO-de) δ 14.45 (s, 1H), 11.17 (s, 1H), 8.02 (dd, J = 8.3, 1.6 Hz, 1H), 7.76 (t, J = 5.8 Hz, 1H), 7.71-7.59 (m, 1H), 7.32 (t, J = 7.6 Hz, 1H), 7.13 (dd, J = 21.1, 7.8 Hz, 2H), 6.96 (dt, J = 7.4, 3.1 Hz, 2H), 6.61 (d, J = 7.8 Hz, 3H), 5.12 (dd, J = 12.8, 5.4 Hz, 1H), 4.39 (s, 2H), 3.36 (d, J = 7.2 Hz, 2H), 3.07 (p, J = 7.7, 7.1 Hz, 2H), 2.98-2.86 (m, 1H), 2.75-2.59 (m, 2H), 2.06 (s, 7H), 1.63 (d, J = 7.5 Hz, 2H), 1.53-1.20 (m, 10H) |
| 58 | 3-(((3-amino-6-(2-hydroxyphenyl)pyridazin-4-yl)oxy)methyl)-N-(8-((2-(2,6-dioxopiperidin-3-yl)-1-oxoisoindolin-4-yl)amino)octyl)bicyclo[1.1.1]pentane-1-carboxamide<br><br>ritm1363927 | 696.4 | $^1$H NMR (300 MHz, DMSO-d$_6$) δ 14.43 (s, 1H), 11.09 (s, 1H), 8.02 (d, J = 8.0 Hz, 1H), 7.76 (t, J = 5.8 Hz, 1H), 7.66 (s, 1H), 7.34 (q, J = 8.4 Hz, 2H), 6.97 (dd, J = 10.7, 6.5 Hz, 3H), 6.81 (d, J = 8.0 Hz, 1H), 6.63 (s, 2H), 5.62 (d, J = 5.8 Hz, 1H), 5.19 (dd, J = 13.1, 5.1 Hz, 1H), 4.39 (s, 2H), 4.25 (q, J = 17.3 Hz, 2H), 3.18 (d, J = 6.4 Hz, 2H), 3.13-2.91 (m, 3H), 2.69 (d, J = 17.7 Hz, 1H), 2.47-2.26 (m, 1H), 2.06 (s, 6H), 1.63 (d, J = 8.1 Hz, 2H), 1.53-1.23 (m, 10H) |
| 59 | 3-(((3-amino-6-(2-hydroxyphenyl)pyridazin-4-yl)oxy)methyl)-N-(8-((3-(2,6-dioxopiperidin-3-yl)-2-methyl-4-oxo-3,4-dihydroquinazolin-5-yl)amino)octyl)bicyclo[1.1.1]pentane-1-carboxamide | 723.25 | $^1$H NMR (300 MHz, DMSO-d$_6$) δ 14.45 (s, 1H), 11.07 (s, 1H), 8.39 (d, J = 5.4 Hz, 1H), 8.02 (d, J = 8.0 Hz, 1H), 7.76 (t, J = 5.7 Hz, 1H), 7.66 (s, 1H), 7.55 (t, J = 8.1 Hz, 1H), 7.32 (t, J = 7.6 Hz, 1H), 6.97 (dd, J = 8.0, 4.6 Hz, 2H), 6.70-6.52 (m, 4H), 5.31-5.21 (m, 1H), 4.39 (s, 2H), 3.21 (q, J = 6.6, 6.1 Hz, 2H), 3.08 (q, J = 6.7 Hz, 2H), 2.89 (d, J = 15.2 Hz, 1H), 2.65 (d, J = |

TABLE C3-continued

Compounds of the Invention

| No. | Name | LCMS (ESI) m/z | 1H NMR |
|---|---|---|---|
| | | | 16.1 Hz, 3H), 2.21 (s, 1H), 2.06 (s, 6H), 1.66 (s, 2H), 1.43-1.34 (m, 12H) |
| 60 | 3-(((3-amino-6-(2-hydroxyphenyl)pyridazin-4-yl)oxy)methyl)-N-(2-(2-(2-((2-(2,6-dioxopiperidin-3-yl)-1-oxoisoindolin-4-yl)amino)ethoxy)ethoxy)ethyl)bicyclo[1.1.1]pentane-1-carboxamide | 700.20 | $^1$H NMR (300 MHz, DMSO-d$_6$) δ 14.45 (s, 1H), 11.08 (s, 1H), 8.54 (s, 1H), 8.07-7.98 (m, 1H), 7.84 (t, J = 5.6 Hz, 1H), 7.65 (s, 1H), 7.34 (dt, J = 13.9, 7.7 Hz, 2H), 7.06-6.83 (m, 4H), 6.63 (s, 2H), 5.66 (d, J = 6.0 Hz, 1H), 5.19 (dd, J = 13.3, 5.0 Hz, 1H), 4.33 (d, J = 29.7 Hz, 2H), 4.31-4.14 (m, 2H), 3.71-3.55 (m, 6H), 3.47 (t, J = 6.2 Hz, 2H), 3.25 (q, J = 6.0 Hz, 2H), 3.09-2.91 (m, 1H), 2.69 (d, J = 17.2 Hz, 1H), 2.49-2.31 (m, 2H), 2.10 (s, 1H), 2.07 (s, 6H) |
| 61 | 3-(((3-amino-6-(2-hydroxyphenyl)pyridazin-4-yl)oxy)methyl)-N-(2-(2-(2-((3-(2,6-dioxopiperidin-3-yl)-2-methyl-4-oxo-3,4-dihydroquinazolin-5-yl)amino)ethoxy)ethoxy)ethyl)bicyclo[1.1.1]pentane-1-carboxamide | 727.20 | $^1$H NMR (300 MHz, DMSO-d$_6$) δ 14.38 (s, 1H), 10.99 (s, 1H), 8.42 (t, J = 5.6 Hz, 1H), 7.95 (dd, J = 8.3, 1.6 Hz, 1H), 7.73 (t, J = 5.7 Hz, 1H), 7.57 (s, 1H), 7.49 (t, J = 8.1 Hz, 1H), 7.24 (td, J = 7.5, 1.5 Hz, 1H), 6.95-6.83 (m, 2H), 6.65 (d, J = 7.8 Hz, 1H), 6.54 (d, J = 8.5 Hz, 3H), 5.18 (dd, J = 11.3, 5.7 Hz, 1H), 4.29 (s, 2H), 3.64 (t, J = 5.5 Hz, 2H), 3.59-3.49 (m, 4H), 3.40 (t, J = 6.0 Hz, 2H), 3.18 (t, J = 5.9 Hz, 2H), 2.88-2.75 (m, 1H), 2.60 (s, 2H), 2.55 (s, 3H), 2.15 (d, J = 6.2 Hz, 1H), 1.99 (s, 6H). |
| 62 | 3-(((3-amino-6-(2-aminophenyl)pyridazin-4-yl)oxy)methyl)-N-(4-((2-(2,6-dioxopiperidin-3-yl)-1,3-dioxoisoindolin-5-yl)amino)butyl)bicyclo[1.1.1]pentane-1-carboxamide; formic acid | 654.30 | $^1$H NMR (300 MHz, DMSO-de0 14.8-14.2 (s, 1H), 11.14 (s, 1H), 8.39 (s, 1H, FA), 8.02 (d, J = 8.1 Hz, 1H), 7.83 (d, J = 6.7 Hz, 1H), 7.64 (d, J = 10.3 Hz, 2H), 7.32 (t, J = 7.7 Hz, 1H), 7.21 (s, 1H), 7.08-6.84 (m, 4H), 6.62 (s, 2H), 5.29-4.96 (m, 1H), 4.40 (s, 2H), 3.28-3.04 (m, 4H), 3.03-2.76 (m, 1H), 2.67 (dd, J = 7.7, 4.8 Hz, 1H), 2.43-2.16 (m, 1H), 2.07 (s, 7H), 1.59 (s, 4H) |
| 63 | 3-(((3-amino-6-(2-hydroxyphenyl)pyridazin-4-yl)oxy)methyl)-N-(5-((2-(2,6-dioxopiperidin-3-yl)-1,3-dioxoisoindolin-5-yl)amino)pentyl)bicyclo[1.1.1]pentane-1-carboxamide; formic acid | 668.4 | $^1$H NMR (300 MHz, DMSO-d$_6$) δ 14.38 (s, 1H), 11.06 (s, 1H), 8.41 (s, 1H, FA), 7.94 (d, J = 8.0 Hz, 1H), 7.84-7.67 (m, 1H), 7.63-7.50 (m, 2H), 7.24 (t, J = 7.7 Hz, 1H), 7.12 (s, 1H), 6.89 (ddd, J = 19.4, 11.2, 5.4 Hz, 4H), 6.55 (s, 2H), 5.02 (dd, J = 12.7, 5.3 Hz, 1H), 4.32 (s, 2H), 3.57-3.45 (m, 2H), 3.15 (t, J = 2.7 Hz, 2H), 3.03 (t, J = 3.2 Hz, 2H), 2.91-2.69 (m, 1H), 2.65-2.53 (m, 1H), 1.99 (s, 6H), 1.57 (t, J = 7.2 Hz, 2H), 1.38 (dd, J = 26.8, 7.2 Hz, 4H) |
| 64 | 3-(((3-amino-6-(2-hydroxyphenyl)pyridazin-4-yl)oxy)methyl)-N-(6-((2-(2,6-dioxopiperidin-3-yl)-1,3-dioxoisoindolin-5-yl)amino)hexyl)bicyclo[1.1.1]pentane-1-carboxamide | 682.35 | $^1$H NMR (400 MHz, DMSO-d$_6$) δ 14.37 (s, 1H), 11.06 (s, 1H), 7.94 (dd, J = 8.3, 1.6 Hz, 1H), 7.71 (t, J = 5.8 Hz, 1H), 7.60-7.53 (m, 2H), 7.24 (td, J = 7.6, 7.0, 1.5 Hz, 1H), 7.10 (t, J = 5.3 Hz, 1H), 6.94-6.85 (m, 4H), 6.55 (s, 2H), 5.03 (dd, J = 12.9, 5.4 Hz, 1H), 4.32 (s, 2H), 3.14 (q, J = 6.6 Hz, 2H), 3.02 (q, J = 6.7 Hz, 2H), 2.87 (ddd, J = 17.5, 14.1, 5.5 Hz, 1H), 2.61-2.51 (m, 2H), 1.99-1.98 (m, 7H), 1.56 (p, J = 7.0 Hz, 2H), 1.43-1.21 (m, 4H), 1.27 (s, 2H) |
| 65 | 3-(((3-amino-6-(2-hydroxyphenyl)pyridazin-4-yl)oxy)methyl)-N-(8-((2-(2,6-dioxopiperidin-3-yl)-1,3-dioxoisoindolin-5-yl)amino)octyl)bicyclo[1.1.1]pentane-1-carboxamide | 710.20 | $^1$H NMR (400 MHz, DMSO-d$_6$) δ 14.34 (s, 1H), 11.06 (s, 1H), 7.93 (dd, J = 8.3, 1.6 Hz, 1H), 7.69 (t, J = 5.7 Hz, 1H), 7.61-7.52 (m, 2H), 7.25 (td, J = 7.6, 1.6 Hz, 1H), 7.10 (t, J = 5.4 Hz, 1H), 6.94-6.84 (m, 4H), 6.59 (s, 2H), 5.03 (dd, J = 12.9, 5.4 Hz, 1H), 4.33 (s, 2H), 3.14 (q, J = 6.5 Hz, 2H), 3.01 (q, J = 6.6 Hz, 2H), 2.87 (ddd, J = 17.3, 14.0, 5.4 Hz, 1H), 2.63-2.51 (m, 2H), 1.99-1.98 (m, 7H), 1.57 (dq, J = 14.5, 7.3, 6.8 Hz, 2H), 1.37-1.25 (m, 10H) |
| 66 | 3-(((3-amino-6-(2-hydroxyphenyl)pyridazin-4-yl)oxy)methyl)-N-(2-(2-(2-((2-(2,6-dioxopiperidin-3-yl)-1,3-dioxoisoindolin-5-yl)amino)ethoxy)ethoxy)ethyl)bicyclo[1.1.1]pentane-1-carboxamide | 714.20 | $^1$H NMR (400 MHz, DMSO-d$_6$) δ 14.34 (s, 1H), 11.06 (s, 1H), 7.92 (d, J = 7.9 Hz, 1H), 7.77 (t, J = 5.8 Hz, 1H), 7.60-7.53 (m, 2H), 7.29-7.21 (m, 1H), 7.16 (t, J = 5.6 Hz, 1H), 7.01 (d, J = 2.1 Hz, 1H), 6.93-6.85 (m, 3H), 6.61 (s, 2H), 5.03 (dd, J = 12.9, 5.3 Hz, 1H), 4.32 (s, 2H), 3.58-3.53 (m, 6H), 3.44-3.33 (m, 4H), 3.18 (q, J = 6.1 Hz, 2H), 2.87 (ddd, J = 17.3, 14.0, 5.4 Hz, 1H), 2.61-2.52 (m, 2H), 2.00 (s, 7H) |

TABLE C3-continued

Compounds of the Invention

| No. | Name | LCMS (ESI) m/z | 1H NMR |
|---|---|---|---|
| 67 | 3-(((3-amino-6-(2-hydroxyphenyl)pyridazin-4-yl)oxy)methyl)-N-(6-((3-(2,6-dioxopiperidin-3-yl)-2-methyl-4-oxo-3,4-dihydroquinazolin-5-yl)amino)hexyl)bicyclo[1.1.1]pentane-1-carboxamide | 695.40 | $^1$H NMR (300 MHz, DMSO-$d_6$) δ 14.45 (s, 1H), 11.07 (s, 1H), 8.37 (d, J = 5.3 Hz, 1H), 8.02 (dd, J = 8.3, 1.5 Hz, 1H), 7.77 (t, J = 5.8 Hz, 1H), 7.66 (s, 1H), 7.56 (t, J = 8.1 Hz, 1H), 7.40-7.25 (m, 1H), 6.96 (ddd, J = 7.4, 4.0, 2.7 Hz, 2H), 6.75-6.51 (m, 4H), 5.25 (dd, J = 11.4, 5.6 Hz, 1H), 4.39 (s, 2H), 3.21 (d, J = 6.2 Hz, 2H), 3.08 (t, J = 6.5 Hz, 2H), 2.95-2.64 (m, 3H), 2.62 (s, 3H), 2.28-2.12 (m, 1H), 2.06 (s, 6H), 1.65 (d, J = 7.3 Hz, 2H), 1.55-1.23 (m, 6H) |
| 68 | (2S,4R)-1-((S)-1-(3-(((3-amino-6-(2-hydroxyphenyl)pyridazin-4-yl)oxy)methyl)bicyclo[1.1.1]pentan-1-yl)-12-(tert-butyl)-1,10-dioxo-5,8-dioxa-2,11-diazatridecan-13-oyl)-4-hydroxy-N-(4-(4-methylthiazol-5-yl)benzyl)pyrrolidine-2-carboxamide; formic acid | 885.4 | $^1$H NMR (300 MHz, DMSO-$d_6$) δ 14.45 (s, 1H), 9.05 (s, 1H), 8.67 (s, 1H), 8.46 (s, 1H), 8.01 (d, J = 8.1 Hz, 1H), 7.84 (t, J = 5.5 Hz, 1H), 7.65 (s, 1H), 7.47 (s, 5H), 7.32 (t, J = 7.8 Hz, 1H), 7.04-6.87 (m, 2H), 6.63 (s, 2H), 5.25 (s, 1H), 4.65 (d, J = 9.5 Hz, 1H), 4.57-4.26 (m, 6H), 4.04 (s, 2H), 3.81-3.55 (m, 6H), 3.36-3.18 (m, 4H), 2.48 (d, J = 18.0 Hz, 4H), 2.06 (s, 7H), 1.02 (s, 9H) |
| 69 | (2S,4R)-1-((S)-1-(3-(((3-amino-6-(2-hydroxyphenyl)pyridazin-4-yl)oxy)methyl)bicyclo[1.1.1]pentan-1-yl)-15-(tert-butyl)-1,13-dioxo-5,8,11-trioxa-2,14-diazahexadecan-16-oyl)-4-hydroxy-N-(4-(4-methylthiazol-5-yl)benzyl)pyrrolidine-2-carboxamide | 929.1 | $^1$H NMR 300 MHz, DMSO-$d_6$) δ 14.45 (s, 1H), 9.05 (s, 1H), 8.67 (t, J = 6.0 Hz, 1H), 8.01 (dd, J = 8.3, 1.6 Hz, 1H), 7.83 (t, J = 5.7 Hz, 1H), 7.65 (s, 1H), 7.47 (s, 5H), 7.32 (td, J = 7.4, 1.5 Hz, 1H), 7.08-6.85 (m, 2H), 6.63 (s, 2H), 5.23 (s, 1H), 4.64 (d, J = 9.5 Hz, 1H), 4.58-4.25 (m, 6H), 4.04 (s, 2H), 3.81-3.53 (m, 10H), 3.43 (s, 2H), 3.24 (q, J = 5.9 Hz, 2H), 2.51 (s, 3H), 2.07 (s, 8H), 1.02 (s, 9H) |
| 70 | (2S,4R)-1-((S)-2-(6-(3-(((3-amino-6-(2-hydroxyphenyl)pyridazin-4-yl)oxy)methyl)bicyclo[1.1.1]pentane-1-carboxamido)hexanamido)-3,3-dimethylbutanoyl)-4-hydroxy-N-(4-(4-methylthiazol-5-yl)benzyl)pyrrolidine-2-carboxamide | 853.4 | $^1$H NMR (300 MHz, DMSO-$d_6$) δ 14.46 (s, 1H), 9.06 (s, 1H), 8.64 (t, J = 6.1 Hz, 1H), 8.09-7.87 (m, 2H), 7.77 (t, J = 5.7 Hz, 1H), 7.66 (s, 1H), 7.56-7.41 (m, 4H), 7.37-7.28 (m, 1H), 7.01-6.89 (m, 2H), 6.63 (s, 2H), 5.21 (s, 1H), 4.66-4.23 (m, 7H), 3.73 (d, J = 4.3 Hz, 2H), 3.07 (q, J = 6.6 Hz, 2H), 2.52 (s, 3H), 2.32 (dt, J = 14.7, 7.4 Hz, 1H), 2.06 (s, 9H), 1.49 (dq, J = 31.2, 7.3 Hz, 4H), 1.28 (d, J = 7.6 Hz, 2H), 1.00 (s, 9H) |
| 71 | (2S,4R)-1-((S)-2-(8-(3-(((3-amino-6-(2-hydroxyphenyl)pyridazin-4-yl)oxy)methyl)bicyclo[1.1.1]pentane-1-carboxamido)octanamido)-3,3-dimethylbutanoyl)-4-hydroxy-N-(4-(4-methylthiazol-5-yl)benzyl)pyrrolidine-2-carboxamide | 881.4 | $^1$H NMR (300 MHz, DMSO-$d_6$) δ 14.45 (s, 1H), 9.06 (s, 1H), 8.64 (t, J = 6.1 Hz, 1H), 8.02 (dd, J = 8.3, 1.6 Hz, 1H), 7.92 (d, J = 9.3 Hz, 1H), 7.76 (t, J = 5.8 Hz, 1H), 7.66 (s, 1H), 7.52-7.43 (m, 4H), 7.32 (td, J = 7.6, 7.1, 1.5 Hz, 1H), 7.02-6.90 (m, 2H), 6.62 (s, 2H), 5.20 (s, 1H), 4.62 (d, J = 9.3 Hz, 1H), 4.57-4.45 (m, 2H), 4.41 (d, J = 8.8 Hz, 3H), 4.29 (dd, J = 15.9, 5.4 Hz, 1H), 3.73 (d, J = 4.1 Hz, 2H), 3.08 (q, J = 6.8 Hz, 2H), 2.52 (s, 3H), 2.33 (dt, J = 14.8, 7.5 Hz, 1H), 2.19 (q, J = 7.0 Hz, 1H), 2.06 (s, 7H), 1.97 (ddd, J = 12.9, 8.7, 4.7 Hz, 1H), 1.66-1.38 (m, 4H), 1.37-1.23 (m, 6H), 1.01 (s, 9H) |
| 72 | (2S,4R)-1-((S)-2-(10-(3-(((3-amino-6-(2-hydroxyphenyl)pyridazin-4-yl)oxy)methyl)bicyclo[1.1.1]pentane-1-carboxamido)decanamido)-3,3-dimethylbutanoyl)-4-hydroxy-N-(4-(4-methylthiazol-5-yl)benzyl)pyrrolidine-2-carboxamide | 909.16 | $^1$H NMR (300 MHz, DMSO-$d_6$) δ 14.43 (s, 1H), 9.06 (s, 1H), 8.64 (t, J = 6.1 Hz, 1H), 8.02 (dd, J = 8.4, 1.6 Hz, 1H), 7.92 (d, J = 9.3 Hz, 1H), 7.76 (t, J = 5.7 Hz, 1H), 7.66 (s, 1H), 7.56-7.41 (m, 4H), 7.38-7.24 (m, 1H), 6.96 (ddd, J = 7.5, 4.0, 2.7 Hz, 2H), 6.63 (s, 2H), 5.20 (d, J = 3.4 Hz, 1H), 4.62 (d, J = 9.3 Hz, 1H), 4.57-4.36 (m, 5H), 4.29 (dd, J = 15.9, 5.4 Hz, 1H), 3.73 (d, J = 4.5 Hz, 2H), 3.07 (q, J = 6.6 Hz, 2H), 2.52 (s, 3H), 2.33 (dt, J = 14.8, 7.6 Hz, 1H), 2.25-2.08 (m, 2H), 2.09 (s, 6H), 2.05-1.88 (m, 1H), 1.64-1.37 (m, 4H), 1.30 (s, 10H), 1.01 (s, 9H) |
| 73 | 3-(((3-amino-6-(2-hydroxyphenyl)pyridazin-4-yl)oxy)methyl)-N-(4-((3-((2-(2,6-dioxopiperidin-3-yl)-1,3-dioxoisoindolin-4- | 760.10 | $^1$H NMR (400 MHz, DMSO-$d_6$) δ 14.38 (s, 1H), 11.11 (s, 1H), 7.97-7.86 (m, 2H), 7.80 (dd, J = 8.5, 7.3 Hz, 1H), 7.61 (t, J = 5.8 Hz, 1H), 7.57 (s, 1H), 7.49 (d, J = 7.3 Hz, 1H), 7.40 (d, J = 8.5 Hz, 1H), 7.24 (td, J = 7.6, 1.6 Hz, 1H), |

TABLE C3-continued

Compounds of the Invention

| No. | Name | LCMS (ESI) m/z | 1H NMR |
|---|---|---|---|
| | yl)amino)propyl)sulfonyl) butyl)bicyclo[1.1.1]pentane-1-carboxamide | | 6.93-6.84 (m, 2H), 6.54 (s, 2H), 5.13 (dd, J = 12.9, 5.4 Hz, 1H), 4.78 (s, 2H), 4.30 (s, 2H), 3.22 (d, J = 6.2 Hz, 2H), 3.16-3.08 (m, 2H), 2.97-2.83 (m, 1H), 2.64-2.53 (m, 2H), 2.41 (dt, J = 14.6, 6.7 Hz, 4H), 2.19 (s, 3H), 2.00-1.99(m, 1H), 1.98 (s, 6H) |
| 74 | 3-(((3-amino-6-(2-hydroxyphenyl)pyridazin-4-yl)oxy)methyl)-N-(2-((2-((2-(2,6-dioxopiperidin-3-yl)-1,3-dioxoisoindolin-4-yl)amino)ethyl)sulfonyl)ethyl) bicyclo[1.1.1]pentane-1-carboxamide | 718.05 | $^1$H NMR (400 MHz, DMSO-d$_6$) δ 14.37 (s, 1H), 11.10 (s, 1H), 8.01-7.91 (m, 2H), 7.67-7.56 (m, 2H), 7.24-7.09 (m, 3H), 6.91-6.80 (m, 3H), 6.56 (s, 2H), 5.06 (dd, J = 12.9, 5.4 Hz, 1H), 4.32 (s, 2H), 3.77 (q, J = 6.6 Hz, 2H), 3.46 (q, J = 6.0, 5.5 Hz, 5H), 3.31 (s, 1H), 2.95-2.81 (m, 1H), 2.58 (dd, J = 19.8, 6.0 Hz, 2H), 2.02-1.99 (m, 7H) |
| 75 | 3-(((3-amino-6-(2-hydroxyphenyl)pyridazin-4-yl)oxy)methyl)-N-(2-((2-(2-((2-(2,6-dioxopiperidin-3-yl)-1,3-dioxoisoindolin-4-yl)oxy)acetamido)ethyl) (methyl)amino)ethyl)bicyclo [1.1.1]pentane-1-carboxamide | 741.30 | $^1$H NMR (400 MHz, DMSO-d$_6$) δ 14.37 (s, 1H), 11.11 (s, 1H), 7.97-7.86 (m, 2H), 7.80 (dd, J = 8.5, 7.3 Hz, 1H), 7.65-7.54 (m, 2H), 7.49 (d, J = 7.3 Hz, 1H), 7.40 (d, J = 8.6 Hz, 1H), 7.24 (td, J = 7.7, 7.2, 1.6 Hz, 1H), 6.93-6.84 (m, 2H), 6.54 (s, 2H), 5.13 (dd, J = 13.0, 5.4 Hz, 1H), 4.78 (s, 2H), 4.30 (s, 2H), 3.22 (d, J = 6.1 Hz, 2H), 3.12 (t, J = 6.7 Hz, 2H), 2.97-2.83 (m, 1H), 2.64-2.53 (m, 2H), 2.41 (dt, J = 14.6, 6.6 Hz, 4H), 2.19 (s, 3H), 2.07-2.00 (m, 1H), 1.98 (s, 6H) |
| 76 | 3-(((3-amino-6-(2-hydroxyphenyl)pyridazin-4-yl)oxy)methyl)-N-(2-((2-(2-((2-(2,6-dioxopiperidin-3-yl)-1,3-dioxoisoindolin-5-yl)oxy)acetamido)ethyl) (methyl)amino)ethyl)bicyclo [1.1.1]pentane-1-carboxamide | 741.25 | $^1$H NMR (300 MHz, DMSO-d$_6$) δ 14.44 (s, 1H), 11.19 (s, 1H), 8.19 (d, J = 5.8 Hz, 1H), 7.97 (dd, J = 23.3, 8.1 Hz, 2H), 7.77-7.59 (m, 2H), 7.57-7.40 (m, 2H), 7.31 (t, J = 7.5 Hz, 1H), 6.97 (dd, J = 8.2, 4.2 Hz, 2H), 6.62 (s, 2H), 5.19 (dd, J = 13.2, 5.4 Hz, 1H), 4.80 (s, 2H), 4.38 (s, 2H), 3.36-3.08 (m, 5H), 3.06-2.84 (m, 1H), 2.69 (s, 1H), 2.55-2.38 (m, 4H), 2.26 (s, 3H), 2.17-2.11 (m, 1H), 2.07 (s, 6H) |
| 77 | 3-(((3-amino-6-(2-hydroxyphenyl)pyridazin-4-yl)oxy)methyl)-N-(2-((2-((2-(2,6-dioxopiperidin-3-yl)-1,3-dioxoisoindolin-4-yl)amino)ethyl)(methyl)amino) ethyl)bicyclo[1.1.1]pentane-1-carboxamide | 683.4 | $^1$H NMR (300 MHz, DMSO-d$_6$) δ 11.19 (s, 1H), 9.90 (s, 1H), 8.15 (t, J = 5.4 Hz, 1H), 7.80 (d, J = 7.8 Hz, 1H), 7.69 (d, J = 6.5 Hz, 2H), 7.50-7.34 (m, 2H), 7.29 (d, J = 8.6 Hz, 1H), 7.19 (d, J = 7.0 Hz, 1H), 7.11-6.97 (m, 2H), 6.92 (t, J = 6.3 Hz, 1H), 5.14 (dd, J = 12.8, 5.4 Hz, 1H), 4.48 (s, 2H), 3.77 (d, J = 6.8 Hz, 2H), 3.56-3.42 (m, 2H), 3.43-3.18 (m, 2H), 3.07-2.82 (m, 5H), 2.76-2.60 (m, 3H), 2.09 (s, 7H) |
| 78 | 4-(2-(1-(3-(((3-amino-6-(2-hydroxyphenyl)pyridazin-4-yl)oxy)methyl)bicyclo[1.1.1] pentane-1-carbonyl)azetidin-3-yl)ethoxy)-2-(2,6-dioxopiperidin-3-yl)isoindoline-1,3-dione | 667.3 | $^1$H NMR (300 MHz, DMSO-d$_6$) δ 14.36 (s, 1H), 11.21 (s, 1H), 8.05-7.81 (m, 2H), 7.66 (s, 1H), 7.56 (dd, J = 11.8, 7.9 Hz, 2H), 7.41-7.28 (m, 1H), 6.99 (d, J = 7.8 Hz, 2H), 6.81 (s, 2H), 5.17 (ddd, J = 12.6, 5.5, 3.3 Hz, 1H), 4.54-4.15 (m, 6H), 4.07 (t, J = 9.2 Hz, 1H), 3.74 (dd, J = 10.0, 5.8 Hz, 1H), 3.08-2.75 (m, 2H), 2.64 (dd, J = 13.4, 3.6 Hz, 2H), 2.17 (s, 9H) |
| 79 | 3-(((3-amino-6-(2-hydroxyphenyl)pyridazin-4-yl)oxy)methyl)-N-(2-((2-(2-((2-(2,6-dioxopiperidin-3-yl)-1,3-dioxoisoindolin-4-yl)oxy)ethoxy)ethyl)(methyl) amino)ethyl)bicyclo[1.1.1] pentane-1-carboxamide | 727.80 | $^1$H NMR (300 MHz, DMSO-d$_6$) δ 14.32 (s, 1H), 11.11 (s, 1H), 7.94 (dd, J = 8.4, 1.6 Hz, 1H), 7.87-7.76 (m, 1H), 7.72 (s, 1H), 7.61-7.49 (m, 2H), 7.46 (d, J = 7.2 Hz, 1H), 7.30-7.18 (m, 1H), 6.94-6.84 (m, 2H), 6.55 (s, 2H), 5.08 (dd, J = 12.8, 5.4 Hz, 1H), 4.40-4.29 (m, 4H), 3.80 (t, J = 4.2 Hz, 2H), 3.68 (s, 2H), 3.19 (s, 3H), 2.92-2.78 (m, 3H), 2.65-2.51 (m, 4H), 2.38 (s, 2H), 2.04-1.99 (m, 7H). |
| 80 | 3-(((3-amino-6-(2-hydroxyphenyl)pyridazin-4-yl)oxy)methyl)-N-(1-(2-((2-(2,6-dioxopiperidin-3-yl)-1,3-dioxoisoindolin-5-yl)oxy)ethyl)piperidin-4-yl)bicyclo[1.1.1]pentane-1-carboxamide | 710.1 | $^1$H NMR (400 MHz, DMSO-d$_6$) δ 14.38 (s, 1H), 11.11 (s, 1H), 7.95 (dd, J = 8.4, 1.6 Hz, 1H), 7.83 (d, J = 8.3 Hz, 1H), 7.59 (s, 1H), 7.54 (d, J = 7.9 Hz, 1H), 7.46 (d, J = 2.3 Hz, 1H), 7.36 (dd, J = 8.3, 2.3 Hz, 1H), 7.24 (td, J = 7.6, 7.0, 1.5 Hz, 1H), 6.95-6.84 (m, 2H), 6.54 (s, 2H), 5.12 (dd, J = 12.9, 5.4 Hz, 1H), 4.39-4.20 (m, 4H), 3.51 (d, J = 7.6 Hz, 1H), 2.99-2.81 (m, 3H), 2.79-2.65 (m, 2H), 2.63-2.53 (m, 2H), 2.00 (s, 9H), 1.63 (d, J = 12.1 Hz, 2H), 1.44 (td, J = 13.5, 10.0 Hz, 2H) |

TABLE C3-continued

Compounds of the Invention

| No. | Name | LCMS (ESI) m/z | 1H NMR |
|---|---|---|---|
| 81 | 3-(((3-amino-6-(2-hydroxyphenyl)pyridazin-4-yl)oxy)methyl)-N-(2-((1-(2-(2,6-dioxopiperidin-3-yl)-1,3-dioxoisoindolin-5-yl)azetidin-3-yl)oxy)ethyl)bicyclo[1.1.1]pentane-1-carboxamide | 618.8 | $^{1}$H NMR (400 MHz, DMSO-d$_6$) δ 14.38 (s, 1H), 11.07 (s, 1H), 7.94 (dd, J = 8.3, 1.6 Hz, 1H), 7.86 (t, J = 5.7 Hz, 1H), 7.66 (d, J = 8.3 Hz, 1H), 7.58 (s, 1H), 7.24 (td, J = 7.6, 1.6 Hz, 1H), 6.93-6.85 (m, 2H), 6.81 (d, J = 2.1 Hz, 1H), 6.67 (dd, J = 8.3, 2.1 Hz, 1H), 6.55 (s, 2H), 5.06 (dd, J = 12.9, 5.4 Hz, 1H), 4.52-4.43 (m, 1H), 4.32 (s, 2H), 4.25 (dd, J = 9.3, 6.3 Hz, 2H), 3.84 (dd, J = 9.4, 4.0 Hz, 2H), 3.45 (t, J = 5.9 Hz, 2H), 3.23 (q, J = 5.9 Hz, 2H), 2.97-2.79 (m, 1H), 2.70-2.53 (m, 2H), 2.01 (s, 7H) |
| 82 | 3-(((3-amino-6-(2-hydroxyphenyl)pyridazin-4-yl)oxy)methyl)-N-(2-(3-(2-((2-(2,6-dioxopiperidin-3-yl)-1,3-dioxoisoindolin-5-yl)amino)ethoxy)phenoxy)ethyl)bicyclo[1.1.1]pentane-1-carboxamide | 762.1 | $^{1}$H NMR (400 MHz, DMSO-d$_6$) δ 14.37 (s, 1H), 11.06 (s, 1H), 8.03-7.88 (m, 2H), 7.65-7.52 (m, 2H), 7.33 (t, J = 5.6 Hz, 1H), 7.28-7.21 (m, 1H), 7.17 (t, J = 8.2 Hz, 1H), 7.06 (d, J = 2.1 Hz, 1H), 6.95 (dd, J = 8.4, 2.1 Hz, 1H), 6.92-6.85 (m, 2H), 6.53 (dd, J = 10.9, 3.9 Hz, 5H), 5.04 (dd, J = 12.9, 5.4 Hz, 1H), 4.32 (s, 2H), 4.14 (t, J = 5.2 Hz, 2H), 3.96 (t, J = 6.0 Hz, 2H), 3.58 (d, J = 5.5 Hz, 2H), 3.39 (t, J = 5.8 Hz, 2H), 2.96-2.80 (m, 1H), 2.71-2.53 (m, 2H), 2.01 (s, 7H) |
| 83 | 3-(((3-amino-6-(2-hydroxyphenyl)pyridazin-4-yl)oxy)methyl)-N-(2-(3-(2-((2-(2,6-dioxopiperidin-3-yl)-1,3-dioxoisoindolin-4-yl)amino)ethoxy)phenoxy)ethyl)bicyclo[1.1.1]pentane-1-carboxamide | 762.1 | $^{1}$H NMR (400 MHz, DMSO-d$_6$) δ 14.37 (s, 1H), 11.06 (s, 1H), 8.03-7.88 (m, 2H), 7.65-7.52 (m, 2H), 7.33 (t, J = 5.6 Hz, 1H), 7.28-7.21 (m, 1H), 7.17 (t, J = 8.2 Hz, 1H), 7.06 (d, J = 2.1 Hz, 1H), 6.95 (dd, J = 8.4, 2.1 Hz, 1H), 6.92-6.85 (m, 2H), 6.53 (dd, J = 10.9, 3.9 Hz, 5H), 5.04 (dd, J = 12.9, 5.4 Hz, 1H), 4.32 (s, 2H), 4.14 (t, J = 5.2 Hz, 2H), 3.96 (t, J = 6.0 Hz, 2H), 3.58 (d, J = 5.5 Hz, 2H), 3.39 (t, J = 5.8 Hz, 2H), 2.96-2.80 (m, 1H), 2.71-2.53 (m, 2H), 2.01 (s, 7H) |
| 84 | 3-(((3-amino-6-(2-hydroxyphenyl)pyridazin-4-yl)oxy)methyl)-N-(2-((3-((2-(2,6-dioxopiperidin-3-yl)-1,3-dioxoisoindolin-5-yl)oxy)ethoxy)methyl)benzyl)oxy)ethyl)bicyclo[1.1.1]pentane-1-carboxamide; formic acid | 791.40 | $^{1}$H NMR (400 MHz, DMSO-d$_6$) δ 14.38 (s, 1H), 11.11 (s, 1H), 8.44 (s, 1H, FA), 7.97-7.90 (m, 1H), 7.82 (dd, J = 7.1, 2.9 Hz, 2H), 7.58 (s, 1H), 7.47 (d, J = 2.3 Hz, 1H), 7.37 (dd, J = 8.3, 2.3 Hz, 1H), 7.31 (dd, J = 14.2, 6.8 Hz, 2H), 7.28-7.20 (m, 3H), 6.89 (dt, J = 7.2, 3.2 Hz, 2H), 6.55 (s, 2H), 5.12 (dd, J = 12.9, 5.3 Hz, 1H), 4.56 (s, 2H), 4.46 (s, 2H), 4.40-4.30 (m, 4H), 3.81 (t, J = 4.5 Hz, 2H), 3.42 (t, J = 6.0 Hz, 2H), 3.23 (q, J = 5.9 Hz, 2H), 2.96-2.82 (m, 1H), 2.59-2.54 (m, 2H), 2.06-2.00 (s, 7H) |
| 85 | 3-(((3-amino-6-(2-hydroxyphenyl)pyridazin-4-yl)oxy)methyl)-N-(2-((3-((2-((2-(2,6-dioxopiperidin-3-yl)-1,3-dioxoisoindolin-4-yl)oxy)ethoxy)methyl)benzyl)oxy)ethyl)bicyclo[1.1.1]pentane-1-carboxamide | 791.15 | $^{1}$H NMR (400 MHz, DMSO-d$_6$) δ 14.38 (s, 1H), 11.11 (s, 1H), 7.94 (dd, J = 8.3, 1.6 Hz, 1H), 7.84-7.76 (m, 2H), 7.60-7.50 (m, 2H), 7.45 (d, J = 7.2 Hz, 1H), 7.35-7.19 (m, 5H), 6.89 (ddd, J = 7.1, 3.7, 2.5 Hz, 2H), 6.55 (s, 2H), 5.10 (dd, J = 12.9, 5.4 Hz, 1H), 4.61 (s, 2H), 4.40-4.32 (m, 6H), 3.83 (s, 2H), 3.42 (t, J = 6.1 Hz, 2H), 3.23 (q, J = 6.0 Hz, 2H), 2.89 (ddd, J = 17.2, 14.0, 5.4 Hz, 1H), 2.65-2.51 (m, 2H), 2.08-1.99 (m, 7H) |
| 86 | 5-((1-(3-(((3-amino-6-(2-hydroxyphenyl)pyridazin-4-yl)oxy)methyl)bicyclo[1.1.1]pentane-1-carbonyl)azetidin-3-yl)methoxy)-2-(2,6-dioxopiperidin-3-yl)isoindoline-1,3-dione | 653.25 | $^{1}$H NMR (400 MHz, DMSO-d$_6$) δ 14.38 (s, 1H), 11.12 (s, 1H), 7.94 (d, J = 7.8 Hz, 1H), 7.85 (d, J = 8.3 Hz, 1H), 7.57 (s, 1H), 7.47 (d, J = 2.3 Hz, 1H), 7.37 (dd, J = 8.3, 2.4 Hz, 1H), 7.24 (t, J = 7.7 Hz, 1H), 6.89 (dt, J = 7.4, 3.3 Hz, 2H), 6.58 (s, 2H), 5.12 (dd, J = 12.9, 5.4 Hz, 1H), 4.46-4.36 (m, 3H), 4.28 (s, 2H), 4.11 (dd, J = 8.8, 5.4 Hz, 1H), 4.01 (t, J = 9.2 Hz, 1H), 3.72 (dd, J = 9.9, 5.4 Hz, 1H), 3.10 (s, 1H), 2.87 (d, J = 12.3 Hz, 1H), 2.65-2.52 (m, 2H), 2.10-2.02 (m, 7H) |
| 87 | 4-((1-(3-(((3-amino-6-(2-hydroxyphenyl)pyridazin-4-yl)oxy)methyl)bicyclo[1.1.1]pentane-1-carbonyl)azetidin-3-yl)methoxy)-2-(2,6-dioxopiperidin-3-yl)isoindoline-1,3-dione | 653.30 | $^{1}$H NMR (400 MHz, DMSO-d$_6$) δ 14.38 (s, 1H), 11.11 (s, 1H), 7.94 (dd, J = 8.3, 1.7 Hz, 1H), 7.84 (dd, J = 8.5, 7.2 Hz, 1H), 7.55 (d, J = 9.2 Hz, 2H), 7.48 (d, J = 7.2 Hz, 1H), 7.24 (td, J = 7.6, 7.1, 1.6 Hz, 1H), 6.93-6.84 (m, 2H), 6.58 (s, 2H), 5.08 (dd, J = 12.7, 5.4 Hz, 1H), 4.46-4.33 (m, 3H), 4.28 (d, J = 1.9 Hz, 2H), 4.16 (t, |

TABLE C3-continued

Compounds of the Invention

| No. | Name | LCMS (ESI) m/z | 1H NMR |
|---|---|---|---|
| | | | J = 7.2 Hz, 1H), 4.00 (t, J = 9.2 Hz, 1H), 3.75 (dd, J = 9.9, 5.6 Hz, 1H), 3.09 (s, 1H), 2.95-2.82 (m, 1H), 2.61-2.55 (m, 2H), 2.10 (s, 6H), 2.02 (s, 1H) |
| 88 | 3-(((3-amino-6-(2-hydroxyphenyl)pyridazin-4-yl)oxy)methyl)-N-(5-(2-(2,6-dioxopiperidin-3-yl)-1,3-dioxoisoindolin-4-yl)pent-4-yn-1-yl)bicyclo[1.1.1]pentane-1-carboxamide | 649.25 | $^1$H NMR (400 MHz, DMSO-d$_6$) δ 14.38 (s, 1H), 11.14 (s, 1H), 7.94 (dd, J = 8.3, 1.7 Hz, 1H), 7.91-7.81 (m, 4H), 7.58 (s, 1H), 7.24 (td, J = 7.6, 7.1, 1.6 Hz, 1H), 6.93-6.85 (m, 2H), 6.55 (s, 2H), 5.15 (dd, J = 12.7, 5.4 Hz, 1H), 4.33 (s, 2H), 3.21 (q, J = 6.5 Hz, 2H), 2.89 (ddd, J = 16.7, 13.6, 5.4 Hz, 1H), 2.65-2.51 (m, 2H), 2.51-2.48 (m, 2H), 2.11-2.02 (m, 1H), 2.01 (s, 6H), 1.73 (p, J = 7.1 Hz, 2H) |
| 89 | 3-(((3-amino-6-(2-hydroxyphenyl)pyridazin-4-yl)oxy)methyl)-N-(5-(2-(2,6-dioxopiperidin-3-yl)-1,3-dioxoisoindolin-5-yl)pent-4-yn-1-yl)bicyclo[1.1.1]pentane-1-carboxamide | 649.25 | $^1$H NMR (400 MHz, DMSO-d$_6$) δ 14.36 (s, 1H), 11.14 (s, 1H), 7.99-7.80 (m, 5H), 7.59 (s, 1H), 7.24 (td, J = 7.6, 7.1, 1.6 Hz, 1H), 6.94-6.85 (m, 2H), 6.55 (s, 2H), 5.16 (dd, J = 12.8, 5.4 Hz, 1H), 4.33 (s, 2H), 3.19 (q, J = 6.6 Hz, 2H), 2.89 (ddd, J = 16.7, 13.6, 5.4 Hz, 1H), 2.66-2.51 (m, 2H), 2.47 (s, 2H), 2.11-2.01 (m, 7H), 1.72 (p, J = 7.0 Hz, 2H) |
| 90 | 3-(((3-amino-6-(2-hydroxyphenyl)pyridazin-4-yl)oxy)methyl)-N-(2-(2-(2-((2-(2,6-dioxopiperidin-3-yl)-1,3-dioxoisoindolin-4-yl)oxy)acetamido)ethoxy)ethoxy)ethyl)bicyclo[1.1.1]pentane-1-carboxamide | 772.3 | $^1$H NMR (300 MHz, DMSO-d$_6$) δ 14.45 (s, 1H), 11.19 (s, 1H), 8.09 (t, J = 5.6 Hz, 1H), 8.01 (dd, J = 8.3, 1.6 Hz, 1H), 7.94-7.79 (m, 2H), 7.65 (s, 1H), 7.57 (d, J = 7.2 Hz, 1H), 7.47 (d, J = 8.5 Hz, 1H), 7.32 (td, J = 7.6, 1.5 Hz, 1H), 7.04-6.90 (m, 2H), 6.62 (s, 2H), 5.19 (dd, J = 12.8, 5.3 Hz, 1H), 4.87 (s, 2H), 4.39 (s, 2H), 3.58 (s, 4H), 3.59-3.43 (m, 6H), 3.25 (q, J = 6.0 Hz, 2H), 3.06-2.88 (m, 1H), 2.75-2.59 (m, 2H), 2.07 (s, 7H) |
| 91 | 3-(((3-amino-6-(2-hydroxyphenyl)pyridazin-4-yl)oxy)methyl)-N-(2-(2-(2-((2-(2,6-dioxopiperidin-3-yl)-1,3-dioxoisoindolin-5-yl)oxy)acetamido)ethoxy)ethoxy)ethyl)bicyclo[1.1.1]pentane-1-carboxamide | 772.3 | $^1$H NMR (300 MHz, DMSO-d$_6$) 0 14.45 (s, 1H), 11.19 (s, 1H), 8.51-8.18 (m, 1H), 8.09-7.89 (m, 2H), 7.84 (t, J = 5.7 Hz, 1H), 7.65 (s, 1H), 7.54-7.42 (m, 2H), 7.32 (td, J = 7.6, 7.0, 1.5 Hz, 1H), 7.03-6.89 (m, 2H), 6.63 (s, 2H), 5.19 (dd, J = 12.9, 5.4 Hz, 1H), 4.81 (s, 2H), 4.39 (s, 2H), 3.57 (s, 4H), 3.55-3.41 (m, 7H), 3.25 (q, J = 6.0 Hz, 2H), 2.96 (ddd, J = 18.2, 13.9, 5.4 Hz, 1H), 2.83-2.61 (m, 1H), 2.07 (s, 7H) |
| 92 | 3-(((3-amino-6-(2-hydroxyphenyl)pyridazin-4-yl)oxy)methyl)-N-(1-((2-(2,6-dioxopiperidin-3-yl)-1,3-dioxoisoindolin-4-yl)oxy)-2-oxo-6,9,12-trioxa-3-azatetradecan-14-yl)bicyclo[1.1.1]pentane-1-carboxamide | 816.4 | $^1$H NMR (300 MHz, DMSO-d$_6$) δ 14.45 (s, 1H), 11.19 (s, 1H), 8.43 (s, 0H), 8.09 (t, J = 5.6 Hz, 1H), 8.01 (dd, J = 8.4, 1.6 Hz, 1H), 7.93-7.79 (m, 2H), 7.65 (s, 1H), 7.57 (d, J = 7.2 Hz, 1H), 7.47 (d, J = 8.5 Hz, 1H), 7.37-7.24 (m, 1H), 7.04-6.89 (m, 2H), 6.62 (s, 2H), 5.19 (dd, J = 12.9, 5.4 Hz, 1H), 4.86 (s, 2H), 4.39 (s, 2H), 3.57 (d, J = 6.6 Hz, 9H), 3.54-3.49 (m, 2H), 3.48 (d, J = 2.4 Hz, 3H), 3.31-3.19 (m, 2H), 3.06-2.87 (m, 1H), 2.84-2.59 (m, 2H), 2.07 (s, 7H) |
| 93 | 3-(((3-amino-6-(2-hydroxyphenyl)pyridazin-4-yl)oxy)methyl)-N-(1-((2-(2,6-dioxopiperidin-3-yl)-1,3-dioxoisoindolin-5-yl)oxy)-2-oxo-6,9,12-trioxa-3-azatetradecan-14-yl)bicyclo[1.1.1]pentane-1-carboxamide | 816.35 | $^1$H NMR (300 MHz, DMSO-d$_6$) δ 14.70-14.04 (m, 1H), 11.19 (s, 1H), 8.33 (t, J = 5.7 Hz, 1H), 7.96 (dd, J = 13.9, 8.1 Hz, 2H), 7.84 (t, J = 5.7 Hz, 1H), 7.66 (s, 1H), 7.55-7.40 (m, 2H), 7.39-7.27 (m, 1H), 6.97 (ddd, J = 7.4, 3.8, 2.6 Hz, 2H), 6.66 (d, J = 31.7 Hz, 2H), 5.20 (dd, J = 12.9, 5.4 Hz, 1H), 4.81 (s, 2H), 4.40 (s, 2H), 3.57 (d, J = 1.6 Hz, 8H), 3.54-3.50 (m, 2H), 3.46 (t, J = 6.3 Hz, 2H), 3.39-3.29 (m, 2H), 3.25 (q, J = 6.0 Hz, 2H), 3.04-2.87 (m, 1H), 2.66 (d, J = 20.0 Hz, 1H), 2.07 (s, 8H) |
| 94 | 5-(4-(2-(1-(3-(((3-amino-6-(2-hydroxyphenyl)pyridazin-4-yl)oxy)methyl)bicyclo[1.1.1]pentane-1-carbonyl)piperidin-4-yl)ethyl)piperazin-1-yl)-2-(2,6-dioxopiperidin-3-yl)isoindoline-1,3-dione | 763.4 | $^1$H NMR (300 MHz, DMSO-d$_6$) δ 14.96-13.89 (m, 1H), 11.16 (s, 1H), 8.02 (dd, J = 8.4, 1.6 Hz, 1H), 7.75 (d, J = 8.5 Hz, 1H), 7.65 (s, 1H), 7.41 (d, J = 2.1 Hz, 1H), 7.32 (td, J = 7.6, 6.8, 1.6 Hz, 2H), 7.06-6.88 (m, 2H), 6.69 (s, 2H), 5.15 (dd, J = 12.7, 5.4 Hz, 1H), 4.43-4.30 (m, 3H), 4.21 (d, J = 13.4 Hz, 1H), 3.51 (s, 4H), 3.18-2.74 (m, 3H), 2.65 (dt, J = 20.3, 2.0 Hz, 3H), 2.43 (t, J = 7.3 Hz, 2H), 2.37-2.26 (m, 2H), 2.21 (dd, J = 10.8, 2.6 Hz, 6H), 2.14-2.03 (m, 1H), 1.91-1.70 (m, 2H), 1.69-1.57 (m, 1H), 1.49 (d, J = 7.4 Hz, 2H), 1.31 (s, 1H), 1.24-0.96 (m, 2H) |

TABLE C3-continued

Compounds of the Invention

| No. | Name | LCMS (ESI) m/z | 1H NMR |
|---|---|---|---|
| 95 | 5-(4-(4-(1-(3-(((3-amino-6-(2-hydroxyphenyl)pyridazin-4-yl)oxy)methyl)bicyclo[1.1.1]pentane-1-carbonyl)piperidin-4-yl)butyl)piperazin-1-yl)-2-(2,6-dioxopiperidin-3-yl)isoindoline-1,3-dione; formic acid | 791.4 | $^1$H NMR (300 MHz, DMSO-$d_6$) δ 15.04-13.93 (m, 1H), 11.16 (s, 1H), 8.30 (s, 1H, FA), 8.13-7.95 (m, 1H), 7.75 (d, J = 8.5 Hz, 1H), 7.65 (s, 1H), 7.41 (d, J = 2.2 Hz, 1H), 7.38-7.25 (m, 2H), 6.96 (ddd, J = 7.3, 3.8, 2.6 Hz, 2H), 6.69 (s, 2H), 5.15 (dd, J = 12.7, 5.3 Hz, 1H), 4.38 (d, J = 11.9 Hz, 3H), 4.21 (d, J = 13.2 Hz, 1H), 3.50 (s, 4H), 3.07 (t, J = 13.4 Hz, 1H), 2.99-2.87 (m, 1H), 2.66 (d, J = 21.6 Hz, 2H), 2.57 (d, J = 2.0 Hz, 3H), 2.45-2.32 (m, 2H), 2.29-2.16 (m, 6H), 2.18-1.96 (m, 2H), 1.89-1.65 (m, 2H), 1.53 (s, 3H), 1.45-1.30 (m, 3H), 1.31 (s, 1H), 1.20-0.84 (m, 3H) |
| 96 | 5-((1-(3-(((3-amino-6-(2-hydroxyphenyl)pyridazin-4-yl)oxy)methyl)bicyclo[1.1.1]pentane-1-carbonyl)azetidin-3-yl)oxy)-2-(2,6-dioxopiperidin-3-yl)isoindoline-1,3-dione | 639.3 | $^1$H NMR (300 MHz, DMSO-$d_6$) δ 14.73-14.13 (m, 1H), 11.20 (s, 1H), 7.97 (t, J = 7.7 Hz, 2H), 7.73-7.26 (m, 4H), 7.07-6.88 (m, 2H), 6.75 (s, 2H), 5.44-5.31 (m, 1H), 5.21 (dd, J = 12.9, 5.3 Hz, 1H), 4.88 (t, J = 8.1 Hz, 1H), 4.47 (dd, J = 10.9, 6.4 Hz, 1H), 4.33 (d, J = 18.5 Hz, 3H), 4.03-3.90 (m, 1H), 3.08-2.88 (m, 1H), 2.76-2.59 (m, 2H), 2.19 (s, 7H) |
| 97 | 5-(3-(4-(3-(((3-amino-6-(2-hydroxyphenyl)pyridazin-4-yl)oxy)methyl)bicyclo[1.1.1]pentane-1-carbonyl)piperazin-1-yl)propoxy)-2-(2,6-dioxopiperidin-3-yl)isoindoline-1,3-dione; formic acid | 710.20 | $^1$H NMR (300 MHz, DMSO-$d_6$) δ 11.19 (s, 1H), 8.34 (s, 1H), 8.02 (dd, J = 8.4, 1.6 Hz, 1H), 7.91 (d, J = 8.3 Hz, 1H), 7.65 (s, 1H), 7.51 (d, J = 2.2 Hz, 1H), 7.43 (dd, J = 8.3, 2.3 Hz, 1H), 7.32 (td, J = 7.5, 7.1, 1.5 Hz, 1H), 7.01-6.88 (m, 2H), 6.68 (s, 2H), 5.19 (dd, J = 12.9, 5.4 Hz, 1H), 4.37 (s, 2H), 4.30 (t, J = 6.3 Hz, 2H), 3.72-3.63 (m, 4H), 2.97 (ddd, J = 17.3, 14.2, 5.7 Hz, 1H), 2.79-2.59 (m, 2H), 2.56-2.31 (m, 6H), 2.23 (s, 6H), 2.12 (ddt, J = 11.3, 6.2, 3.6 Hz, 1H), 2.00 (t, J = 6.8 Hz, 2H) |
| 98 | 5-((3-(2-(3-(((3-amino-6-(2-hydroxyphenyl)pyridazin-4-yl)oxy)methyl)bicyclo[1.1.1]pentane-1-carbonyl)-2,7-diazaspiro[3.5]nonan-7-yl)propyl)amino)-2-(2,6-dioxopiperidin-3-yl)isoindoline-1,3-dione; formic acid | 749.4 | $^1$H NMR (300 MHz, DMSO-$d_6$) δ 14.40 (dd, J = 26.5, 19.1 Hz, 1H), 11.14 (s, 1H), 8.25 (s, 1H, FA), 8.02 (dd, J = 8.3, 1.6 Hz, 1H), 7.63 (d, J = 8.1 Hz, 2H), 7.38-7.17 (m, 2H), 7.07-6.87 (m, 4H), 6.66 (s, 2H), 5.10 (dd, J = 12.7, 5.4 Hz, 1H), 4.35 (s, 2H), 3.99 (s, 2H), 3.60 (d, J = 9.2 Hz, 2H), 3.32-3.21 (m, 2H), 3.07-2.76 (m, 2H), 2.73-2.59 (m, 3H), 2.48-2.30 (m, 4H), 2.16 (s, 6H), 2.15-2.00 (m, 1H), 1.78 (s, 6H) |
| 99 | 5-((5-(4-(3-(((3-amino-6-(2-hydroxyphenyl)pyridazin-4-yl)oxy)methyl)bicyclo[1.1.1]pentane-1-carbonyl)piperazin-1-yl)pentyl)oxy)-2-(2,6-dioxopiperidin-3-yl)isoindoline-1,3-dione; formic acid | 738.25 | $^1$H NMR (300 MHz, DMSO-$d_6$) δ 15.13-13.65 (m, 1H), 11.19 (s, 1H), 8.30 (s, 1H, FA), 7.96 (dd, J = 34.4, 8.1 Hz, 2H), 7.65 (s, 1H), 7.55-7.20 (m, 3H), 6.97 (dd, J = 8.1, 4.3 Hz, 2H), 6.68 (s, 2H), 5.19 (dd, J = 12.9, 5.4 Hz, 1H), 4.46-4.15 (m, 4H), 3.66 (s, 3H), 3.58 (s, 2H), 3.07-2.85 (m, 1H), 2.74-2.60 (m, 1H), 2.40 (d, J = 16.3 Hz, 6H), 2.23 (s, 6H), 2.15 (d, J = 7.2 Hz, 1H), 1.85 (t, J = 6.8 Hz, 2H), 1.54 (s, 4H) |
| 100 | 5-(4-((1-(3-(((3-amino-6-(2-hydroxyphenyl)pyridazin-4-yl)oxy)methyl)bicyclo[1.1.1]pentane-1-carbonyl)azetidin-3-yl)methyl)piperazin-1-yl)-2-(2,6-dioxopiperidin-3-yl)isoindoline-1,3-dione; formic acid | 720.80 | $^1$H NMR (300 MHz, DMSO-$d_6$) δ 14.38 (s, 1H), 11.09 (s, 1H), 8.22 (s, 1H, FA), 7.94 (dd, J = 8.4, 1.6 Hz, 1H), 7.68 (d, J = 8.5 Hz, 1H), 7.57 (s, 1H), 7.34-7.24 (m, 3H), 6.94-6.83 (m, 2H), 6.59 (s, 2H), 5.07 (dd, J = 12.7, 5.4 Hz, 1H), 4.34-4.28 (m, 3H), 4.00-3.85 (m, 3H), 3.43 (s, 2H), 3.43 (s, 3H), 2.92-2.79 (m, 3H), 2.68-2.51 (m, 6H), 2.06-1.96 (m, 7H) |
| 101 | 5-(4-((1-(3-(((3-amino-6-(2-hydroxyphenyl)pyridazin-4-yl)oxy)methyl)bicyclo[1.1.1]pentane-1-carbonyl)piperidin-4-yl)methyl)piperazin-1-yl)-2-(2,6-dioxopiperidin-3-yl)isoindoline-1,3-dione | 748.80 | $^1$H NMR (300 MHz, DMSO-$d_6$) δ 14.52 (s, 1H), 11.09 (s, 1H), 7.99-7.90 (m, 1H), 7.70 (d, J = 8.2 Hz, 1H), 7.58 (s, 1H), 7.38 (s, 1H), 7.33-7.19 (m, 2H), 6.95-6.84 (m, 2H), 6.62 (s, 2H), 5.08 (dd, J = 12.7, 5.4 Hz, 1H), 4.30 (s, 3H), 4.15 (d, J = 13.3 Hz, 1H), 3.64 (s, 4H), 3.12-3.01 (m, 2H), 2.94-2.81 (m, 2H), 2.63-2.51 (m, 5H), 2.16 (d, J = 2.7 Hz, 7H), 2.02 (d, J = 12.2 Hz, 2H), 1.81 (d, J = 15.1 Hz, 2H), 1.72 (s, 3H), 1.00 (s, 2H) |
| 102 | 5-(3-((4-(3-(((3-amino-6-(2-hydroxyphenyl)pyridazin-4-yl)oxy)methyl)bicyclo[1.1.1]pentane-1-carbonyl)piperazin-1-yl)methyl)azetidin-1-yl)-2- | 720.90 | $^1$H NMR (300 MHz, DMSO-$d_6$) δ 14.01 (s, 1H), 11.08 (s, 1H), 7.92 (d, J = 8.0 Hz, 1H), 7.66-7.59 (m, 2H), 7.26 (t, J = 7.6 Hz, 1H), 6.90 (dt, J = 7.4, 3.3 Hz, 2H), 6.79 (d, J = 2.0 Hz, 1H), 6.72-6.61 (m, 3H), 5.06 (dd, J = 12.8, 5.4 Hz, |

TABLE C3-continued

Compounds of the Invention

| No. | Name | LCMS (ESI) m/z | 1H NMR |
|---|---|---|---|
|  | (2,6-dioxopiperidin-3-yl)isoindoline-1,3-dione |  | 1H), 4.32 (s, 2H), 4.19 (t, J = 7.7 Hz, 2H), 3.83-3.73 (m, 3H), 3.69-3.59 (m, 4H), 3.15 (s, 3H), 2.91-2.79 (m, 3H), 2.58 (d, J = 19.8 Hz, 3H), 2.18 (s, 6H), 2.00 (dd, J = 10.8, 5.5 Hz, 1H) |
| 103 | 5-(2-(4-(3-(((3-amino-6-(2-hydroxyphenyl)pyridazin-4-yl)oxy)methyl)bicyclo[1.1.1]pentane-1-carbonyl)piperazin-1-yl)ethoxy)-2-(2,6-dioxopiperidin-3-yl)isoindoline-1,3-dione; formic acid | 696.25 | $^1$H NMR (300 MHz, DMSO-$d_6$) δ 14.37 (s, 1H), 11.12 (s, 1H), 8.21 (s, 1H, FA), 7.95 (dd, J = 8.3, 1.6 Hz, 1H), 7.84 (d, J = 8.3 Hz, 1H), 7.57 (s, 1H), 7.47 (d, J = 2.3 Hz, 1H), 7.37 (dd, J = 8.3, 2.3 Hz, 1H), 7.30-7.18 (m, 1H), 6.89 (dt, J = 7.3, 3.3 Hz, 2H), 6.61 (s, 2H), 5.12 (dd, J = 12.9, 5.4 Hz, 1H), 4.30 (d, J = 6.1 Hz, 4H), 3.62 (s, 2H), 3.50 (s, 2H), 2.95-2.78(m, 2H), 2.63 (s, 2H), 2.49 (s, 3H), 2.16 (s, 6H), 2.05 (d, J = 11.7 Hz, 1H) |
| 104 | 3-(((3-amino-6-(2-hydroxyphenyl)pyridazin-4-yl)oxy)methyl)-N-(2-(1-(2-(2,6-dioxopiperidin-3-yl)-1,3-dioxoisoindolin-5-yl)piperidin-4-yl)ethyl)bicyclo[1.1.1]pentane-1-carboxamide | 693.80 | $^1$H NMR (300 MHz, DMSO-$d_6$) δ 14.37 (s, 1H), 11.08 (s, 1H), 7.94 (dd, J = 8.5, 1.6 Hz, 1H), 7.73 (t, J = 5.7 Hz, 1H), 7.69-7.60 (m, 1H), 7.58-7.51 (m, 1H), 7.30-7.24 (m, 3H), 6.95-6.84 (m, 2H), 6.55 (d, J = 7.1 Hz, 2H), 5.06 (dd, J = 12.7, 5.4 Hz, 1H), 4.33 (s, 2H), 4.03 (d, J = 12.9 Hz, 2H), 3.51 (s, 1H), 3.09 (d, J = 6.6 Hz, 2H), 2.90 (d, J = 12.4 Hz, 3H), 2.64-2.51 (m, 2H), 2.00 (s, 7H), 1.75 (d, J = 12.4 Hz, 2H), 1.53 (s, 1H), 1.37 (t, J = 7.1 Hz, 2H), 1.17 (s, 2H) |
| 105 | (2S,4R)-1-((S)-2-(3-(((3-amino-6-(2-hydroxyphenyl)pyridazin-4-yl)oxy)methyl)bicyclo[1.1.1]pentane-1-carboxamido)-3,3-dimethylbutanoyl)-4-hydroxy-N-(4-(4-methylthiazol-5-yl)benzyl)pyrrolidine-2-carboxamide | 740.40 | $^1$H NMR (400 MHz, DMSO-$d_6$) δ 14.38 (s, 1H), 8.99 (s, 1H), 8.58 (t, J = 6.0 Hz, 1H), 7.98-7.91 (m, 1H), 7.58 (s, 1H), 7.40 (s, 4H), 7.28-7.18 (m, 2H), 6.93-6.85 (m, 2H), 6.55 (s, 2H), 5.18-5.13 (m, 1H), 4.57 (d, J = 9.4 Hz, 1H), 4.47-4.37 (m, 2H), 4.37-4.30 (m, 3H), 4.29-4.18 (m, 1H), 3.71-3.56 (m, 2H), 2.45 (s, 3H), 2.14-1.97 (m, 7H), 1.97-1.84 (m, 1H), 0.93 (s, 9H) |

Example 74. Degradation of BRM and BRG1 by Compounds of the Invention

This example demonstrates the ability of the compounds of the disclosure to degrade a HiBit-BRM or HiBit-BRG1 fusion protein in a cell-based degradation assay.

Procedure: A stable HeLa cell line expressing HiBiT-BRM was generated. On day 0, 5000 cells were seeded in 40 μL of media into each well of 384-well cell culture plates. On day 1, cells were treated with 120 nL DMSO or 120 nL of 3-fold serially DMSO-diluted compounds (10 points in duplicate with 30 μM as final top dose). Subsequently plates were incubated for 24 h in a standard tissue culture incubator and equilibrated at room temperature for 15 minutes. Nano-Glo HiBiT Lytic Detection System (Promega N3050) reagent was freshly prepared and 20 ul was added to each well. Upon addition of this LgBit-containing reagent, the HiBiT and LgBiT proteins associate to form the luminescent NanoBiT luciferase. The plates were shaken for 10 minutes at room temperature and the bioluminescence read using an EnVision plate reader (PerkinElmer).

For measurement of BRG1 degradation, a stable HeLa cell line expressing HiBit-BRG1 and LgBit was generated. The same protocol as above was then followed.

The degradation % was calculated using the following formula: % degradation=100%−100%×(Lum$_{sample}$−Lum$_{LC}$)/(Lum$_{HC}$−Lum$_{LC}$). DMSO treated cells are employed as High Control (HC) and 2 μM of a known BRM/BRG1 degrader standard treated cells are employed as Low Control (LC). The data was fit to a four parameter, non-linear curve fit to calculate IC$_{50}$ (μM) values as shown in Table 3.

Results: As shown in Table 2 below, the compounds of the invention degraded both BRM and BRG1.

TABLE 2

BRM/BRG1 Degradation Activity

| Compound No. | BRM HiBit Degradation IC50 (nM) | BRM HiBit Degradation Maximum (%) | BRG1 HiBit Degradation IC50 (nM) | BRG1 HiBit Degradation Maximum (%) |
|---|---|---|---|---|
| 1 | NC | C | NC | C |
| 2 | NC | C | NC | C |
| 3 | NC | C | NC | C |
| 4 | NC | C | NC | C |
| 5 | NC | C | NC | C |
| 6 | NC | C | NC | C |
| 7 | NC | C | NC | C |
| 8 | NC | C | NC | C |
| 9 | NC | C | NC | C |
| 10 | NC | C | NC | C |
| 11 | NC | C | NC | C |
| 12 | NC | C | NC | C |
| 13 | NC | C | NC | C |
| 14 | NC | C | NC | C |
| 15 | NC | C | NC | C |
| 16 | NC | C | NC | C |
| 17 | NC | C | NC | C |
| 18 | NC | C | NC | C |
| 19 | NC | C | NC | C |
| 20 | NC | C | NC | C |

TABLE 2-continued

BRM/BRG1 Degradation Activity

| Compound No. | BRM HiBit Degradation IC50 (nM) | BRM HiBit Degradation Maximum (%) | BRG1 HiBit Degradation IC50 (nM) | BRG1 HiBit Degradation Maximum (%) |
|---|---|---|---|---|
| 21 | NC | C | NC | C |
| 22 | NC | C | NC | C |
| 23 | NC | C | NC | C |
| 24 | NC | C | NC | C |
| 25 | NC | C | NC | C |
| 26 | NC | C | NC | C |
| 27 | NC | C | NC | C |
| 28 | NC | C | NC | C |
| 29 | NC | C | NC | C |
| 30 | NC | C | NC | C |
| 31 | NC | C | NC | C |
| 32 | ++ | B | NC | C |
| 33 | NC | C | NC | C |
| 34 | NC | C | NC | C |
| 35 | NC | C | NC | C |
| 36 | NC | C | NC | C |
| 37 | NC | C | NC | C |
| 38 | ++ | B | NC | C |
| 39 | ++ | B | NC | C |
| 40 | +++ | B | NC | C |
| 41 | ++ | B | NC | C |
| 42 | NC | C | NC | C |
| 43 | + | A | + | A |
| 44 | + | B | NC | C |
| 45 | + | B | NC | C |
| 46 | + | B | NC | C |
| 47 | ++ | B | NC | C |
| 48 | ++ | B | + | B |
| 49 | NC | C | NC | C |
| 50 | +++ | B | NC | C |
| 51 | NC | C | NC | C |
| 52 | NC | C | NC | C |
| 53 | NC | C | NC | C |
| 54 | NC | C | NC | C |
| 55 | NC | C | NC | C |
| 56 | NC | C | NC | C |
| 57 | NC | C | NC | C |
| 58 | NC | C | NC | C |
| 59 | NC | C | NC | C |
| 60 | NC | C | NC | C |
| 61 | NC | C | NC | C |
| 62 | NC | C | NC | C |
| 63 | NC | C | NC | C |
| 64 | NC | C | NC | C |
| 65 | NC | C | NC | C |
| 66 | NC | C | NC | C |
| 67 | NC | C | NC | C |
| 68 | NC | C | NC | C |
| 69 | NC | C | NC | C |
| 70 | + | B | NC | C |
| 71 | + | B | NC | C |
| 72 | + | B | NC | C |
| 73 | NC | C | NC | C |
| 74 | NC | C | NC | C |
| 75 | NC | C | NC | C |
| 76 | NC | C | NC | C |
| 77 | NC | C | NC | C |
| 78 | NC | C | NC | C |
| 79 | NC | C | NC | C |
| 80 | NC | C | NC | C |
| 81 | + | B | + | B |
| 82 | NC | C | NC | C |
| 83 | NC | C | NC | C |
| 84 | NC | C | NC | C |
| 85 | NC | C | NC | C |
| 86 | + | B | + | B |
| 87 | NC | C | NC | C |
| 88 | NC | C | NC | C |
| 89 | NC | C | NC | C |
| 90 | NC | C | NC | C |
| 91 | NC | C | NC | C |
| 92 | NC | C | NC | C |
| 93 | NC | C | NC | C |
| 94 | +++ | B | NC | C |
| 95 | +++ | B | +++ | B |
| 96 | NC | C | NC | C |
| 97 | NC | C | NC | C |
| 98 | ++ | B | NC | C |
| 99 | NC | C | NC | C |
| 100 | NC | C | NC | C |
| 101 | +++ | B | NC | C |
| 102 | ++ | B | NC | C |
| 103 | NC | C | NC | C |
| 104 | NC | C | NC | C |
| 105 | NC | C | NC | C |

"+" indicates inhibitory effect of ≥1000 nM;
"++" indicates inhibitory effect of ≥100 nM;
"+++" indicates inhibitory effect of ≥10 nM;
"++++" indicates inhibitory effect of <10 nM;
"NC" indicates not calculated;
"A" indicates maximum degradation ≥ 75%;
"B" indicates maximum degradation ≥ 50%; and
"C" indicates maximum degradation < 50%

OTHER EMBODIMENTS

All publications, patents, and patent applications mentioned in this specification are incorporated herein by reference in their entirety to the same extent as if each individual publication, patent, or patent application was specifically and individually indicated to be incorporated by reference in its entirety. Where a term in the present application is found to be defined differently in a document incorporated herein by reference, the definition provided herein is to serve as the definition for the term.

While the invention has been described in connection with specific embodiments thereof, it will be understood that invention is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are in the claims.

The invention claimed is:

1. A compound having the structure of Formula I:

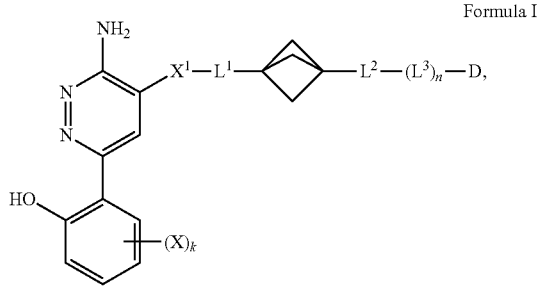

Formula I wherein
X is halo;
$X^1$ is absent, O, or $NR^1$;
k is 0, 1, 2, or 3;
n is 0, 1, or 2;
$R^1$ is H or optionally substituted $C_1$-$C_6$ alkyl;
$L^1$ is optionally substituted $C_1$-$C_6$ alkylene, optionally substituted $C_2$-$C_6$ alkenylene, or optionally substituted $C_2$-$C_6$ alkynylene;
$L^2$ is absent, optionally substituted $C_1$-$C_6$ alkylene, optionally substituted $C_1$-$C_{20}$ heteroalkylene, or optionally substituted $C_2$-$C_9$ heterocyclylene;
each $L^3$ is, independently, optionally substituted $C_1$-$C_{20}$ heteroalkylene, optionally substituted $C_3$-$C_{10}$ carbocyclylene, optionally substituted $C_3$-$C_{10}$ carbocyclylene-$C_1$-$C_6$ alkylene, optionally substituted $C_2$-$C_9$ heterocyclylene, optionally substituted $C_2$-$C_9$ heterocyclylene-$C_1$-$C_6$ alkylene, optionally substituted $C_6$-$C_{10}$ arylene, optionally substituted $C_6$-$C_{10}$ arylene-$C_1$-$C_6$ alkylene, optionally substituted $C_2$-$C_6$ alkynylene, O, or $NR^1$; and
D is a degradation moiety,
or a pharmaceutically acceptable salt thereof.

2. The compound of claim 1, or a pharmaceutically acceptable salt thereof, wherein $X^1$ is absent.

3. The compound of claim 1, or a pharmaceutically acceptable salt thereof, wherein $X^1$ is O or $NR^1$.

4. The compound of claim 1, or a pharmaceutically acceptable salt thereof, wherein $L^1$ is optionally substituted $C_1$-$C_6$ alkylene.

5. The compound of claim 1, or a pharmaceutically acceptable salt thereof, wherein $L^2$ is optionally substituted $C_1$-$C_6$ alkylene.

6. The compound of claim 1, wherein $L^2$ is

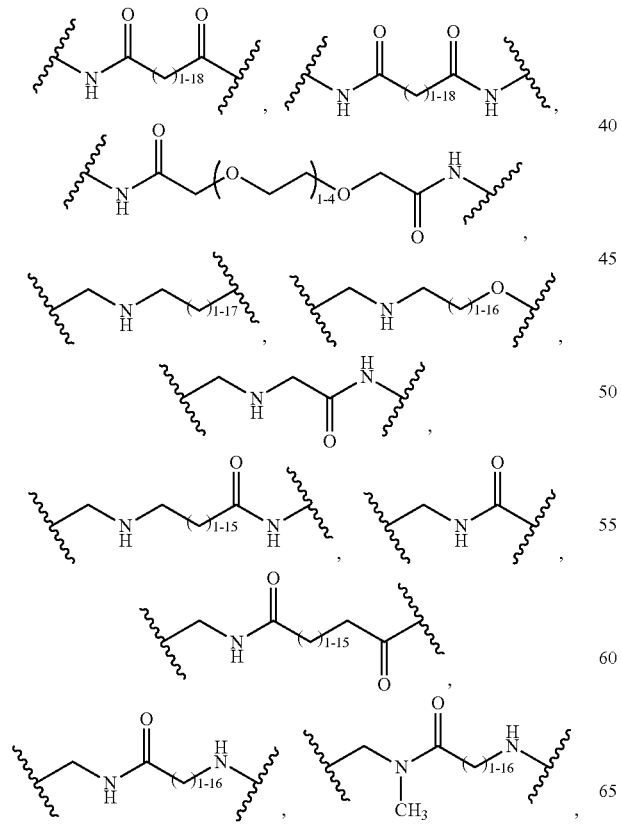

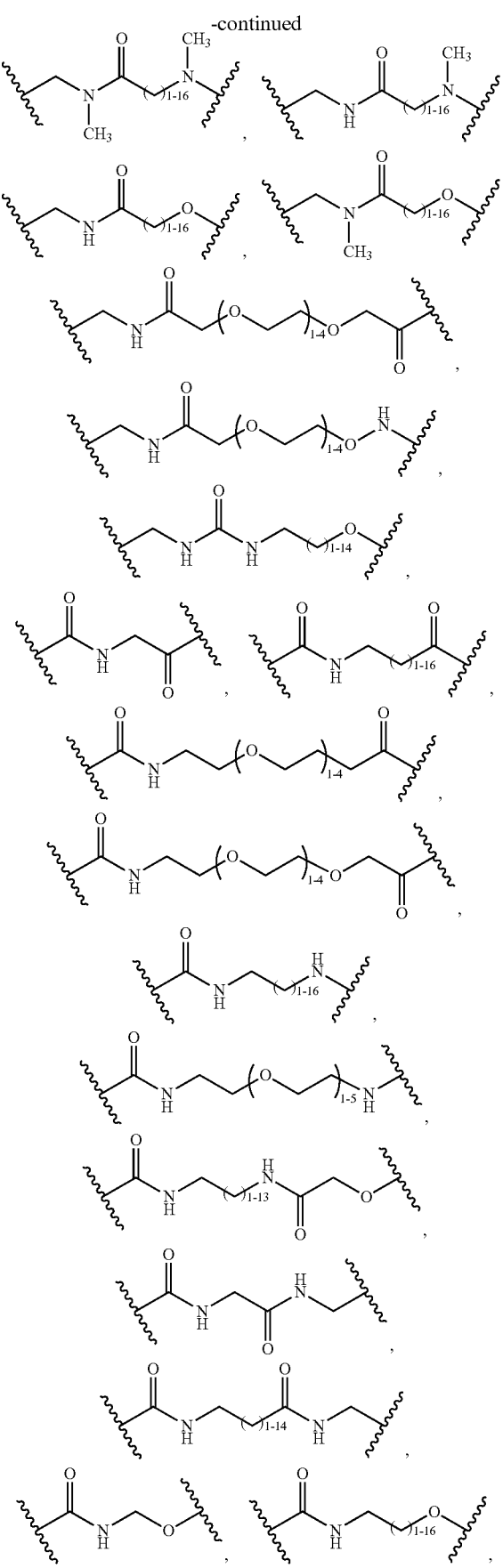

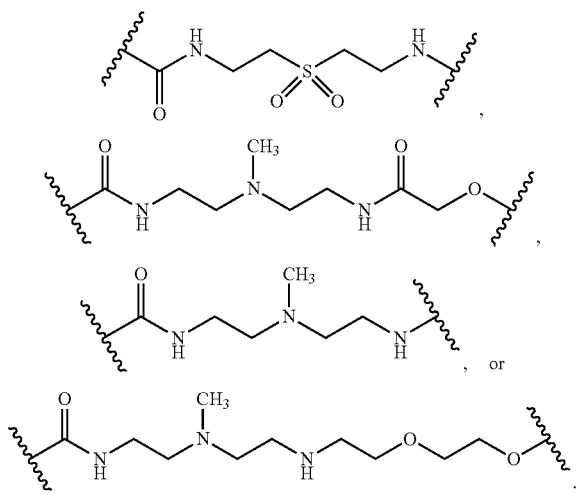

7. The compound of claim 1, or a pharmaceutically acceptable salt thereof, wherein n is 1 or 2.

8. The compound of claim 1, or a pharmaceutically acceptable salt thereof, wherein at least one $L^3$ is

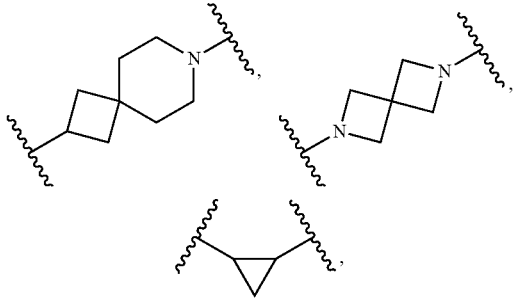

phenylene, O, or $NR^1$.

9. The compound of claim 1, or a pharmaceutically acceptable salt thereof, wherein the degradation moiety is a ubiquitin ligase binding moiety.

10. The compound of claim 9, or a pharmaceutically acceptable salt thereof, wherein the ubiquitin ligase binding moiety comprises a Cereblon ligand, an IAP (Inhibitors of Apoptosis) ligand, a mouse double minute 2 homolog (MDM2), or a von Hippel-Lindau ligand.

11. The compound of claim 9, or a pharmaceutically acceptable salt thereof, wherein the degradation moiety has the structure of Formula A:

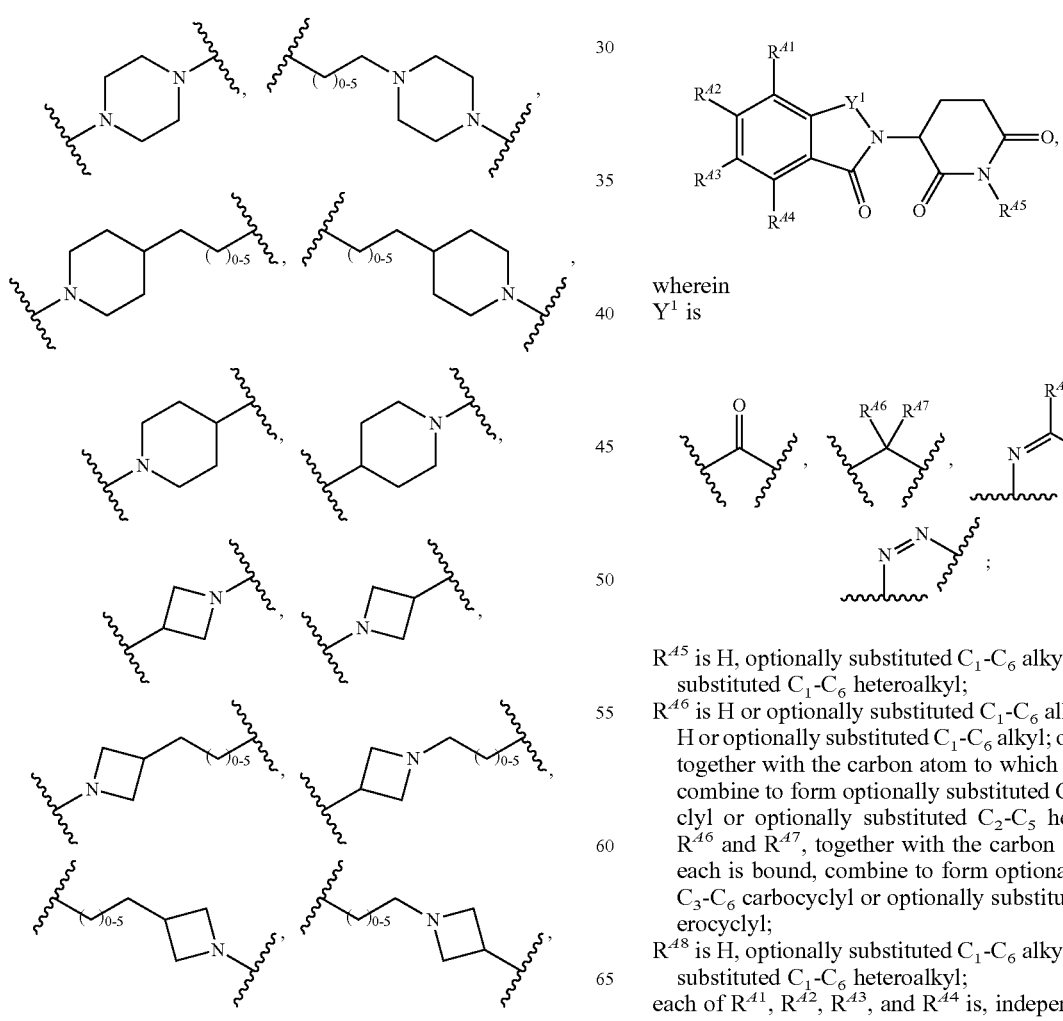

Formula A wherein
$Y^1$ is $R^{A5}$ is H, optionally substituted $C_1$-$C_6$ alkyl, or optionally substituted $C_1$-$C_6$ heteroalkyl;

$R^{A6}$ is H or optionally substituted $C_1$-$C_6$ alkyl; and $R^{A7}$ is H or optionally substituted $C_1$-$C_6$ alkyl; or $R^{A6}$ and $R^{A7}$, together with the carbon atom to which each is bound, combine to form optionally substituted $C_3$-$C_6$ carbocyclyl or optionally substituted $C_2$-$C_5$ heterocyclyl; or $R^{A6}$ and $R^{A7}$, together with the carbon atom to which each is bound, combine to form optionally substituted $C_3$-$C_6$ carbocyclyl or optionally substituted $C_2$-$C_5$ heterocyclyl;

$R^{A8}$ is H, optionally substituted $C_1$-$C_6$ alkyl, or optionally substituted $C_1$-$C_6$ heteroalkyl;

each of $R^{A1}$, $R^{A2}$, $R^{A3}$, and $R^{A4}$ is, independently, H, $A^2$, halogen, optionally substituted $C_1$-$C_6$ alkyl, optionally substituted $C_1$-$C_6$ heteroalkyl, optionally substituted $C_3$-$C_{10}$ carbocyclyl, optionally substituted $C_2$-$C_9$ heterocyclyl, optionally substituted $C_6$-$C_{10}$ aryl, optionally substituted $C_2$-$C_9$ heteroaryl, optionally substituted $C_2$-$C_6$ alkenyl, optionally substituted $C_2$-$C_6$ heteroalkenyl, optionally substituted —O—$C_3$-$C_6$ carbocyclyl, hydroxyl, thiol, or optionally substituted amino; or $R^{A1}$ and $R^{A2}$, $R^{A2}$ and $R^{A3}$, and/or $R^{A3}$ and $R^{A4}$, together is with the carbon atoms to which each is attached, combine to form

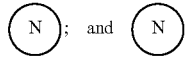

is optionally substituted $C_6$-$C_{10}$ aryl, optionally substituted $C_3$-$C_{10}$ carbocyclyl, optionally substituted $C_2$-$C_9$ heteroaryl, or $C_2$-$C_9$ heterocyclyl, any of which is optionally substituted with $A^2$, where one of $R^{A1}$, $R^{A2}$, $R^{A3}$, and $R^{A4}$ is $A^2$, or

is substituted with $A^2$; and $A^2$ is a bond between the degradation moiety and the linker.

12. The compound of claim 11, or a pharmaceutically acceptable salt thereof, wherein $R^{A5}$ is H or

13. The compound of claim 11, or a pharmaceutically acceptable salt thereof, wherein each of $R^{A1}$, $R^{A2}$, $R^{A3}$, and $R^{A4}$ is, independently, H or $A^2$.

14. The compound of claim 13, or a pharmaceutically acceptable salt thereof, wherein $R^{A1}$ is $A^2$ and each of $R^{A2}$, $R^{A3}$, and $R^{A4}$ is H, or wherein $R^{A2}$ is $A^2$ and each of $R^{A1}$, $R^{A3}$, and $R^{A4}$ is H, or wherein $R^{A3}$ is $A^2$ and each of $R^{A1}$, $R^{A2}$, and $R^{A4}$ is H, or wherein $R^{A4}$ is $A^2$ and each of $R^{A1}$, $R^{A2}$, and $R^{A3}$ is H.

15. The compound of claim 11, or a pharmaceutically acceptable salt thereof, wherein $Y^1$ is

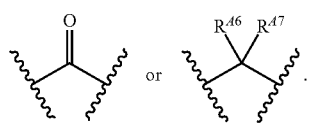

16. The compound of claim 15, or a pharmaceutically acceptable salt thereof, wherein $R^{A6}$ is H or $R^{A7}$ is H, or wherein $R^{A6}$ is H and $R^{A7}$ is H.

17. The compound of claim 11, or a pharmaceutically acceptable salt thereof, wherein $Y^1$ is

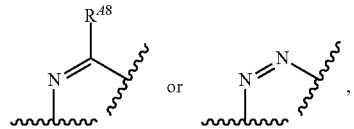

and $R^{A8}$ is H or optionally substituted $C_1$-$C_6$ alkyl.

18. The compound of claim 11, or a pharmaceutically acceptable salt thereof, wherein the degradation moiety has the structure of Formula A2, Formula A4, Formula A5, Formula A6, Formula A8, or Formula A10;

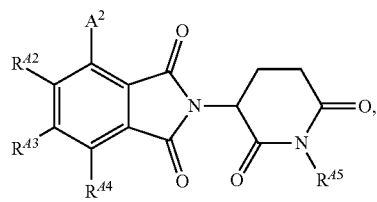

Formula A2

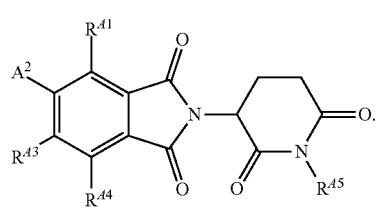

Formula A4

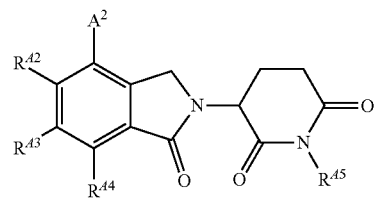

Formula A5

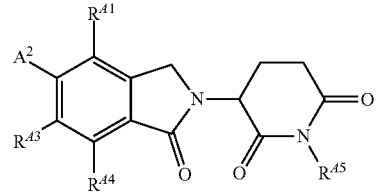

Formula A6

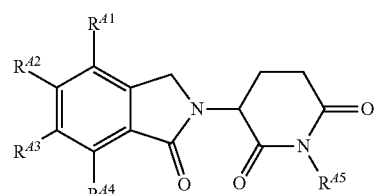

Formula A8

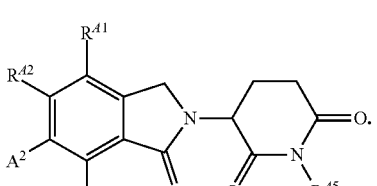

Formula A10

19. The compound of claim 11, or a pharmaceutically acceptable salt thereof, wherein the degradation moiety has the following structure:

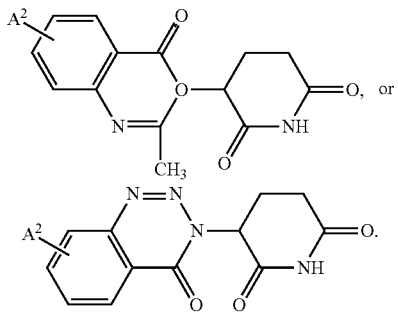

20. The compound of claim 9, or a pharmaceutically acceptable salt thereof, wherein the degradation moiety has the structure of Formula C:

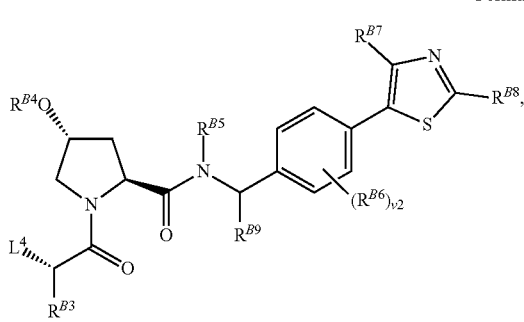

wherein
$L^4$ is —N($R^{B1}$)($R^{B2}$),

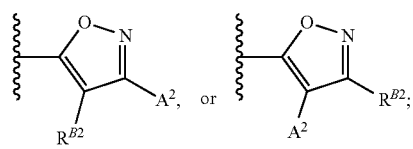

$R^{B1}$ is H, $A^2$, optionally substituted $C_1$-$C_6$ alkyl, or optionally substituted $C_1$-$C_6$ heteroalkyl;
$R^{B2}$ is H, optionally substituted $C_1$-$C_6$ alkyl, or optionally substituted $C_1$-$C_6$ heteroalkyl;
$R^{B3}$ is $A^2$, optionally substituted $C_1$-$C_6$ alkyl, optionally substituted $C_1$-$C_6$ heteroalkyl, optionally substituted $C_3$-$C_{10}$ carbocyclyl, optionally substituted $C_6$-$C_{10}$ aryl, optionally substituted $C_1$-$C_6$ alkyl $C_3$-$C_{10}$ carbocyclyl, or optionally substituted $C_1$-$C_6$ alkyl $C_6$-$C_{10}$ aryl;
$R^{B4}$ is H, optionally substituted $C_1$-$C_6$ alkyl, optionally substituted $C_3$-$C_{10}$ carbocyclyl, optionally substituted $C_6$-$C_{10}$ aryl, optionally substituted $C_1$-$C_6$ alkyl $C_3$-$C_{10}$ carbocyclyl, or optionally substituted $C_1$-$C_6$ alkyl $C_6$-$C_{10}$ aryl;
$R^{B5}$ is H, optionally substituted $C_1$-$C_6$ alkyl, or optionally substituted $C_1$-$C_6$ heteroalkyl;
v2 is 0, 1, 2, 3, or 4;
each $R^{B6}$ is, independently, $A^2$, halogen, optionally substituted $C_1$-$C_6$ alkyl, optionally substituted $C_1$-$C_6$ heteroalkyl, optionally substituted $C_3$-$C_{10}$ carbocyclyl, optionally substituted $C_2$-$C_9$ heterocyclyl, optionally substituted $C_6$-$C_{10}$ aryl, optionally substituted $C_2$-$C_9$ heteroaryl, optionally substituted $C_2$-$C_6$ alkenyl, optionally substituted $C_2$-$C_6$ heteroalkenyl, hydroxy, thiol, or optionally substituted amino;
each of $R^{B7}$ and $R^{B8}$ is, independently, H, halogen, optionally substituted $C_1$-$C_6$ alkyl, or optionally substituted $C_6$-$C_{10}$ aryl;
$R^{B9}$ is H or optionally substituted $C_1$-$C_6$ alkyl; and
$A^2$ is a bond between the degradation moiety and the linker;
wherein one and only one of $R^{B1}$, $R^{B3}$, and $R^{B6}$ is $A^2$.

21. The compound of claim 20, or a pharmaceutically acceptable salt thereof, wherein the degradation moiety has the structure of Formula $C_1$ or Formula C2:

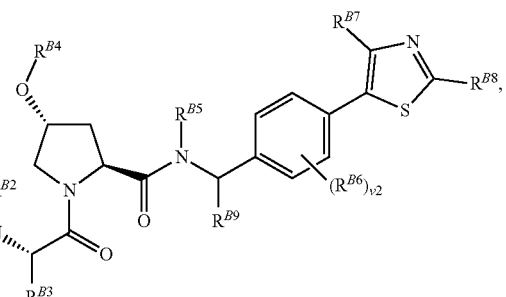

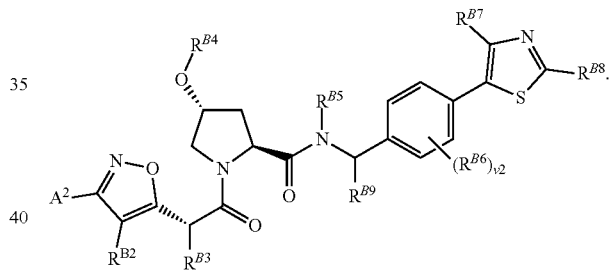

22. The compound of claim 20, or a pharmaceutically acceptable salt thereof, wherein $R^{B9}$ is methyl or H.
23. The compound of claim 20, or a pharmaceutically acceptable salt thereof, wherein $R^{B9}$ is bonded to(S)-stereogenic center.
24. The compound of claim 20, or a pharmaceutically acceptable salt thereof, wherein the degradation moiety has the following structure:

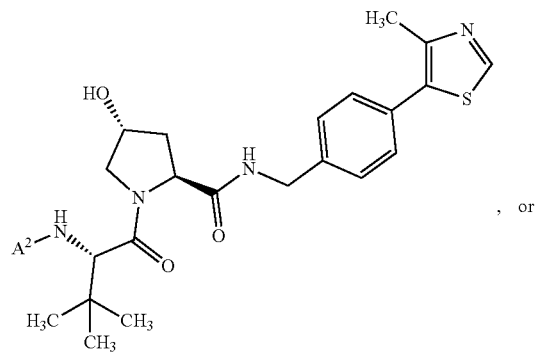

277
-continued

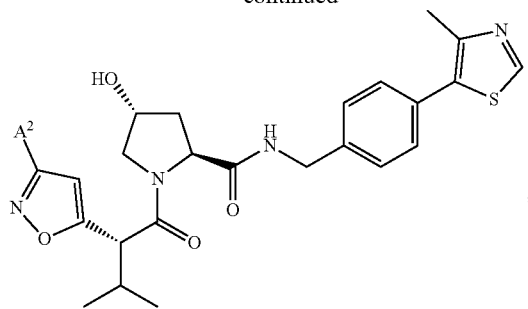

, or

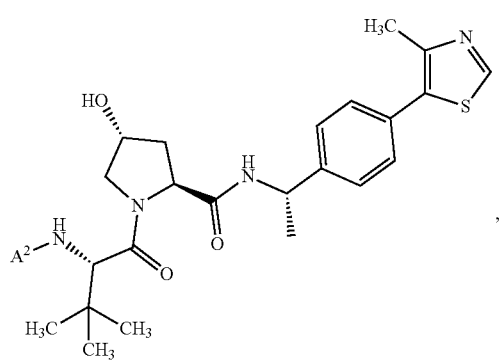

, or

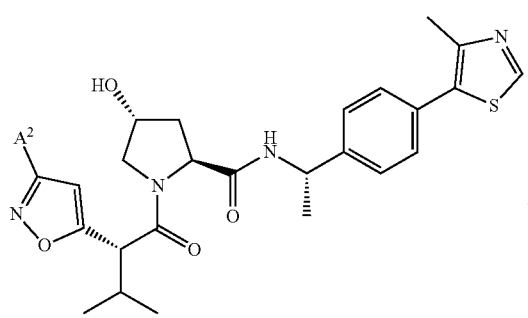

, or

278
-continued

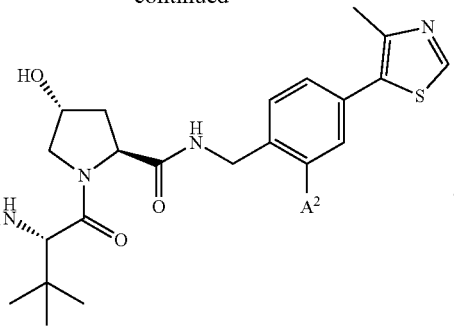

.

25. The compound of claim 1, or a pharmaceutically acceptable salt thereof, wherein the degradation moiety comprises the structure of

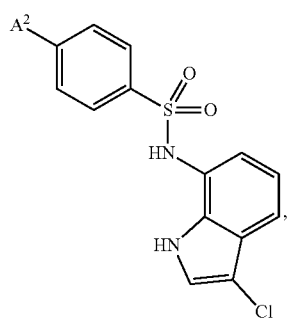

wherein $A^2$ is a bond between the degradation moiety and the linker.

26. The compound of claim 1, or a pharmaceutically acceptable salt thereof, wherein k is 0.

27. A compound selected from the group consisting of compounds 1-105 in Table 1 and pharmaceutically acceptable salts thereof.

28. The compound of claim 1, or a pharmaceutically acceptable salt thereof, wherein the compound has a ratio of BRG1 $IC_{50}$ to BRM $IC_{50}$ of at least 5.

29. A pharmaceutical composition comprising a compound of claim 1, and a pharmaceutically acceptable excipient.

* * * * *